(12) United States Patent
Campbell et al.

(10) Patent No.: US 9,128,262 B2
(45) Date of Patent: Sep. 8, 2015

(54) SLIDABLE TELECOMMUNICATIONS TRAY WITH CABLE SLACK MANAGEMENT

(71) Applicant: ADC Telecommunications, Inc., Berwyn, PA (US)

(72) Inventors: Brent Campbell, Minneapolis, MN (US); Ryan Kostecka, Waconia, MN (US); Paula Rudenick, Jordan, MN (US); Scott C. Sievers, Jordan, MN (US); Dustin Tichy, Benson, MN (US); Gregory J. Shaible, Lakeville, MN (US); Jonathan T. Lawson, Eagan, MN (US); Oscar Fernando Bran de León, Belle Plaine, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 0 days.

(21) Appl. No.: 14/169,941

(22) Filed: Jan. 31, 2014

(65) Prior Publication Data

US 2014/0248028 A1 Sep. 4, 2014

Related U.S. Application Data

(60) Provisional application No. 61/843,977, filed on Jul. 9, 2013, provisional application No. 61/843,744, filed on Jul. 8, 2013, provisional application No. 61/763,347, filed on Feb. 11, 2013, provisional application No. 61/761,009, filed on Feb. 5, 2013.

(51) Int. Cl.
*G02B 6/44* (2006.01)
*G02B 6/00* (2006.01)

(52) U.S. Cl.
CPC ............... *G02B 6/4452* (2013.01); *G02B 6/00* (2013.01); *G02B 6/4453* (2013.01); *G02B 6/4461* (2013.01)

(58) Field of Classification Search
CPC ..................................................... G02B 6/4461
See application file for complete search history.

(56) References Cited

U.S. PATENT DOCUMENTS

| 2,805,106 A | 9/1957 | Penkala |
| 2,864,656 A | 12/1958 | Yorinks |

(Continued)

FOREIGN PATENT DOCUMENTS

| AU | 40995/85 | 4/1985 |
| AU | 55314/86 | 3/1986 |

(Continued)

OTHER PUBLICATIONS

"ITU Fiber Handbook" with English translation, 14 pages, Mar. 1992.

(Continued)

*Primary Examiner* — Jerry Rahll
(74) *Attorney, Agent, or Firm* — Merchant & Gould P.C.

(57) ABSTRACT

A fiber optic telecommunications device includes a rack for mounting a plurality of chassis, each chassis including a plurality of trays slidably mounted thereon and arranged in a vertically stacked arrangement. Each tray includes fiber optic connection locations and a cable manager coupled to the tray and also coupled to the chassis, the cable manager for routing cables to and from the fiber optic connection locations and defining a plurality of link arms pivotally connected such that the manager retracts and extends with a corresponding movement of the tray, wherein the link arms pivot relative to each other to prevent cables managed therein from being bent in an arc having a radius of curvature less than a predetermined value, each link arm defining a top wall, a bottom wall, and two oppositely positioned sidewalls, each link arm defining an open portion along at least one of the sidewalls and an open portion along the top wall for receiving cables therein, the open portions along the top wall and the at least one of the sidewalls communicating with each other.

43 Claims, 112 Drawing Sheets

(56) References Cited

U.S. PATENT DOCUMENTS

| | | |
|---|---|---|
| 3,901,564 A | 8/1975 | Armstrong |
| 4,070,076 A | 1/1978 | Zwillinger |
| 4,172,625 A | 10/1979 | Swain |
| 4,320,934 A | 3/1982 | Rock et al. |
| 4,359,262 A | 11/1982 | Dolan |
| 4,373,776 A | 2/1983 | Purdy |
| 4,494,806 A | 1/1985 | Williams et al. |
| 4,502,754 A | 3/1985 | Kawa |
| 4,585,303 A | 4/1986 | Pinsard et al. |
| 4,595,255 A | 6/1986 | Bhatt et al. |
| 4,630,886 A | 12/1986 | Lauriello et al. |
| 4,697,874 A | 10/1987 | Nozick |
| 4,699,455 A | 10/1987 | Erbe et al. |
| 4,708,430 A | 11/1987 | Donaldson et al. |
| 4,717,231 A | 1/1988 | Dewez et al. |
| 4,737,039 A | 4/1988 | Sekerich |
| 4,765,710 A | 8/1988 | Burmeister et al. |
| 4,792,203 A | 12/1988 | Nelson et al. |
| 4,820,007 A | 4/1989 | Ross et al. |
| 4,840,449 A | 6/1989 | Ghandeharizadeh |
| 4,898,448 A | 2/1990 | Cooper |
| 4,971,421 A | 11/1990 | Ori |
| 4,986,762 A | 1/1991 | Keith |
| 4,995,688 A | 2/1991 | Anton et al. |
| 5,024,498 A | 6/1991 | Becker et al. |
| 5,066,149 A | 11/1991 | Wheeler et al. |
| 5,067,678 A | 11/1991 | Henneberger et al. |
| 5,071,211 A | 12/1991 | Debortoli et al. |
| 5,100,221 A | 3/1992 | Carney et al. |
| 5,127,082 A | 6/1992 | Below et al. |
| 5,129,030 A | 7/1992 | Petrunia |
| 5,138,688 A | 8/1992 | Debortoli |
| 5,142,606 A | 8/1992 | Carney et al. |
| 5,142,607 A | 8/1992 | Petrotta et al. |
| 5,167,001 A | 11/1992 | Debortoli et al. |
| 5,174,675 A | 12/1992 | Martin |
| 5,240,209 A | 8/1993 | Kutsch |
| 5,247,603 A | 9/1993 | Vidacovich et al. |
| 5,275,064 A | 1/1994 | Hobbs |
| 5,285,515 A | 2/1994 | Milanowski et al. |
| 5,289,558 A | 2/1994 | Teichler et al. |
| 5,316,243 A | 5/1994 | Henneberger |
| 5,323,480 A | 6/1994 | Mullaney et al. |
| 5,335,349 A | 8/1994 | Kutsch et al. |
| 5,339,379 A | 8/1994 | Kutsch et al. |
| 5,353,367 A | 10/1994 | Czosnowski et al. |
| 5,363,466 A | 11/1994 | Milanowskki et al. |
| 5,363,467 A | 11/1994 | Keith |
| 5,402,515 A | 3/1995 | Vidacovich et al. |
| 5,412,751 A | 5/1995 | Siemon et al. |
| 5,430,823 A | 7/1995 | Dupont et al. |
| 5,438,641 A | 8/1995 | Malacarne |
| 5,490,229 A | 2/1996 | Ghandeharizadeh et al. |
| 5,497,444 A | 3/1996 | Wheeler |
| 5,509,096 A | 4/1996 | Easley |
| 5,511,144 A | 4/1996 | Hawkins et al. |
| 5,530,783 A | 6/1996 | Belopolsky et al. |
| 5,570,450 A | 10/1996 | Fernandez et al. |
| 5,613,030 A | 3/1997 | Hoffer et al. |
| 5,640,481 A | 6/1997 | Llewellyn et al. |
| 5,655,044 A | 8/1997 | Finzel et al. |
| 5,717,810 A | 2/1998 | Wheeler |
| 5,724,469 A | 3/1998 | Orlando |
| 5,802,237 A | 9/1998 | Pulido |
| 5,811,055 A | 9/1998 | Geiger |
| 5,836,148 A | 11/1998 | Fukao |
| 5,882,100 A | 3/1999 | Rock |
| 5,887,106 A | 3/1999 | Cheeseman et al. |
| 5,917,984 A | 6/1999 | Roseler et al. |
| 5,923,753 A | 7/1999 | Haataja et al. |
| 5,946,440 A | 8/1999 | Puetz |
| 5,966,492 A | 10/1999 | Bechamps et al. |
| 5,971,626 A | 10/1999 | Knodell et al. |
| 5,975,769 A | 11/1999 | Larson et al. |
| 5,978,540 A | 11/1999 | Bechamps et al. |
| 6,009,224 A | 12/1999 | Allen |
| 6,022,150 A | 2/2000 | Erdman et al. |
| 6,027,252 A | 2/2000 | Erdman et al. |
| 6,044,194 A | 3/2000 | Meyerhoefer |
| 6,076,908 A | 6/2000 | Maffeo |
| 6,215,938 B1 | 4/2001 | Reitmeier et al. |
| 6,226,436 B1 | 5/2001 | Daoud et al. |
| 6,236,795 B1 | 5/2001 | Rodgers |
| 6,269,214 B1 | 7/2001 | Naudin et al. |
| 6,301,424 B1 | 10/2001 | Hwang |
| 6,438,310 B1 | 8/2002 | Lance et al. |
| 6,439,523 B1 | 8/2002 | Chandler et al. |
| 6,496,638 B1 | 12/2002 | Andersen |
| 6,504,988 B1 | 1/2003 | Trebesch et al. |
| 6,556,763 B1 | 4/2003 | Puetz et al. |
| 6,591,051 B2 | 7/2003 | Solheid et al. |
| 6,594,434 B1 | 7/2003 | Davidson et al. |
| 6,600,866 B2 | 7/2003 | Gatica et al. |
| RE38,311 E | 11/2003 | Wheeler |
| 6,647,197 B1 * | 11/2003 | Marrs et al. .................. 385/134 |
| 6,677,520 B1 | 1/2004 | Kim et al. |
| 6,715,619 B2 | 4/2004 | Kim et al. |
| 6,748,155 B2 | 6/2004 | Kim et al. |
| 6,768,860 B2 | 7/2004 | Liberty |
| 6,772,887 B2 | 8/2004 | Audibert et al. |
| 6,804,447 B2 | 10/2004 | Smith et al. |
| 6,809,258 B1 | 10/2004 | Dang et al. |
| 6,810,193 B1 | 10/2004 | Müller |
| 6,845,208 B2 | 1/2005 | Thibault et al. |
| 6,865,331 B2 | 3/2005 | Mertesdorf |
| 6,925,241 B2 | 8/2005 | Bohle et al. |
| 6,934,457 B2 | 8/2005 | Vincent et al. |
| 6,945,620 B2 | 9/2005 | Lam et al. |
| 6,968,111 B2 | 11/2005 | Trebesch et al. |
| 7,006,748 B2 | 2/2006 | Dagley et al. |
| 7,068,907 B2 | 6/2006 | Schray |
| 7,079,744 B2 | 7/2006 | Douglas et al. |
| 7,120,348 B2 | 10/2006 | Trebesch et al. |
| 7,171,099 B2 | 1/2007 | Barnes et al. |
| 7,302,153 B2 | 11/2007 | Thom |
| 7,302,154 B2 | 11/2007 | Trebesch et al. |
| 7,308,184 B2 | 12/2007 | Barnes et al. |
| 7,373,071 B2 | 5/2008 | Douglas et al. |
| 7,406,240 B2 | 7/2008 | Murano |
| 7,409,137 B2 | 8/2008 | Barnes |
| 7,460,757 B2 | 12/2008 | Hoehne et al. |
| 7,463,811 B2 | 12/2008 | Trebesch et al. |
| 7,496,268 B2 | 2/2009 | Escoto et al. |
| 7,499,623 B2 | 3/2009 | Barnes et al. |
| 7,664,361 B2 | 2/2010 | Trebesch et al. |
| 7,689,089 B2 | 3/2010 | Wagner et al. |
| 7,706,656 B2 | 4/2010 | Zimmel |
| 7,715,681 B2 | 5/2010 | Krampotich et al. |
| 7,747,125 B1 | 6/2010 | Lee et al. |
| RE41,460 E | 7/2010 | Wheeler |
| 7,751,674 B2 | 7/2010 | Hill |
| 7,764,859 B2 | 7/2010 | Krampotich et al. |
| 7,856,166 B2 | 12/2010 | Biribuze et al. |
| 7,869,683 B2 | 1/2011 | Barnes et al. |
| 7,876,993 B2 | 1/2011 | Krampotich et al. |
| 7,889,961 B2 | 2/2011 | Cote et al. |
| 7,934,022 B2 | 4/2011 | Velleca et al. |
| 8,027,558 B2 | 9/2011 | Barnes et al. |
| 8,059,932 B2 | 11/2011 | Hill et al. |
| 8,078,030 B2 | 12/2011 | Trebesch et al. |
| 8,452,149 B2 | 5/2013 | Krampotich et al. |
| 8,639,081 B2 | 1/2014 | Barnes et al. |
| 8,655,136 B2 | 2/2014 | Trebesch et al. |
| 8,690,593 B2 | 4/2014 | Anderson et al. |
| 2001/0001270 A1 | 5/2001 | Williams Vigliaturo |
| 2002/0181922 A1 | 12/2002 | Xin et al. |
| 2003/0007767 A1 | 1/2003 | Douglas et al. |
| 2003/0128951 A1 | 7/2003 | Lecomte et al. |
| 2003/0165315 A1 | 9/2003 | Trebesch et al. |
| 2004/0011750 A1 | 1/2004 | Kim et al. |
| 2004/0013390 A1 | 1/2004 | Kim et al. |
| 2004/0136676 A1 | 7/2004 | Mertesdorf |
| 2004/0175090 A1 | 9/2004 | Vastmans et al. |
| 2004/0258384 A1 | 12/2004 | Trebesch et al. |

(56) References Cited

U.S. PATENT DOCUMENTS

| | | |
|---|---|---|
| 2005/0025444 A1 | 2/2005 | Barnes et al. |
| 2005/0078929 A1 | 4/2005 | Iwanek |
| 2005/0123261 A1 | 6/2005 | Bellekens et al. |
| 2007/0003204 A1 | 1/2007 | Makrides-Saravanos et al. |
| 2007/0031099 A1 | 2/2007 | Herzog et al. |
| 2007/0201806 A1 | 8/2007 | Douglas et al. |
| 2008/0175550 A1 | 7/2008 | Coburn et al. |
| 2008/0219634 A1 | 9/2008 | Rapp et al. |
| 2009/0067802 A1 | 3/2009 | Hoehne et al. |
| 2009/0097813 A1 | 4/2009 | Hill |
| 2009/0226142 A1 | 9/2009 | Barnes et al. |
| 2009/0274431 A1 | 11/2009 | Krampotich et al. |
| 2010/0135631 A1 | 6/2010 | Zimmel et al. |
| 2010/0142910 A1 | 6/2010 | Hill et al. |
| 2010/0158465 A1 | 6/2010 | Smrha |
| 2010/0266253 A1 | 10/2010 | Krampotich et al. |
| 2010/0316346 A1 | 12/2010 | Krampotich et al. |
| 2010/0322578 A1 | 12/2010 | Cooke et al. |
| 2011/0188809 A1 | 8/2011 | LeBlanc et al. |
| 2011/0217016 A1 | 9/2011 | Mullsteff |
| 2011/0268404 A1 | 11/2011 | Cote et al. |
| 2011/0268408 A1 | 11/2011 | Giraud et al. |
| 2011/0268410 A1 | 11/2011 | Giraud et al. |
| 2011/0268412 A1 | 11/2011 | Giraud et al. |
| 2011/0289760 A1 | 12/2011 | Marcouiller |
| 2012/0057838 A1 | 3/2012 | Hill et al. |
| 2013/0089292 A1 | 4/2013 | Ott et al. |
| 2013/0089298 A1 | 4/2013 | Holmberg et al. |
| 2013/0183018 A1 | 7/2013 | Holmberg |
| 2014/0086545 A1 | 3/2014 | Solheid et al. |
| 2014/0133819 A1 | 5/2014 | Trebesch et al. |

FOREIGN PATENT DOCUMENTS

| | | |
|---|---|---|
| DE | 2735106 | 2/1979 |
| DE | 2918309 | 11/1980 |
| DE | 3308682 | 9/1984 |
| DE | 3836273 | 4/1990 |
| DE | 4413136 | 5/1995 |
| DE | 29504191 | 3/1996 |
| EP | 0146478 | 6/1985 |
| EP | 0149250 | 7/1985 |
| EP | 0356942 | 3/1990 |
| EP | 0406151 | 1/1991 |
| EP | 0464570 | 1/1992 |
| EP | 0479226 | 4/1992 |
| EP | 0196102 | 3/1993 |
| EP | 0538164 | 4/1993 |
| EP | 0563995 | 10/1999 |
| FR | 2531576 | 2/1984 |
| FR | 2587127 | 3/1987 |
| FR | 2678076 | 12/1992 |
| JP | 59-74523 | 4/1984 |
| JP | 60-169811 | 9/1985 |
| JP | 61-55607 | 3/1986 |
| JP | 61-90104 | 5/1986 |
| KR | 200337929 | 1/2004 |
| KR | 10-0750350 | 8/2007 |
| KR | 20080033420 | 4/2008 |
| WO | WO 91/10927 | 7/1991 |
| WO | WO 95/07480 | 3/1995 |
| WO | WO 96/10203 | 4/1996 |
| WO | WO 99/00619 | 1/1999 |
| WO | WO 03/005095 | 1/2003 |

OTHER PUBLICATIONS

"Precision Mechanical" with English translation, 5 pages.

AT&T Product Bulletin 2987D-DLH-7/89, "High Density Interconnect System (HDIC)," Issue 2 (Copyright 1989).

Complaint relating to Civil Action No. 1:11cv-735 (GBL-IDD), *ADC Telecommunications, Inc* v. *Opterna Am, Inc.* filed Jul. 12, 2011 (5 pages).

Complaint relating to Civil Action No. 5:11-cv-02509-JS, *ADC Telecommunications, Inc* v. *Opterna Am, Inc.* filed Apr. 11, 2011 (14 pages).

International Search Report and Written Opinion for PCT/US2014/014866 mailed Aug. 18, 2014.

Northern Telecom Bulletin #91-004, Issue #2, May 1991.

Plaintiff's Notice of Dismissal relating to Civil Action No. 5:11-cv-02509-JS, *ADC Telecommunications, Inc* v. *Opterna Am, Inc.* filed Jul. 12, 2011 (1 page).

Preface to the book "Structure, Installation, Connection and Protection of Communication Optical Fiber Cable," in Chinese with English Translation, 14 pages (Mar. 1992).

Stipulation and Order of Dismissal relating to Civil Action No. 1:11-cv-735-GBL-IDD, *ADC Telecommunications, Inc* v. *Opterna Am, Inc.* filed Feb. 21, 2012 (2 pages).

\* cited by examiner

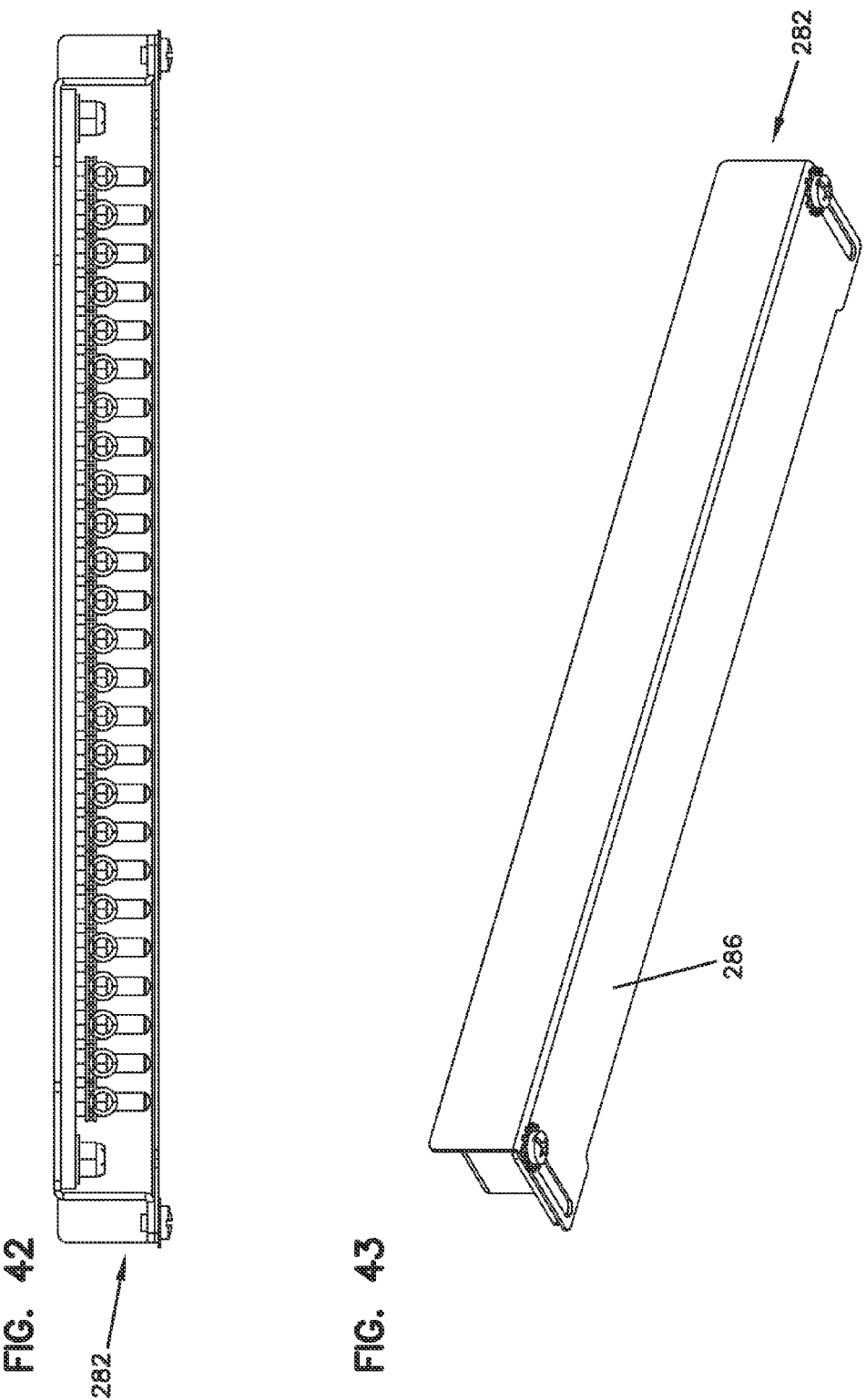

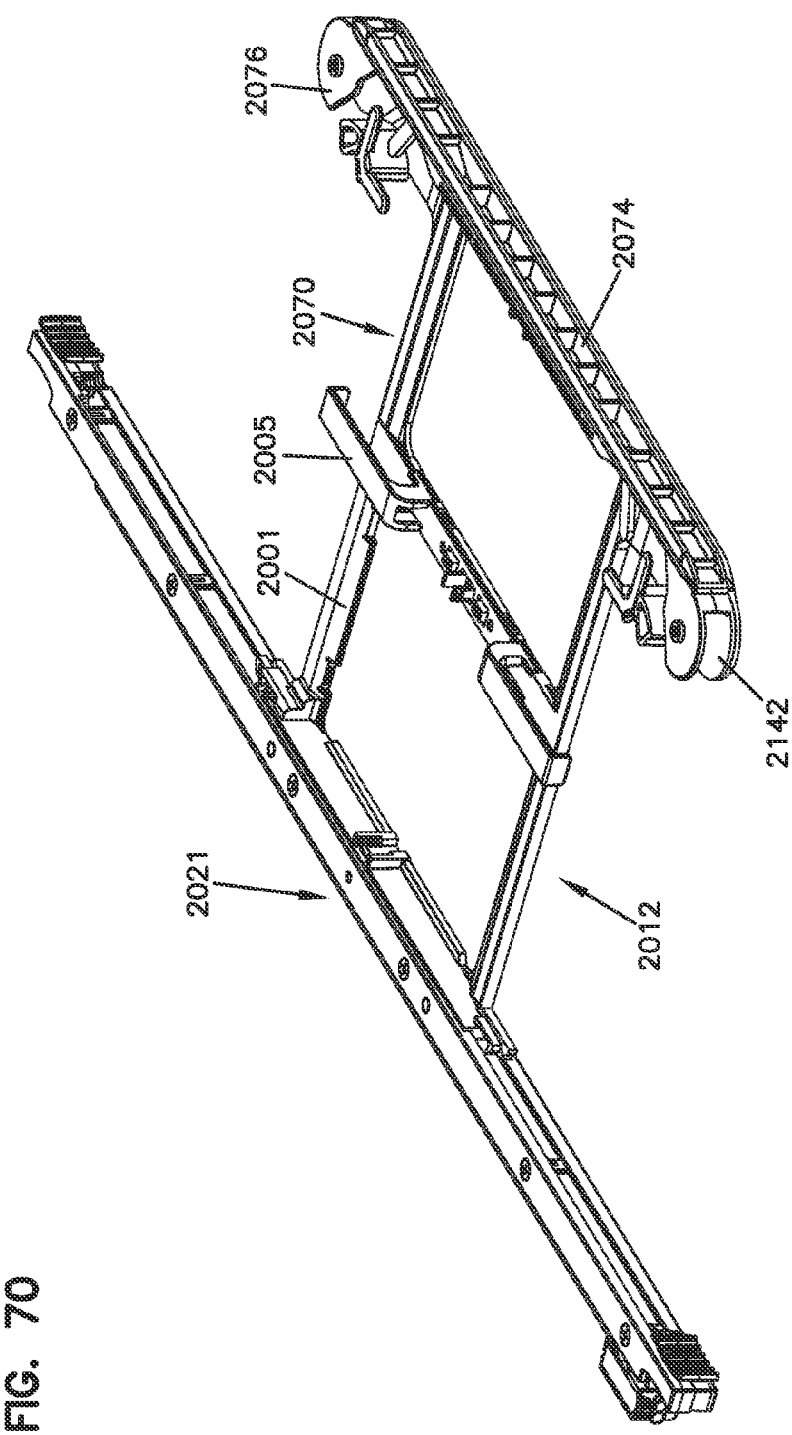

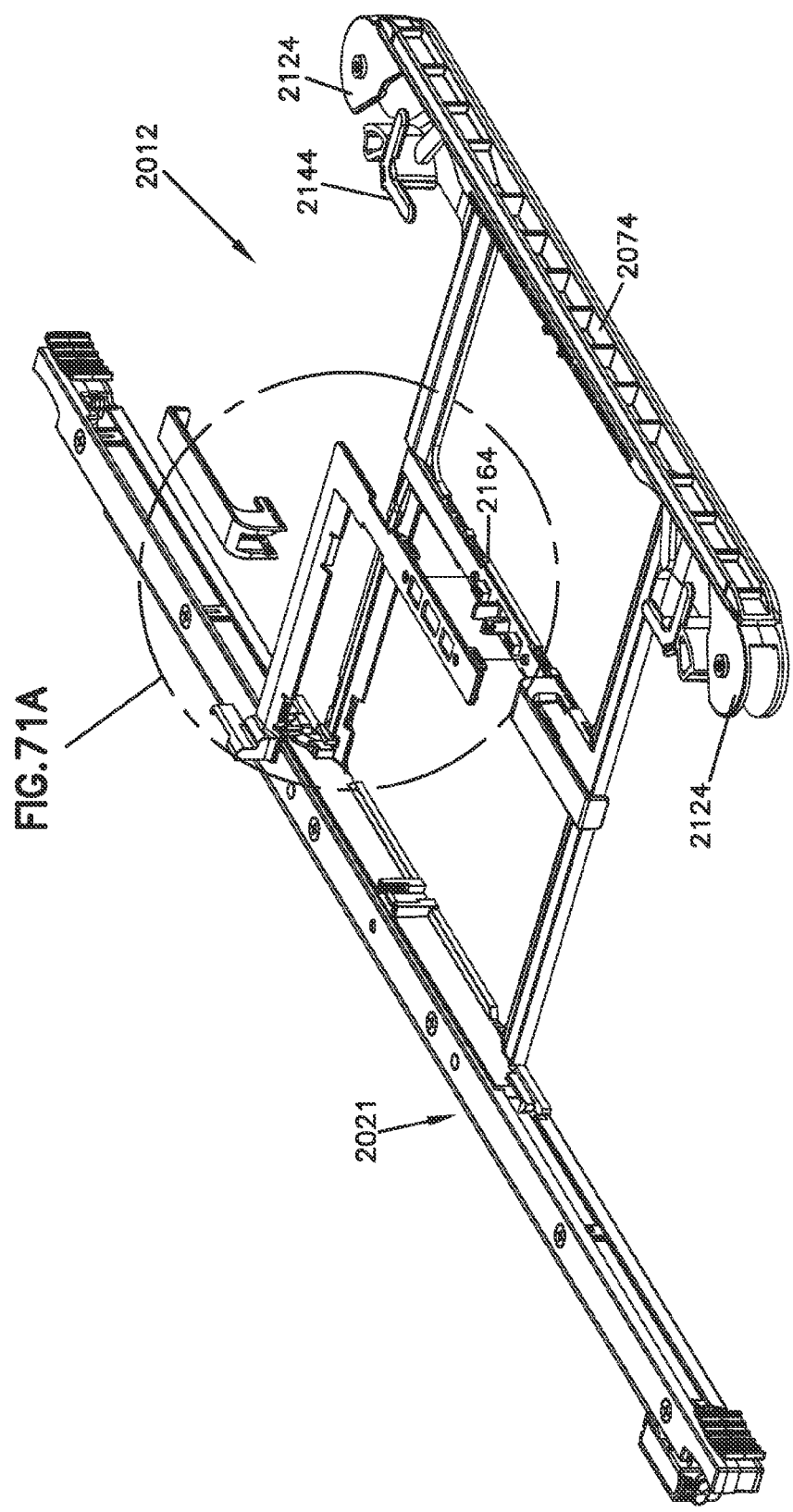

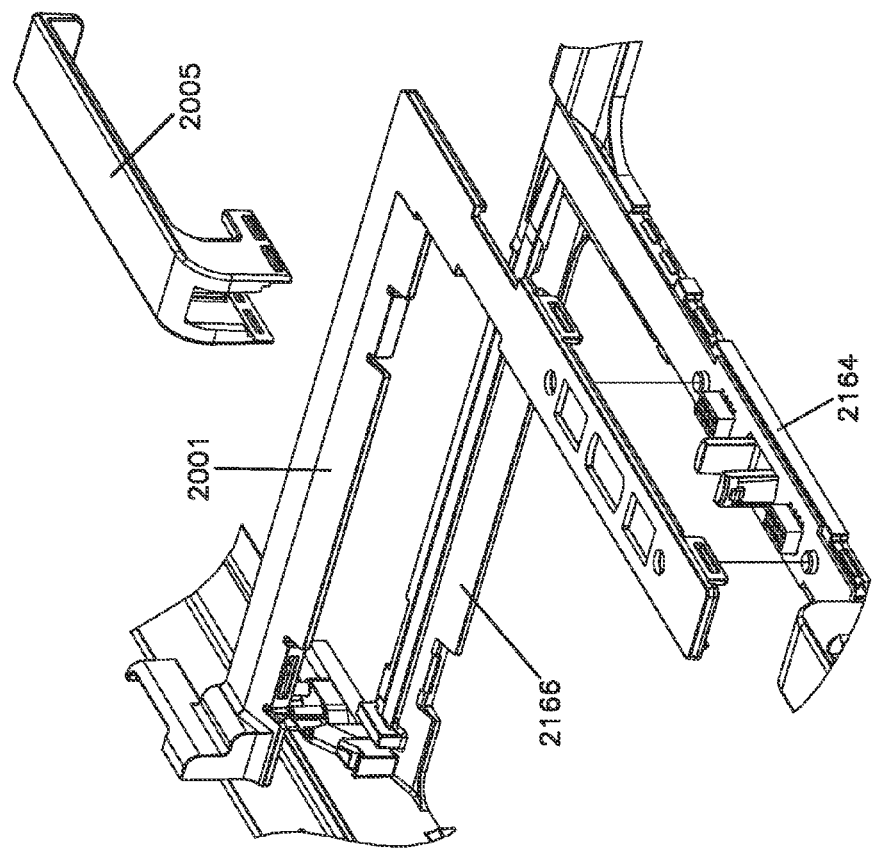

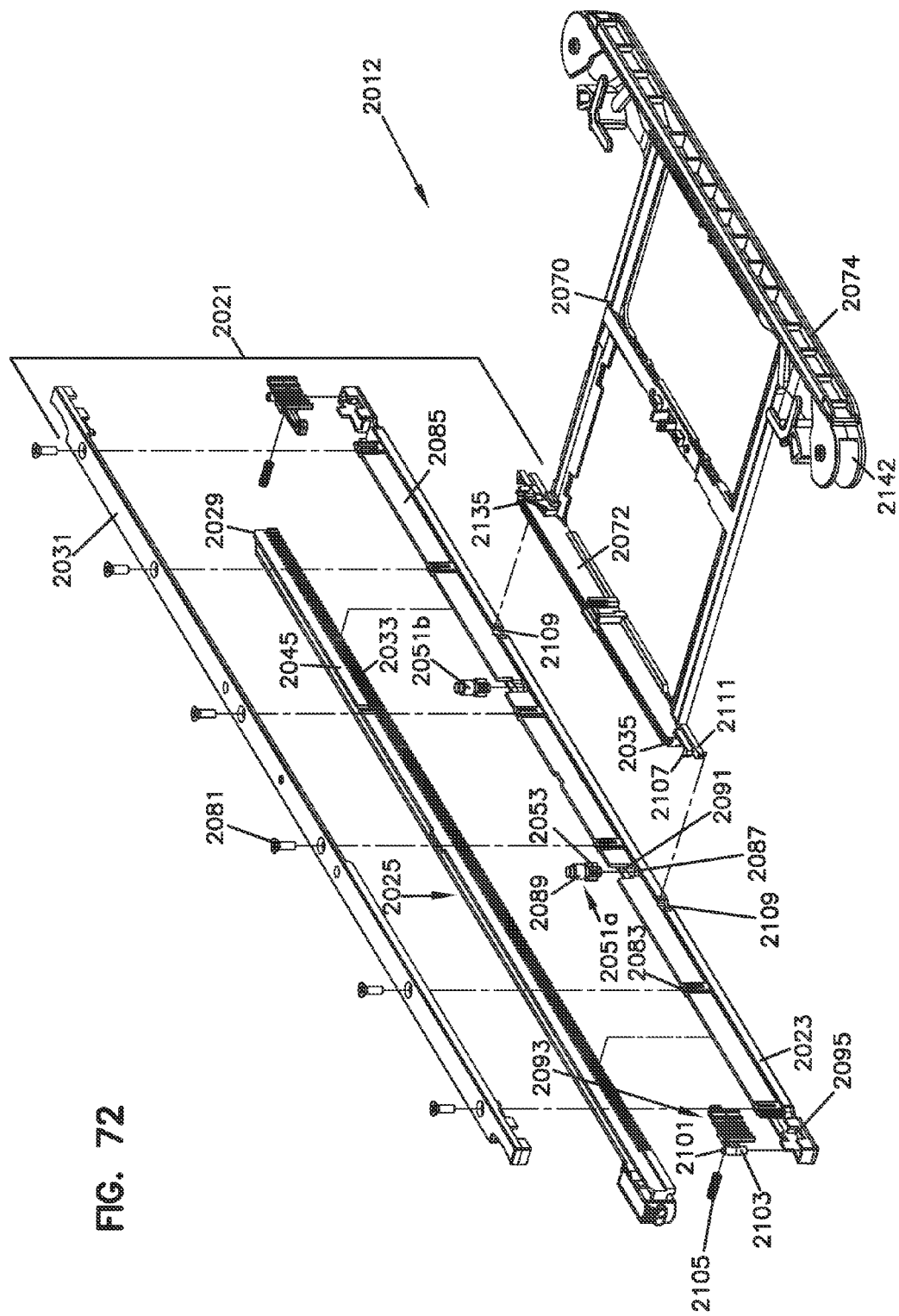

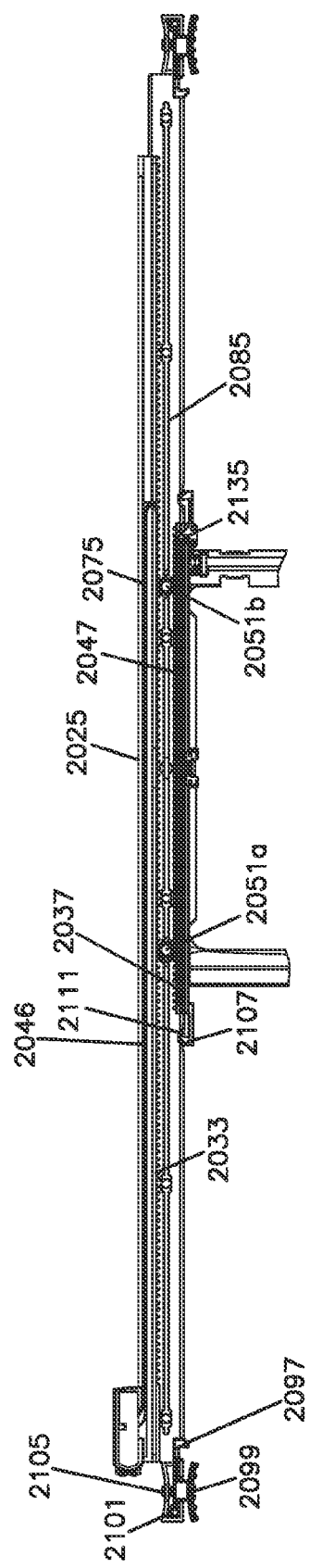

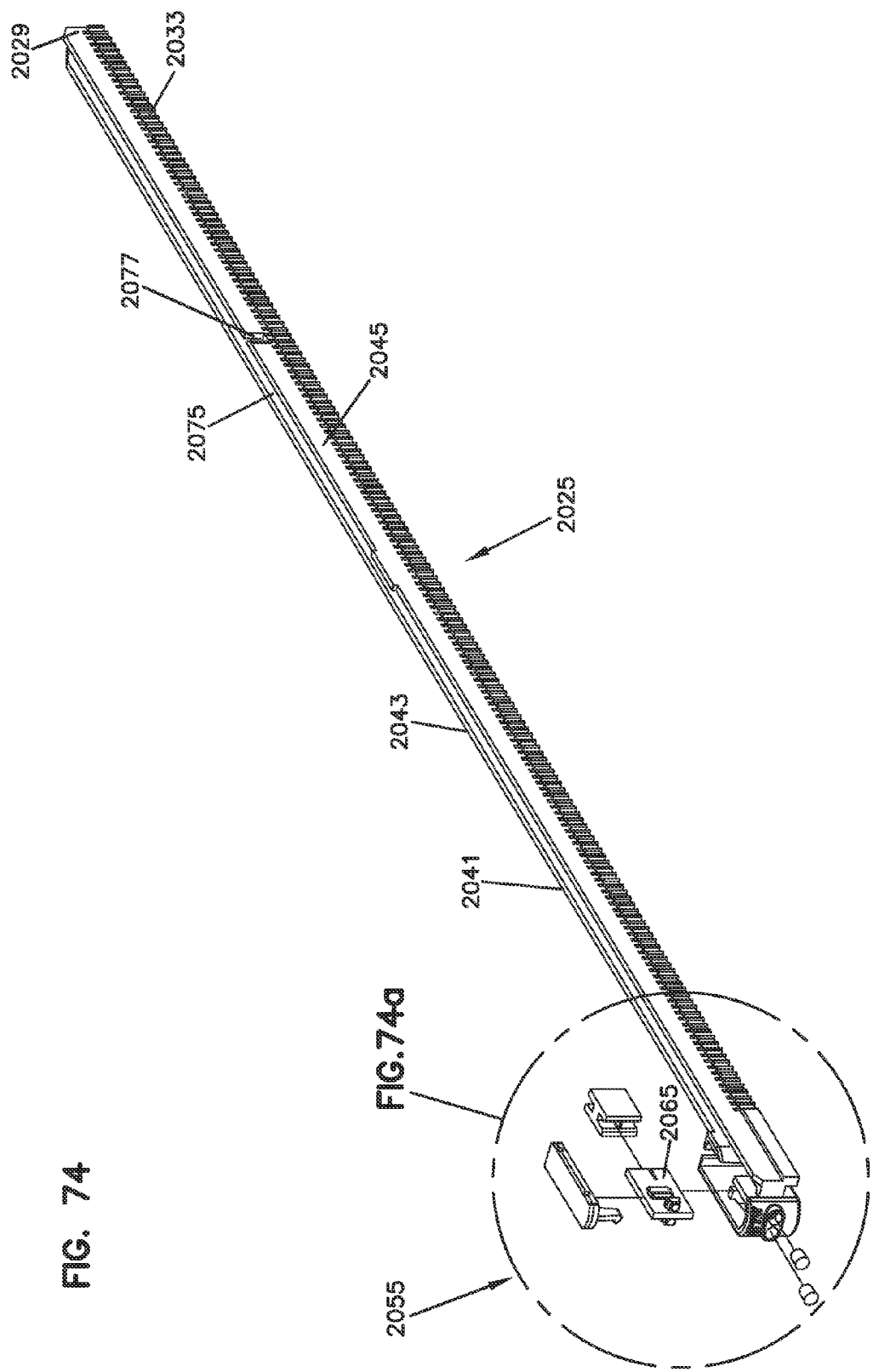

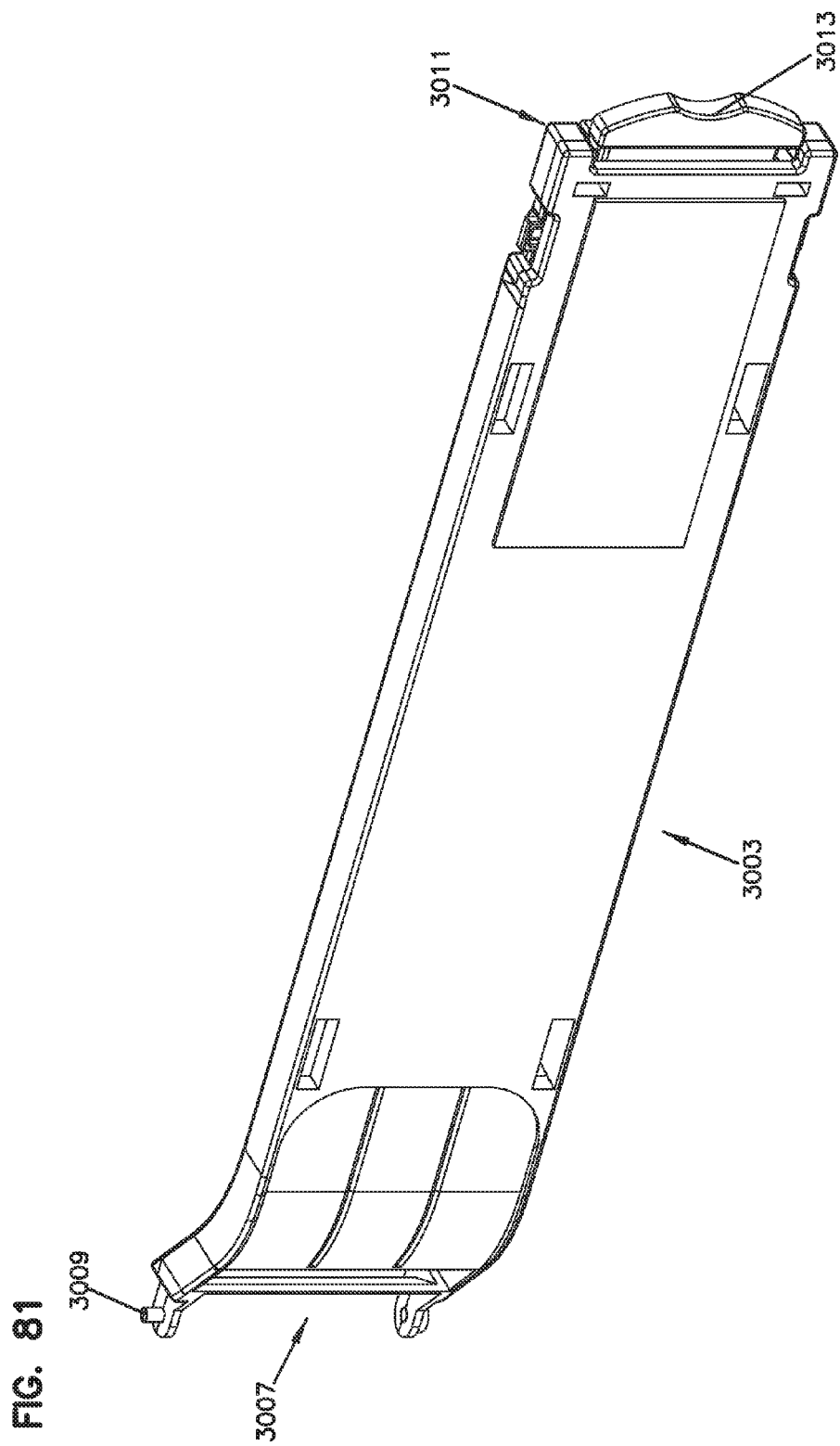

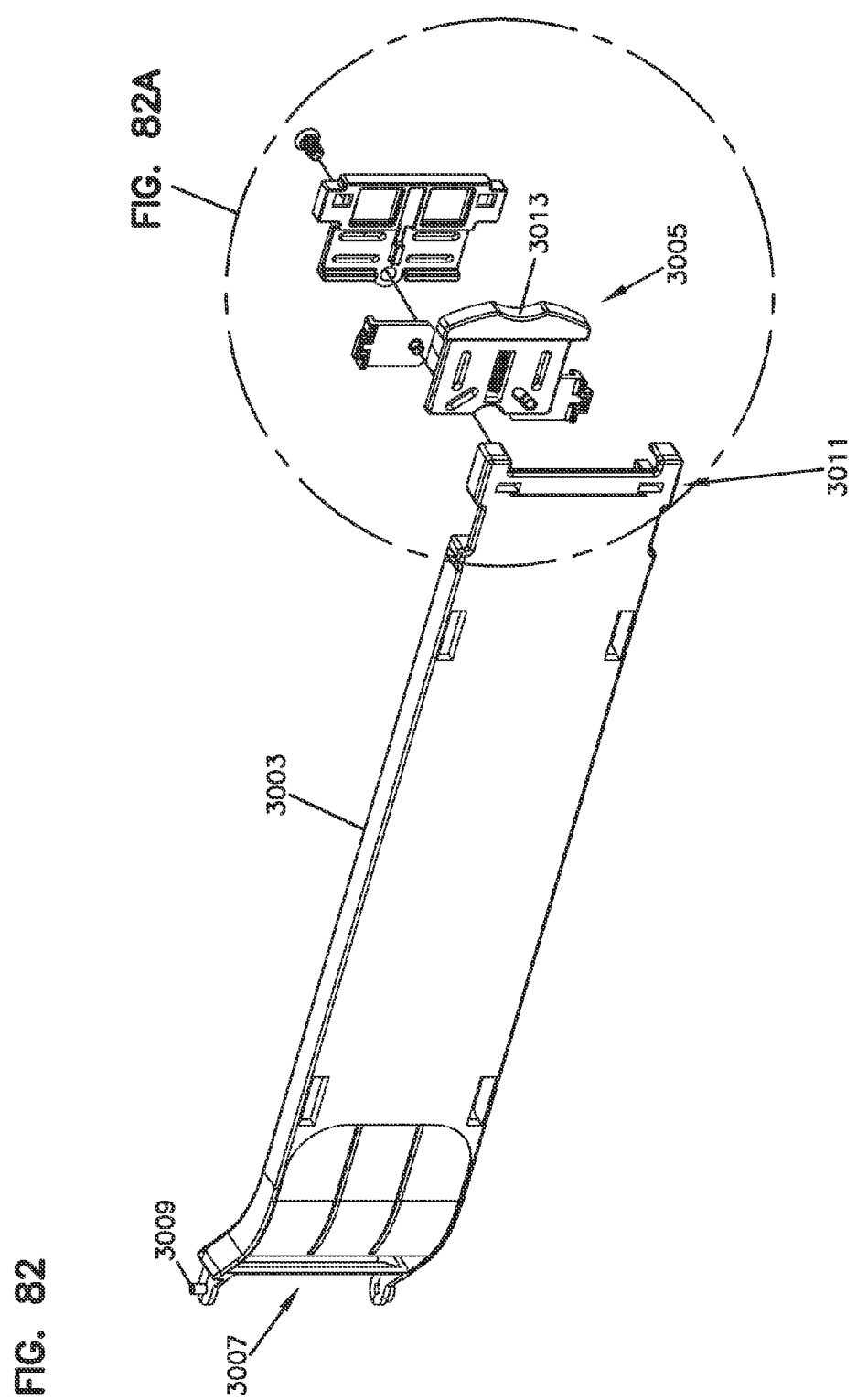

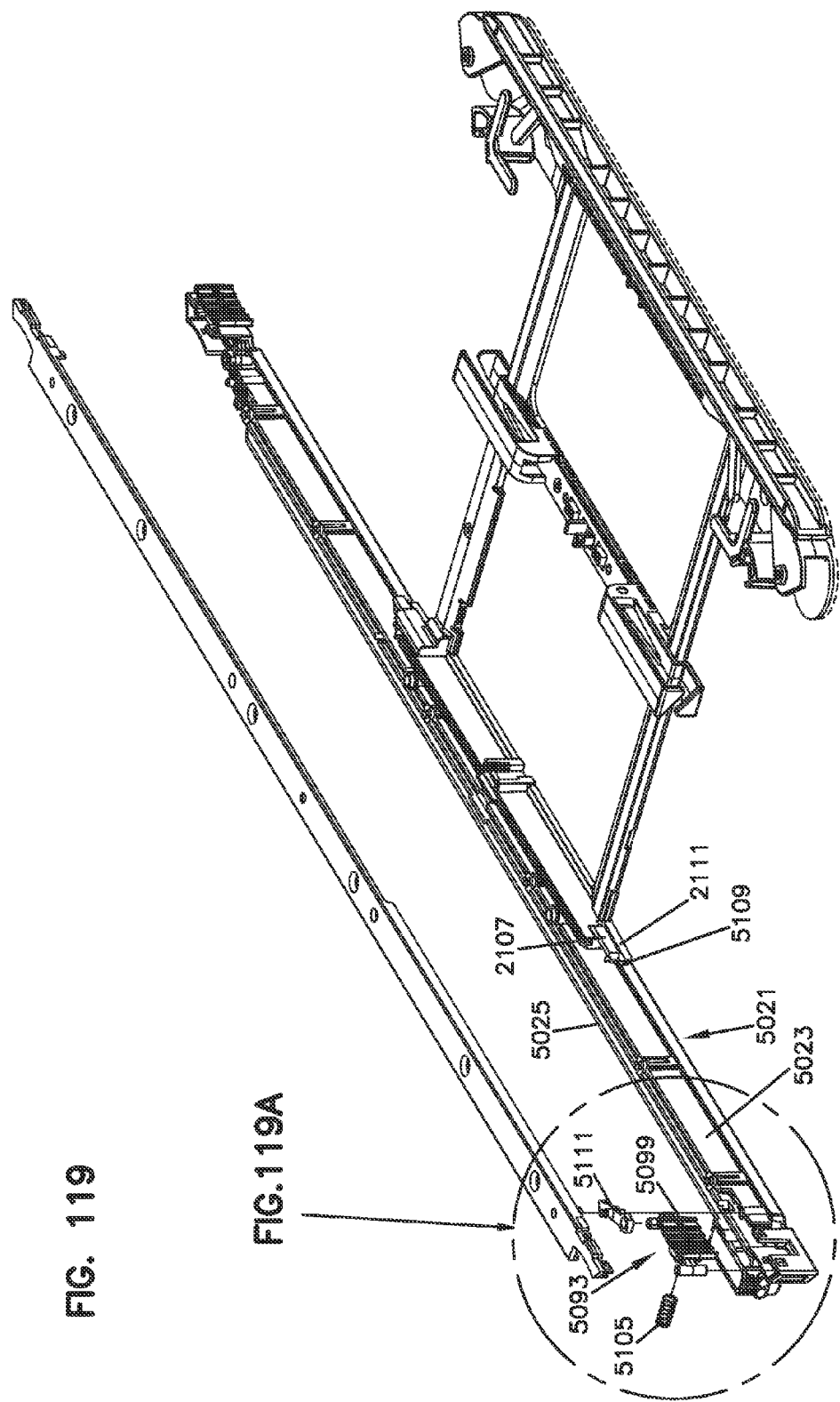

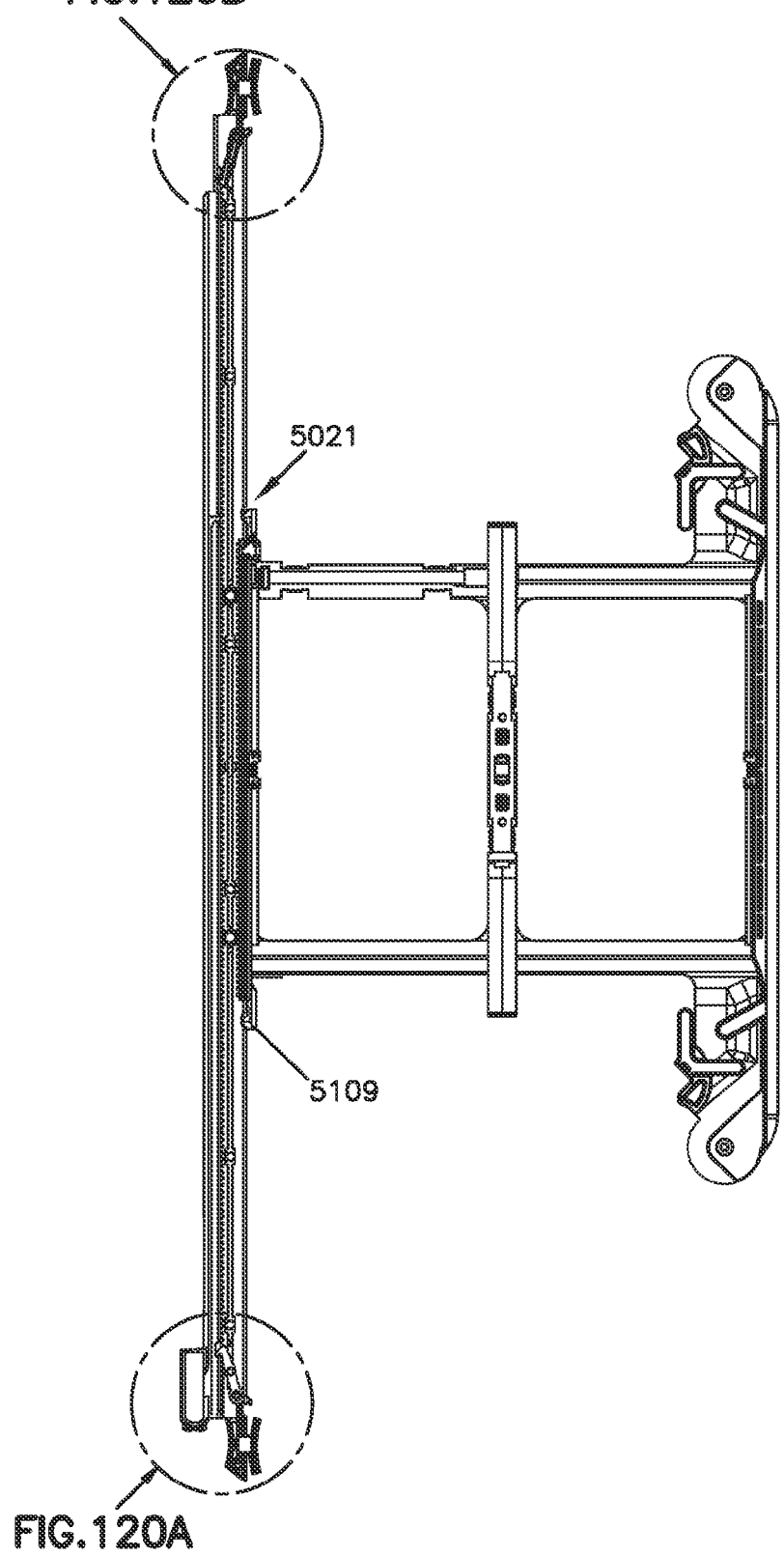

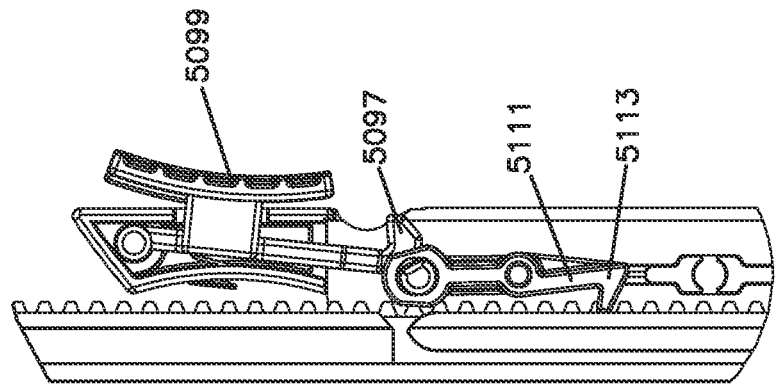
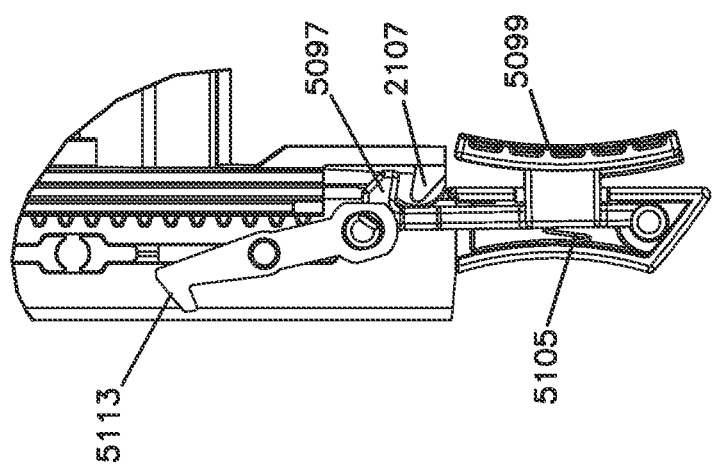

SLIDABLE TELECOMMUNICATIONS TRAY WITH CABLE SLACK MANAGEMENT

CROSS REFERENCE TO RELATED APPLICATIONS

The present application claims priority to U.S. Provisional Application Ser. Nos. 61/761,009, filed on Feb. 5, 2013; 61/763,347, filed on Feb. 11, 2013; 61/843,744, filed on Jul. 8, 2013; and 61/843,977, filed on Jul. 9, 2013, which applications are incorporated by reference in their entirety.

TECHNICAL FIELD

The present disclosure relates generally to fiber optic telecommunications equipment. More specifically, the present disclosure relates to a slidable fiber optic tray or blade designed for high density applications and a rack or frame configured to support a plurality of such fiber optic trays.

BACKGROUND

In telecommunications industry, the demand for added capacity is growing rapidly. This demand is being met in part by the increasing use and density of fiber optic transmission equipment. Even though fiber optic equipment permits higher levels of transmission in the same or smaller footprint than traditional copper transmission equipment, the demand requires even higher levels of fiber density. This has led to the development of high-density fiber handling equipment.

An example of this type of equipment is found in U.S. Pat. No. 6,591,051 (the '051 patent) assigned to ADC Telecommunications, Inc. This patent concerns a high-density fiber distribution frame and high-density fiber termination blocks (FTBs) which are mounted to the frame. Because of the large number of optical fibers passing into and out of the FTBs, the frame and blocks have a variety of structures to organize and manage the fibers. Some structures are used to aid the fibers entering the back of the frame and FTBs. Other structures are provided for managing the cables leaving the FTBs on the front. The FTBs also include structures for facilitating access to the densely packed terminations. One such structure is a slidable adapter module that is incorporated into the FTBs to allow selective access to the densely packed terminations inside the FTBs.

Further development in such fiber termination systems is desired.

SUMMARY

The present disclosure relates to fiber optic telecommunications devices. The telecommunications devices include slidable fiber optic connection trays or blades with features for cable slack management and racks or frames supporting panels or chassis that house such slidable trays in stacked arrangements.

According to one aspect of the disclosure, a fiber optic telecommunications device defines a telecommunications chassis for mounting on a telecommunications frame. The chassis includes a plurality of fiber optic trays slidably mounted on the chassis, the fiber optic trays arranged in a vertically stacked arrangement, each fiber optic tray slidable between a closed storage position and an open access position. Each fiber optic tray includes fiber optic connection locations for connecting cables to be routed through the telecommunications frame and a cable manager coupled at a first end to the fiber optic tray and coupled at a second end to the telecommunications chassis. The cable manager is configured for routing cables to and from the fiber optic connection locations, the cable manager defining a plurality of link arms that are pivotally connected to each other such that the cable manager retracts and extends with a corresponding movement of the tray as the link arms pivot with respect to each other, wherein the link arms are configured to pivot relative to each other to prevent fiber optic cables managed therein from being bent in an arc having a radius of curvature that is less than a predetermined value during the movement of the tray. Each link arm defines a top wall, a bottom wall, and two oppositely positioned sidewalls, wherein each link arm defines an open portion along at least one of the sidewalls and an open portion along the top wall for receiving fiber optic cables therein, the open portions along the top wall and the at least one of the sidewalls communicating with each other.

According to another aspect of the disclosure, a fiber optic telecommunications device defines a telecommunications rack for mounting a plurality of telecommunications chassis, wherein each chassis includes a plurality of fiber optic trays slidably mounted on the chassis, the fiber optic trays arranged in a vertically stacked arrangement, each fiber optic tray slidable between a closed storage position and an open access position. Each fiber optic tray includes fiber optic connection locations for connecting cables to be routed through the telecommunications frame and a cable manager coupled at a first end to the fiber optic tray and coupled at a second end to the telecommunications chassis, the cable manager configured for routing cables to and from the fiber optic connection locations, the cable manager defining a plurality of link arms that are pivotally connected to each other such that the cable manager retracts and extends with a corresponding movement of the tray as the link arms pivot with respect to each other, wherein the link arms are configured to pivot relative to each other to prevent fiber optic cables managed therein from being bent in an arc having a radius of curvature that is less than a predetermined value during the movement of the tray. Each link arm defines a top wall, a bottom wall, and two oppositely positioned sidewalls, wherein each link arm defines an open portion along at least one of the sidewalls and an open portion along the top wall for receiving fiber optic cables therein, the open portions along the top wall and the at least one of the sidewalls communicating with each other.

According to another aspect of the disclosure, a fiber optic tray includes first and second slide portions for slidably mounting the tray to a telecommunications fixture and a connection portion located between the first and second slide portions. Fiber optic connection locations are defined by the connection portion of the tray for connecting cables and a cable manager is coupled at a first end to the fiber optic tray and defines a second end for coupling to the telecommunications fixture receiving the tray. The cable manager is configured for routing cables to and from the fiber optic connection locations, the cable manager defining a plurality of link arms that are pivotally connected to each other such that the cable manager retracts and extends with a corresponding movement of the tray with respect to the fixture as the link arms pivot with respect to each other. The link arms are configured to pivot relative to each other to prevent fiber optic cables managed therein from being bent in an arc having a radius of curvature that is less than a predetermined value during the movement of the tray, each link arm defining a top wall, a bottom wall, and two oppositely positioned sidewalls, wherein each link arm defines an open portion along at least one of the sidewalls and an open portion along the top wall for receiving fiber optic cables therein, the open portions along the top wall and the at least one of the sidewalls communicating with each other.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 42 is a front view of the bus-bar support and the bus-bar of FIG. 39;

FIG. 43 is a rear perspective view of the bus-bar support and the bus-bar of FIG. 39;

FIG. 70 illustrates one of the first trays of the first tray assembly of the chassis of FIGS. 62-65 in isolation with the cable management portion of the tray removed;

FIG. 71 is a partially exploded view of the tray of FIG. 70 with the tray PCB cover exploded off the tray;

FIG. 71A is a close-up view of a portion of the tray of FIG. 71;

FIG. 72 is a fully exploded view of the tray of FIG. 70, with portions of the slide assembly of the tray removed to illustrate the features thereof;

FIG. 73 is a top view of the slide assembly of the tray with the top cover of the center rail of the slide assembly removed to illustrate the routing of the flexible circuit board in the form of a ribbon cable within the slide assembly;

FIG. 74 illustrates a partially exploded view of the mounting rail of the slide assembly of FIG. 72;

FIG. 81 is a perspective view of another embodiment of a pivot door that can be used with the chassis of FIGS. 62-80;

FIG. 82 is a partially exploded view of the pivot door of FIG. 81;

FIG. 116 is a side view of the fanout holder of FIG. 112;

FIG. 117 is a front view of the fanout holder of FIG. 112;

FIG. 118 is a rear view of the fanout holder of FIG. 112;

FIG. 119 illustrates another embodiment of a slide assembly for mounting a tray such as the tray of FIG. 70 to a chassis, the slide assembly shown in a partially exploded configuration;

FIG. 119A illustrates a close-up view of the locking features of the slide assembly of FIG. 119 for locking the tray at pulled-out positions or at a central position within the chassis;

FIG. 120 is a top view of the slide assembly of FIG. 119 with the top cover of the center rail of the slide assembly removed to illustrate the internal locking features thereof;

FIG. 120A is a close-up view of a front end portion of the slide assembly of FIG. 120;

FIG. 120B is a close-up view of a rear end portion of the slide assembly of FIG. 120;

FIG. 121 illustrates the slide assembly of FIG. 119 when the tray is at a forward, pulled-out position;

FIG. 121A is a close-up top view of a front end portion of the slide assembly of FIG. 121; and FIG. 121B is a close-up top view of a rear end portion of the slide assembly of FIG. 121.

DETAILED DESCRIPTION

Figure 1:
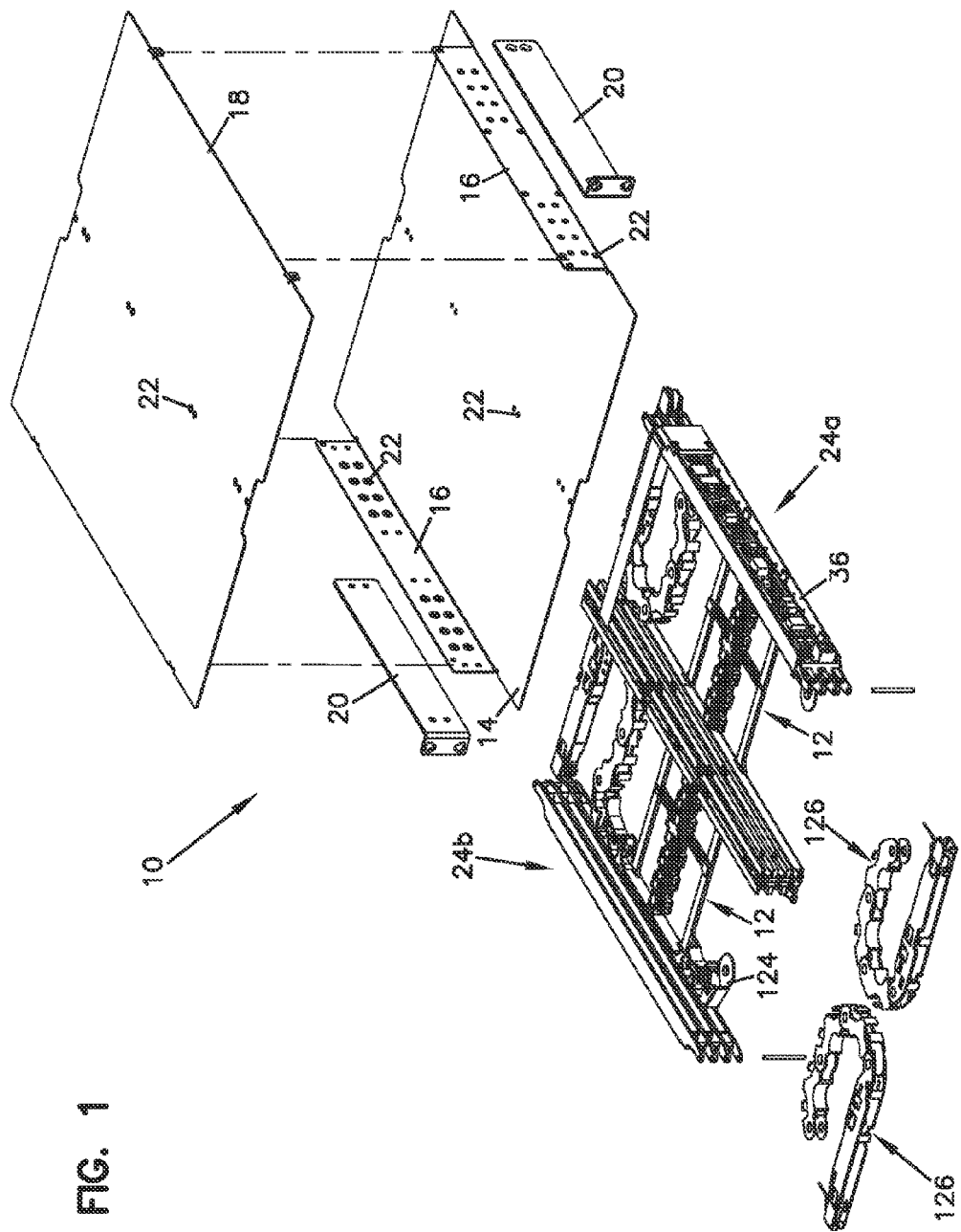
FIG. 1 is a front, right, top partially exploded perspective view of a high-density fiber distribution chassis configured to support a plurality of slidable fiber optic connection trays or blades having features that are examples of inventive aspects in accordance with the principles of the present disclosure mounted in a stacked arrangement thereon.

Reference will now be made in detail to examples of inventive aspects of the present disclosure which are illustrated in the accompanying drawings. Wherever possible, the same reference numbers will be used throughout the drawings to refer to the same or like parts.

The fiber optic telecommunications devices shown in FIGS. 1-48 are high density distribution racks or frames and panels or chassis mounted therein, wherein each chassis or panel is configured to house a plurality of slidable trays or blades. The trays are configured to support multiple fiber optic connections. According to one embodiment, the panels or the racks housing the panels can be managed devices wherein the connections can be monitored to verify that the connectors have been installed into the correct connection locations (e.g., adapters) and have not been disturbed. The panels may be available in 1-rack-unit (1RU) and 4-rack-unit (4RU) sizes. According to one embodiment, the 1RU panels may house 144 mated LC connector pairs, 72 SC connector pairs or 48 MPO connector pairs. The 4RU panels may house four times the number of connections as the 1 RU units with the same functionality.

Within each panel and within each tray or blade, the connection locations defined by, for example, an adapter block assembly, which is used to connect fiber optic connectors, may be accessible from both the front and the back of the panel. An adapter block assembly may be installed onto a sliding tray and may reside toward the center portion of the panel. Using a portion of the tray which may define a pull handle or a pull arm, the tray can be slid forward to access the front connections of the adapter block assembly. The cables attached to the front connectors may be managed using a link arm assembly made up of four cable management link arms, which swing forward and out of the way for access to the front of the adapter block assembly. When a technician is done accessing/loading the front connectors, using the aforementioned pull arm, the tray is pushed back to its central location. The tray, as well as a torsion spring located within the link arm that is connected directly to one of the end supports of the tray assembly, pull the cable management link arms back into the panel as the tray is pushed back into place by the technician.

To access or load the back-side of the adapter block assemblies, a technician can, from the back of the panel, pull the tray out the other side, moving the link arms to manage the cables on the back side as well.

According to one example embodiment, there may be a total of six trays per 1RU panel, each housing an adapter block assembly capable of holding 24 LC connections, for a total of 6×24=144 connections. According to one example, the trays may be stacked three high on each side (i.e., first side and second side) of the panel. Each tray may use link arms on both the front and back sides to manage incoming and outgoing cables. The link arms are configured to allow cables to be installed and removed from both the tops and the sides of the link arms. The link arms are designed such that, regardless of position of the moving tray, the cables contained therewithin do not violate the minimum bend radius requirements. The longest link arm that is directly attached to one of the end supports of the tray assembly may be designed to hold two fanouts, which are devices that transition fiber from one high-fiber-count cable to multiple single-fiber-count cables.

On each tray, a technician may attach a 24-port adapter block assembly using a snap fit mounting arrangement on the tray. For managed panels, the adapter block assemblies may include a printed circuit board (PCB) installed thereonto, which connects to each connector installed using contacts within the adapter openings and a chip on each connector. The PCB on the adapter block assembly may connect to the tray using a multi-pin connector on the tray. The connector on the tray may be attached to a flexible circuit formed from a ribbon cable that routes to a central PCB within the chassis. The ribbon cable may be looped within a cavity defined by the pull arm or pull handle of the tray to allow the tray to travel back and forth without disrupting the communication through the ribbon cable between the central PCB and the adapter block assembly PCB. The central PCB may use indicators in the form of light emitting diodes (LEDs) on both the front and back of the panel to communicate to a technician which tray should be accessed. The central PCB then may connect to a main PCB (i.e., a main controller), which is housed within one of the end supports of the tray assembly. The connection is made via another ribbon cable that runs along a top cover of the chassis into the end support. The main PCB or controller is accessible to the technician by removing a front end cap of the applicable end support. The main controller may use a card-edge-style connection at its opposite rear end to connect to the ribbon cable that runs along the cover, allowing the main controller to be a field-replaceable device. The main controller is configured to communicate to a higher-level managed connectivity rack or frame via a connection (e.g., an RJ connection) on the side of the panel. The main controller of the panel may be powered via another connection on the side of the panel.

The above aspects of the telecommunications device will now be described in further detail below.

Referring specifically now to FIGS. 1-6, the high-density fiber distribution chassis or panel 10 is shown in various views. In FIG. 1, the chassis 10 is shown in an exploded view with a plurality of slidable fiber optic connection trays or blades 12 mounted thereon. The chassis 10 defines a bottom plate 14 with upwardly extending sidewalls 16, a top chassis cover 18, and a pair of mounting brackets 20 that are configured to be fastened to the sidewalls 16. The mounting brackets 20 are used for mounting the chassis 10 to other fixtures such as telecommunications racks or frames. The bottom plate 14, including the upwardly extending sidewalls 16, and the top cover 18 define fastener openings 22 for mounting a tray assembly 24 within the chassis 10. The mounting brackets 20 of the chassis 10 are also fastened to fastener openings 22 on the sidewalls 16 of the chassis 10.

In the depicted embodiment, the chassis 10 is configured as a standard 1RU (rack unit) piece. In other embodiments, the chassis 10 may be configured to have different sizes. According to one example embodiment, the chassis 10 may be configured as a 4RU device. Such an example of a chassis is shown in FIGS. 23-37 as mounted on a telecommunications rack 40, as will be discussed in further detail below.

Still referring to FIGS. 1-6, as noted above, each chassis 10 is configured to house tray assemblies 24. In the depicted embodiment, the tray assemblies 24 may be defined by a first tray assembly 24a that is located on the right side of the chassis 10 and a second tray assembly 24b that is located on the left side of the chassis 10. Each of the tray assemblies 24 may include a plurality of slidable trays 12 mounted in a stacked arrangement. For example, the first tray assembly 24a, as shown, may include three first trays 12a to be mounted in a stacked arrangement and the second tray assembly 24b may include three second trays 12b to be mounted in a stacked arrangement, wherein the chassis 10 can house six total slidable trays 12 in the depicted version.

The first and second tray assemblies 24a, 24b are generally similar in configuration and for ease of description, only the first tray assembly 24a will be described in detail, with the understanding that the features of the first tray assembly 24a are fully applicable to the second tray assembly 24b except for the noted differences. In addition, in the drawings, only one representative first tray 12a and one representative second tray 12b have been shown for ease of illustration. Thus, in the present disclosure, only one of the first trays 12a will be shown and described in detail, with the understanding that the features of that first tray 12a are fully applicable to other first trays 12a that might be mounted in a stacked arrangement therewith or to other second trays 12b that might be mounted on the left side of the chassis 10.

Figure 2:
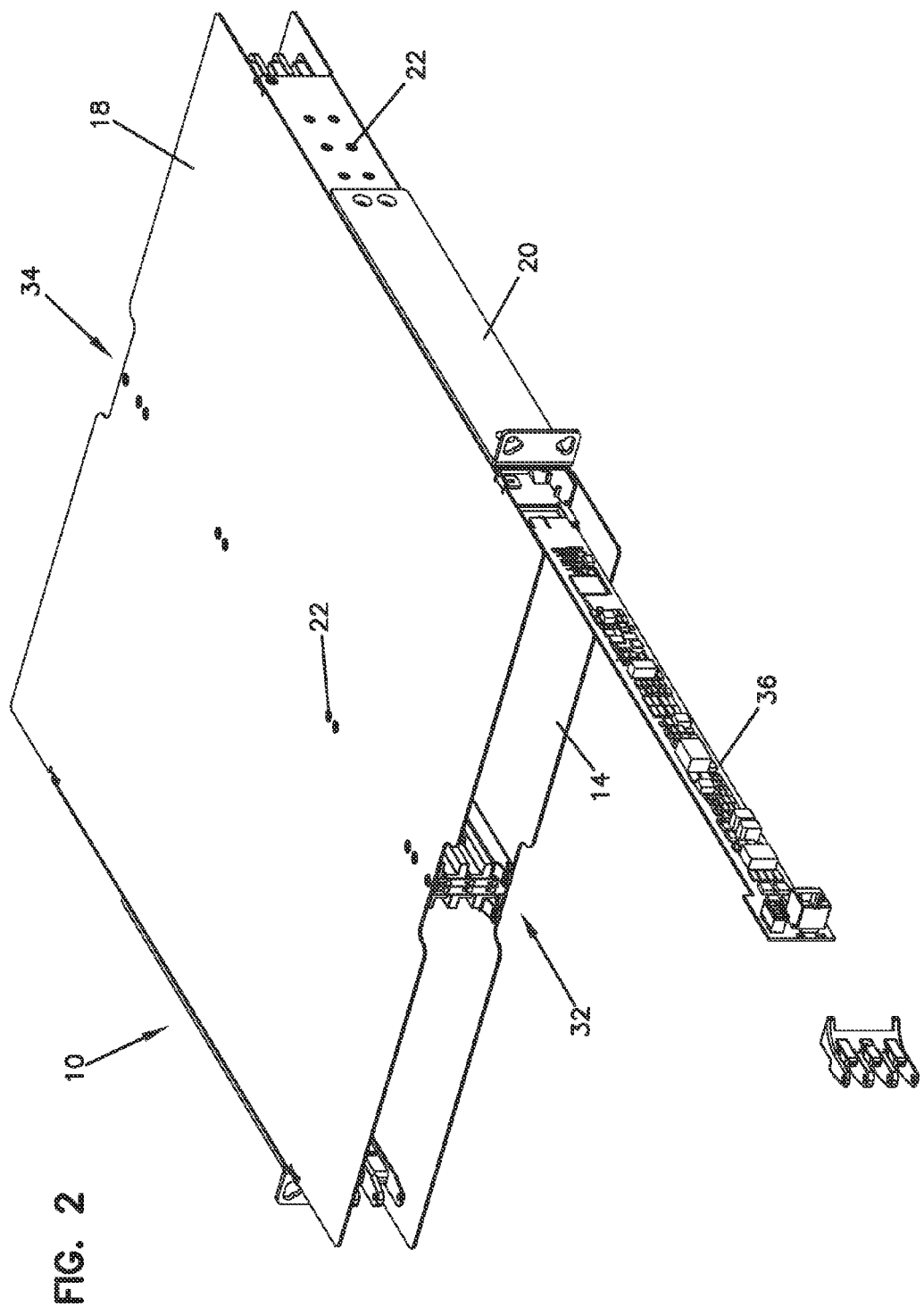
FIG. 2 illustrates the high-density fiber distribution chassis of FIG. 1 in a partially assembled configuration, shown with a main or master controller circuit board of the chassis being slidably mounted thereon.
Figure 3:
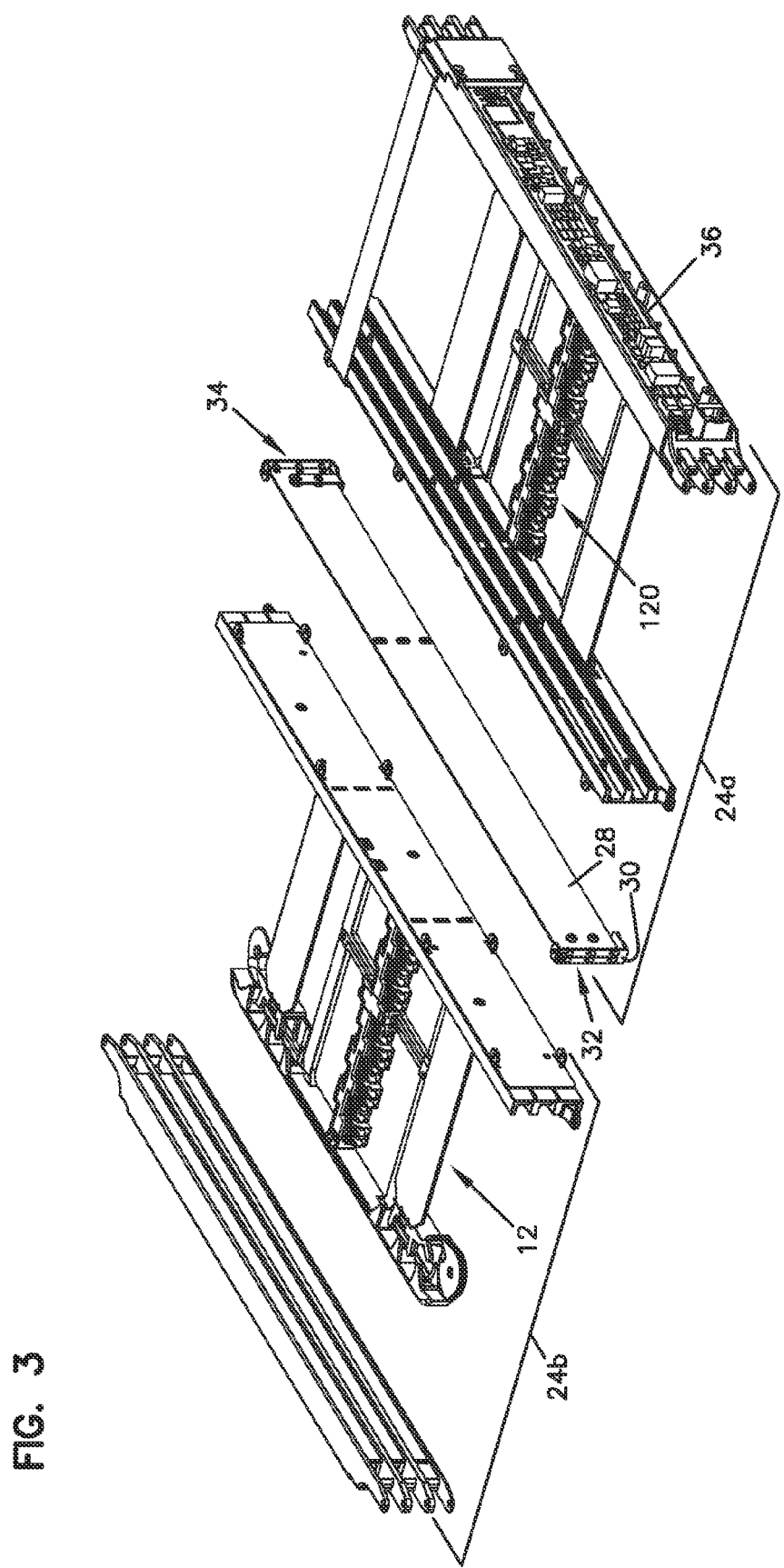
FIG. 3 illustrates the first and second tray assemblies of the chassis of FIG. 1 in a partially exploded configuration, the tray assemblies shown outside of the chassis.
Figure 4:
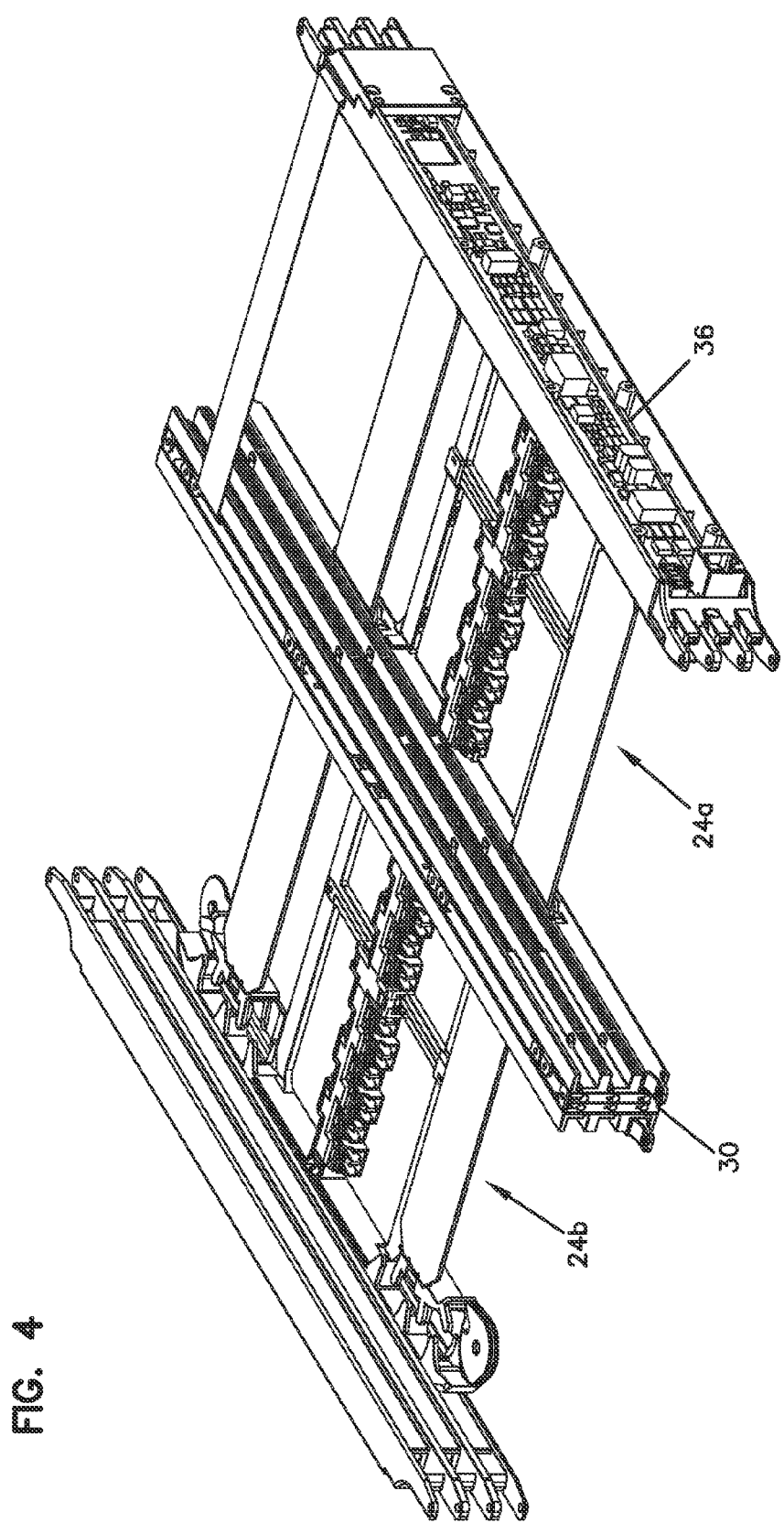
FIG. 4 illustrates the first and second tray assemblies of FIG. 3 in an assembled configuration outside of the chassis.

Referring specifically now to FIGS. 3 and 4, the first and second tray assemblies 24a, 24b are shown outside of the chassis 10 of FIGS. 1 and 2. In FIG. 3 specifically, the first and second tray assemblies 24a, 24b are shown in an exploded configuration where they have been separated from each other. As discussed previously and as will be discussed in further detail below, the two tray assemblies 24, when mounted together, capture a central PCB 28 therebetween. The central PCB 28 may include indicators in the form of LEDs 30 on both the front 32 and the back 34 of the chassis 10 to communicate to a technician which tray 12 should be accessed. As will be discussed in further detail below, all of the trays 12 of both the first tray assembly 24a and the second tray assembly 24b electrically connect to the central PCB 28. And, the central PCB 28 is electrically connected to a main PCB or controller 36 of the chassis 10, wherein the main PCB 36 of the chassis 10 is configured to communicate to a higher-level managed connectivity rack or frame 40.

Figure 5:
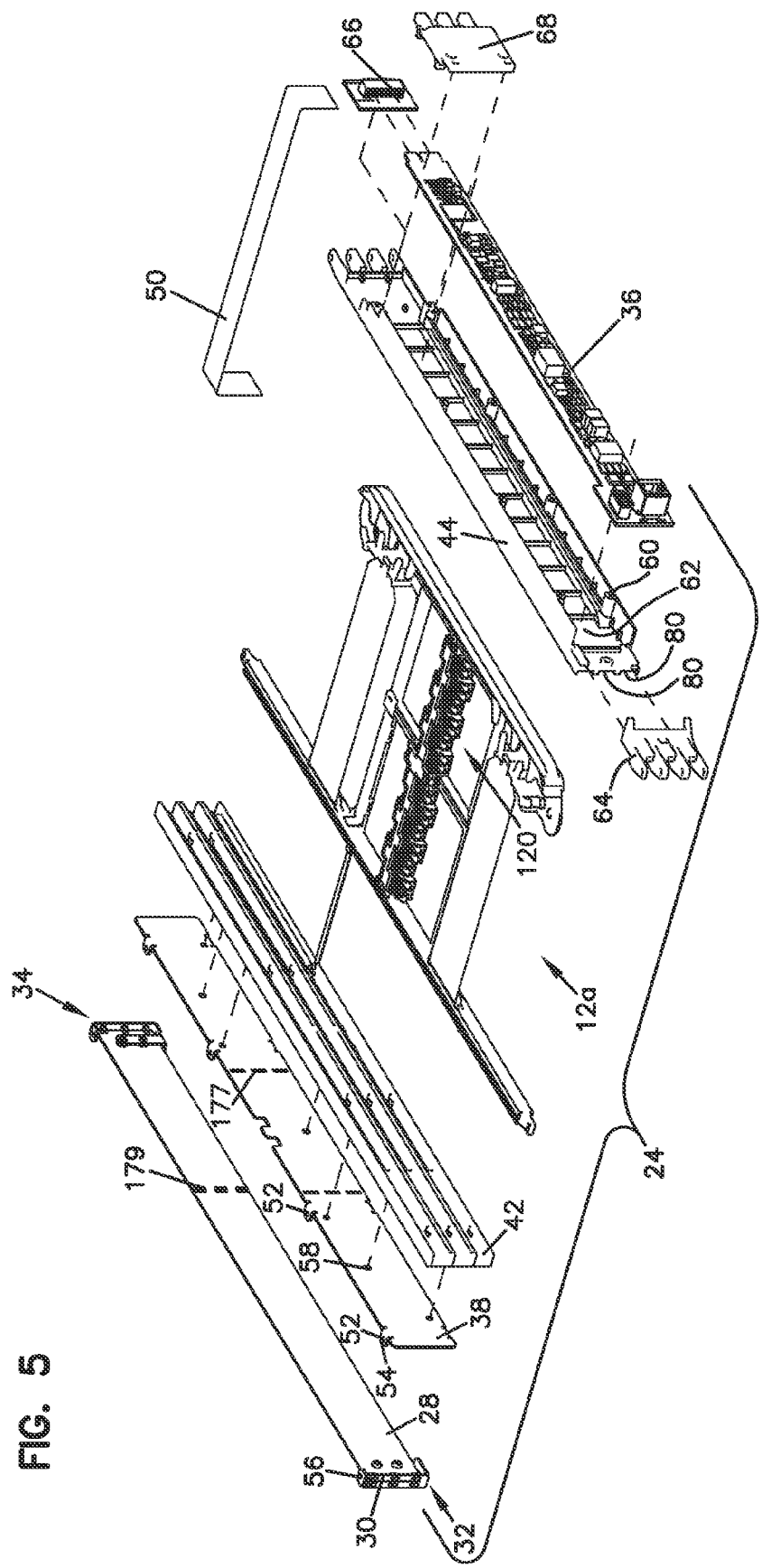
FIG. 5 illustrates the first tray assembly of FIG. 3 in an exploded configuration outside of the chassis.
Figure 6:
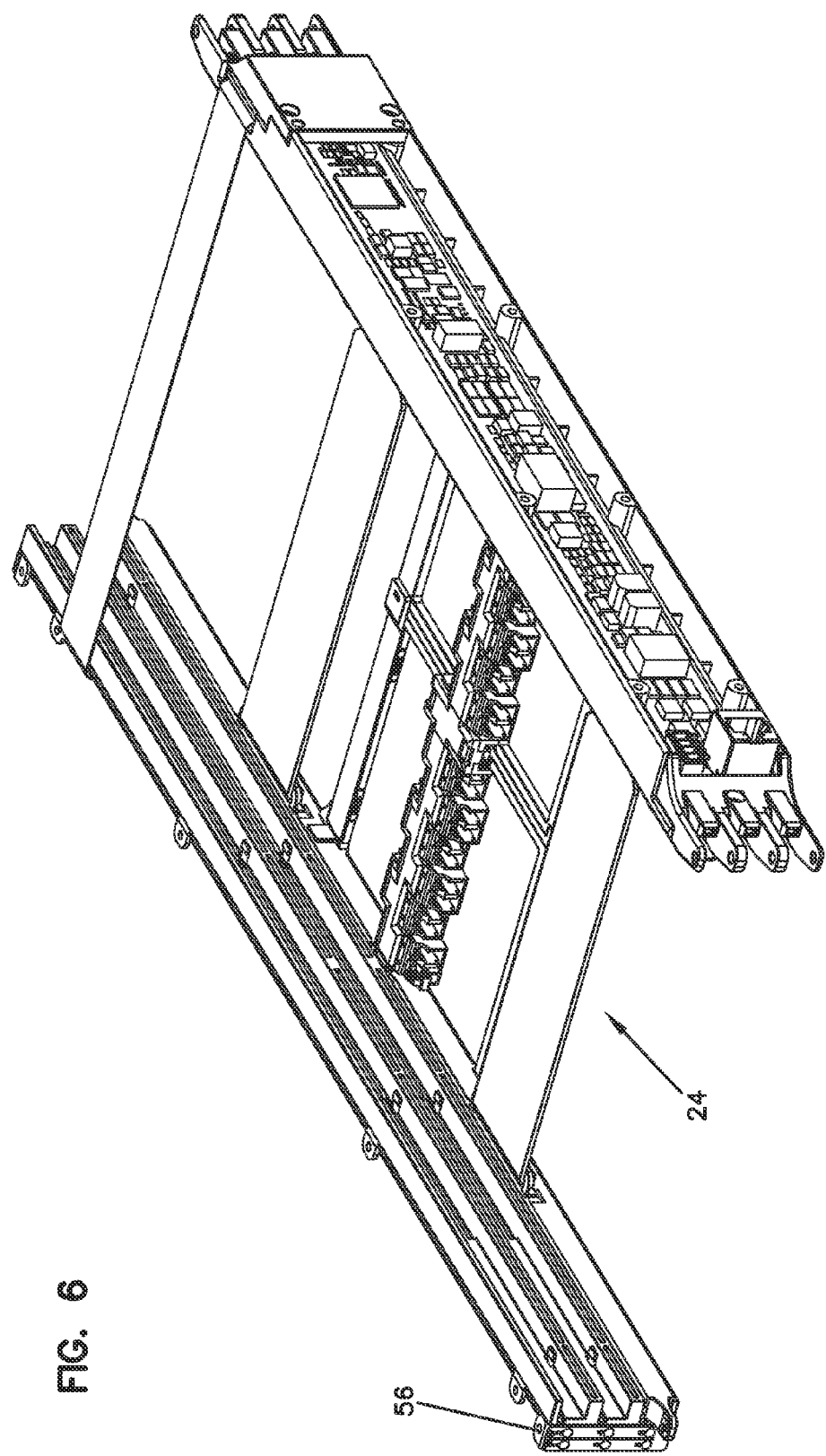
FIG. 6 illustrates the first tray assembly of FIG. 5 in an assembled configuration.

Referring now to FIG. 5, the different parts of the first tray assembly are illustrated in an exploded configuration. The first tray assembly includes the central PCB 28, a mounting plate 38, a mounting block 42, a first tray 12a, an end support 44, and the main PCB 36 to be mounted to the end support 44. As noted above and as will be described in further detail below, a flexible circuit in the form of a ribbon cable 46 provides an electrical connection between the central PCB 28 and a PCB 48 located on the tray 12 and another ribbon cable 50 provides the connection between the central PCB 28 and the main PCB or controller 36 of the chassis 10. The ribbon cable 50 is configured to run along the top cover 18 of the chassis 10, and, via the central PCB 28, can connect both the first and second tray assemblies 24a, 24b to the main PCB 36.

The mounting plate 38 of the first tray assembly 24a, which along with a mounting plate 38 of the second tray assembly 24b, is configured for capturing the central PCB 28 and mounting the central PCB 28 and the mounting blocks 42 of the tray assemblies 24 to the chassis 10. The mounting plate 38 defines tabs 52 with fastener openings 54 that are aligned with fastener openings 56 of the central PCB 28 for mounting the central PCB 28 to the bottom plate 14 and top cover 18 of the chassis 10. The mounting plate 38 also includes fastener openings 58 on a sidewall thereof for fastening the mounting blocks 42 thereto and to the chassis 10.

As will be discussed in further detail, each tray 12 is configured to be slidably captured between the mounting block 42 and the end support 44 of the tray assembly 24. For the first tray assembly 24a, for example, the end support 44 defines fastener openings 60 for mounting to the right sidewall 16 of the chassis 10, capturing the main PCB 36 thereagainst. The end support 44 defines a channel 62 for housing the main PCB 36. As shown in FIG. 2, the main PCB 36 may be slidably loaded into the channel 62 of the end support 44. The main PCB 36 is accessible to a technician by removing a front end cap 64 of the end support 44. The main controller 36 may use a card-edge-style connection at its opposite rear end to connect to the ribbon cable 50 that runs along the chassis top cover 18, allowing the main controller 36 to be a field-replaceable device. A side cap 68 is used at the rear end of the end support 44 to cover a card-edge-style connector 66. It should be noted that in the depicted embodiment of the chassis 10, since both tray assemblies 24 are being connected through the central PCB 28, only the end support 44 of the first tray assembly 24a defines a channel 62 for supporting the main controller 36, wherein the end support 44 of the second tray assembly 24b is not shown as housing a main controller or PCB 36. This configuration may be modified depending upon the orientation of the chassis 10 within a given rack 40.

Referring now to FIGS. 5 and 8-14, each tray 12 of each tray assembly 24 defines a main connection portion 70, a center mounting portion 72, a side mounting portion 74, and a cable management portion 76. The center mounting portion 72 of the tray 12 is configured for slidable coupling to the mounting block 42 that is located generally toward the center of the chassis 10. The side mounting portion 74 of the tray 12 is configured for slidable coupling to an end support 44 of the tray assembly 24 that is located generally close to one of the sides of the chassis 10.

Both the mounting block 42 and the end support 44 include longitudinally extending channels provided in a stacked arrangement. The channels 78 of the mounting block 42 are configured to slidably receive the center mounting portion 72 of each tray 12. The channels 80 of the end support 44 are configured to receive the side mounting portion 74 of each tray 12.

Referring now to the interaction between the side mounting portions 74 of the trays 12 and the channels 80 of the end support 44, the side mounting portions 74 and the channels 80 of the end support 44 define matching dovetail configurations for providing slidable movement and preventing lateral separation.

Regarding the interaction between the center mounting portions 72 of the trays 12 and the channels 78 of the central mounting block 42, the center mounting portions 72 may define pull handles or arms 82 at both the front and rear ends of the center mounting portions 72. Using the pull handles 82, the trays 12 can be slid forward to access the front connections within the trays 12 or slid rearward to access the rear connections within the trays 12.

Figure 13:
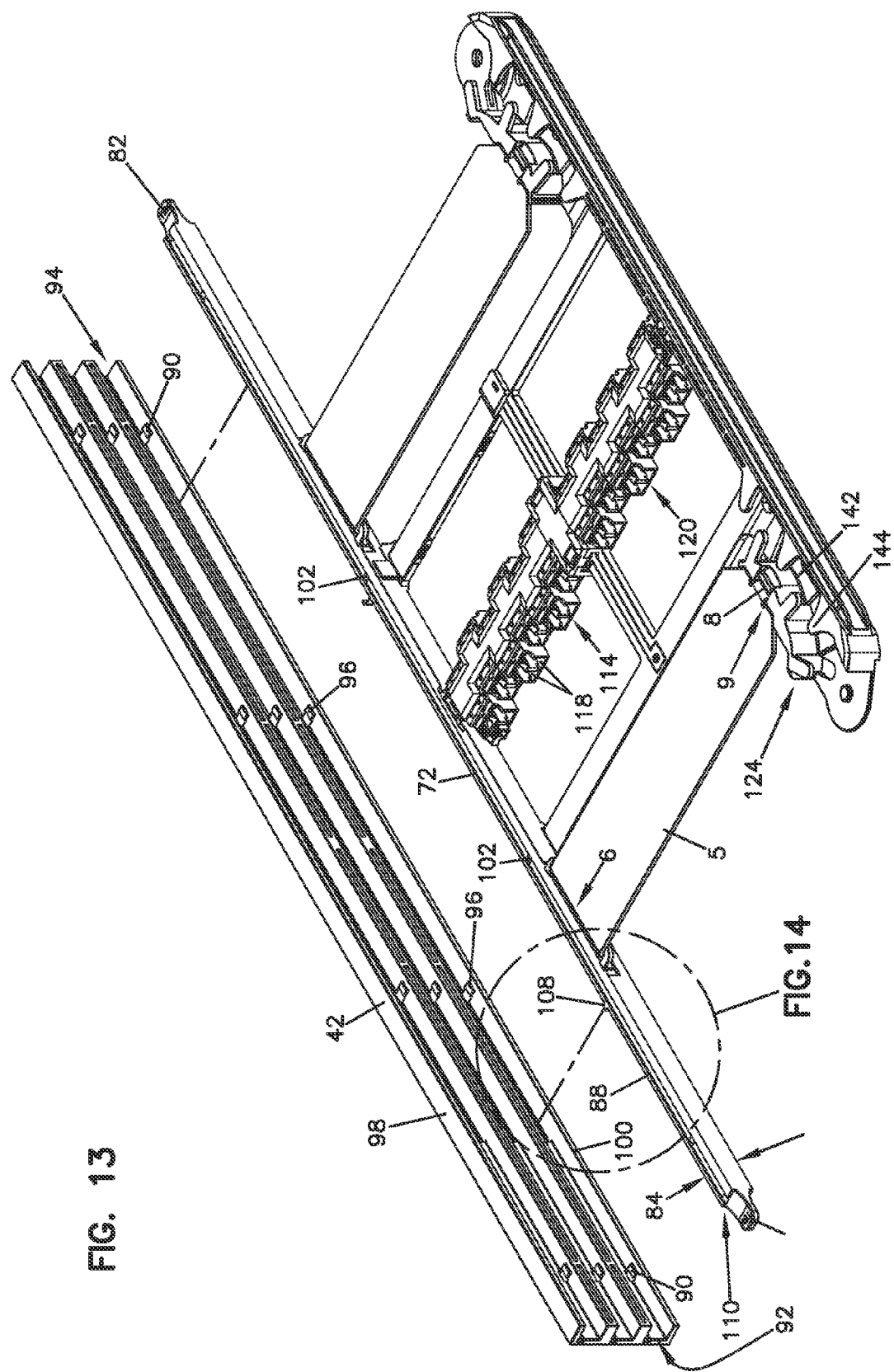
FIG. 13 illustrates one of the first trays exploded from the mounting block of the first tray assembly.
Figure 14:
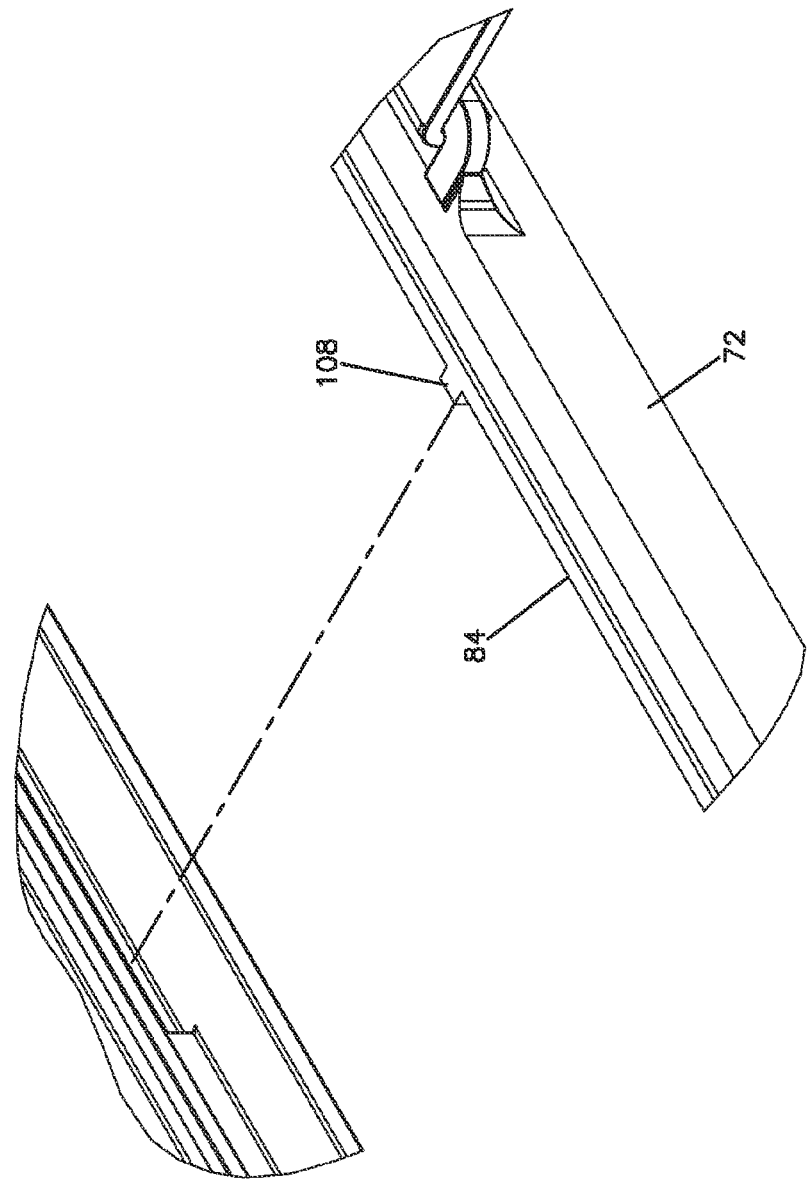
FIG. 14 is a close-up view illustrating the interaction between one of the stop surfaces within one of the channels of the mounting block and one of the stop tabs of a tray of the first tray assembly.

As shown in detail in FIG. 13, both the top and bottom sides 84, 86 of the center mounting portion 72 of a tray 12 define longitudinal tracks 88. The tracks 88 receive guides 90 located within the channels 78 of the mounting block 42 for slidably guiding the trays 12. The guides 90 are located adjacent the front 92 and the rear 94 of the channels 78 of the mounting block 42.

Within the channels 78 of the mounting block 42 are also located flexible tabs 96 on both the top and bottom walls 98, 100 defining each channel 78. The tabs 96 cooperate with depressions 102 located within the tracks 88 of the center mounting portion 72 of the tray 12 to provide temporary stops for the tray 12. In this manner, the trays 12 may be stopped at discrete intermittent positions such as at a center position within the chassis 10 or when pulled forwardly or rearwardly.

Figure 15:
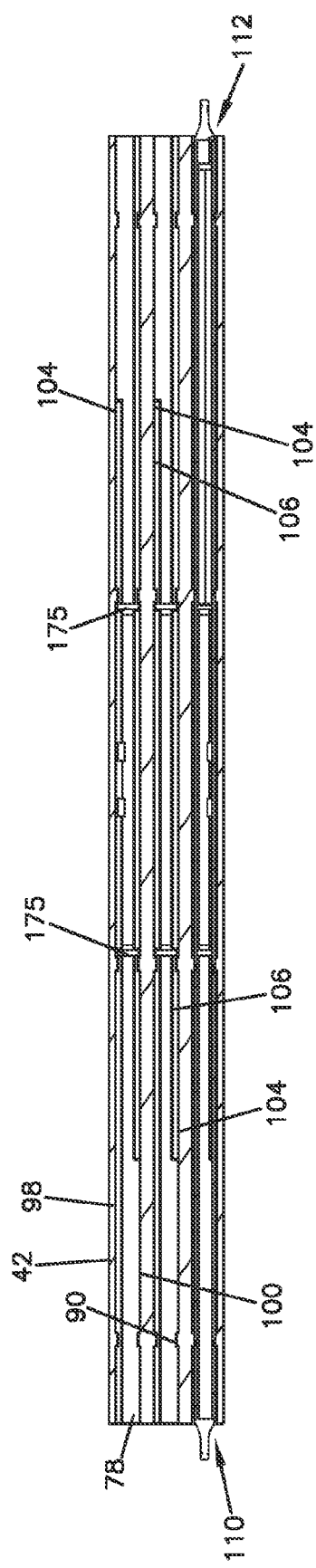
FIG. 15 is a cross-sectional view illustrating the center mounting portion of one of the trays within one of the channels of the mounting block of the first tray assembly.
Figure 16:
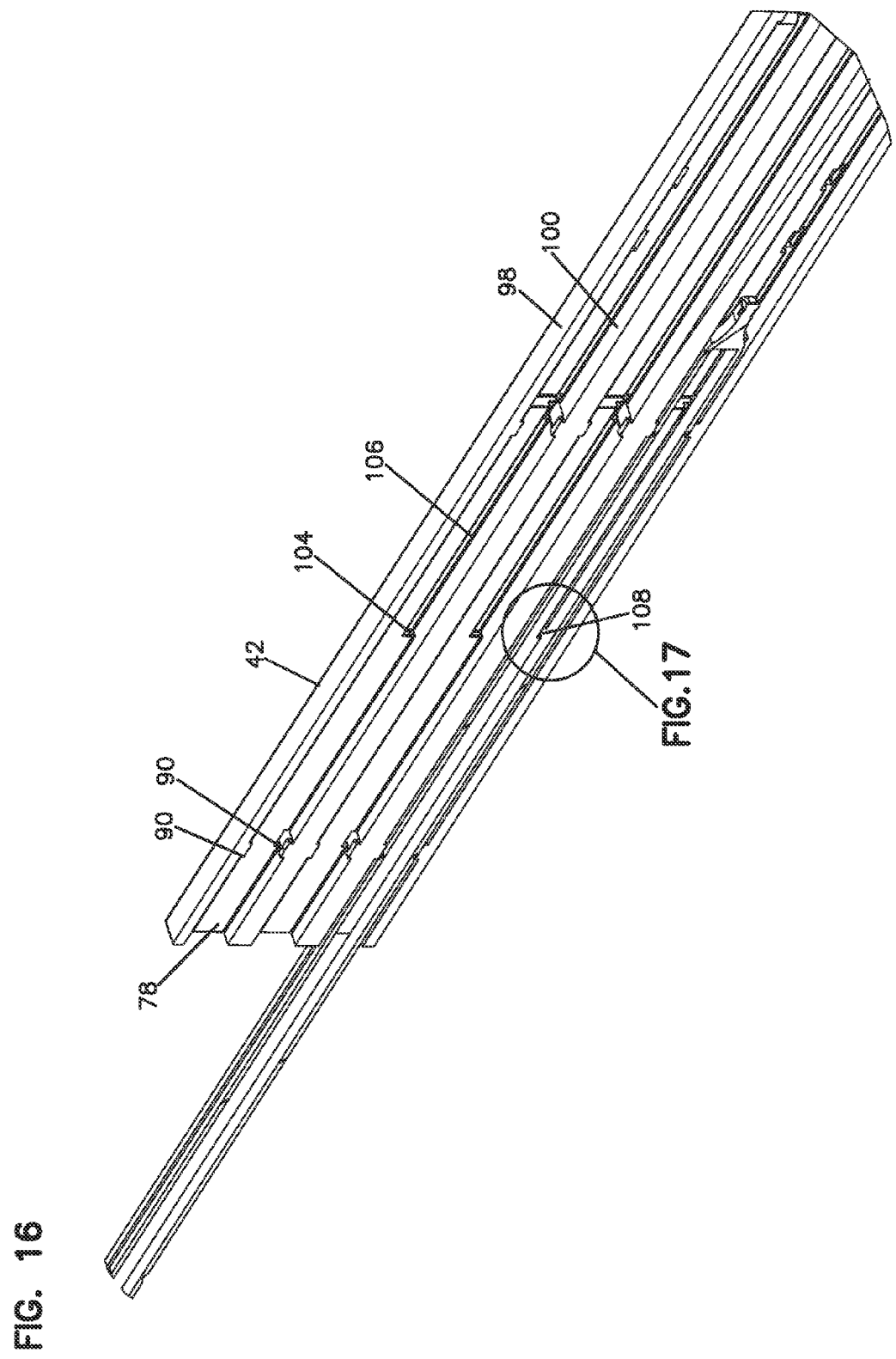
FIG. 16 is a perspective cross-sectional view illustrating the interaction between the stop tab of one of the trays and the stop surface within one of the channels of the mounting block when a tray has been pulled fully forwardly with respect to the mounting block.
Figure 17:
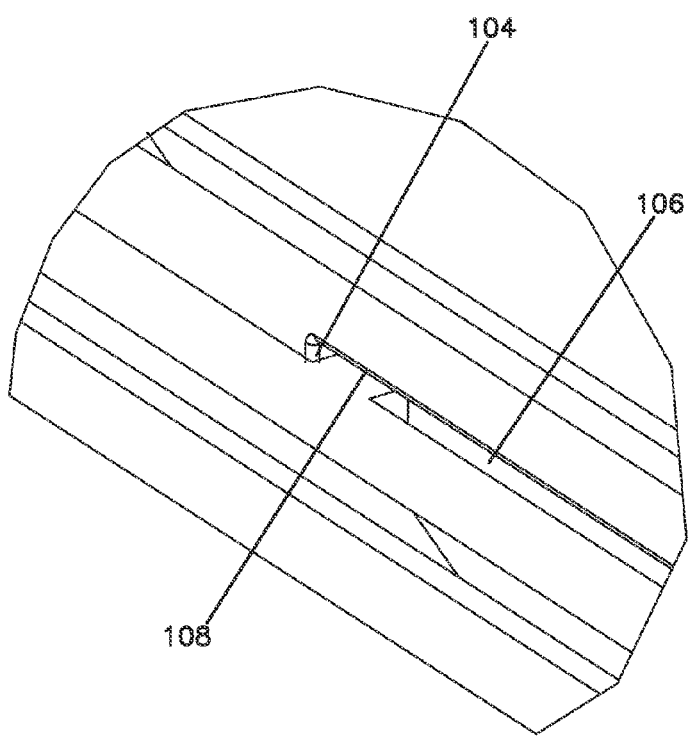
FIG. 17 illustrates a close-up view of the stop tab and the stop surface of FIG. 16.

In addition, each channel 78 and the center mounting portion 72 of each tray 12 also define positive stops to prevent removal of the trays 12 when the trays 12 are pulled fully forwardly or fully rearwardly. The positive stops are defined first by a stop surface 104 adjacent the front end 92 of the channel 78 and a stop surface 104 adjacent the rear end 94 of the channel 78. The stop surfaces 104 are defined at ends of top and bottom longitudinal recesses 106 within the channel 78 as seen in FIG. 15. The other portion of the positive stops between the tray 12 and the mounting block 42 are defined on the trays 12. As shown in FIGS. 13-16, the center mounting portion 72 of each tray 12 defines a stop tab 108 adjacent the front end 110 of the center mounting portion 72 and a stop tab 108 adjacent the rear end 112 of the center mounting portion 72. The stop tab 108 at the front end 110 extends outwardly from the top side 84 of the center mounting portion 72 and the stop tab 108 at the rear end 112 extends outwardly from the bottom side 86 of the center mounting portion 72.

As shown in FIG. 15, the stop surface 104 adjacent the front 92 of the channel 78 of the mounting block 42 is positioned toward the bottom wall 100 of the channel 78 and the stop surface 104 adjacent the rear 94 of the channel 78 of the mounting block 42 is positioned toward the top wall 98 of the channel 78. Thus, when a tray 12 is pulled fully forwardly, the rear stop tab 108 (which is located at the bottom side 86) contacts the front stop surface 104 within the channel 78. When a tray 12 is pulled fully rearwardly, the front stop tab 108 (which is located at the top side 84) contacts the rear stop surface 104 within the channel 78. As noted above, the top and bottom stop tabs 108 of the center mounting portion 72 are normally accommodated by the top and bottom longitudinal recesses 106 within each channel 78 until they encounter the stop surfaces 104 at the respective ends.

The main connection portion 70 of the tray 12 is located between the center mounting portion 72 and the side mounting portion 74 and is configured to define connection locations 114 for the tray 12. By stacking a plurality of the trays 12 on a distribution chassis 10, density of connections for fiber optic transmission can be increased and the slidability of the trays 12 in either the front direction or the rear direction provides for easy access at both the front or the rear of the distribution chassis 10.

Figure 8:
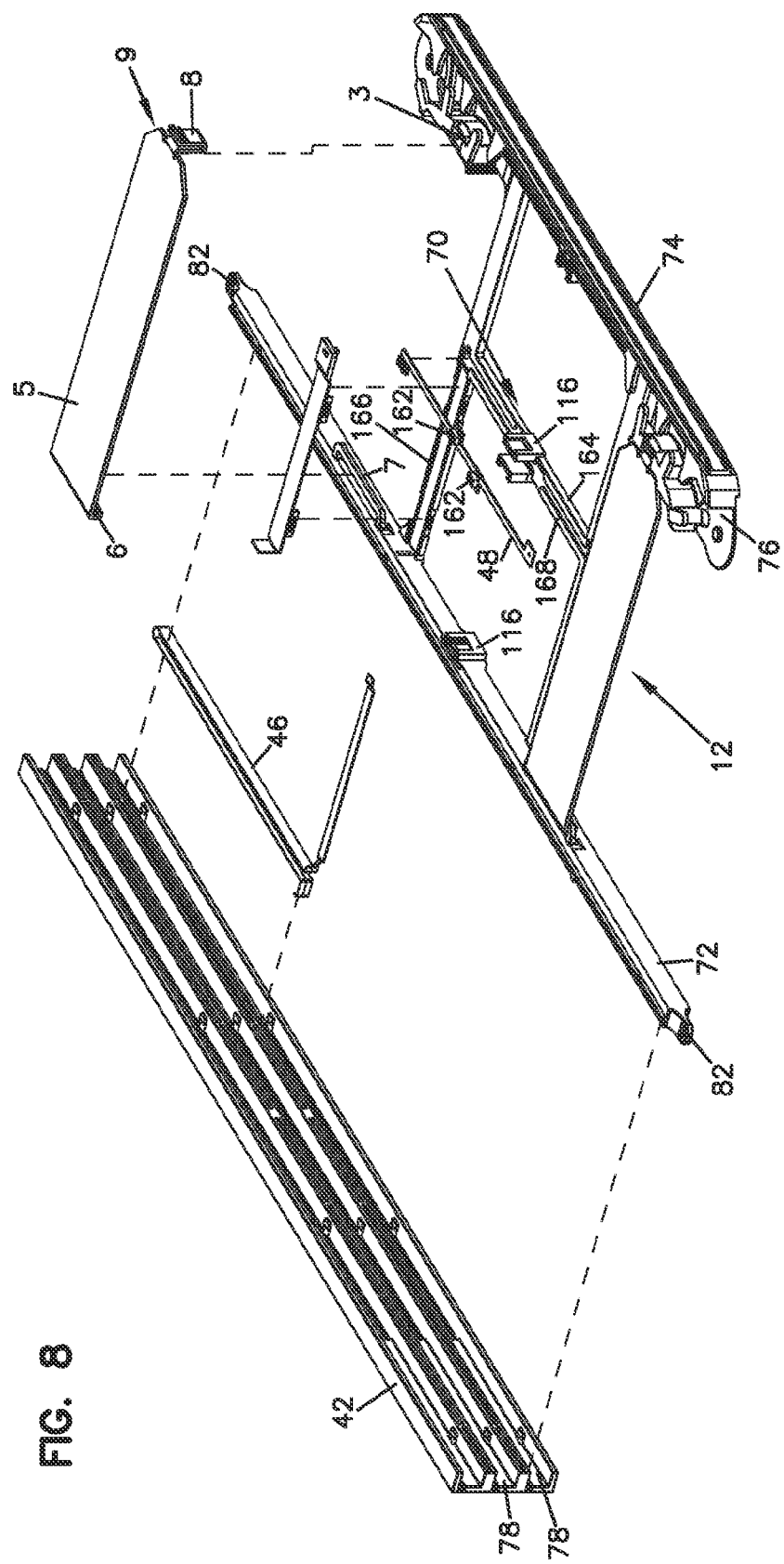
FIG. 8 illustrates the electrical communication pathways via circuit boards for one of the first trays of FIG. 6.
Figure 9:
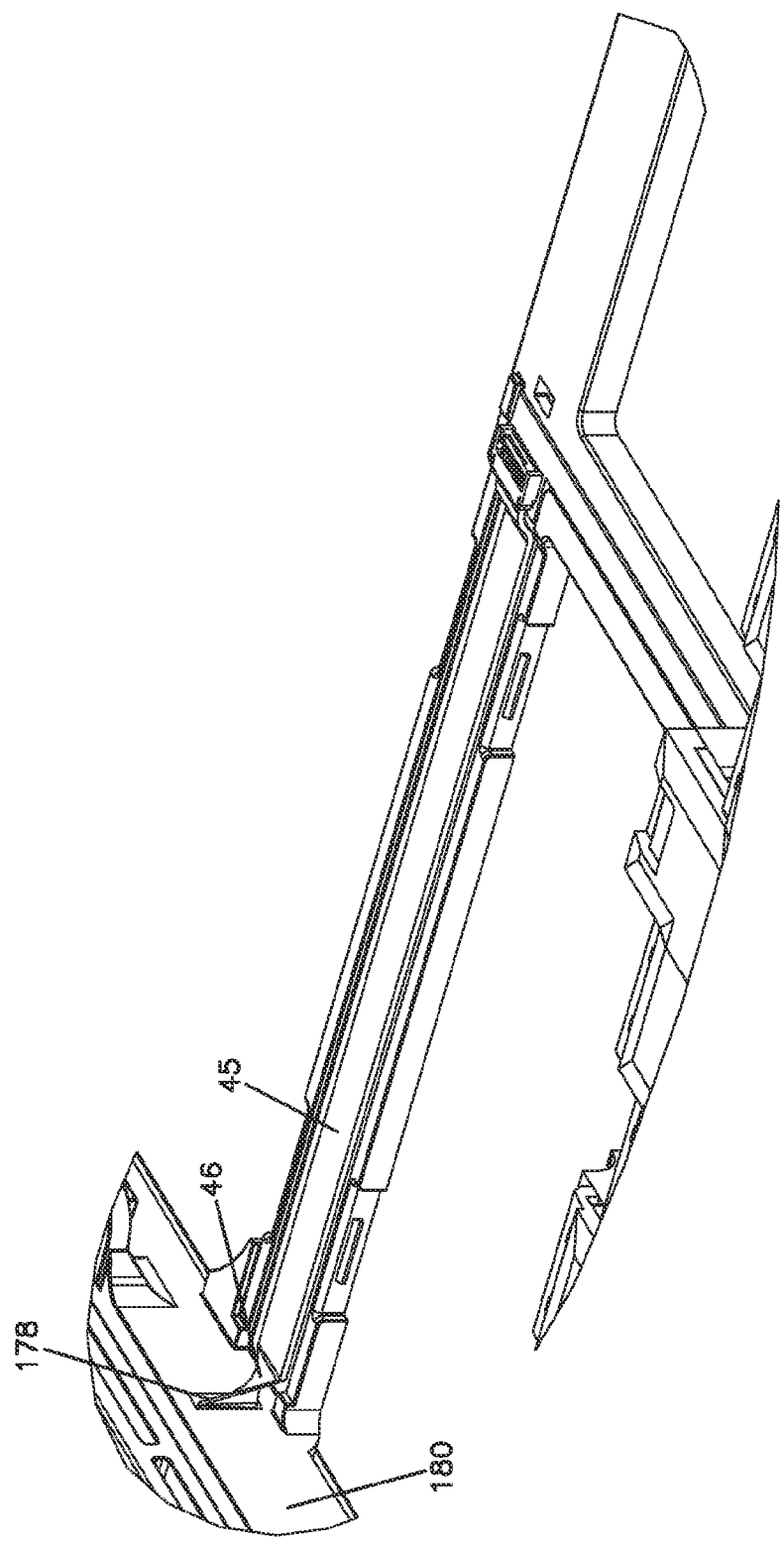
FIG. 9 is a close-up view illustrating the routing of a flexible circuit board in the form of a ribbon cable from a mounting block to one of the trays of the first tray assembly.

As shown in FIGS. 8-9, the depicted version of the main connection portion 70 of the tray 12 includes a mount 116 for mounting fiber optic adapters 118 which define the fiber optic connection locations 114 in the present embodiment of the tray 12. Specifically, in the tray 12 shown and described in the present application, the fiber optic connection locations 114 are defined by adapters 118 having an LC type footprint. In the depicted embodiments, twenty-four LC adapters 118 are mounted to the mount 116 via a snap-fit connection defined on the mount 116. In the high density distribution chassis 10 shown in the present disclosure, six slidable trays 12 may be mounted on a 1RU of rack space, providing 144 LC connections as noted above.

As noted earlier, other standards of fiber optic adapters 118 (such as SC or MPO adapters) can be mounted to the mount 116. Fiber optic adapters 118 are only one type of fiber optic equipment that provides connection locations 114 for the tray 12 and the tray 12 can be used with other types of fiber optic equipment. For example, equipment such as fiber optic splitters, couplers, multiplexers/demultiplexers, or other types of equipment wherein cables may be routed away from the connection locations 114 may be housed on the main connection portion 70.

If fiber optic adapters 118 are used, the connection locations 114 may be defined by adapters 118 individually mounted in the mount 116 or may be defined by adapter block assemblies 120 that include integrally formed adapters 118 in block form, as shown in the depicted embodiment. In other embodiments, the connection locations 114 may be in the form of a cassette that may include fiber optic adapters 118 on one side wherein the opposite side may have a multi-fiber connector or a cable extending outwardly therefrom, with optical fibers normally housed within such a cassette.

Examples of devices that may define the connection locations such as the adapter block assemblies 120 or cassettes are illustrated and described in further detail in U.S. patent applications having Ser. Nos. 61/761,048, 61/761,034, and 61/761,042, all entitled "Optical Assemblies with Managed Connectivity," which applications were filed on Feb. 5, 2013, and U.S. Patent Applications having Ser. Nos. 61/843,733, 61/843,718, and 61/843,752, all entitled "Optical Assemblies with Managed Connectivity," which applications were filed on Jul. 8, 2013, which are all incorporated by reference in their entireties.

As noted previously, the chassis or panels may be available in 1-rack-unit (1RU) and 4-rack-unit (4RU) sizes. The 1RU panels may house 144 mated LC connector pairs (as shown), 72 SC connector pairs or 48 MPO connector pairs. The 4RU panels may house four times the number of connections as the 1RU units with the same functionality.

Within each panel 10 and within each tray 12, the connection locations 114 may be accessible from both the front and the back of the panel 10. For example, as shown, an adapter block assembly 120 may be installed on a sliding tray 12 such that it resides toward the center portion of the panel 10. Using the pull handles or arms 82 discussed above, the tray 12 can be slid forwardly or rearwardly to access the front connections or the rear connections of the adapter block assembly 120.

Cable management is an important aspect of a high density distribution panel or frame when managing a high density of cables extending from the front and rear ends of the adapter block assemblies 120 that may be mounted on the trays 12.

As discussed above, each tray 12 is configured to include a cable management portion 76 for managing cables 122 from the connection locations 114 to and away from the chassis 10 both for the cables 122 extending from the front ports of the adapters 118 and from the rear ports of the adapters 118. The cable management portions 76 of the trays 12 are configured such that they accommodate any cable slack during the forward and rearward slidable movements of the trays 12, while maintaining minimum bend radius requirements of the cables 122. Also, the cable management portions 76 of the trays 12 are designed to keep the same length of cabling from the connection locations 114 to the exterior of the chassis 10 so as to prevent any pulling or pinching of the cables 122 and to limit the need for excess slack cabling.

The cable management portion 76 of each tray 12 may be defined by a front cable management portion 76a and a rear cable management portion 76b. It should be noted that the front and rear cable management portions 76a, 76b are similar in configuration and only the front cable management portion 76a will be discussed herein for ease of description, with the understanding that all of the inventive features of the front cable management portion 76a of a given tray 12 are fully applicable to the rear cable management portion 76b.

Referring now to FIGS. 13 and 18-22, the front cable management portion 76a is defined by a radius limiter 124 that is located adjacent the side mounting portion 74 of the tray 12 and a link arm assembly 126 made up of four cable management link arms 128, which are attached between the radius limiter 124 and the front of the end support 44 of the tray assembly 24.

The link arms 128 are configured to swing forwardly and out of the way for access to the front of the adapter block assembly 120 when the tray 12 is pulled forwardly. When a technician is done accessing and/or loading the front connectors, using the aforementioned pull arm 82, the tray 12 is pushed back to its original closed location.

Figure 18:
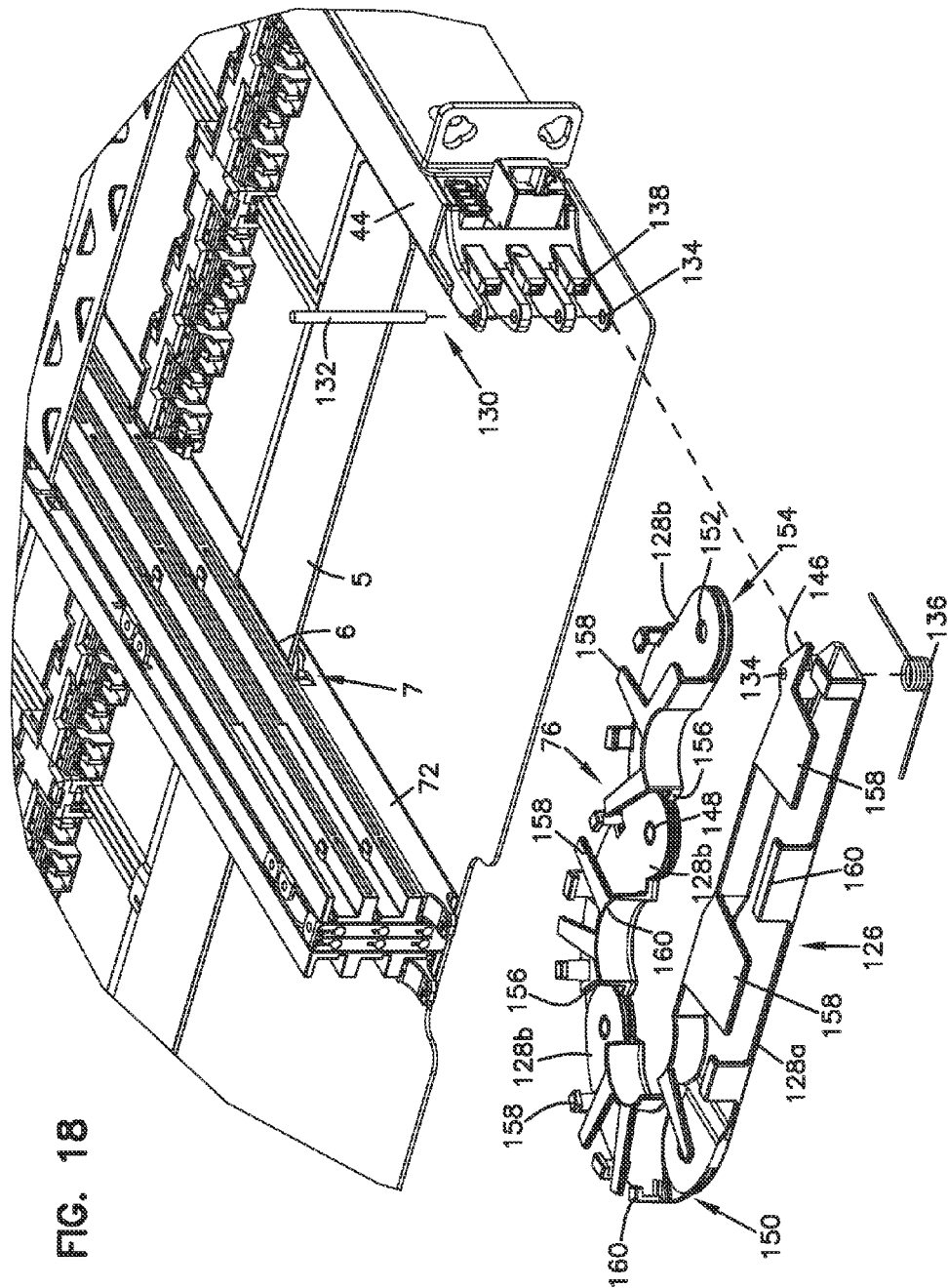
FIG. 18 is a partial exploded view showing the cable management portion of one of the first trays of the first tray assembly of FIG. 3, the cable management portion defined at least in part by a link arm assembly that connects between the right end support and the tray of the tray assembly, the link arm assembly formed by a plurality of cable management link arms.
Figure 19:
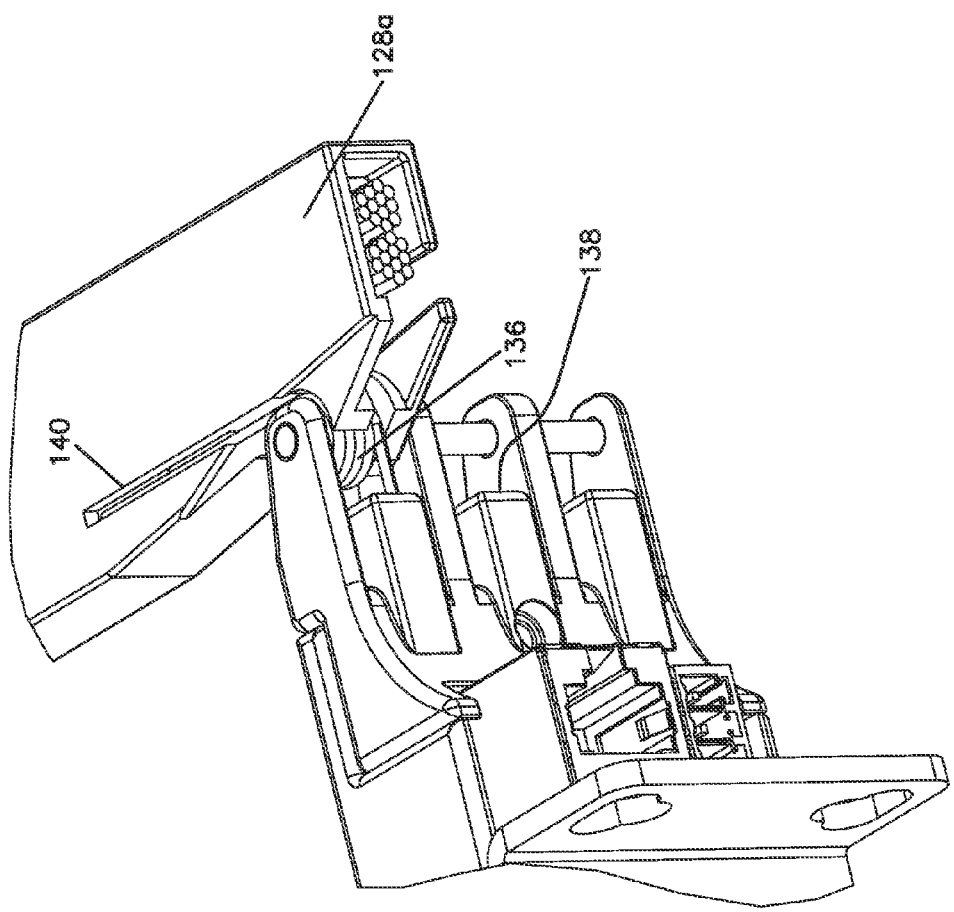
FIG. 19 is a close-up view showing the pivotal coupling of the link arm assembly to the right end support of the tray assembly.

The link arms 128 are defined by four link arms that are pivotally coupled with respect to each other so as to define a limited pivotal movement therebetween. The four link arms include a first link arm 128a that is directly pivotally coupled to the front of the end support 44 of the tray assembly 24 via a hinge assembly 130. The hinge assembly 130 defines a hinge pin 132 that is inserted through openings 134 on both the end support 44 and the first link arm 128a for the pivotal coupling. As shown in FIGS. 18 and 19, the hinge assembly 130 also defines a torsion spring 136, one end of which is inserted into a longitudinal pocket 138 at the front of the end support 44 and a second (perpendicular) end which is inserted into a pocket 140 provided on the first link arm 128a. The torsion spring 136 is configured to bias the link arm assembly 126 into its original closed position wherein the torsion spring 136 pulls the cable management link arms 128 back into the panel 10 as the tray 12 is pushed back into place by the technician, whether the tray 12 is being pulled forwardly or rearwardly. A similar torsion spring is also provided on the rear cable management portion 76b of the tray 12 assisting the torsion spring 136 of the front cable management portion 76a in biasing the tray 12 back into a closed position.

Figure 20:
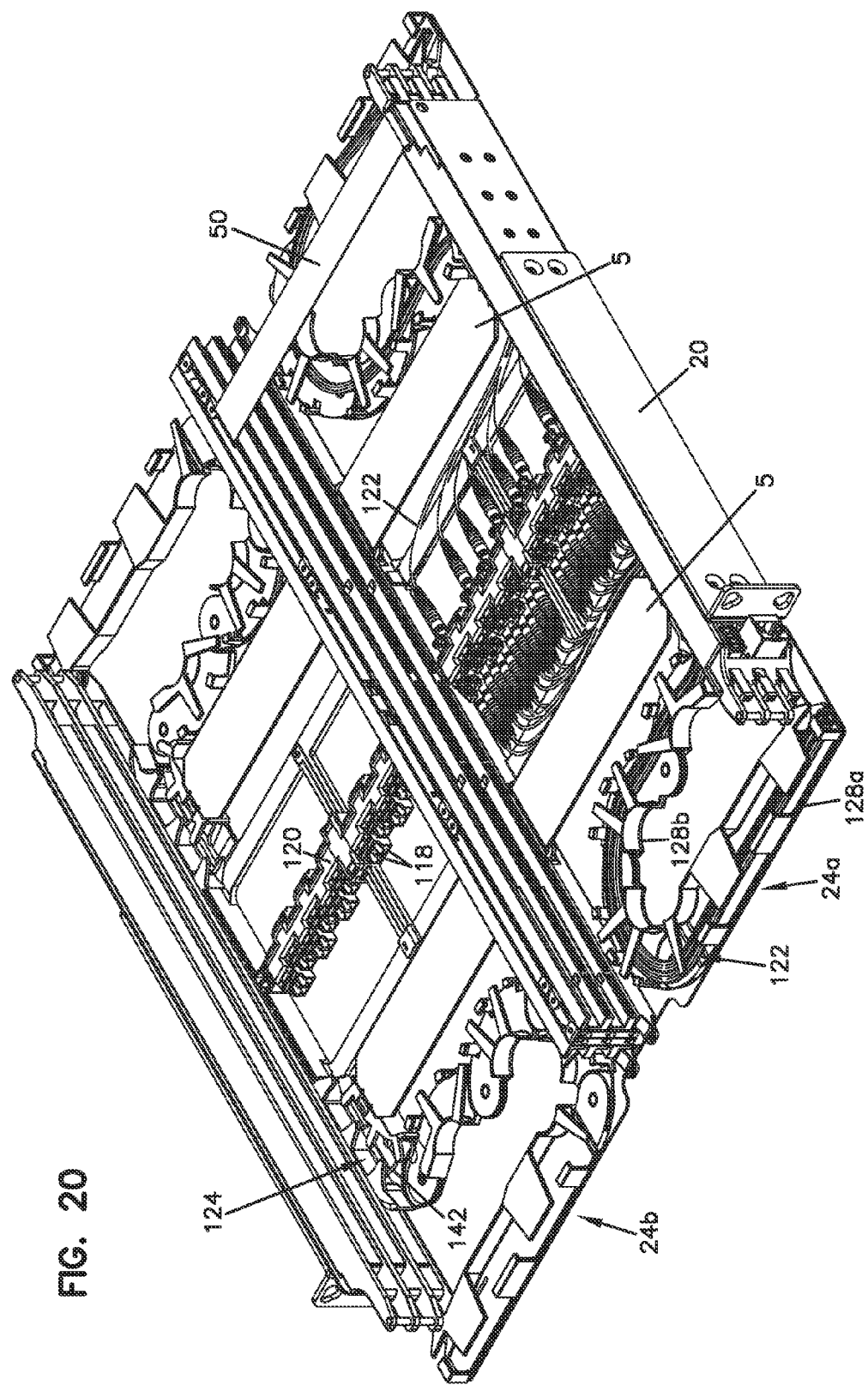
FIG. 20 is a top, right, front perspective view of the chassis of FIG. 1 without the top chassis cover mounted thereon to illustrate an example cable routing configuration for one of the first trays within the chassis.
Figure 21:
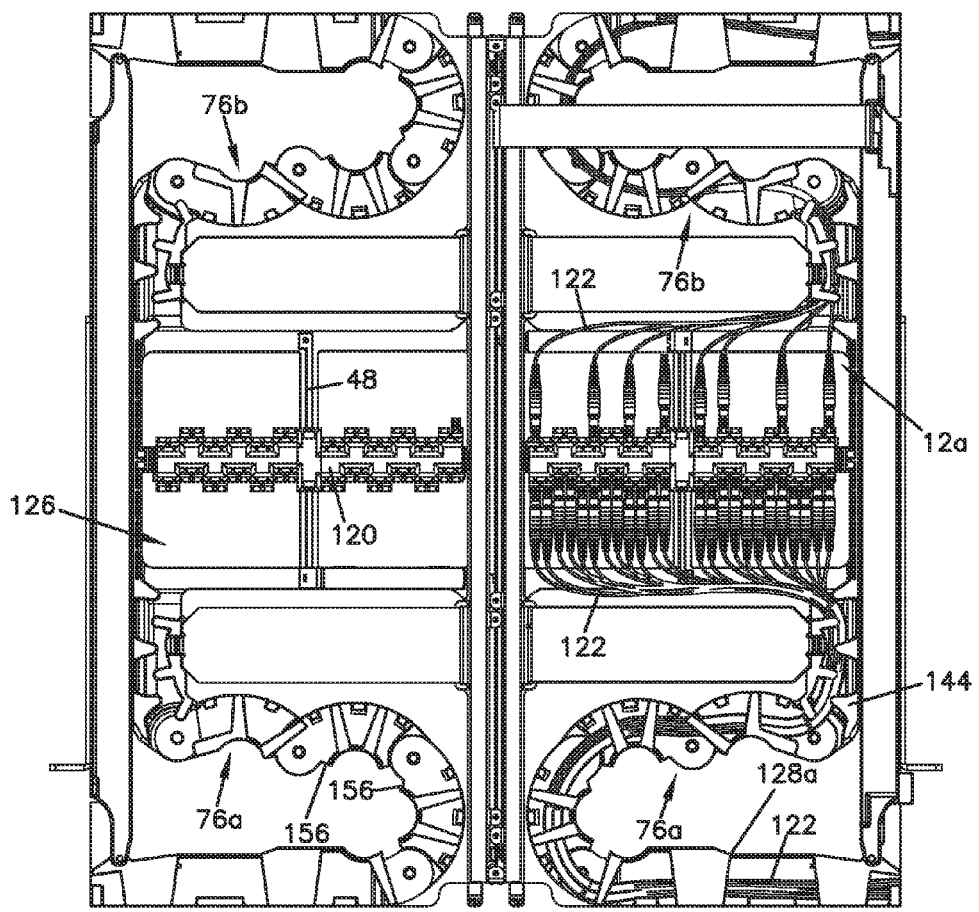
FIG. 21 is a top view of the chassis of FIG. 20 without the chassis cover thereon.

In the depicted embodiment, the cable management portion 76 of the trays 12 are configured for top and side loading of the cables thereinto. As shown in FIGS. 13, 20, and 21, the radius limiter 124 defines a generally curved cable channel 142 with inwardly extending cable management fingers 144 for retaining cables 122 once therein. In such an example, the cables 122 can be top loaded into the radius limiter 124 as they extend from the connection locations 114.

Figure 22:
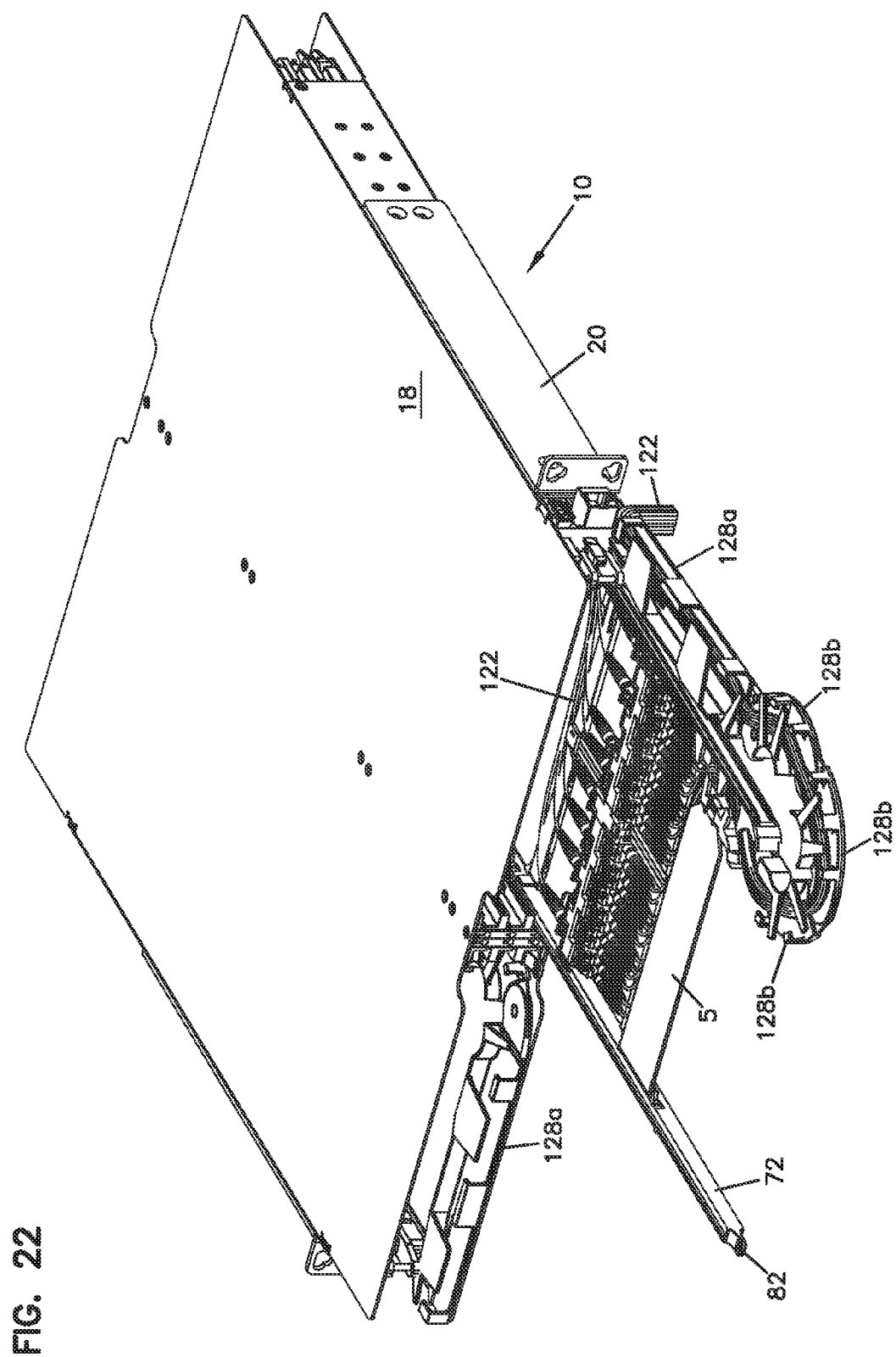
FIG. 22 is a perspective view of the chassis of FIG. 1, with one of the trays fully pulled out to an open position, illustrating an example cable routing configuration within the tray.

The first link arm 128a is pivotally connected to the end support 44 such that it can move between a transverse position when the tray 12 is closed to a longitudinal orientation when the tray 12 is fully open as shown in FIG. 22. A contact surface 146 defined on the first link arm 128a prevents further movement of the first link arm 128a with respect to the end support 44. The remaining three link arms 128b of the link arm assembly 126 are configured to have the same shape as each other. Each of the three similar link arms 128b is coupled back to back from the first link arm 128a to the radius limiter 124 of the tray 12. The link arms 128b include snap-fit coupling features defined, for example, by cylindrical tabs 148 on a first male end 150 and cylindrical receptacles 152 on an opposite second female end 154 for providing the pivotal movement. Each of the link arms 128b, as in the first link arm 128a, defines contact surfaces 156 such that they are limited in their pivotal movement with respect to each other. For example, the link arm 128b that is directly coupled to the first link arm 128a might define a contact surface 156 to prevent further pivotal movement with respect thereto when the tray 12 is fully open. Each of the link arms 128 including the first link arm 128a is designed such that regardless of position of the moving tray 12, the cables 122 contained therewithin will not violate the minimum bend radius requirements.

According to one example embodiment, as shown in FIGS. 20 and 21, the link arms 128 may be designed for top and side loading of the cable 122, wherein cable management tabs 158 might be located on the peripheral edges 160. Other configurations are certainly possible for the link arms 128.

The first link arm 128a that is directly attached to one of the end supports 44 of the tray assembly 24 may be designed to hold structures such as fanouts, which are devices that transition fiber from one high-fiber-count cable to multiple single-fiber-count cables 122.

Example cable routing configurations have been shown in FIGS. 20-22. The cables 122 lead from both the front and rear connection locations 114 through the radius limiters 124 and through each of the three similar link arms 128b and finally through the first link arm 128a before being directed out of the chassis 10. As noted above, the front link arm assembly 126a and the rear link arm assembly 126b are configured to move simultaneously together to manage the cable slack as the trays 12 are pulled out from either direction.

Referring now to FIGS. 8, 13, 18, 20, and 21, the cable management portion 76 of the trays 12 may also include cable retainers 5 that extend between the center mounting portion 72 and the radius limiter 124. The cable retainers 5 are pivotally coupled to the center mounting portion 72 of the tray assembly 24 at a first end 6 via a hinge assembly 7 defined by both the center mounting portion 72 and the first end of the cable retainer 5. The cable retainer 5 includes a snap-fit tab 8 at a second end 9 thereof that is configured to be inserted into a receptacle 3 defined adjacent the radius limiter 124 for interlocking the cable retainer 5 at a closed or pivoted-down position with a snap-fit. The cable retainers 5 are configured to hold or retain cables extending from the connection locations 114 when in a pivoted-down position. The cable retainers can be pivoted up and out of the way by the technician to access the connection locations 114.

Referring now to FIGS. 7-12, as noted above, in accordance with some aspects, certain types of adapters 118 that are mounted to the trays 12 in the form of adapter block assemblies 120 may be configured to collect physical layer information from one or more fiber optic connectors received thereat. For example, certain types of adapters 118 of the adapter block assemblies 120 may include a body configured to hold one or more media reading interfaces that are configured to engage memory contacts on the fiber optic connectors. One or more media reading interfaces may be positioned in the adapter body. In certain implementations, the adapter body may define slots extending between an exterior of the adapter body and an internal passage in which the ferrules of the connectors are received.

Certain types of media reading interfaces may include one or more contact members that are positioned in the slots. A portion of each contact member may extend into a respective one of the passages to engage memory contacts on a fiber optic connector. Another portion of each contact member may also extend out of the slot to contact a circuit board that may be positioned on the adapter block assembly 120. As noted, portions of the tray 12 and the chassis 10 may define conductive paths that are configured to connect the media reading interfaces of the adapters 118 with a main controller or PCB 36 of the chassis 10, which can further communicate with a controller of the rack 40 that is housing the chassis 10.

The main controller 36 of the chassis 10 or the controller of the rack 40 may include or connect (e.g., over a network) to a processing unit that is configured to manage physical layer information obtained by the media reading interfaces.

Figure 7:
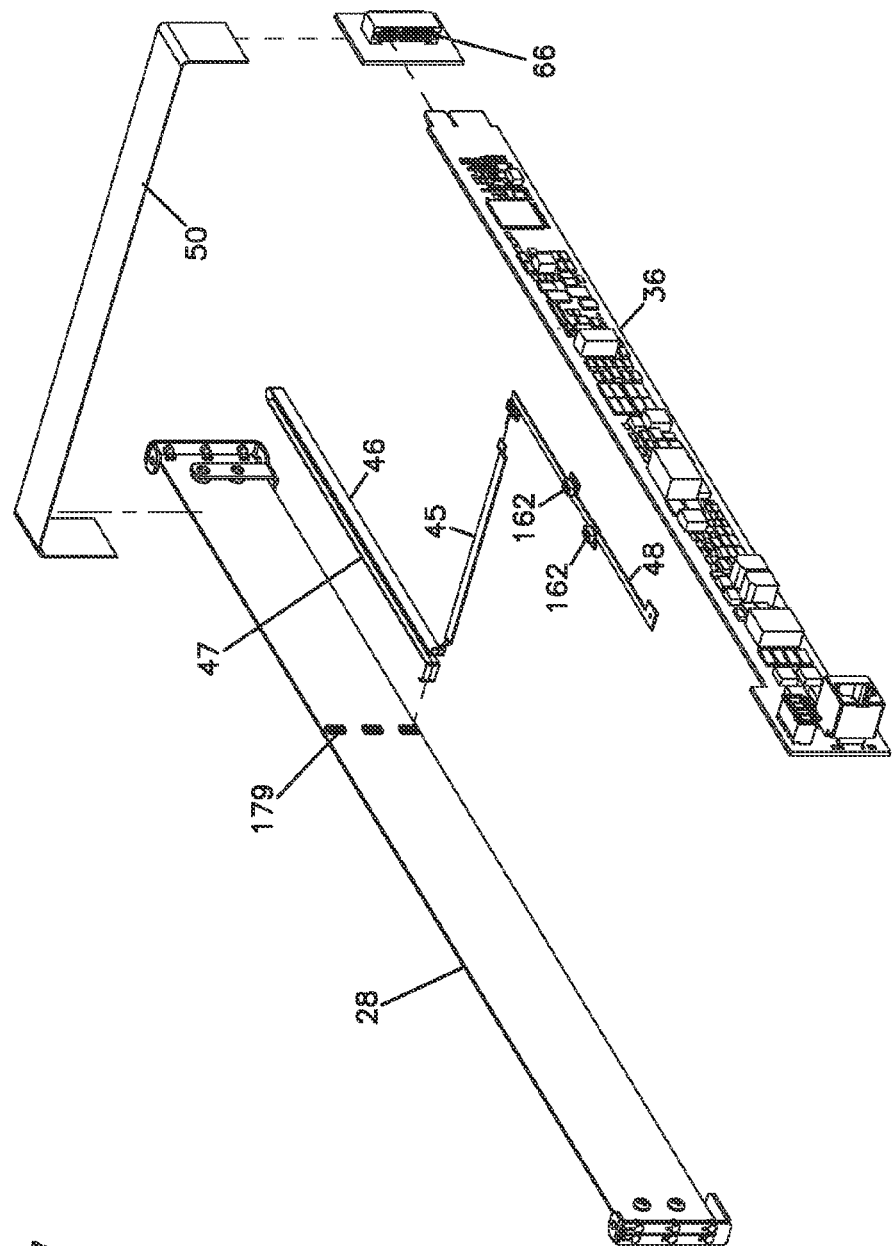
FIG. 7 illustrates the electrical communication pathways via circuit boards for the entire chassis of FIGS. 1-2.
Figure 10:
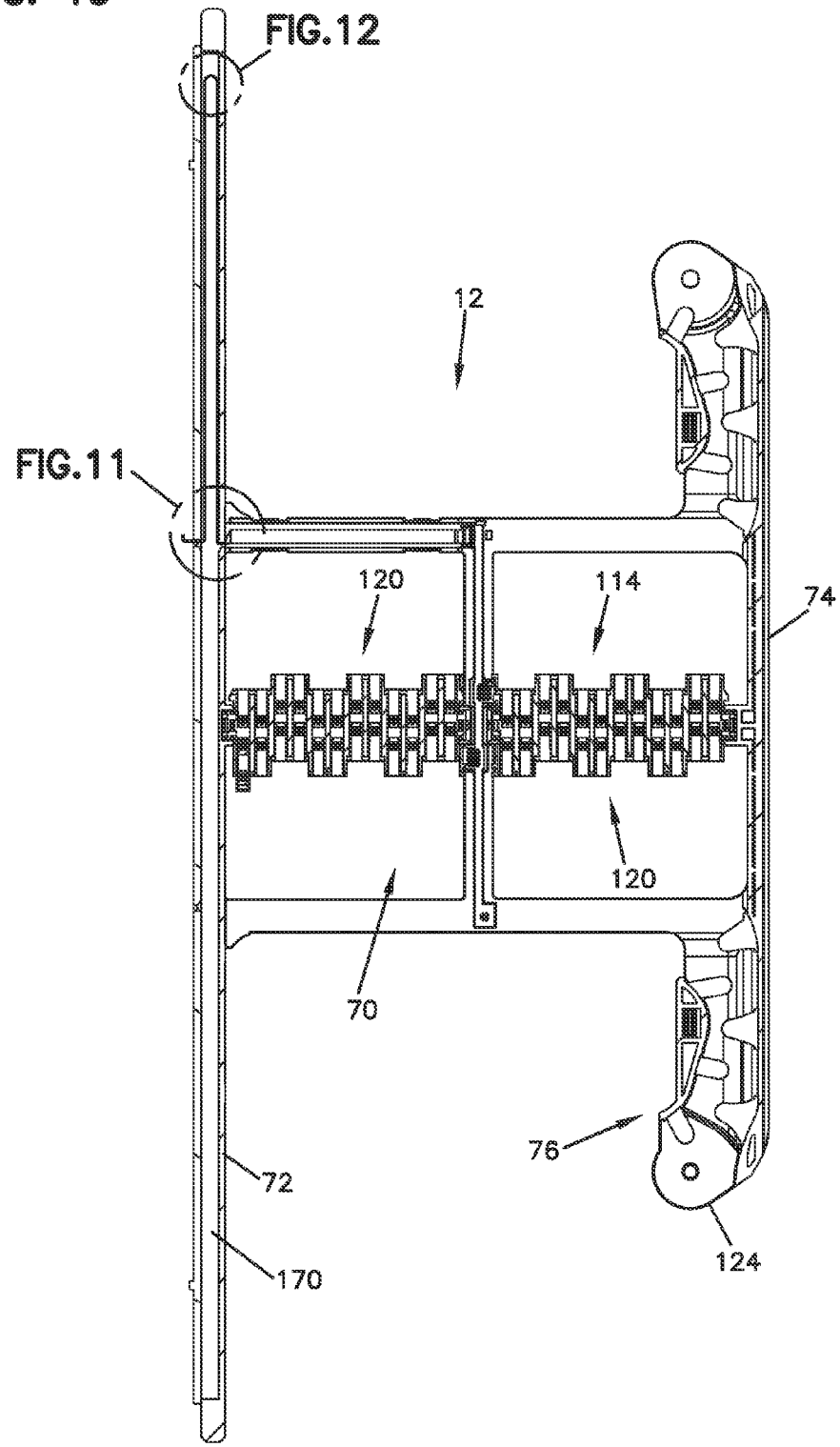
FIG. 10 is a top cross-sectional view illustrating the routing of the flexible circuit board in the form of a ribbon cable from the center mounting portion of the tray to the fiber optic connection locations of the tray.

According to the depicted example embodiment, on each tray 12, once a technician attaches a 24-port adapter block assembly 120 using snap features on the tray 12, the adapter block assemblies 120 may plug into the network as discussed above. For such managed panels 10, for example, the printed circuit boards of the adapter block assemblies 120 may connect to the tray 12 using multi-pin connectors 162 on the tray 12 as shown in FIGS. 7, 8, and 10. The multi-pin connectors 162 on the tray 12 may be attached to a flexible circuit formed by a ribbon cable 46 that routes to a central PCB 28 within the panel 10. As shown, the conductive pathway from the multi-pin connectors 162 to the ribbon cable 46 is provided by a printed circuit board 48 that is located at a central divider portion 164 of the tray 12 and also by a portion 45 of the flexible ribbon cable 46 that is positioned horizontally along the rear side 166 of the main connection portion 70 of the tray 12. The printed circuit board 48 and the horizontal portion 45 of the ribbon cable 46 are preferably mounted flush within recesses 168 provided on the central divider 164 and the rear side 166 of the main connection portion 70 of the tray 12.

Figure 11:
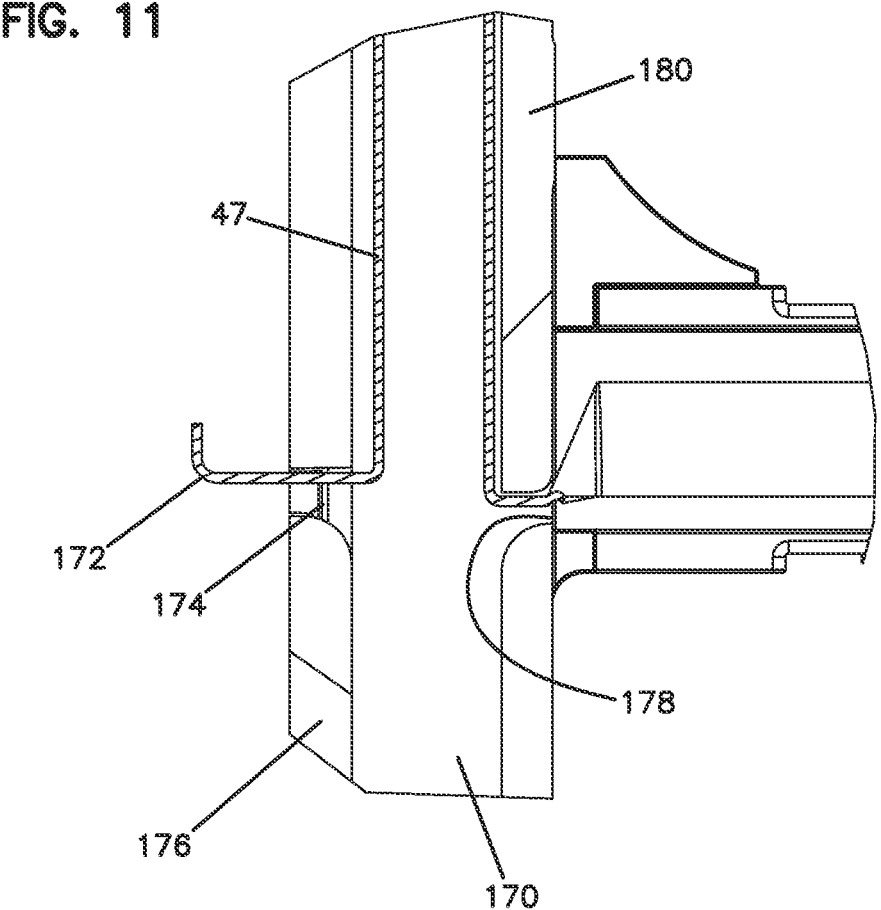
FIG. 11 is a close-up view of a portion of the flexible circuit board of FIG. 10 that transitions from the center mounting portion of the tray to the main connection portion of the tray.
Figure 12:
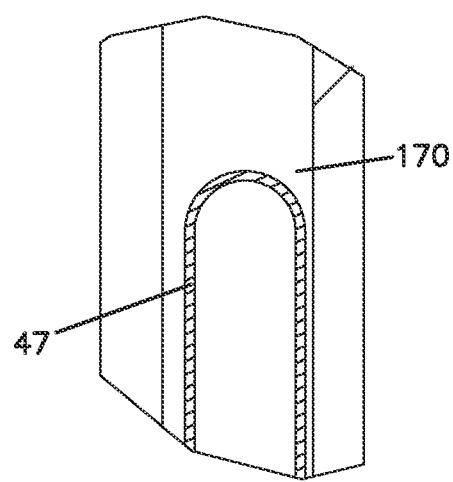
FIG. 12 is a close-up view of another portion of the flexible circuit board of FIG. 10 within the center mounting portion of the tray.

A portion 47 of the ribbon cable 46, which is provided in a vertical orientation, may be looped within a cavity 170 defined by the center mounting portion 72 of the tray 12 as shown in FIGS. 10-12. The vertical portion 47 of the ribbon cable 46 is configured to move within the cavity 170 to allow the tray 12 to travel back and forth without disrupting the communication through the ribbon cable 46 between the central PCB 28 and tray PCB 48. An end 172 of the ribbon cable 46 extends through a slot 174 on the left wall 176 of the center mounting portion 72 of the tray 12 to connect to the central PCB 28. Another slot 178 is provided on the right wall 180 of the center mounting portion 72 of the tray 12 to allow a portion of the ribbon cable 46 to extend from inside the cavity 170 to the main connection portion 70 of the tray 12, wherein the ribbon cable 46 transitions from a vertical orientation to a flat horizontal orientation by a twist of the cable 46.

The end 172 of the ribbon cable 146, after passing though the slot 174 on the left wall of the center mounting portion 72 of the tray, extends through slots 175 on the mounting block 42 and then slots 177 on the mounting plate 38, before making a connection with a connector 179 on the central PCB 28.

As noted above, the central PCB 28 may use indicators such as LEDs 30 on both the front 32 and back 34 of the panel 10 to communicate to a technician which tray 12 should be accessed. The central PCB 28 then may connect to the main PCB or controller 36 of the chassis 10, which is housed within the end support 44 of the tray assembly 24. The connection is made via another ribbon cable 50 that runs along a top cover 18 of the panel 10 into the end support 44. The ribbon cable 50 is configured to extend to the card-edge-style connector 66 that is located toward the rear of the channel 62. The main controller 36 is accessible to the technician by removing a front end cap 64 of the applicable end support 44. The main controller 36 may use a card-edge-style connection with the connector 66 at its opposite rear end to connect to the ribbon cable 50 that runs along the top cover 18, allowing the main controller 36 to be a field-replaceable device. The main controller 36 is configured to communicate to a higher-level managed connectivity rack or frame 40 via a connection on the side of the panel 10. The main controller 36 of the panel 10 may be powered via another connection on the side of the panel 10.

Referring now to FIGS. 23-31, three different examples of a managed connectivity racks or frames 40 are shown. In the example embodiments of the racks 40 shown, the racks 40 are configured for housing chassis 1010 that are 4RU in size. The main controller or PCB of the 4RU chassis 1010 is designed to communicate with twenty four trays 12 and may be provided at a location different than the location discussed for a 1RU chassis 10 (of FIGS. 1-22) which is designed to communicate with six trays 12. In the 1RU chassis 10, each chassis 10 is illustrated as having the main controller 36 embedded in an end support 44 of the chassis 10. According to one example, for the 4RU chassis 1010, the main controller may be positioned within a channel located in an end support of the tray assemblies, similar to the 1RU version of the chassis 10, as will be described in further detail with respect to FIGS. 49-61. Other locations are possible for the chassis main controller.

Still referring to FIGS. 23-31, the managed connectivity racks 40 are designed to include a rack controller 41 that communicates with each chassis 1010 mounted within the rack 40. The three different examples of the racks 40 illustrate different methods of routing the cabling 222 from the rack controller 41 to the individual chassis 1010 mounted within the rack 40.

Except for the way the cabling 222 is routed from the rack controller 41 to the individual chassis 1010, all depicted versions of the racks 40 share certain similar features. Such features will generally be discussed with reference to one of the versions, with the understanding that the features are fully applicable to the other versions.

Figure 23:
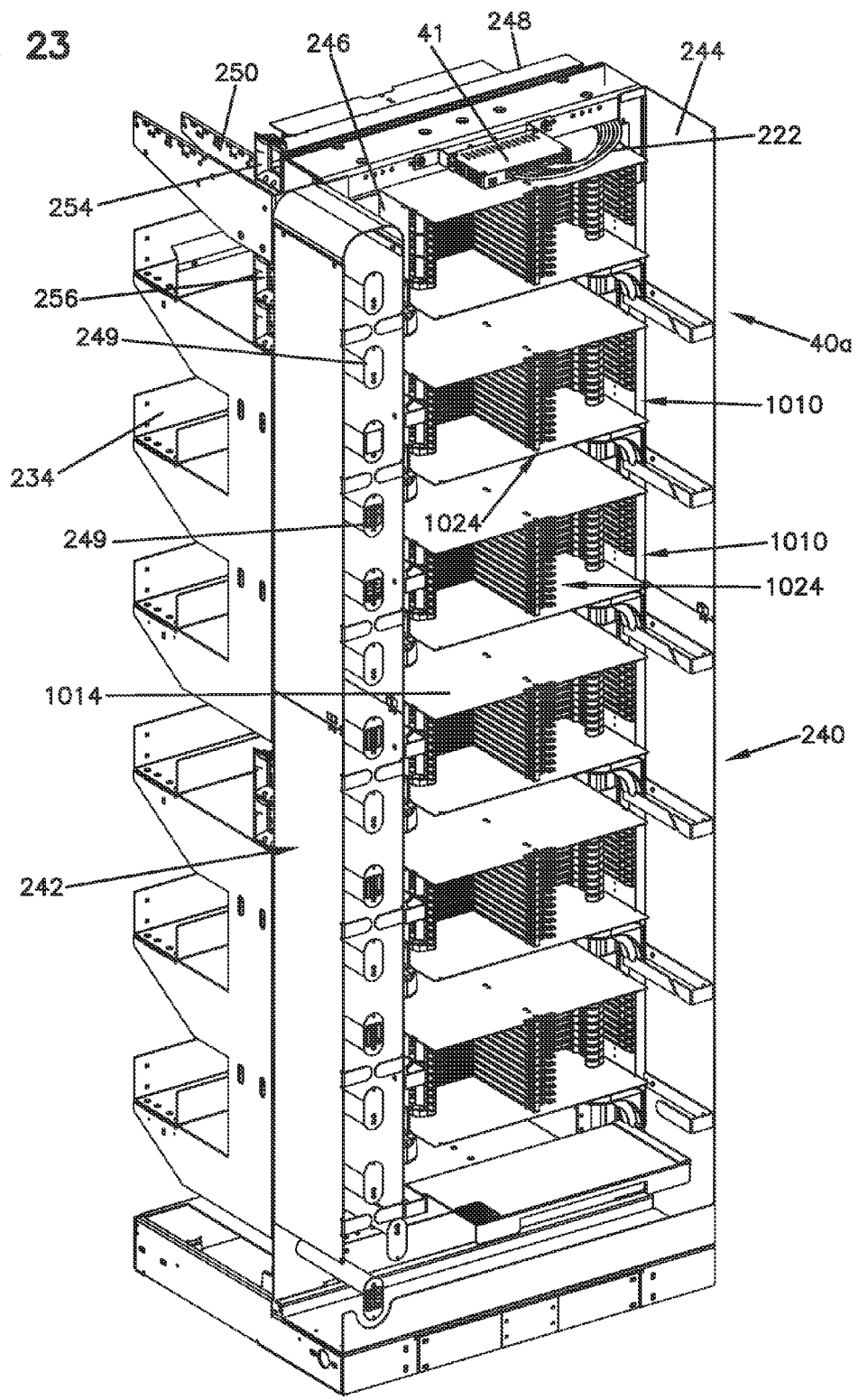
FIG. 23 is a perspective view of a first embodiment of a managed connectivity rack housing a plurality of 4RU chassis having features similar to those of the 1RU chassis of FIG. 1.
Figure 24:
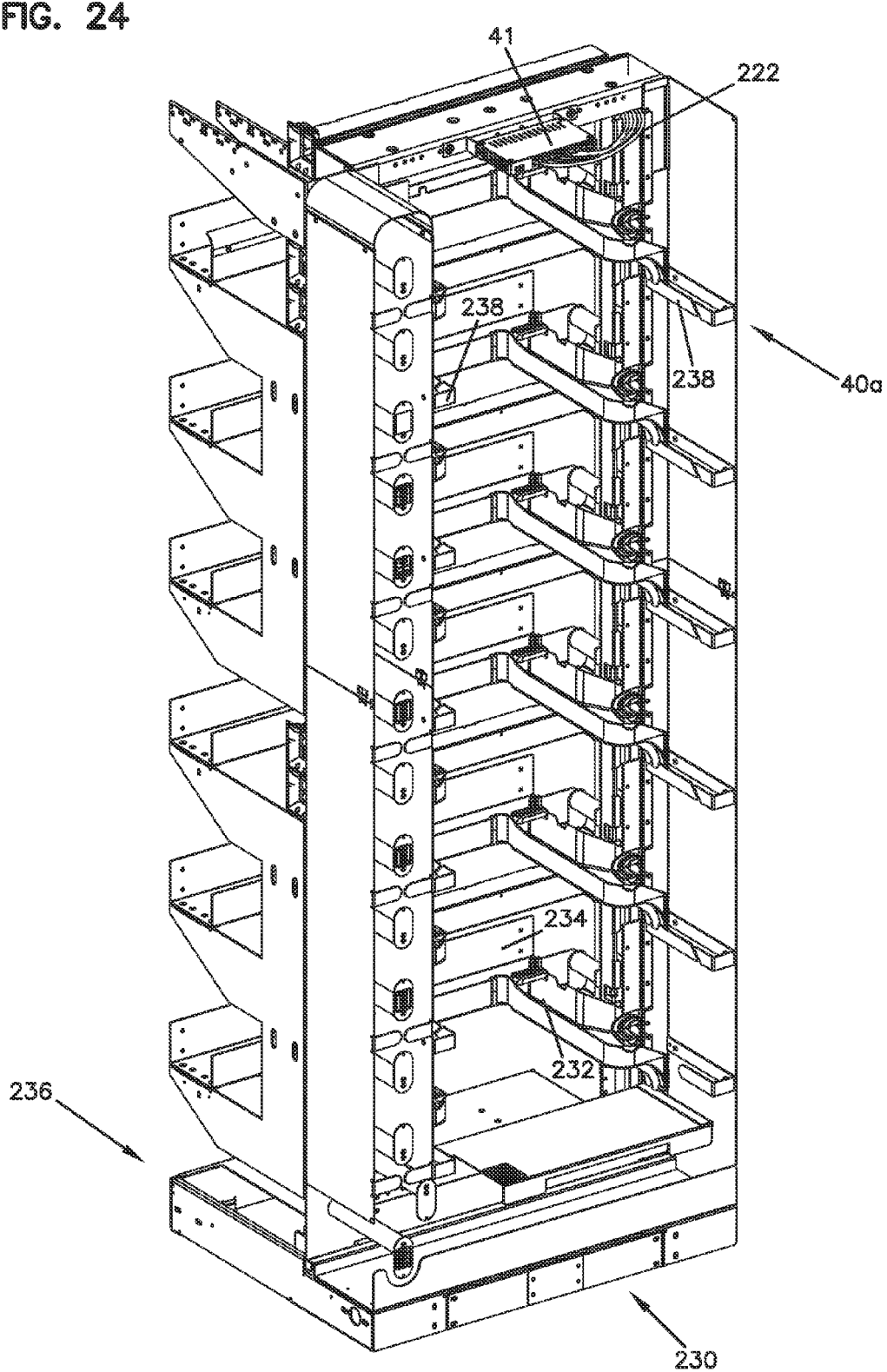
FIG. 24 is a perspective view of the rack of FIG. 23, shown without any chassis mounted thereon.
Figure 25:
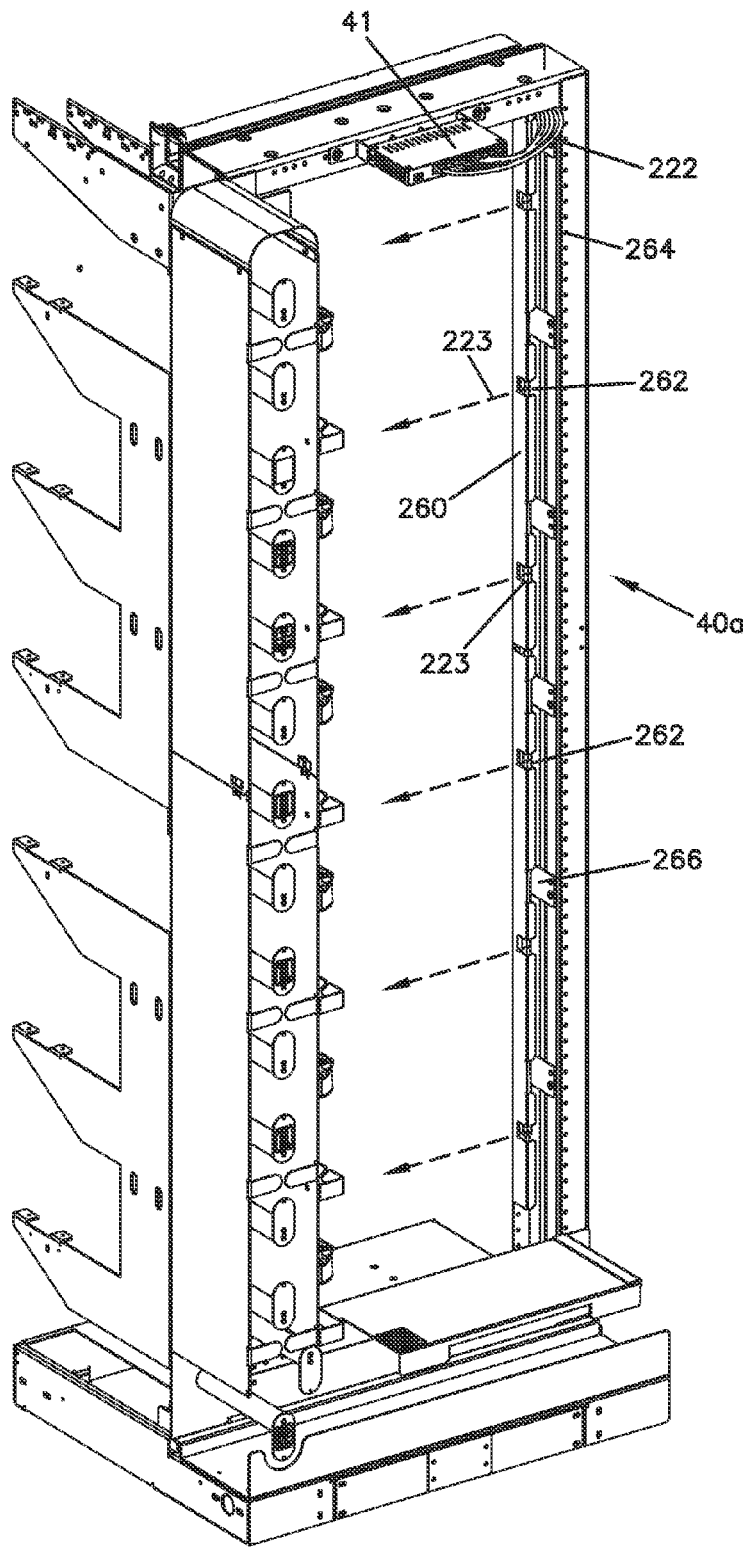
FIG. 25 is a perspective view of the rack of FIG. 23, shown with a number of the cable management features removed therefrom to illustrate the cable path from the rack controller to the individual chassis mounted within the rack.

Referring now to FIGS. 23-25, a first embodiment of a managed connectivity rack 40a housing a plurality of 4RU chassis 1010 having features similar to those of the 1RU chassis 10 of FIG. 1 is shown. As noted above, the first embodiment of the rack 40a shares certain features with the other two versions. In FIG. 24, the rack 40a is shown without any chassis 1010 mounted thereon and in FIG. 25, the rack 40a is shown with a number of cable management features removed therefrom to illustrate the cable path from the rack controller 41 to the individual chassis 1010 mounted within the rack 40a.

Still referring to FIGS. 23-25, at the front 230, the rack 40a includes front-to rear troughs 232 that communicate with rear horizontal troughs 234 at the rear 236 of the rack 40a. Cable loops 238 are provided adjacent both the right and left sides 240, 242 of the rack 40a, wherein the cable loops 238 are located within right and left front vertical cable channels 244, 246 defined on the right and left sides 240, 242 of the chassis 40a, respectively. In the depicted embodiment, the rack 40a also includes cable slack management spools 249 at the left side 242 of the rack 40a, wherein the spools 249 are provided in a stacked arrangement along a column at the left side 242 of the rack 40a, at the front 230 thereof.

At the rear 236 of the rack 40a, the rack 40a defines vertical cable guides or channels 248, 250, respectively, on both the right and left sides 240, 242 of the rack 40a extending along the height of the rack 40a. Please see FIGS. 32 and 34 for the rear view of a similar rack 40d. A cross-frame trough 252 is provided for each chassis or panel 1010 and connects the vertical cable guides 248, 250 on the right and left sides 240, 242. A radius limiter in the form of a trumpet flare 254 is provided on the left end of the cross-frame trough 252. A second trumpet flare 256 is provided below the first trumpet flare 254 on the left side 242 of the rack 40a. At the right side 240 of the rack 40a, a plurality of radius limiters 258 (e.g., spools) is located within the right vertical cable guide or channel 248. Still referring to FIGS. 23-25, the rack 40a also includes the rear horizontal troughs 234 extending between the right side 240 and the left side 242 of the rack 40a. The front-to-rear troughs 232 provided at each of the right and left sides 240, 242 of the rack 40a provide for the routing of cables 122 between the front side 230 and the rear side 236 of the rack 40a.

The cable routing within the rack 40a for cables 122 extending from the front connection locations 114 and rear connection locations 114 of the trays 12 of the individual chassis 1010 are similar in configuration to those example routings described in U.S. application Ser. Nos. 13/645,756 and 13/645,771, both filed on Oct. 5, 2012, the entire disclosures of which are incorporated herein by reference in their entireties.

Racks 40 illustrated in FIGS. 26-31 generally follow the same construction and routing configuration as the rack 40a illustrated in FIGS. 23-25.

As noted above, the three different versions of the racks illustrated in FIGS. 23-31 all include controllers 41 that are configured to communicate with the individual chassis 1010 mounted on the racks 40.

In the depicted embodiments of the racks 40, the racks 40 are configured to hold six 4RU chassis 1010. In such an embodiment, the frame controller 41 may contain an S-port Ethernet switch, one of which may be used to route data from each 4RU chassis main controller to an Infrastructure Configuration Manager (ICM). A local microprocessor may be attached to the Ethernet switch which allows the processor to access an Address Translation Unit of the Ethernet switch and look up the Media Access Control Address of each 4RU chassis main controller connected to the frame 40 by specific ports (e.g., six different ports allowing for six chassis 1010 to be managed). This allows mapping of each switch port to the Media Access Control Addresses of the attached chassis main controller. Each switch port may relate to a specific location in the frame 40. The Media Access Control Addresses and related Ethernet switch port data can be sent to the Infrastructure Configuration Manager, which may use the data to determine which frame each 4RU chassis main controller is installed in, and the location of each 4RU main controller within the frame 40. An auxiliary Ethernet port may be provided for local access to each 4RU chassis main controller or the rack controller 41. A Power over Ethernet powered Wi-Fi access point can optionally be added to allow mobile devices access to each 4RU chassis main controller, or the frame controller 41. Further aspects of the managed connectivity of the rack 40 and the chassis 10/1010 mounted thereon is described in Examples of devices that may define the connection locations such as the adapter block assemblies 118 or cassettes are illustrated and described in further detail in U.S. Patent Application Ser. No. 61/760,816, entitled "Systems and Methods for Associating Location Information with a Communication Sub-assembly Housed within a Communication Assembly", which application is filed on Feb. 5, 2013 and is incorporated by reference in its entirety.

Regarding the routing of the cabling 222 from the Ethernet ports of the controller 41 of the rack 40 to the individual 4RU chassis 1010, in the first version of the rack 40a shown in FIGS. 23-25, the rack 40a defines a single vertical bracket 260 with openings 262 that allow breakout points 223 of the cables 222 to extend therethrough. The vertical bracket 260 is mounted to the right vertical frame member 264 and is configured to contain the cabling 222 extending from the controller 41 as shown in detail in FIG. 25, wherein the rack 40a is shown with a number of cable management features removed therefrom to illustrate the cable path. The vertical bracket 260 defines a plurality of mounting flanges 266 for fastening to the right vertical frame member 264 of the rack 40a.

Figure 26:
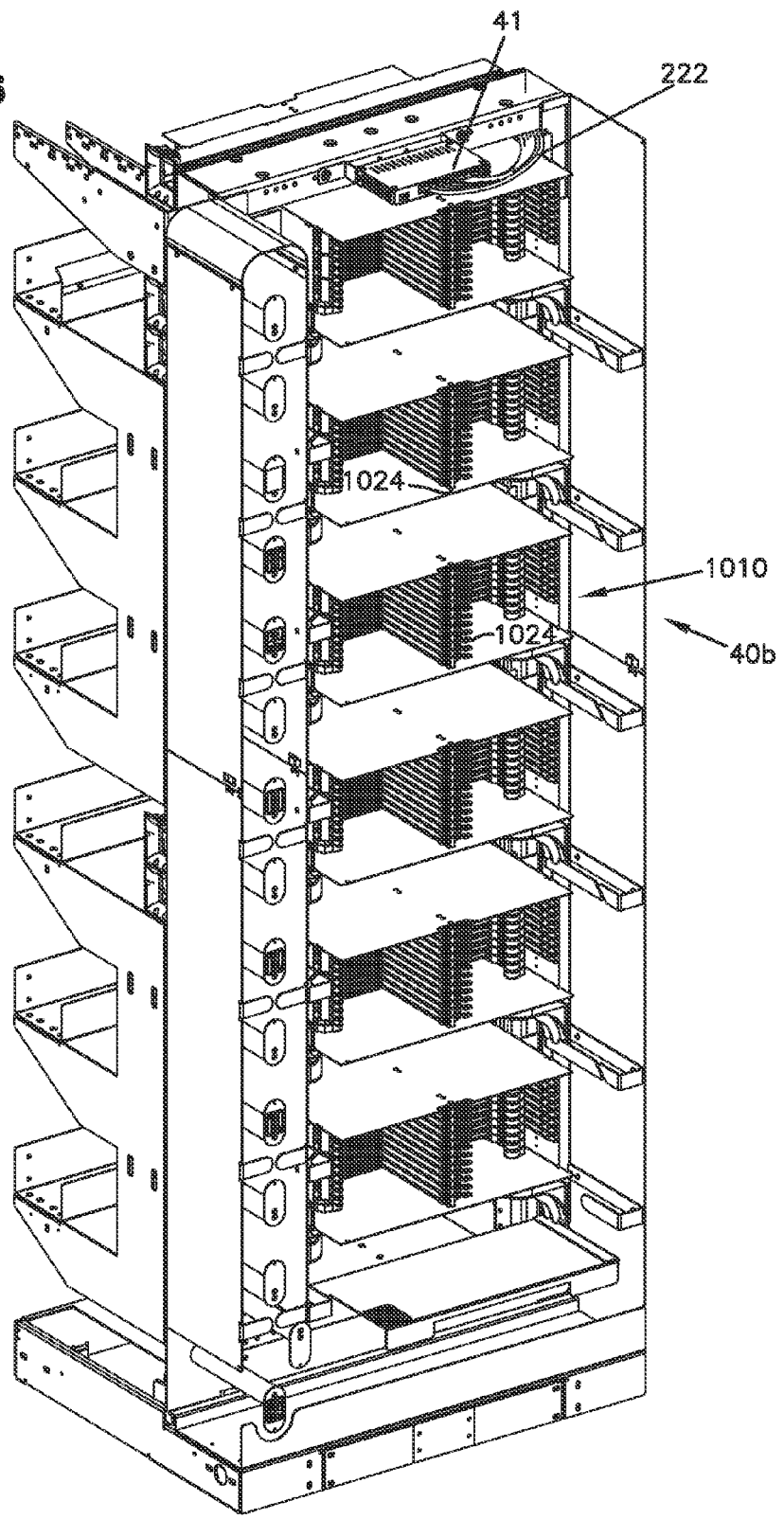
FIG. 26 is a perspective view of a second embodiment of a managed connectivity rack housing a plurality of 4RU chassis having features similar to those of the 1RU chassis of FIG. 1, the second embodiment of the rack having features similar to the rack of FIGS. 23-25.
Figure 27:
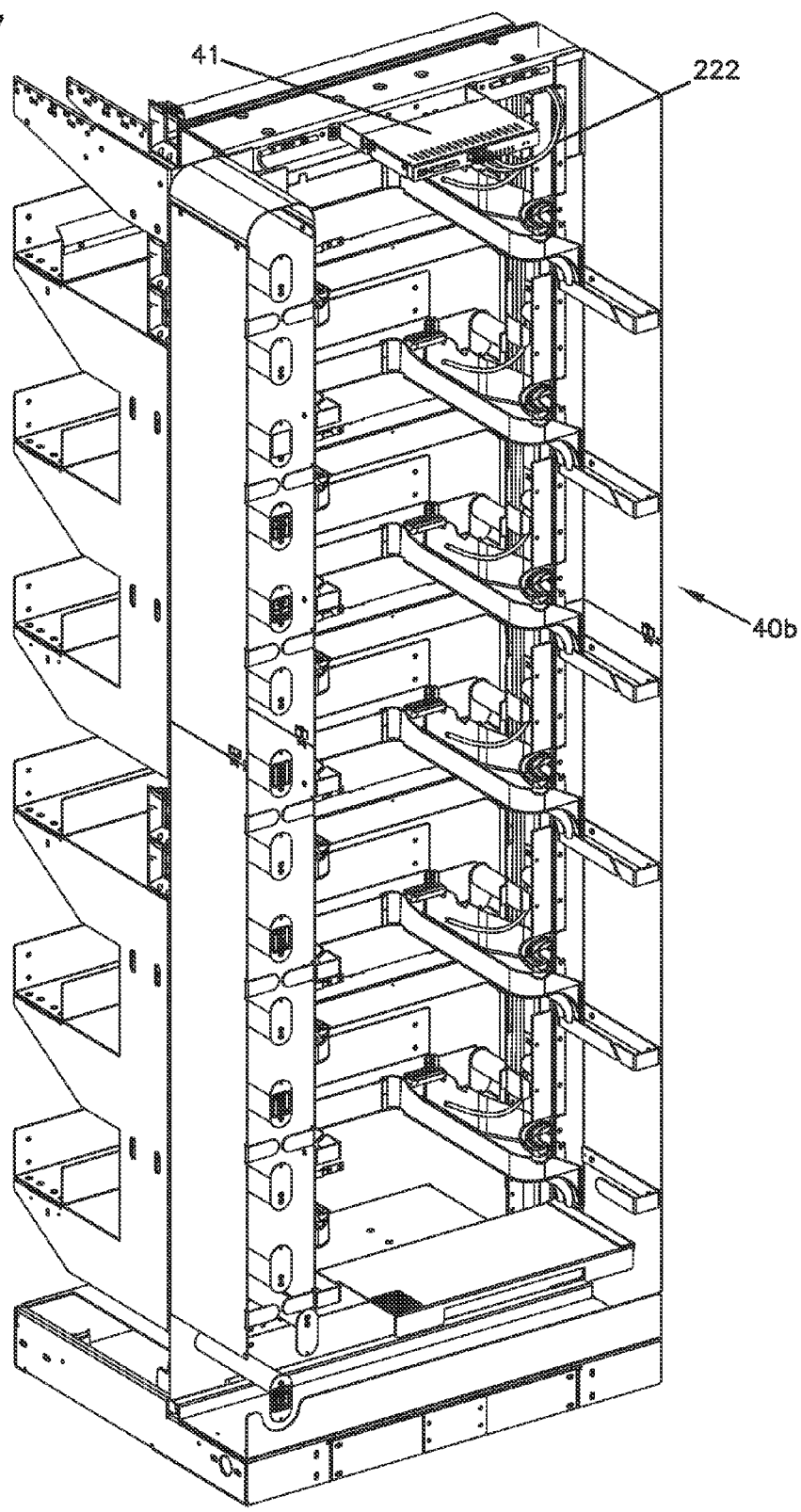
FIG. 27 is a perspective view of the rack of FIG. 26, shown without any chassis mounted thereon.
Figure 28:
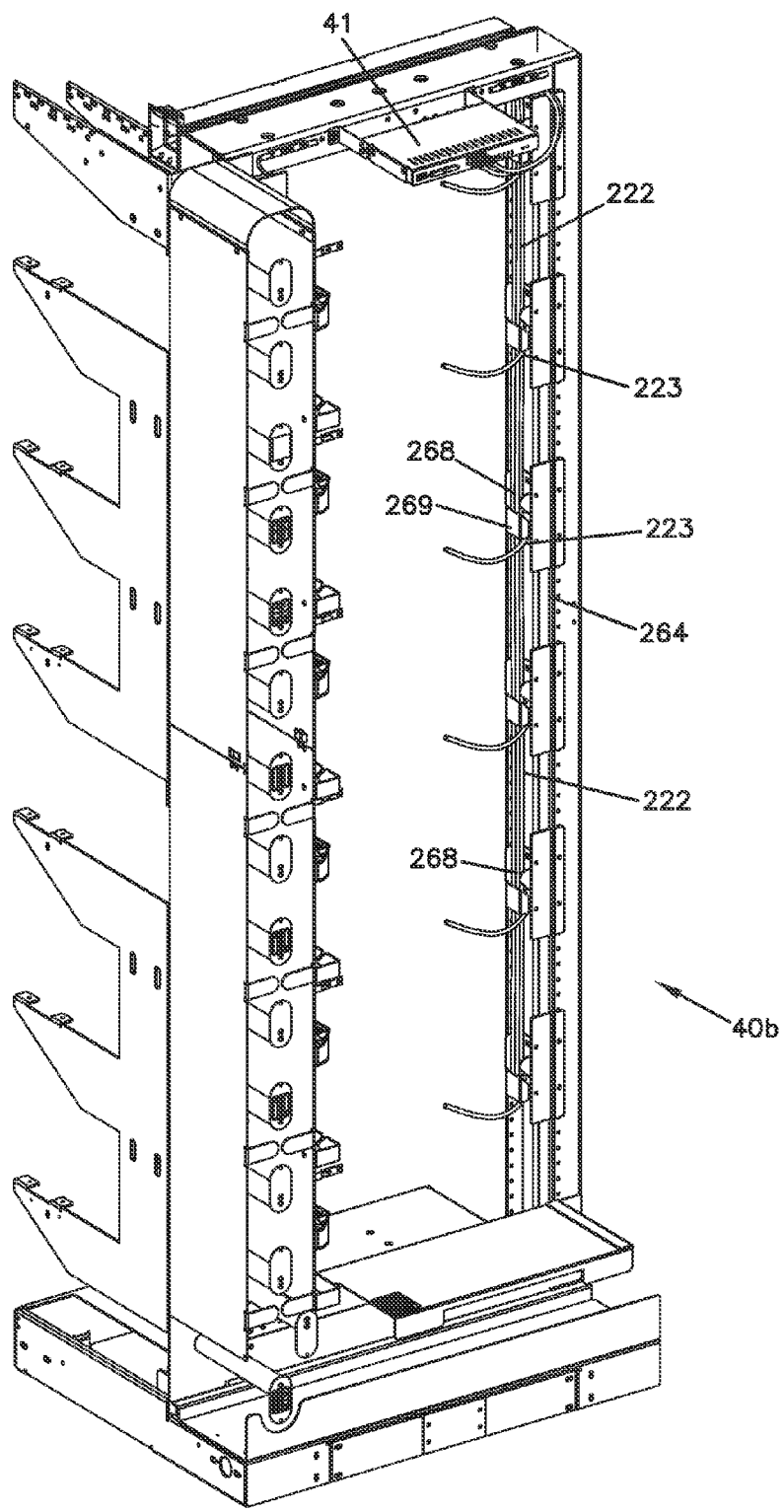
FIG. 28 is a perspective view of the rack of FIG. 26, shown with a number of the cable management features removed therefrom to illustrate the cable path from the rack controller to the individual chassis mounted within the rack.

In the second version of the rack 40*b* shown in FIGS. 26-28, the rack 40*b* defines a plurality of individual brackets 268 having cable management tabs 269 that are mounted to the right vertical frame member 264 of the rack 40*b*. The brackets 268 are configured to provide cable breakouts 223 at either the top side or the bottom sides of the brackets 268. The brackets 268 are positioned depending upon where the main controller for each 4RU chassis 1010 may be located.

Figure 29:
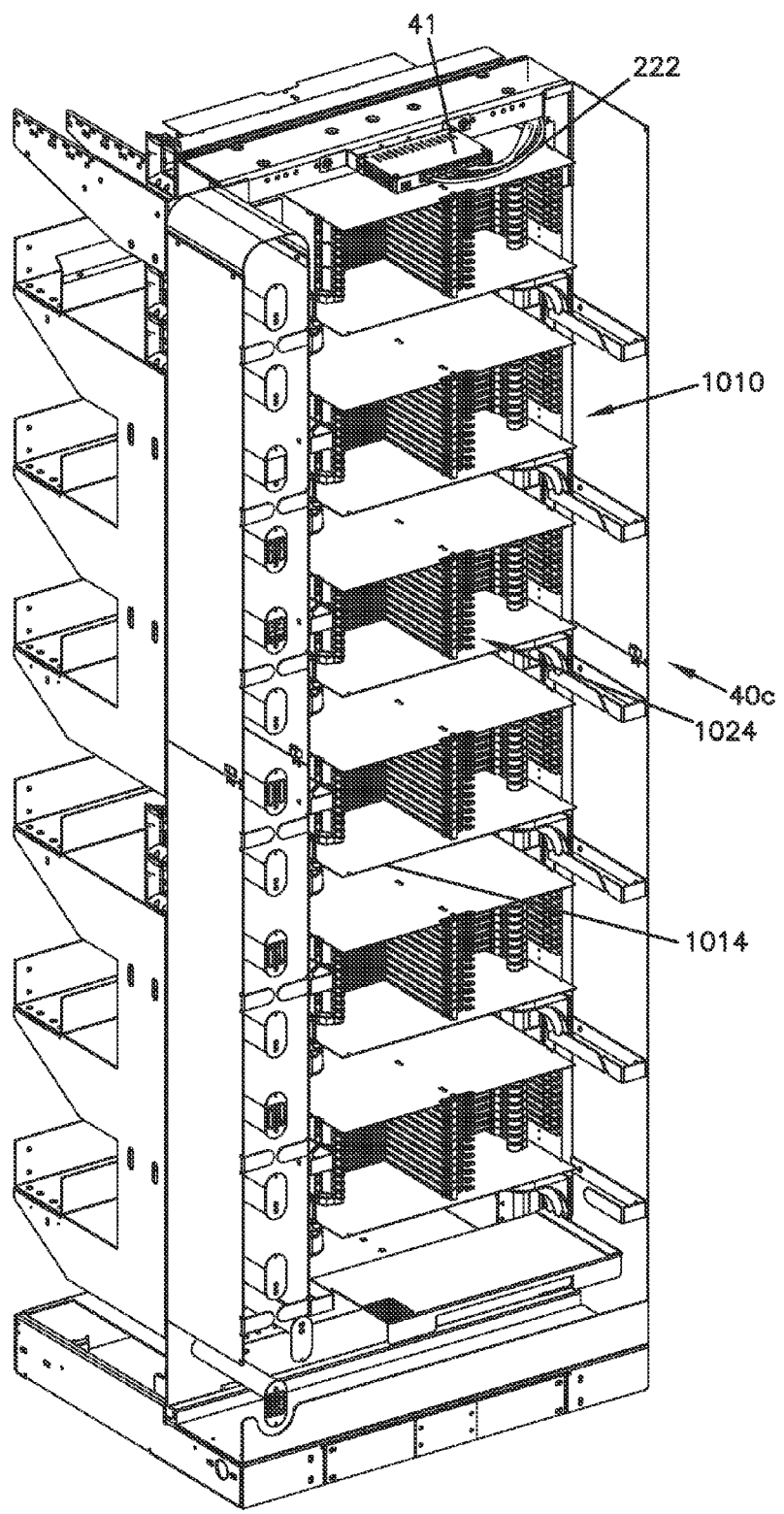
FIG. 29 is a perspective view of a third embodiment of a managed connectivity rack housing a plurality of 4RU chassis having features similar to those of the 1RU chassis of FIG. 1, the third embodiment of the rack having features similar to the racks of FIGS. 23-28.
Figure 30:
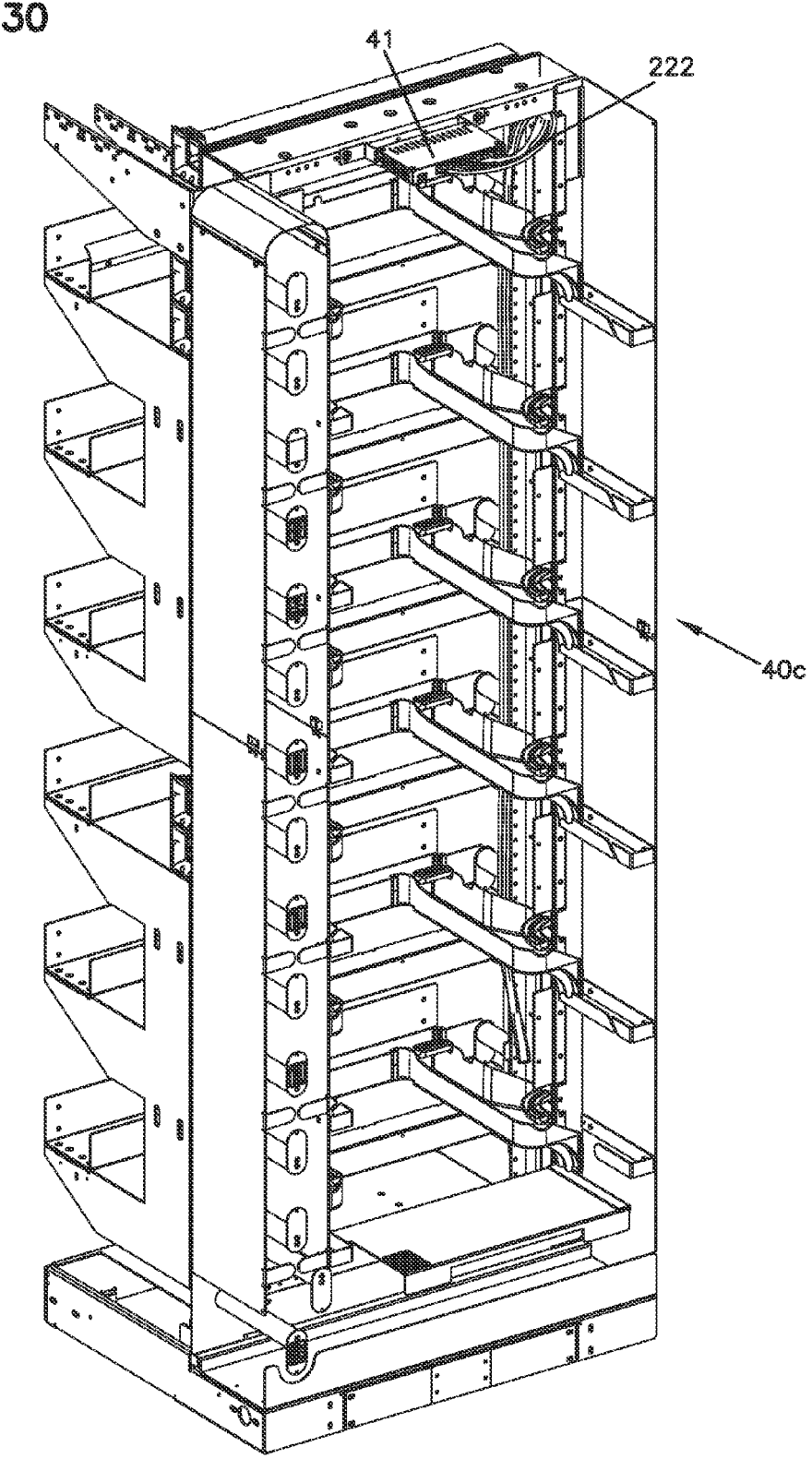
FIG. 30 is a perspective view of the rack of FIG. 29, shown without any chassis mounted thereon.
Figure 31:
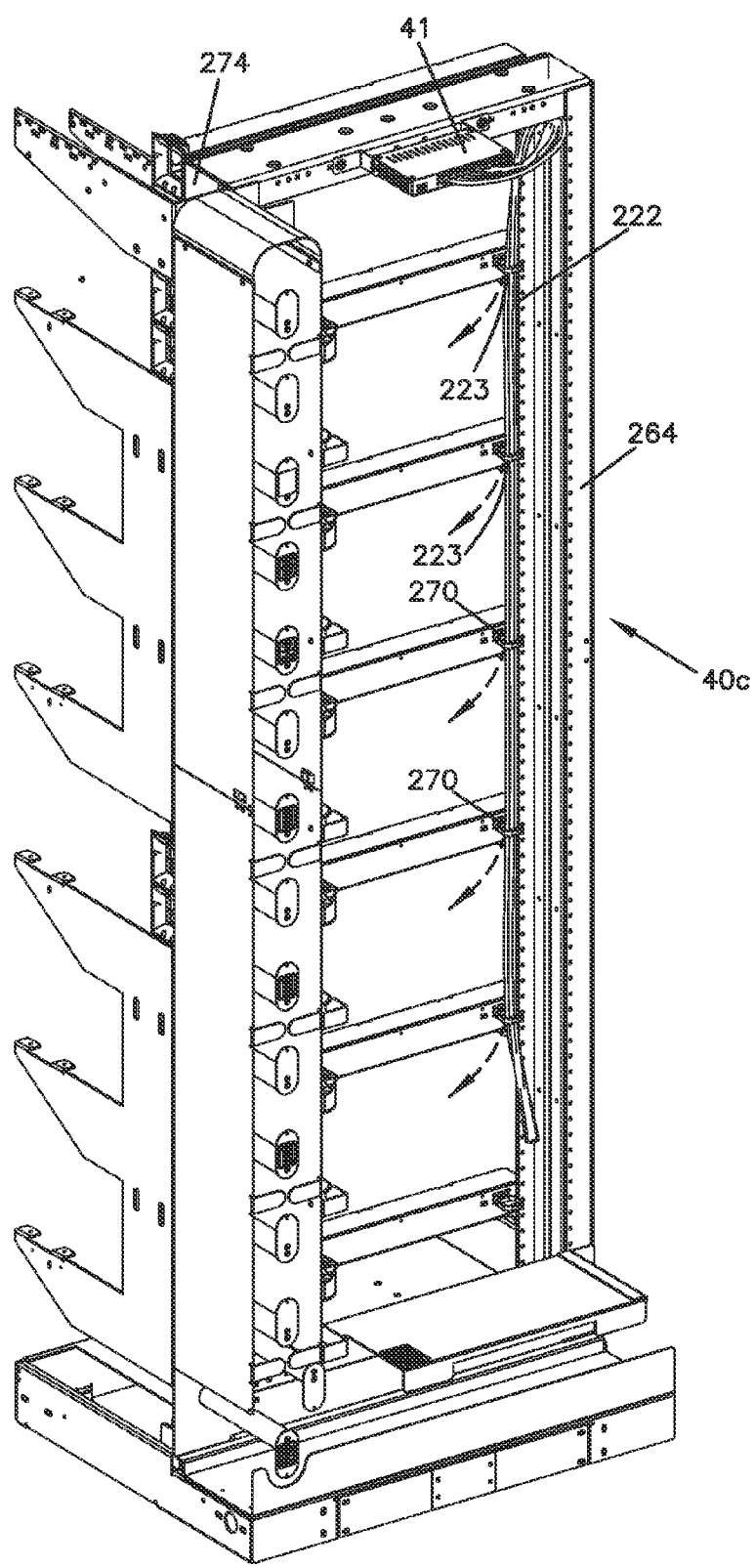
FIG. 31 is a perspective view of the rack of FIG. 29, shown with a number of the cable management features removed therefrom to illustrate the cable path from the rack controller to the individual chassis mounted within the rack.
Figure 32:
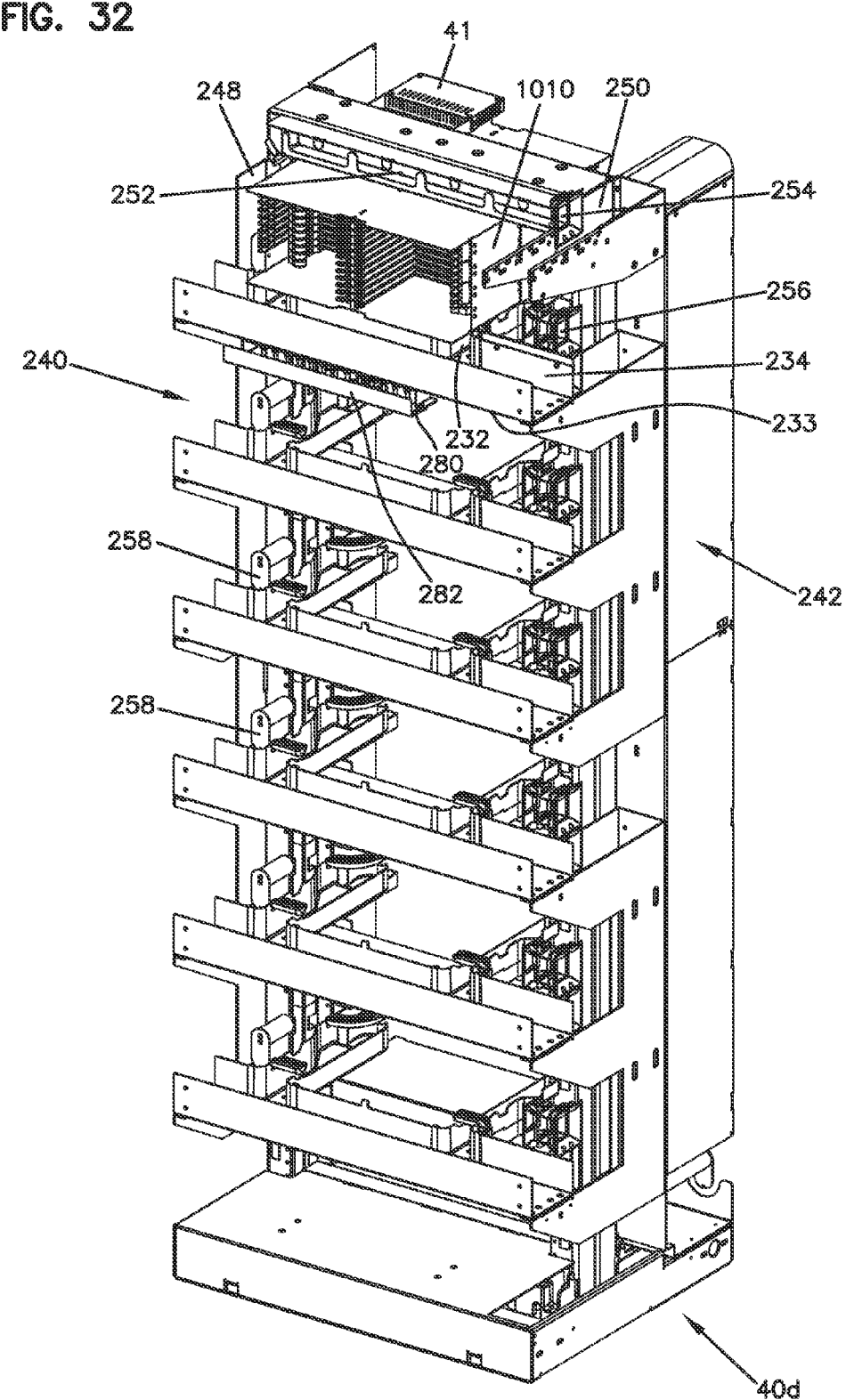
FIG. 32 is a rear, top, left perspective view of a rack similar to one of the racks of FIGS. 23-31 shown with a bus-bar mounted thereon for grounding an armored cable.
Figure 33:
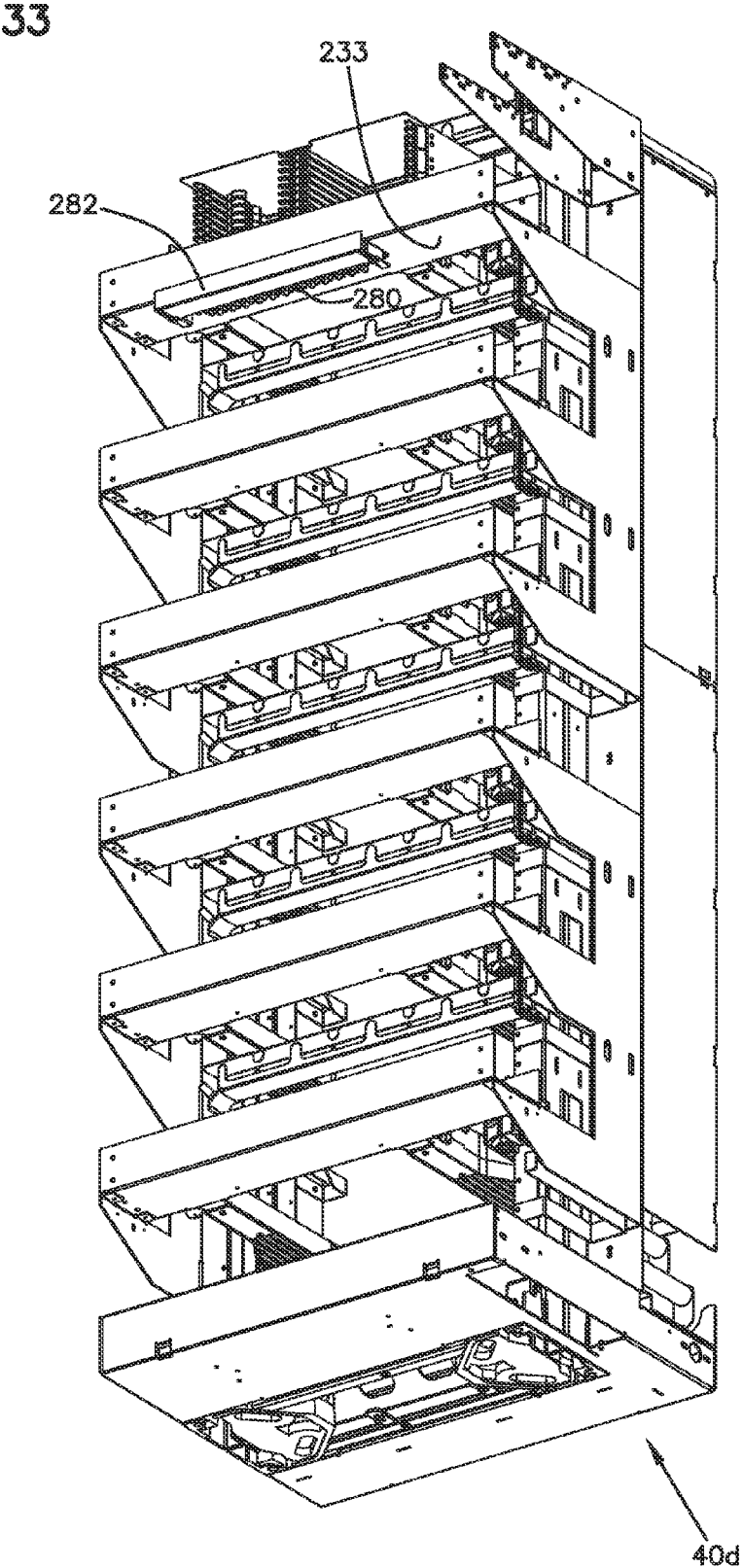
FIG. 33 is a rear, bottom, left perspective view of the rack of FIG. 32.
Figure 34:
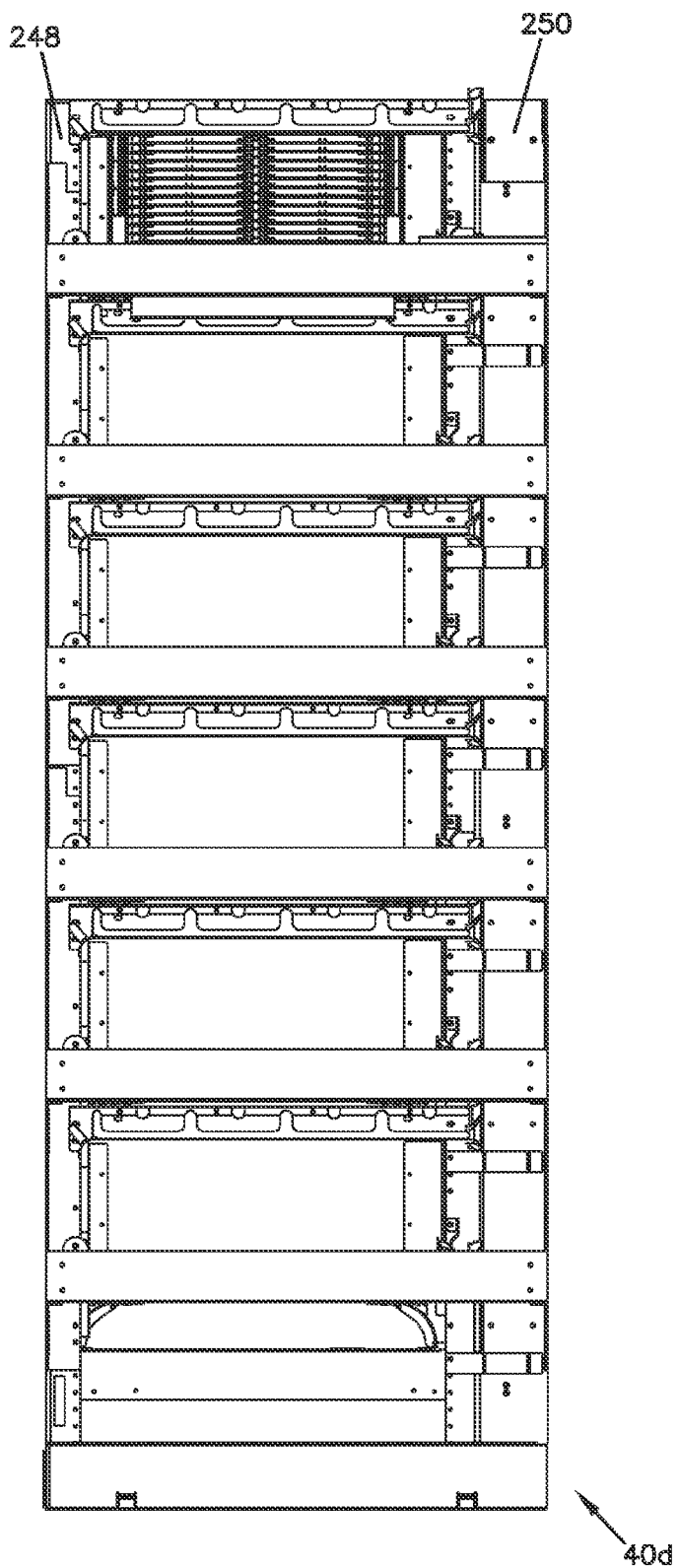
FIG. 34 is a rear view of the rack of FIG. 32.
Figure 35:
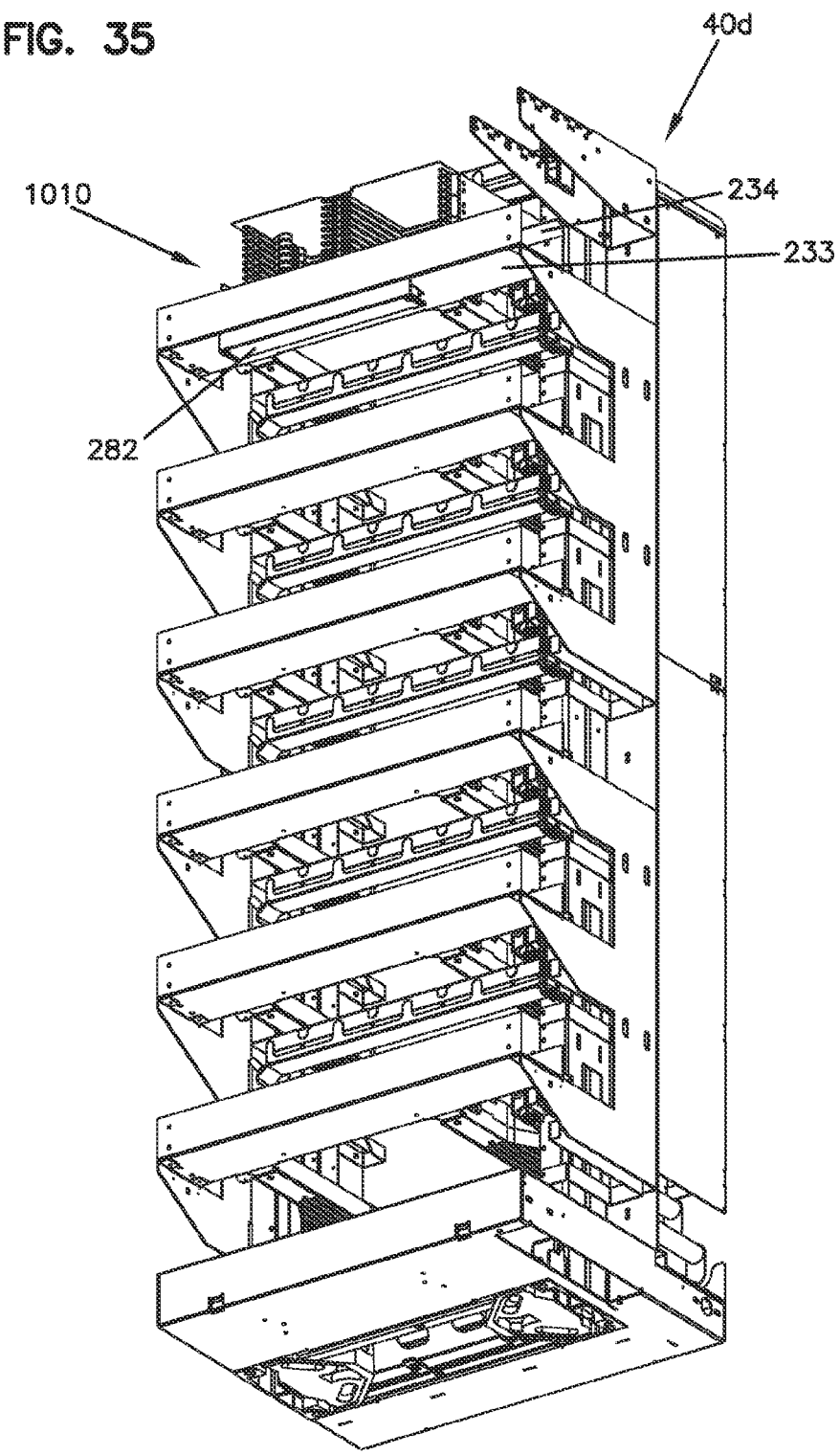
FIG. 35 illustrates the rack of FIG. 33 with the bus-bar removed from the bus-bar support of the rack.
Figure 36:
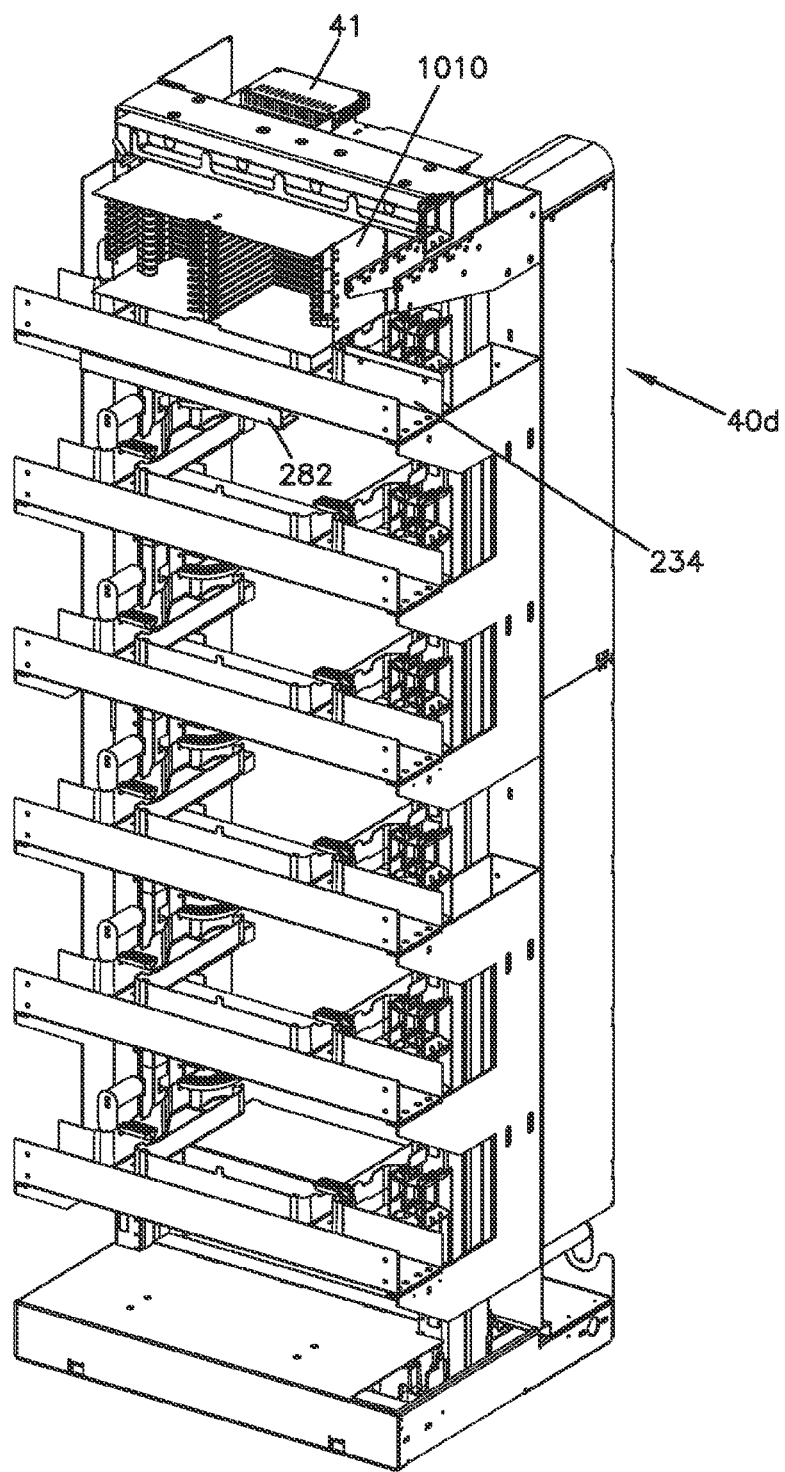
FIG. 36 illustrates a rear, top, left perspective view of the rack of FIG. 35.
Figure 37:
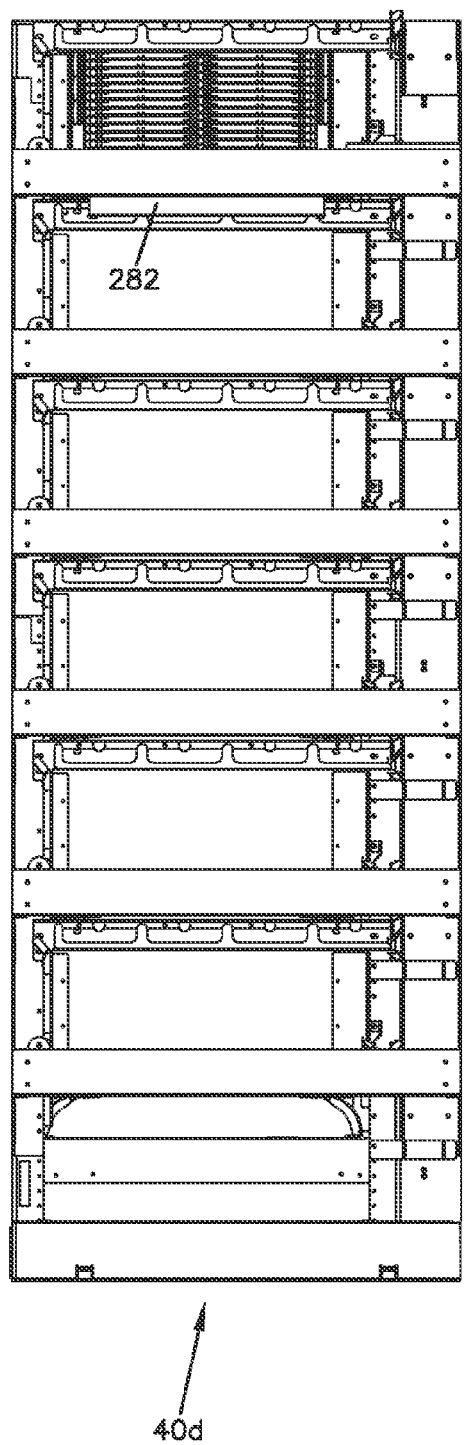
FIG. 37 illustrates a rear view of the rack of FIG. 35.
Figure 38:
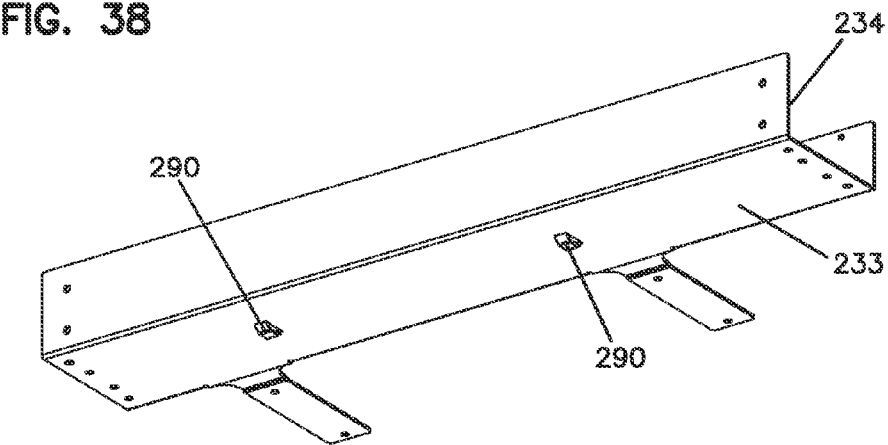
FIG. 38 is a perspective view of one of the rear horizontal troughs of the rack of FIGS. 32-37 shown in isolation, the horizontal trough configured for mounting the bus-bar support of the rack.
Figure 39:
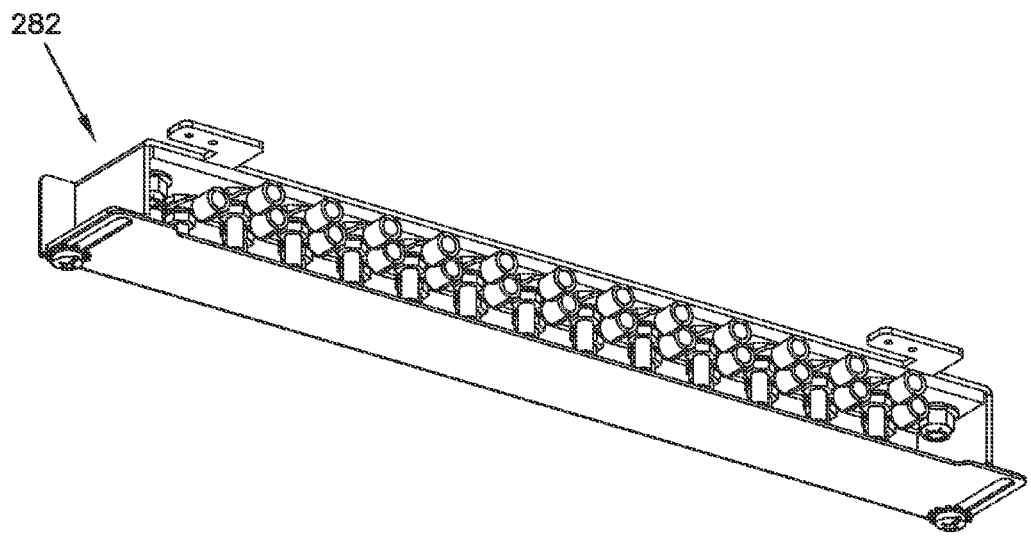
FIG. 39 is a front perspective view of the bus-bar support and the bus-bar located therein for mounting to the rack of FIGS. 32-37.
Figure 40:
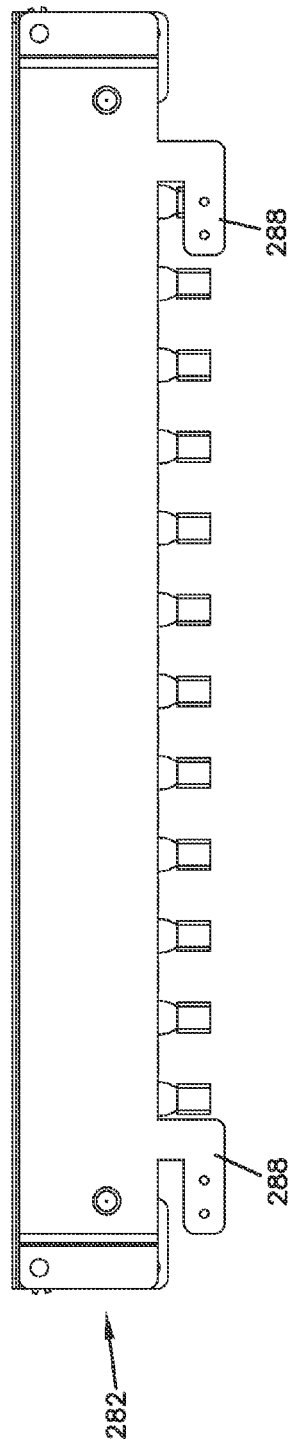
FIG. 40 is a top view of the bus-bar support and the bus-bar of FIG. 39.
Figure 41:
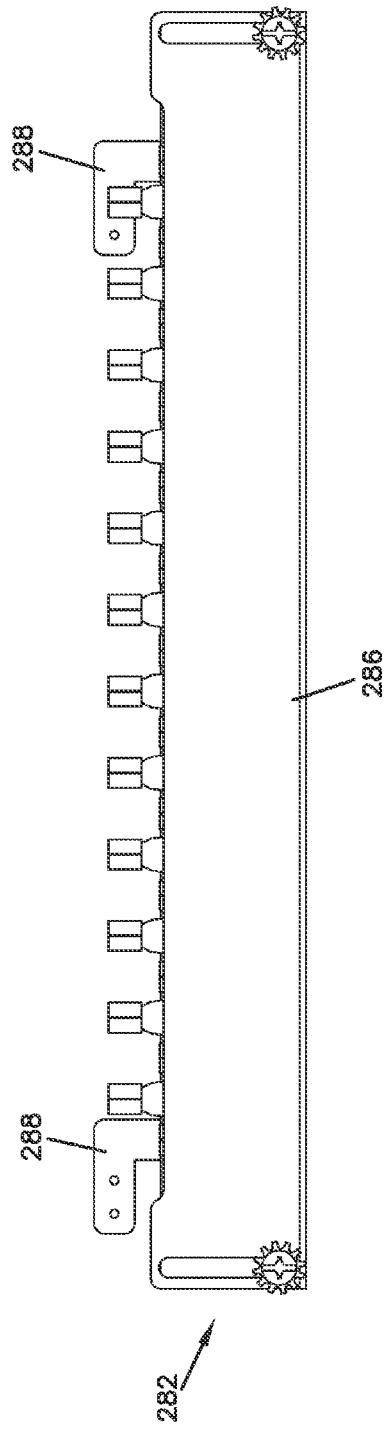
FIG. 41 is a bottom view of the bus-bar support and the bus-bar of FIG. 39.
Figure 44:
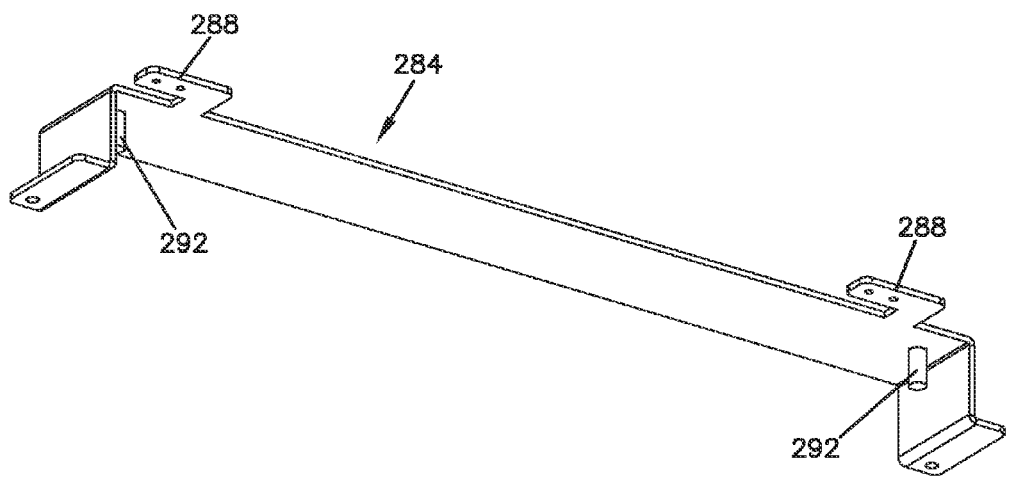
FIG. 44 is a perspective view of a top cover of the bus-bar support of the rack of FIGS. 32-37.
Figure 45:
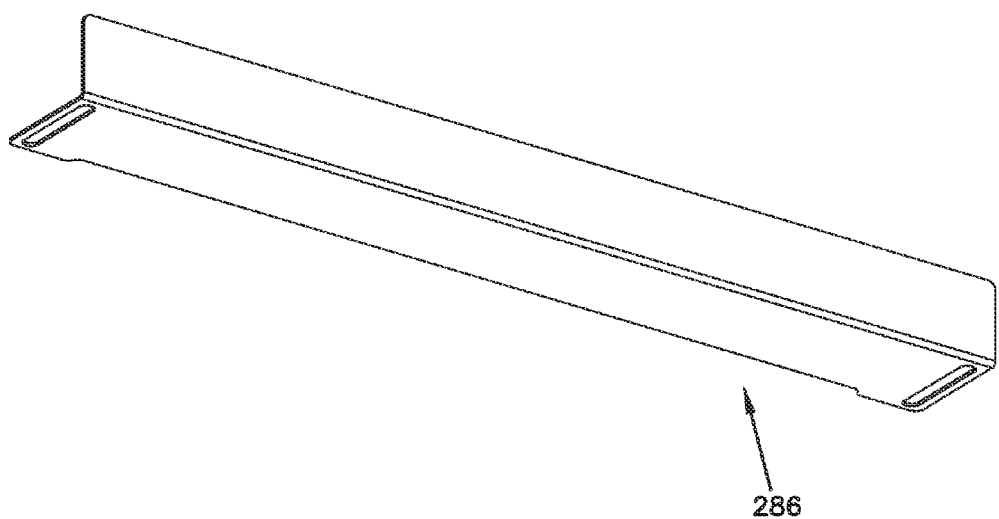
FIG. 45 is a perspective view of a bottom cover of the bus-bar support of the rack of FIGS. 32-37.

In the third version of the rack 40*c* shown in FIGS. 29-31, the rack 40*c* may include a plurality of clips 270 that are configured to be mounted to cross frame members 272 that extend between the right vertical frame member 264 of the rack 40*c* and the left vertical frame member 274. According to one embodiment, the clips 270 may be adhesively attached. The cables 222 that are contained by the clips 270 can breakout at the desired locations.

In such a version of the rack 40*c*, the rack 40*c* does not have to be previously modified (e.g., requiring mounting holes on the vertical frame members 264/274, etc.) and, thus, the routing of the cabling 222 from the controller 41 to the individual chassis 1010 may be characterized as a retrofit arrangement.

Referring now to FIGS. 32-37, there is shown an embodiment of a rack 40*d* similar to those of FIGS. 23-31 that includes a bus-bar 280 mounted thereon for grounding an armored cable. The cabling coming into a rack 40 from a central office (e.g., an IFC cable) for further distribution might include armored cabling having grounded shielding surrounding the cable bundle. Each of the cables of the bundle may be grounded using the bus-bar 280 mounted on the rack 40*d*.

According to one example mounting arrangement, the bus-bar 280 may be housed in a bus-bar support 282 that is mounted to the bottom 233 of the uppermost rear horizontal trough 234.

The bus-bar support 282 is shown in FIG. 39-45. It should be noted that the bus-bar support 282 that is depicted in the application is simply one example structure that may be used. Other support structures or enclosures may be used. In the depicted example, the bus-bar support 282 defines a top cover 284 and a bottom cover 286 that is fastened to the top cover 284. The top cover 284 may define mounting flanges 288 that are slidably inserted into receptacles 290 defined at the bottom 233 of the uppermost rear horizontal trough 234. The uppermost rear horizontal trough 234 is shown in isolation, removed from the rack 40*d*, in FIG. 38. The top cover 284 of the bus-bar support 282 defines projections 292 which receive a main plate 294 of the bus-bar 280 and the bottom cover 286 captures the bus-bar 280 with respect to the top plate 284.

Figure 46:
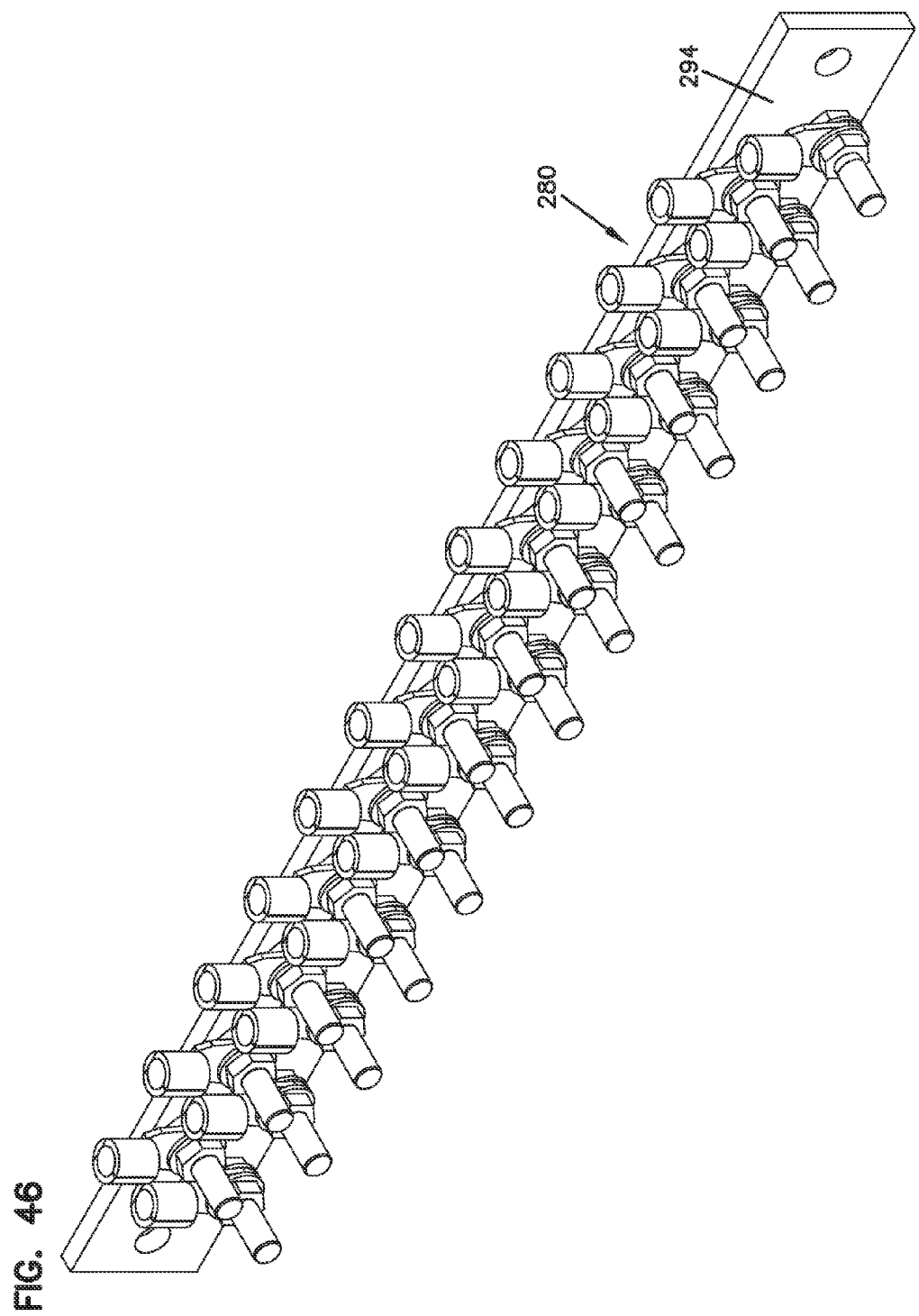
FIG. 46 is a bottom, front perspective view of the bus-bar of the rack of FIGS. 32-37.
Figure 47:
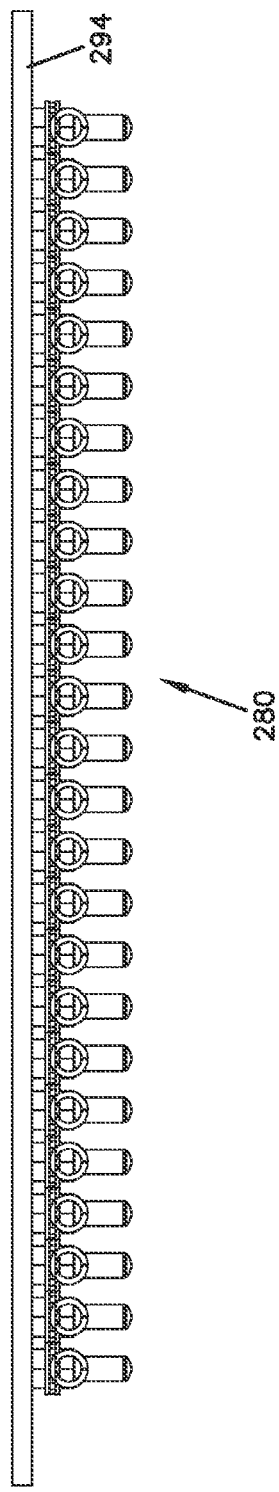
FIG. 47 is a front view of the bus-bar of FIG. 46.
Figure 48:
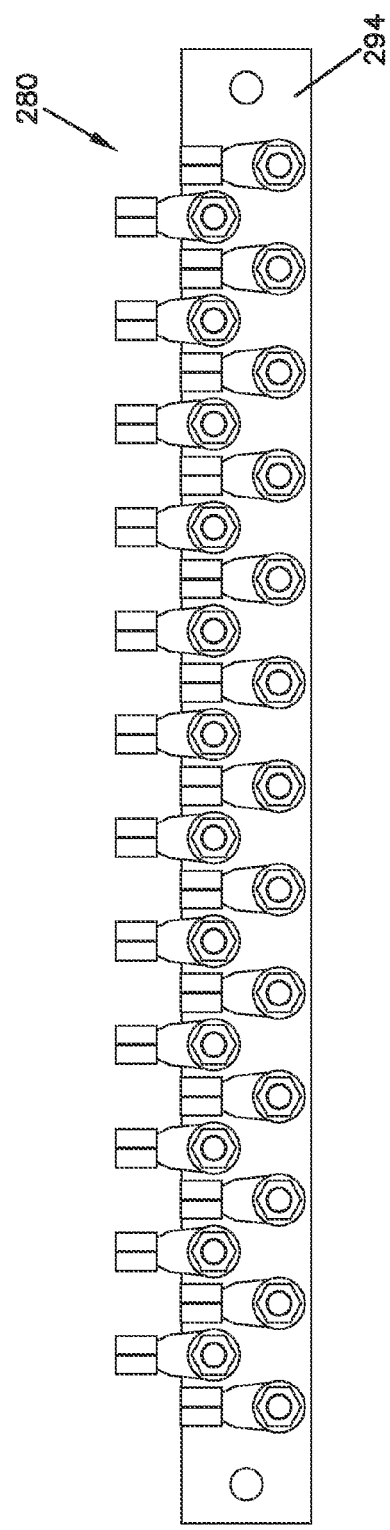
FIG. 48 is a bottom view of the bus-bar of FIG. 46.

The bus-bar 280 is shown in isolation in FIGS. 46-48. Even though the bus-bar 280 is described and shown as being mounted to the uppermost rear horizontal trough 234, other locations are also possible for the mounting of the bus-bar 280 in the rack 40*d*.

According to another aspect of the racks 40 discussed in the present application, the racks 40 may include a light source. The light source may provide visual assistance to a technician in locating a rack 40 in an environment where light may be limited. The light source may be provided in various forms and may be positioned at various locations on the rack 40 for illuminating the rack 40 and the connection locations 114 thereof.

Referring now to FIGS. 49-61, one of the 4-rack-unit (4RU) panels 1010 that have been shown mounted on the racks 40 of FIGS. 23-37 is illustrated in further detail. Except for the differences that will be discussed in detail, the 4RU versions of the panels 1010 are similar in configuration and functionality to the 1 RU versions and are designed to slidably receive the same fiber optic connection devices as the 1RU panels 10. For example, as shown in FIGS. 49-61, the 4RU panels 1010 may be sized to fit twenty-four trays 12 (i.e., twelve first trays 12*a* in a stacked arrangement on the right side of the chassis 1010 and twelve second trays 12*b* in a stacked arrangement on the left side of the chassis 1010). Within those trays 12, whereas the 1RU panels 10 (shown in FIGS. 1-32) may house 144 mated LC connector pairs, 72 SC connector pairs or 48 MPO connector pairs, the 4RU versions 1010 may house four times the number of connections as the 1RU units with the same functionality. As will be discussed in further detail below, the trays 12 mounted within the 4RU panels 1010 form parts of tray assemblies 1024 similar to those tray assemblies 24 of 1RU panels 10.

As discussed above, the connection locations within the trays 12 within the 4RU panels 1010 may be managed similar to the connection locations within the 1RU panels 10. As will be discussed in further detail below, for managed 4RU panels, similar to 1RU panels, a connection between a central PCB 1028 within the panel 1010 and a main PCB or controller 1036 of the panel 1010 may be established via ribbon cables that run within the panel 1010. Similar to the 1RU versions of the panels 10, in a 4RU panel 1010, the main controller 1036 may use a card-edge-style connection 1066 at its opposite rear end to connect to the ribbon cable(s), allowing the main controller 1036 to be a field-replaceable device. As shown in FIGS. 23-31, the main controller 1036 of the 4RU panel 1010, similar to the 1RU version, is configured to communicate to a higher-level managed connectivity rack or frame 40 via a connection 1077 (e.g., an RJ connection) on the side of the panel 1010. The main controller 1036 of the panel 1010 may be powered via another connection 1079 on the side of the panel 1010.

Further aspects of the 4RU panel 1010 will now be described below with reference to FIGS. 49-61.

Figure 49:
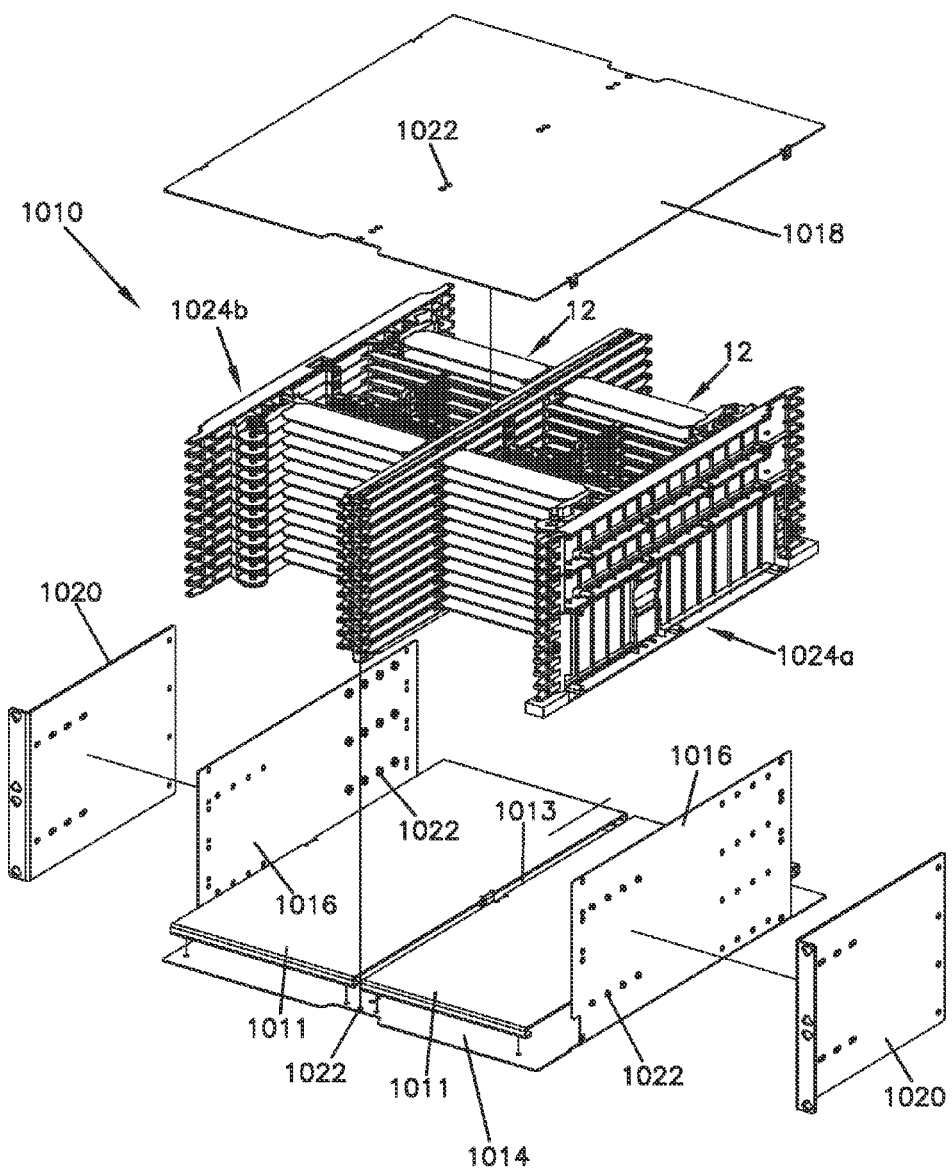
FIG. 49 is a front, right, top partially exploded perspective view of one of the 4RU high-density fiber distribution chassis shown removed from the racks of FIGS. 23-37.

Referring to FIGS. 49-61, the high-density fiber distribution chassis or panel 1010 is shown in various views. In FIG. 49, the chassis 1010 is shown in an exploded view with a plurality of slidable fiber optic connection trays or blades 12 mounted thereon. The chassis 1010 defines a bottom plate 1014 with upwardly extending sidewalls 1016, a top chassis cover 1018, and a pair of mounting brackets 1020 that are configured to be fastened to the sidewalls 1016. The mounting brackets 1020 are used for mounting the chassis 1010 to other fixtures such as telecommunications racks or frames. The bottom plate 1014, including the upwardly extending sidewalls 1016, and the top cover 1018 define fastener openings 1022 for mounting tray assemblies 1024 within the chassis 1010. The mounting brackets 1020 of the chassis 1010 are also fastened to the fastener openings 1022 on the sidewalls 1016 of the chassis 1010. A pair of spacer plates 1011 are mounted to the bottom plate 1014 of the chassis 1010. The spacer plates 1011 are positioned underneath the stacked trays 12. The spacer plates cooperatively define a notch 1013 extending from the front to the back of the chassis 1010 for accommodating the central PCB 1028 and mounting plates 1038 that are attached at each side of the central PCB 1028, which extend further down than the trays 12.

In the depicted embodiment, the chassis 1010 is configured as a standard 4RU (4-rack-unit) piece. The chassis 1010 is configured to house four times as many trays 12 as the 1RU chassis 10 described previously.

Still referring to FIGS. 49-61, as noted above, each chassis 1010 is configured to house tray assemblies 1024. In the depicted embodiment, similar to the 1RU chassis 10, the tray assemblies 1024 may be defined by a first tray assembly 1024*a* that is located on the right side of the chassis 1010 and a second tray assembly 1024b that is located on the left side of the chassis 1010. Each of the tray assemblies 1024 may include a plurality of slidable trays 12 mounted in a stacked arrangement. For example, the first tray assembly 1024a, as shown, may include twelve first trays 12a to be mounted in a stacked arrangement and the second tray assembly 1024b may include twelve second trays 12b to be mounted in a stacked arrangement, wherein the chassis 1010 can house twenty-four total slidable trays 12 in the depicted version.

The first and second tray assemblies 1024a, 1024b are generally similar in configuration and for ease of description, only the first tray assembly 1024a will be described in detail, with the understanding that the features of the first tray assembly 1024a are fully applicable to the second tray assembly 1024b except for the noted differences. In addition, in a number of the drawings (e.g., FIGS. 53-54), only one representative first tray 12a has been shown for ease of illustration. Thus, in the present disclosure, only one of the first trays 12a will be shown and described in detail, with the understanding that the features of that first tray 12a are fully applicable to other first trays 12a that might be mounted in a stacked arrangement therewith or to other second trays 12b that might be mounted on the left side of the chassis 1010.

Figure 50:
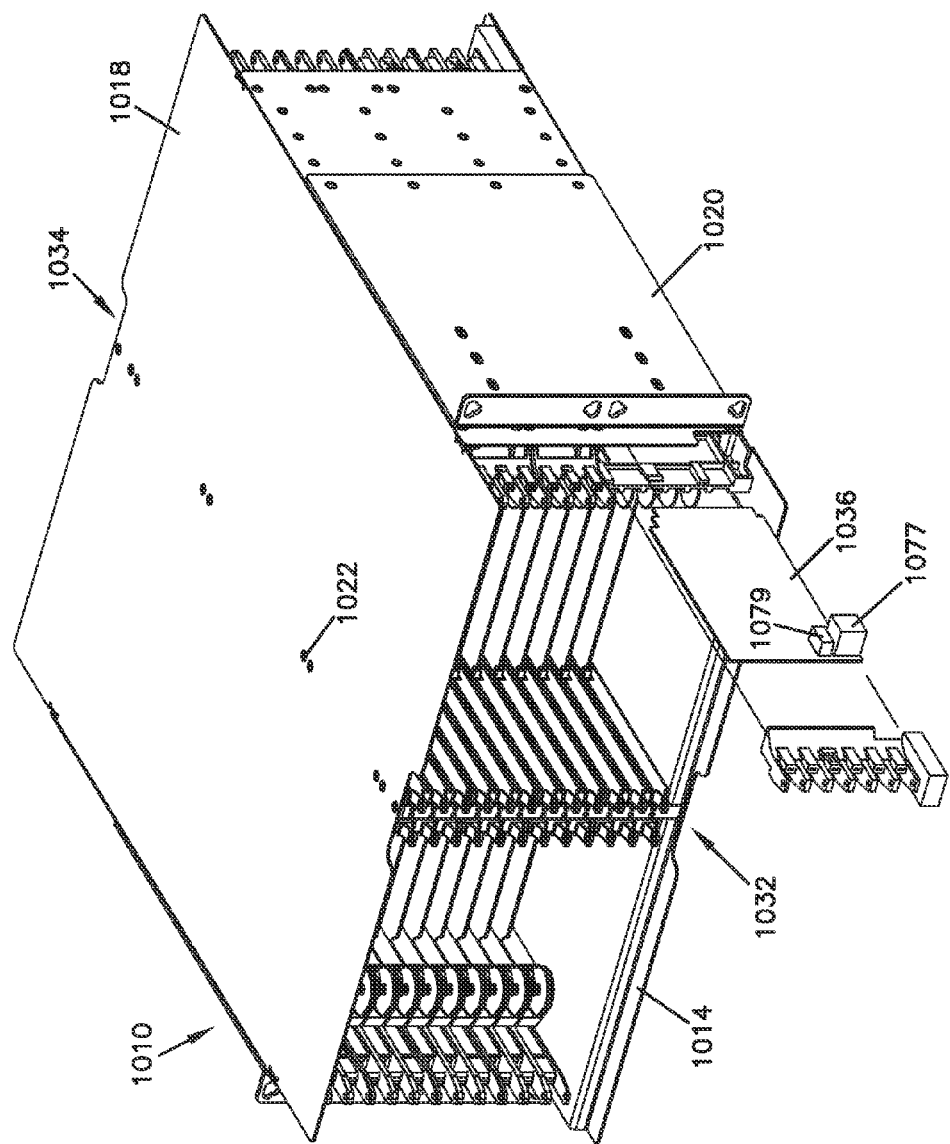
FIG. 50 illustrates the high-density fiber distribution chassis of FIG. 49 in a partially assembled configuration, shown with a main or master controller circuit board of the chassis being slidably mounted thereon.
Figure 51:
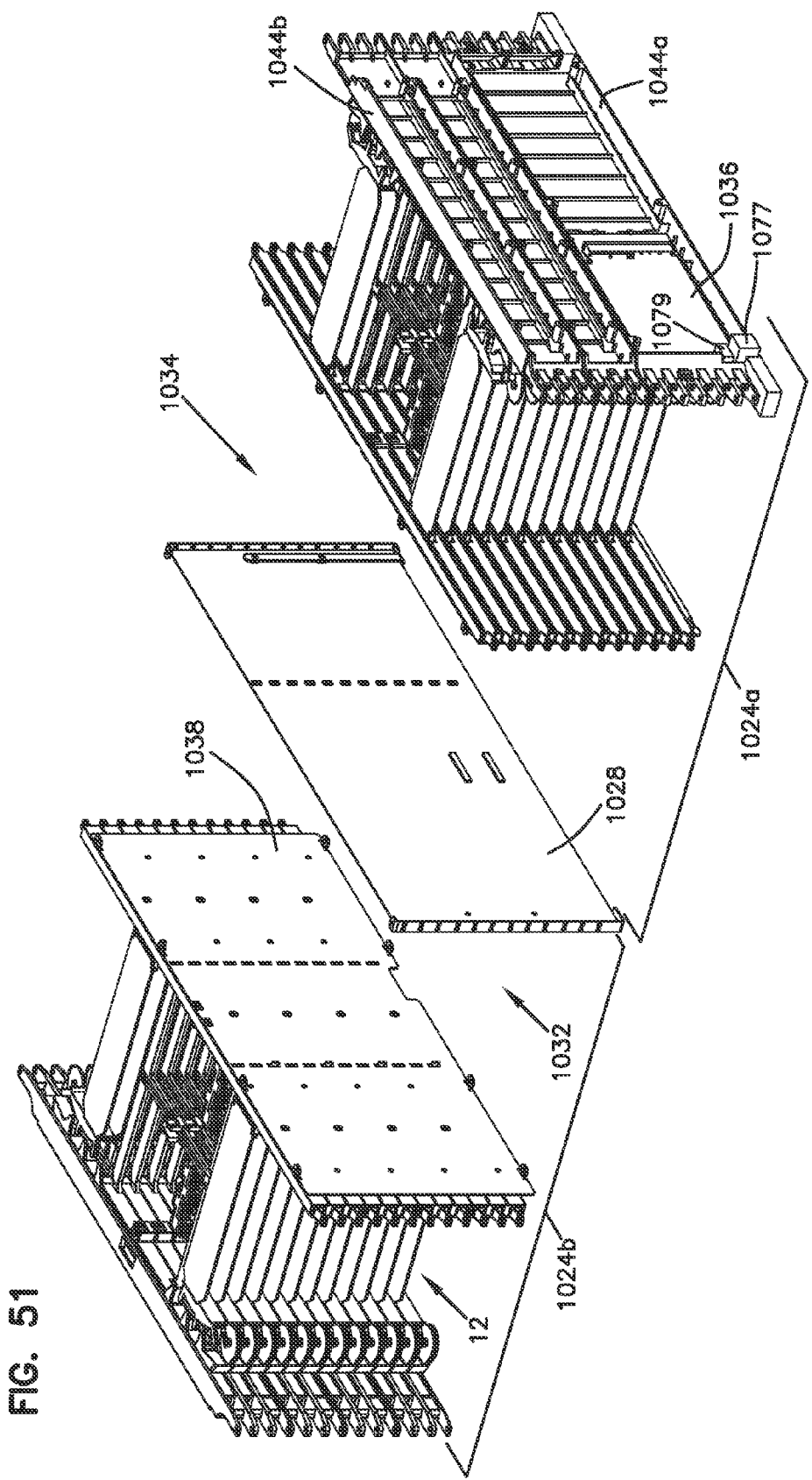
FIG. 51 illustrates the first and second tray assemblies of the chassis of FIG. 49 in a partially exploded configuration, the tray assemblies shown outside of the chassis.
Figure 52:
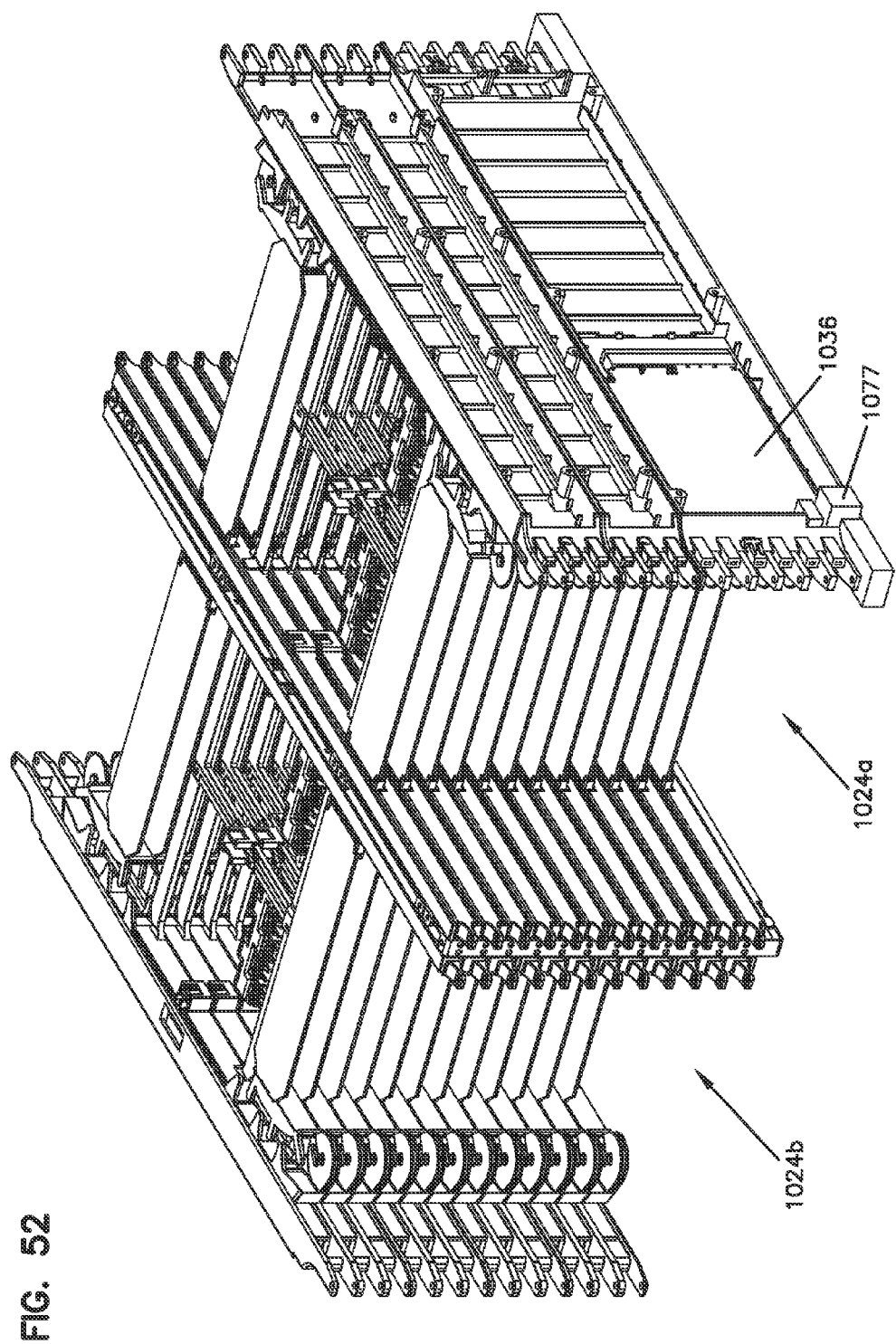
FIG. 52 illustrates the first and second tray assemblies of FIG. 51 in an assembled configuration outside of the chassis.

Referring specifically now to FIGS. 51 and 52, the first and second tray assemblies 1024a, 1024b are shown outside of the chassis 1010 of FIGS. 49 and 50. In FIG. 51 specifically, the first and second tray assemblies 1024a, 1024b are shown in an exploded configuration where they have been separated from each other. As discussed previously and as will be discussed in further detail below, the two tray assemblies 1024, when mounted together, capture a central PCB 1028 therebetween. The central PCB 1028 may include indicators in the form of LEDs 1030 on both the front 1032 and the back 1034 of the chassis 1010 to communicate to a technician which tray 12 should be accessed. Similar to the 1RU panel 10, all of the trays 12 of both the first tray assembly 1024a and the second tray assembly 1024b electrically connect to the central PCB 1028. And, the central PCB 1028 is electrically connected to a main PCB or controller 1036 of the chassis 1010, wherein the main PCB 1036 of the chassis 1010 is configured to communicate to a higher-level managed connectivity rack or frame 40.

Referring now to FIGS. 51-54, the different parts of the first tray assembly 1024a are illustrated. The first tray assembly 1024a includes the central PCB 1028, a mounting plate 1038, four of the mounting blocks 42 from the 1RU chassis 10 (only one shown), a first tray 12a, a first end support 1044a, a second end support 1044b that is stacked on top of the first end support 1044a, and the main PCB 1036 to be mounted to the first end support 1044a. As noted above, similar to the 1RU panel 10, a flexible circuit in the form of the ribbon cable 46 provides an electrical connection between the central PCB 1028 and the PCB 48 located on the tray 12. And, a pair of ribbon cables 1050a and 1050b provide a connection between the central PCB 1028 and the main PCB or controller 1036 of the chassis 1010. The ribbon cables 1050a and 1050b are configured to run underneath the trays 12, along the top of one of the spacer plates 1011 of the chassis 1010. Via the central PCB 1028, the ribbon cables 1050a and 1050b can connect both the first and second tray assemblies 1024a, 1024b to the main PCB 1036. The central PCB 1028 includes a first connection point 1029a for the ribbon cable 1050a and a second connection point 1029b for the ribbon cable 1050b.

The mounting plate 1038 of the first tray assembly 1024a, which along with a mounting plate 1038 of the second tray assembly 1024b, is configured for capturing the central PCB 1028 and mounting the central PCB 1028 and the mounting blocks 42 of the tray assemblies 1024 to the chassis 1010. The mounting plate 1038 defines tabs 1052 with fastener openings 1054 that are aligned with fastener openings 1056 of the central PCB 1028 for mounting the central PCB 1028 to the bottom plate 1014 and to the top cover 1018 of the chassis 1010. The mounting plate 1038 also includes fastener openings 1058 on a sidewall thereof for fastening the mounting blocks 42 (four in a stacked arrangement on each mounting plate 1038) thereto and to the chassis 1010.

Each tray 12 is configured to be slidable between the mounting blocks 42 and the end supports 1044a, 1044b of the tray assembly 1024. For the first tray assembly 1024a, for example, the end supports 1044a, 1044b define fastener openings 1060 for mounting to the right sidewall 1016 of the chassis 1010. The first end support 1044a defines a channel 1062 for housing the main PCB 1036. As shown in FIG. 50, the main PCB 1036 may be slidably loaded into the channel 1062 of the first end support 1044a. The main PCB 1036 is accessible to a technician by removing a front end cap 1064 of the first end support 1044a. The main controller 1036 may use a card-edge-style connection at its opposite rear end to connect to the ribbon cables 1050a, 1050b. The card-edge-style connection allows the main controller 1036 to be a field-replaceable device. A rear end cap 1068 is also positioned at the rear end of the first end support 1044a. As in the 1RU panel 10, since both tray assemblies 1024 are being connected through the central PCB 1028, only the first end support 1044a of the first tray assembly 1024a defines a channel 1062 for supporting the main controller 1036. In the depicted embodiment, the end supports 1044a, 1044b of the second tray assembly 1024b are not shown as housing a main controller or PCB 1036. This configuration may be modified depending upon the orientation of the chassis 1010 within a given rack 40.

As in the 1RU panel 10, the side mounting portion 74 of the tray 12 is configured for slidable coupling to the end supports 1044a and 1044b of the tray assembly 1024. The end supports 1044a, 1044b include longitudinally extending channels 1080 provided in a stacked arrangement. The channels 1080 of the end supports 1044a, 1044b are configured to receive the side mounting portion 74 of each tray 12. As in the 1RU panel 10, the side mounting portions 74 and the channels 1080 of the end supports 1044a, 1044b define matching dovetail configurations for providing slidable movement and preventing lateral separation.

The cable management portions of the trays are coupled to the end supports 1044a and 1044b in a similar manner to that shown and described for the 1RU panel 10.

Figure 56:
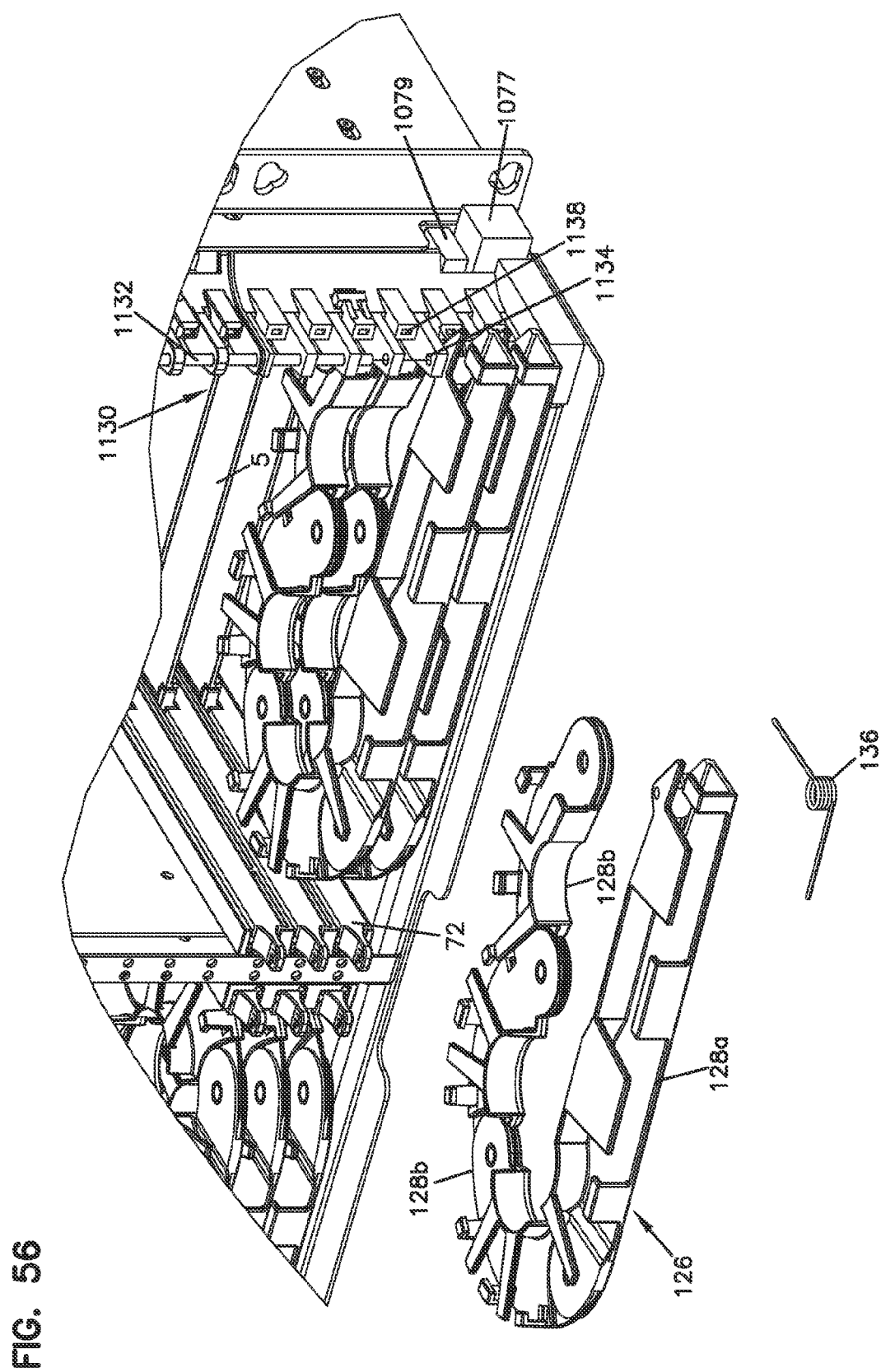
FIG. 56 is a partial exploded view showing the cable management portion of one of the first trays of the first tray assembly of FIG. 51.
Figure 57:
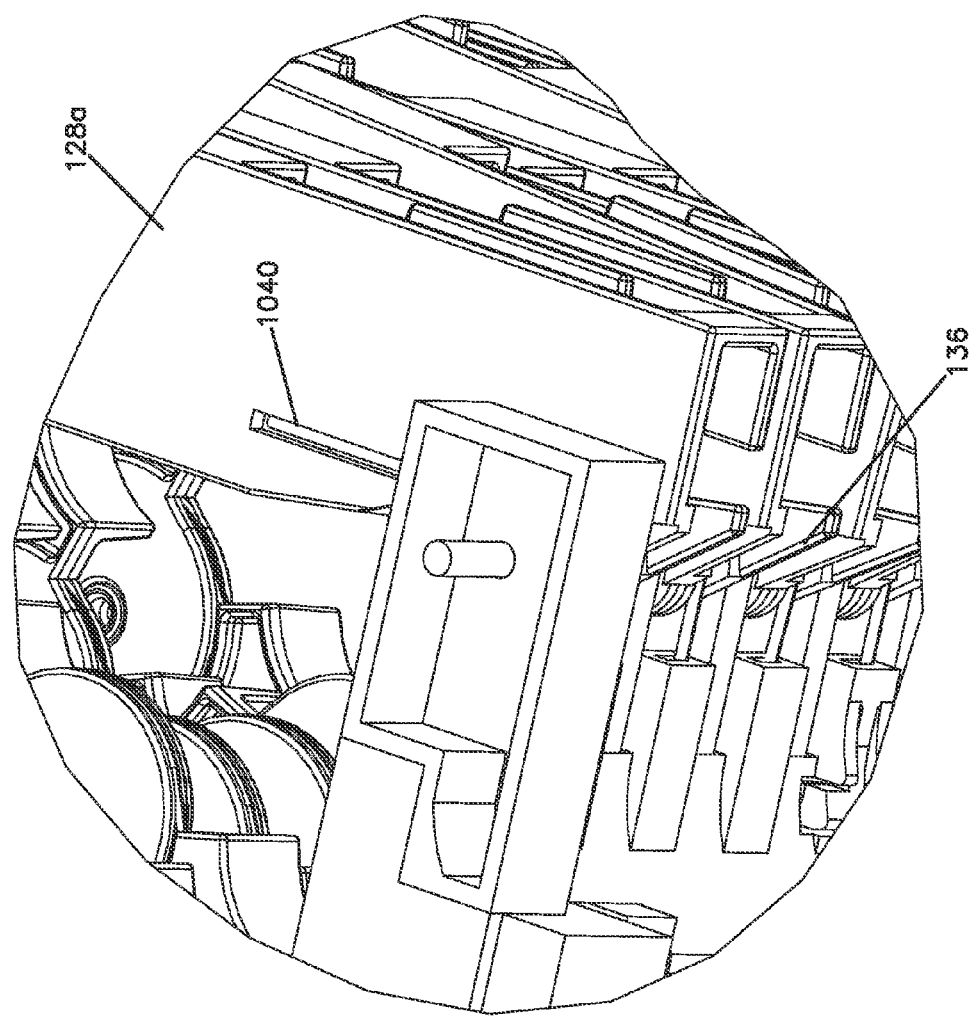
FIG. 57 is a close-up view showing the pivotal coupling of the link arm assembly of the first tray to a right end support of the tray assembly of FIG. 56.
Figure 58:
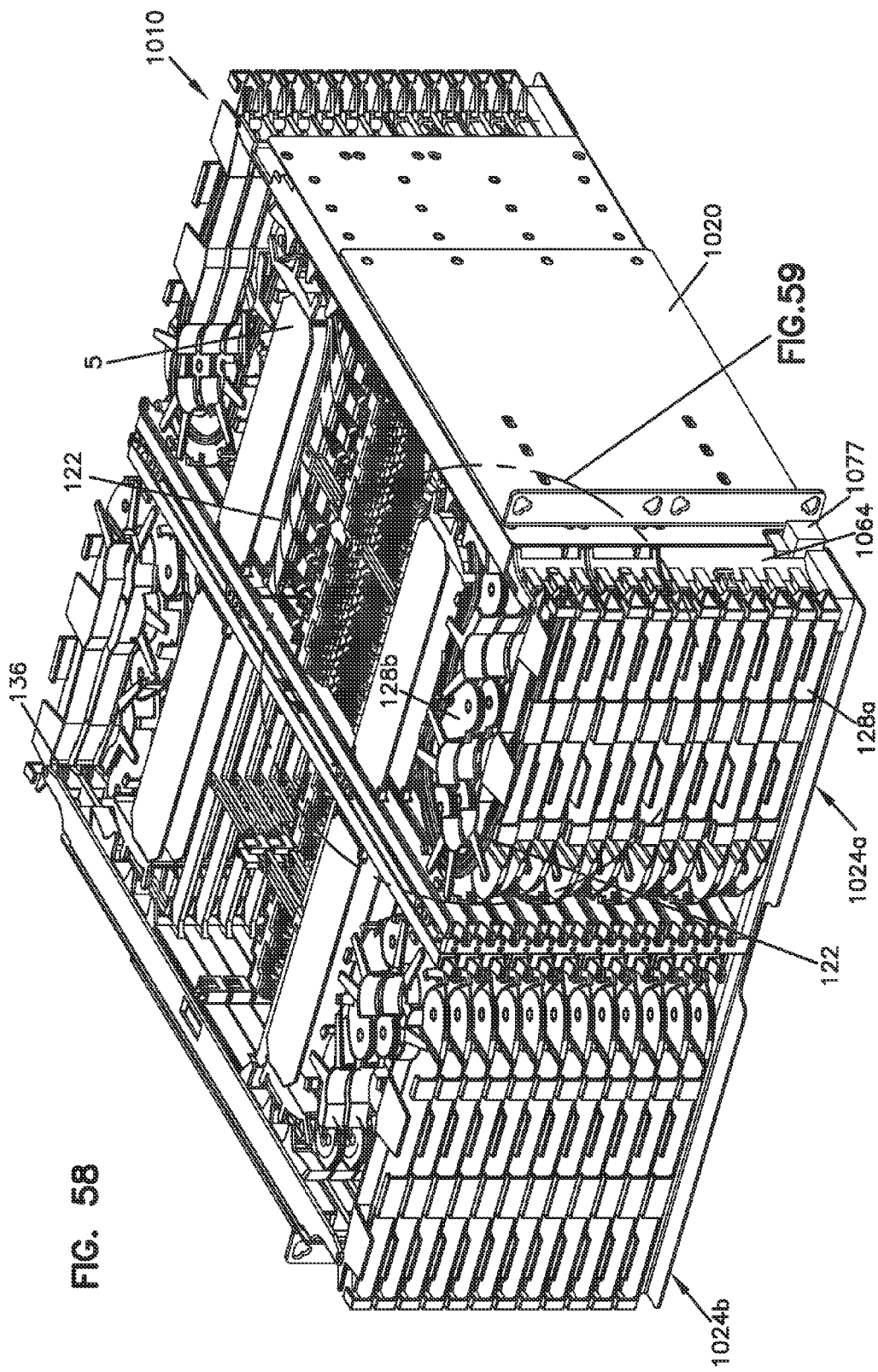
FIG. 58 is a top, right, front perspective view of the chassis of FIG. 49 without the top chassis cover mounted thereon to illustrate an example cable routing configuration for one of the first trays within the chassis.
Figure 59:
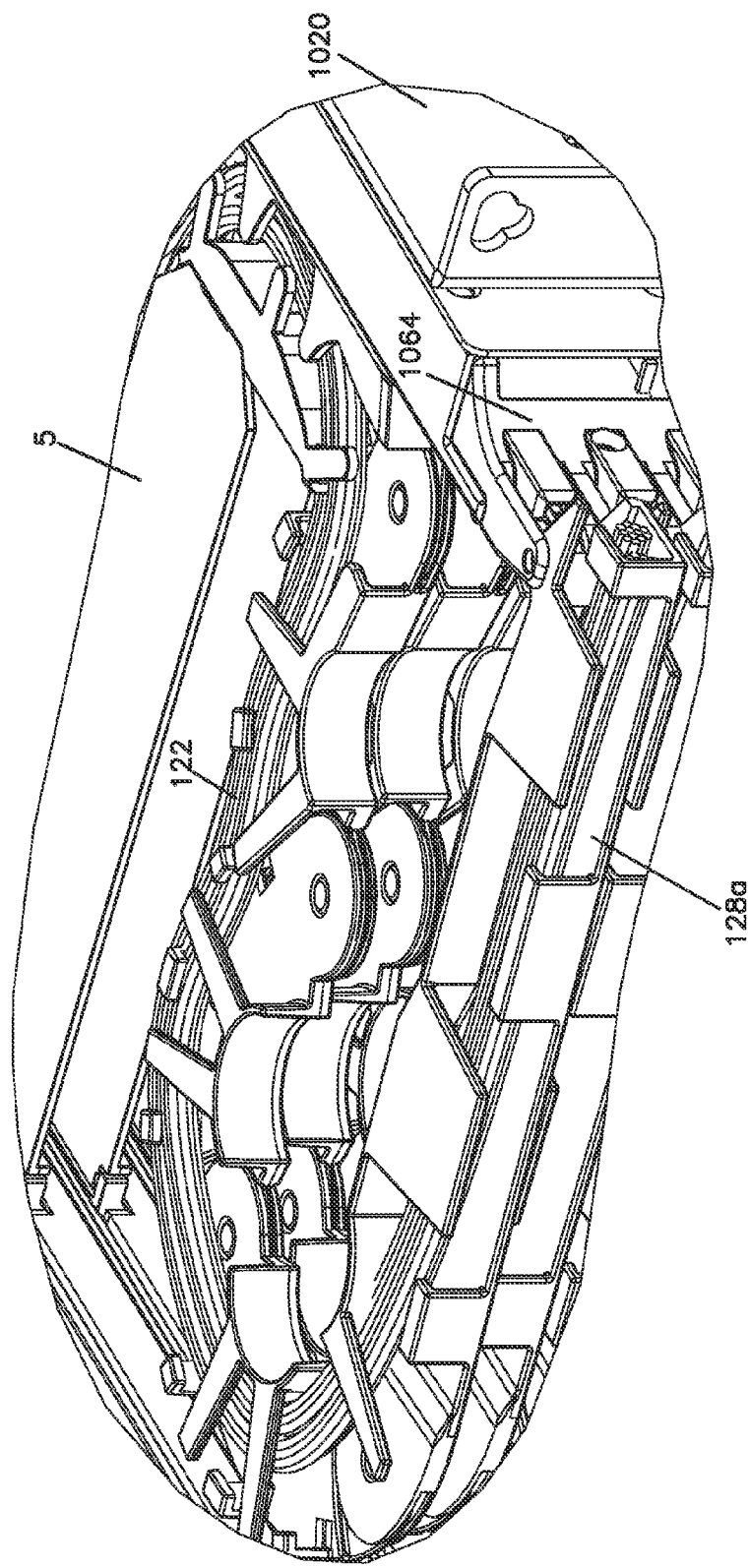
FIG. 59 is a close-up view of the cable management portion of the first tray of the first tray assembly of FIG. 58.
Figure 60:
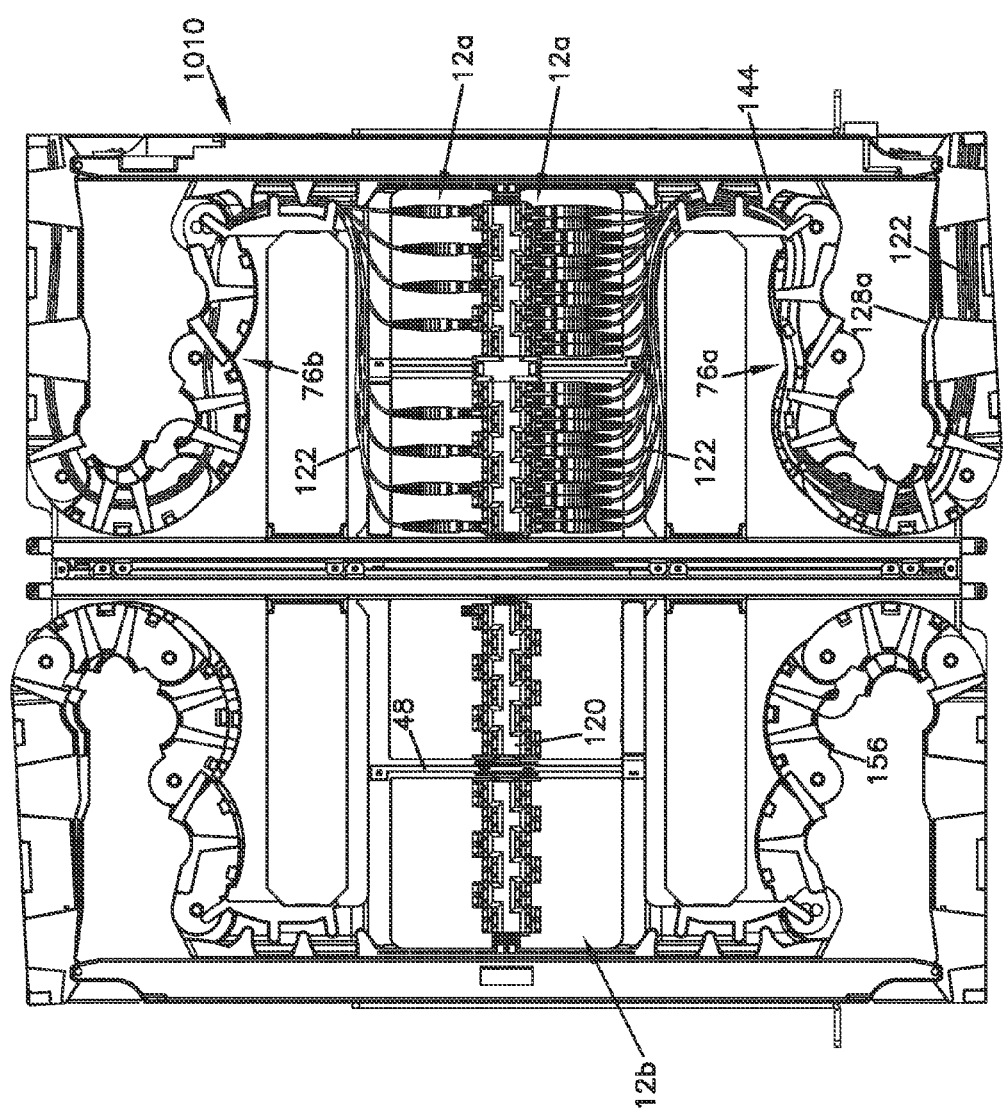
FIG. 60 is a top view of the chassis of FIG. 58 without the chassis cover thereon.

Referring now to FIGS. 56 and 57, the first link arm 128a is directly pivotally coupled to the front of the end supports 1044a, 1044b of the tray assembly 1024 via a hinge assembly 1130. The hinge assembly 1130 defines a hinge pin 1132 that is inserted through openings 1134 on both the end supports 1044a, 1044b and the first link arm 128a for the pivotal coupling. As shown in FIGS. 56 and 57, the hinge assembly 1130 also includes the torsion spring 136, one end of which is inserted into a longitudinal pocket 1138 at the fronts of the end supports 1044a, 1044b and a second (perpendicular) end which is inserted into the pocket 140 provided on the first link arm 128a. As in the 1RU chassis 10 described above, the torsion spring 136 is configured to bias the link arm assembly 126 into its original closed position wherein the torsion spring 136 pulls the cable management link arms 128 back into the panel 1010 as the tray 12 is pushed back into place by the technician, whether the tray 12 is being pulled forwardly or rearwardly. A similar torsion spring is also provided on the rear cable management portion 76b of the tray 12 assisting the torsion spring 136 of the front cable management portion 76a in biasing the tray 12 back into a closed position.

Example cable routing configurations have been shown in FIGS. 58-61 for the 4RU chassis. The cables 122 lead from both the front and rear connection locations 114 through the radius limiters 124 and through each of the three similar link arms 128b and finally through the first link arm 128a before being directed out of the chassis 1010. As noted previously, the front link arm assembly 126a and the rear link arm assembly 126b are configured to move simultaneously together to manage the cable slack as the trays 12 are pulled out from either direction.

As described above with respect to the 1RU chassis 10, portions of the tray 12 and the chassis 1010 may define conductive paths that are configured to connect media reading interfaces of adapters 118 mounted within the tray 12 with the main controller or PCB 1036 of the chassis 1010, which can further communicate with a controller of the rack 40 that is housing the chassis 1010.

The main controller 1036 of the chassis 1010 or the controller of the rack 40 may include or connect (e.g., over a network) to a processing unit that is configured to manage physical layer information obtained by the media reading interfaces.

Figure 53:
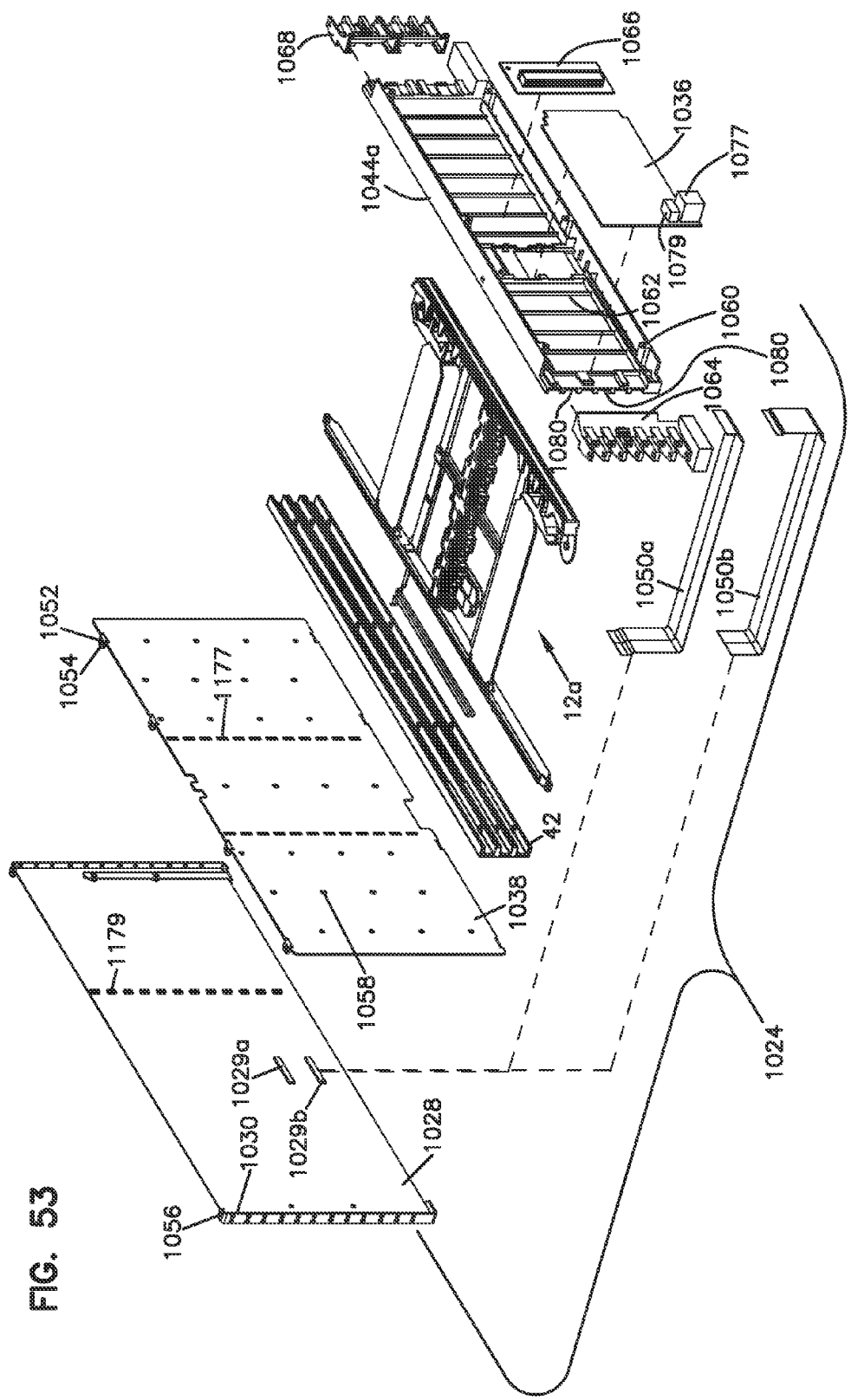
FIG. 53 illustrates the first tray assembly of FIG. 51 in an exploded configuration outside of the chassis.
Figure 54:
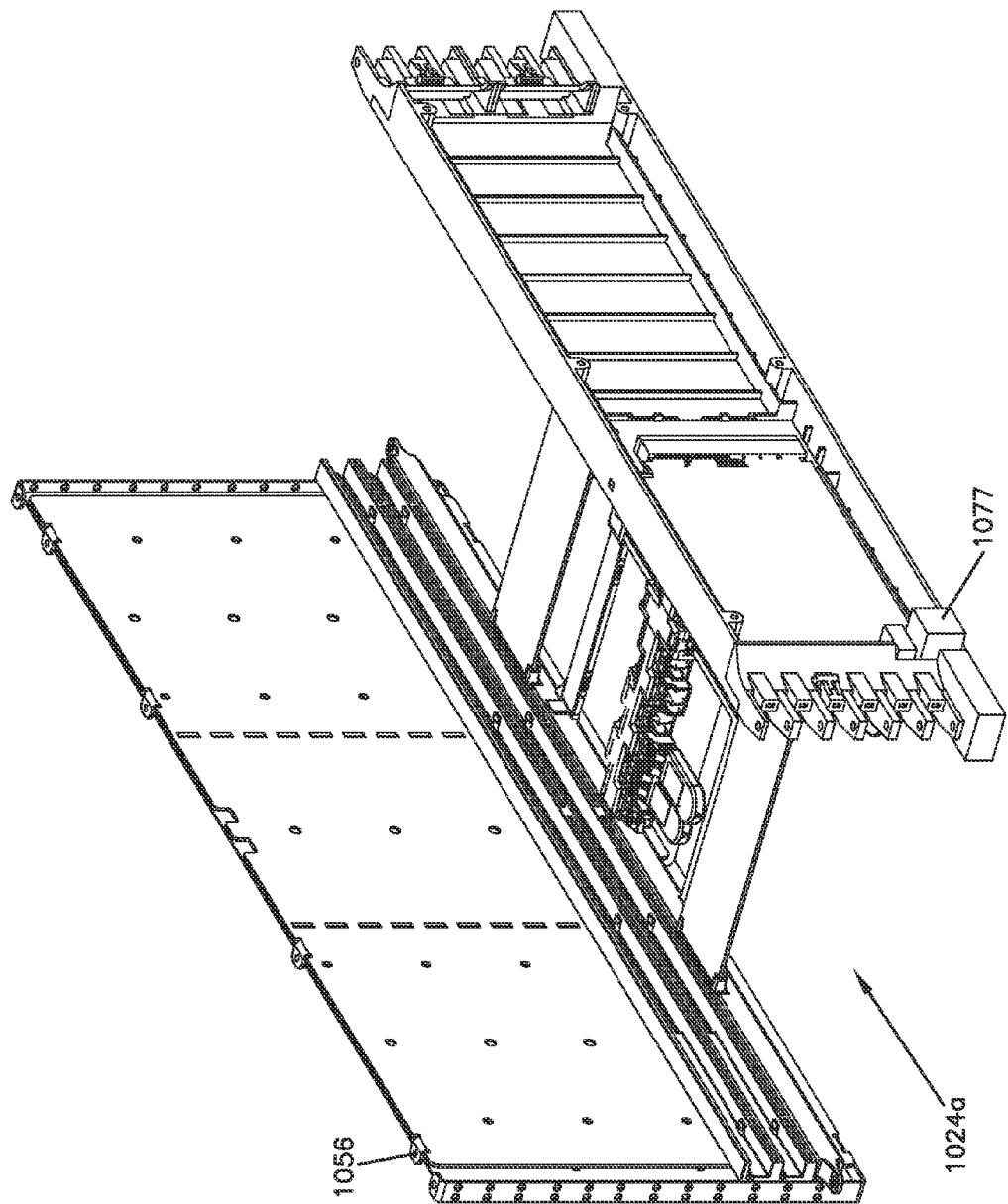
FIG. 54 illustrates the first tray assembly of FIG. 53 in an assembled configuration.
Figure 55:
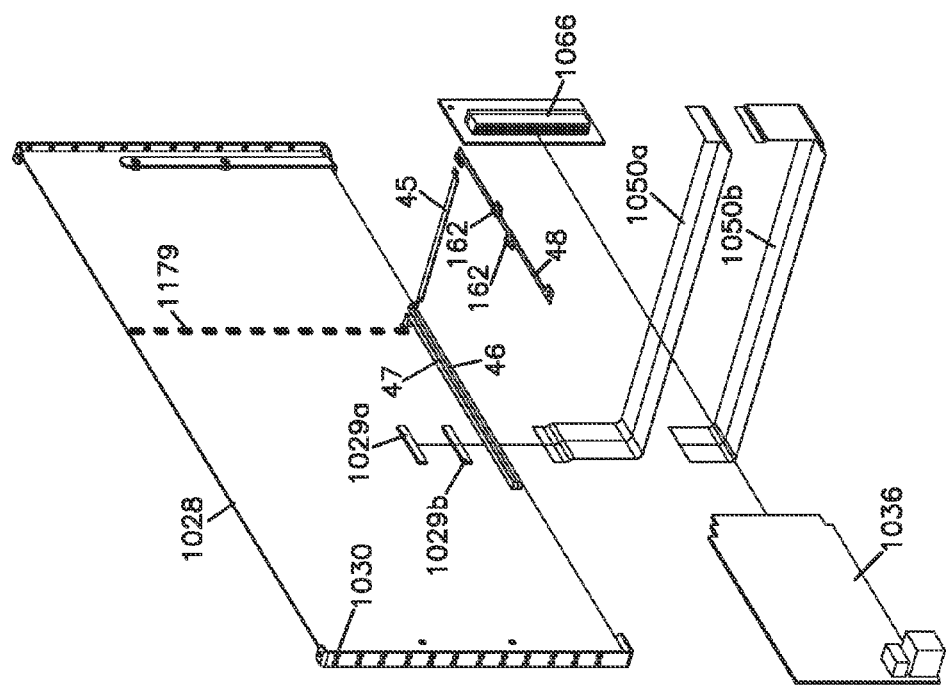
FIG. 55 illustrates the electrical communication pathways via circuit boards for the entire chassis of FIGS. 49-50.

Referring now to FIGS. 53-55, according to the depicted example embodiment, on each tray 12, once a technician attaches a 24-port adapter block assembly 120 using snap features on the tray 12, the adapter block assemblies 120 may plug into the network as discussed above. For such managed panels 1010, for example, the printed circuit boards of the adapter block assemblies 120 may connect to the tray 12 using the multi-pin connectors 162 on the tray 12 as shown in FIG. 55. The multi-pin connectors 162 on the tray 12 may be attached to a flexible circuit formed by the ribbon cable 46 that routes to the central PCB 1028 within the panel 1010. As shown, the conductive pathway from the multi-pin connectors 162 to the ribbon cable 46 is provided by the printed circuit board 48 that is located at a central divider portion 164 of the tray 12 and also by a portion 45 of the flexible ribbon cable 46 that is positioned horizontally along the rear side 166 of the main connection portion 70 of the tray 12.

As described above for the 1RU panels 10, a portion 47 of the ribbon cable 46, which is provided in a vertical orientation, is looped within the cavity 170 defined by the center mounting portion 72 of the tray 12 (as shown previously in FIGS. 10-12). The vertical portion 47 of the ribbon cable 46 is configured to move within the cavity 170 to allow the tray 12 to travel back and forth without disrupting the communication through the ribbon cable 46 between the central PCB 1028 and the tray PCB 48. An end 172 of the ribbon cable 46 extends through a slot 174 on the left wall 176 of the center mounting portion 72 of the tray 12 to connect to the central PCB 1028. Another slot 178 is provided on the right wall 180 of the center mounting portion 72 of the tray 12 to allow a portion of the ribbon cable 46 to extend from inside the cavity 170 to the main connection portion 70 of the tray 12, wherein the ribbon cable 46 transitions from a vertical orientation to a flat horizontal orientation by a twist of the cable 46.

For each tray 12, the end 172 of the ribbon cable 146, after passing though the slot 174 on the left wall of the center mounting portion 72 of the tray, extends through slots 175 on the mounting blocks 42 and then slots 1177 on the mounting plate 1038, before making a connection with a connector 1179 on the central PCB 28.

As noted above, the central PCB 1028 may use indicators such as LEDs 1030 on both the front 1032 and back 1034 of the panel 1010 to communicate to a technician which tray 12 should be accessed. The central PCB 1028 then may connect to the main PCB or controller 1036 of the chassis 1010, which is housed within the first end support 1044a of the tray assembly 1024. The connection is made via ribbon cables 1050a, 1050b that run to the first end support 1044a. The ribbon cables 1050a and 1050b are configured to extend to the card-edge-style connector 1066 that is located within the channel 1062 of the first end support 1044a. The main controller 1036 is accessible to a technician by removing the front end cap 1064 of the first end support 1044a. The main controller 1036 may use the card-edge-style connection with the connector 1066 at its opposite rear end to connect to the ribbon cables 1050a, 1050b, allowing the main controller 1036 to be a field-replaceable device.

As shown in FIGS. 23-37, the main controller 1036 is configured to communicate to a higher-level managed connectivity rack or frame 40 via a connection (e.g., connection 1077) on the side of the panel 1010. The main controller 1036 of the panel 1010 may be powered via another connection (e.g., connection 1079) on the side of the panel 1010.

FIGS. 62-80 illustrate another embodiment of a 1RU high-density fiber distribution chassis configured to support a plurality of slidable fiber optic connection trays or blades having features that are examples of inventive aspects in accordance with the principles of the present disclosure. As will be described in further detail below, the chassis 2010 of FIGS. 62-80 includes features similar to the 1RU chassis of FIGS. 1-22. The chassis 2010 of FIGS. 62-80 also includes features that are different than the 1RU chassis of FIGS. 1-22, as will be discussed in further detail. For example, the chassis 2010 is configured to house slidable trays or blades that are completely physically and electrically removable from the chassis and replaceable with other trays or blades.

Figure 61:
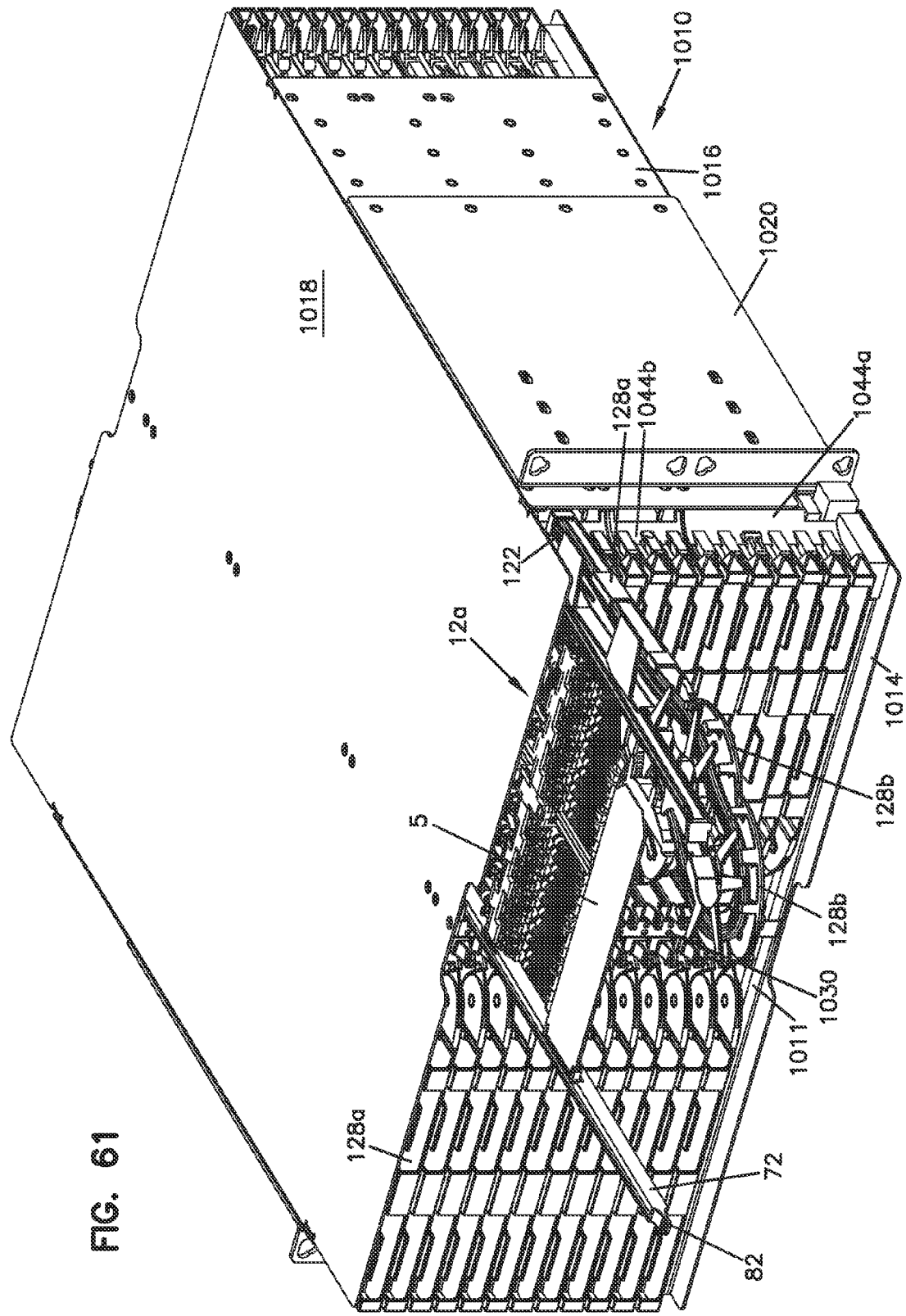
FIG. 61 is a perspective view of the chassis of FIG. 49, with one of the trays fully pulled out to an open position, illustrating an example cable routing configuration within the tray.

As in the previous examples of devices shown in FIGS. 1-61, the fiber optic telecommunications device shown in FIGS. 62-80 is a panel or chassis that is configured to be mounted in a high density distribution rack or frame. The chassis or panel is configured to house a plurality of slidable trays or blades. The trays are configured to support multiple fiber optic connections. According to one embodiment, the panel or the rack housing the panel can be managed devices wherein the connections can be monitored to verify that the connectors have been installed into the correct connections locations (e.g., adapters) and have not been disturbed. Even though the panel described herein and shown in FIGS. 62-80 is a 1-rack-unit (1RU) panel, versions that include 4-rack-unit (4RU) sizes may be provided.

As in the previous 1RU chassis described above and shown in FIGS. 1-22, within the panel and within each tray or blade, the connection locations defined by, for example, an adapter block assembly, which is used to connect fiber optic connectors, may be accessible from both the front and the back of the panel. An adapter block assembly may be installed onto a sliding tray and may reside toward the center portion of the panel. Using a portion of the tray which may define a pull or slide lever, the tray can be slid forward to access the front connections of the adapter block assembly. The cables attached to the front connectors may be managed using a link arm assembly made up of five cable management link arms, which swing forward and out of the way for access to the front of the adapter block assembly. When a technician is done accessing/loading the front connectors, using the aforementioned pull or slide lever, the tray is pushed back to its central location. The tray, as well as an extension spring located within the link arm assembly are configured to pull the cable management link arms back into the panel as the tray is pushed back into place by the technician.

To access or load the back-side of the adapter block assemblies, a technician can, from the back of the panel, pull the tray out the other side, moving the link arms to manage the cables on the back side as well.

As in the previous example 1RU panel, according to one example embodiment, there may be a total of six trays per 1RU panel, each housing an adapter block assembly capable of holding 24 LC connections, for a total of 6×24=144 connections. According to one example, the trays may be stacked three high on each side (i.e., first side and second side) of the panel. Each tray may use link arms on both the front and back sides to manage incoming and outgoing cables. The link arms are configured to allow cables to be installed and removed from both the tops and the sides of the link arms. The link arms are designed such that, regardless of position of the moving tray, the cables contained therewithin do not violate the minimum bend radius requirements. The longest link arm that is directly attached to one of the end supports of the tray assembly may be designed to hold two fanouts, which are devices that transition fiber from one high-fiber-count cable to multiple single-fiber-count cables.

On each tray, a technician may attach a 24-port adapter block assembly using a snap fit mounting arrangement on the tray. For managed panels, the adapter block assemblies may include a printed circuit board (PCB) installed thereonto, which connects to each connector installed using contacts within the adapter openings and a chip on each connector. The PCB on the adapter block assembly may connect to the tray using multi-pin connectors on the tray. The connectors on the tray may be attached to a flexible circuit in the form of a ribbon cable that routes to a central PCB within the chassis. The ribbon cable may be flexibly routed within a slide assembly of the tray to allow the tray to travel back and forth without disrupting the communication through the ribbon cable between the central PCB and the adapter block assembly PCB. The slide assembly of each tray may house a micro slide PCB that is configured to be electrically connected to the central PCB when the trays are mounted to the chassis. The micro slide PCB of each removable tray may use indicators in the form of light emitting diodes (LEDs) to communicate to a technician which tray should be accessed. The central PCB then may connect to a main PCB (i.e., a main controller), which is housed within one of the end supports of the tray assembly of the chassis. The connection is made via another top PCB that runs along a top cover of the chassis into the end support. The main PCB or controller may be a removable device and may be accessible to the technician by removing a front end cap of the end support. The main controller may use a card-edge-style connection at its opposite rear end to connect to a backplane PCB housed within the end support. The top PCB that runs along the cover connects the central PCB to the backplane PCB and thus to the main controller using card-edge-style connections. The main controller of the chassis is configured to communicate to a higher-level managed connectivity rack or frame via a connection (e.g., an RJ connection) on the side of the panel. The main controller of the panel may be powered via another connection on the side of the panel.

The above aspects of the telecommunications device will now be described in further detail below.

Referring specifically now to FIGS. 62-69, the high-density fiber distribution chassis or panel 2010 is shown in various views. The chassis 2010 is shown with a plurality of slidable fiber optic connection trays or blades 2012 mounted thereon. As will be described in further detail below, the trays 2012 are configured to be completely removable, both physically and electrically, from the chassis 2010 and replaceable with other similar trays.

Figure 63:
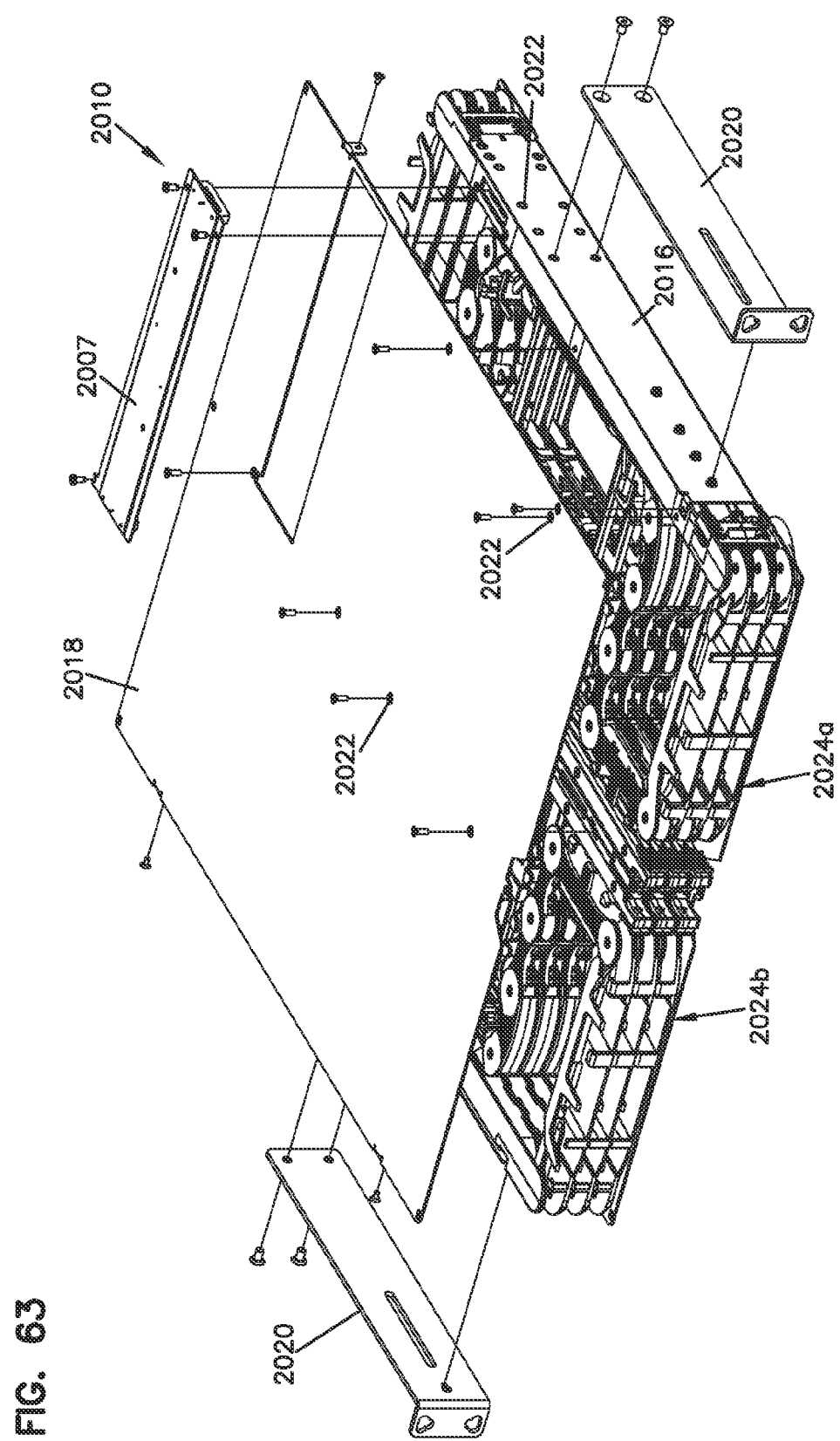
FIG. 63 is a partially exploded view of the chassis of FIG. 62.
Figure 64:
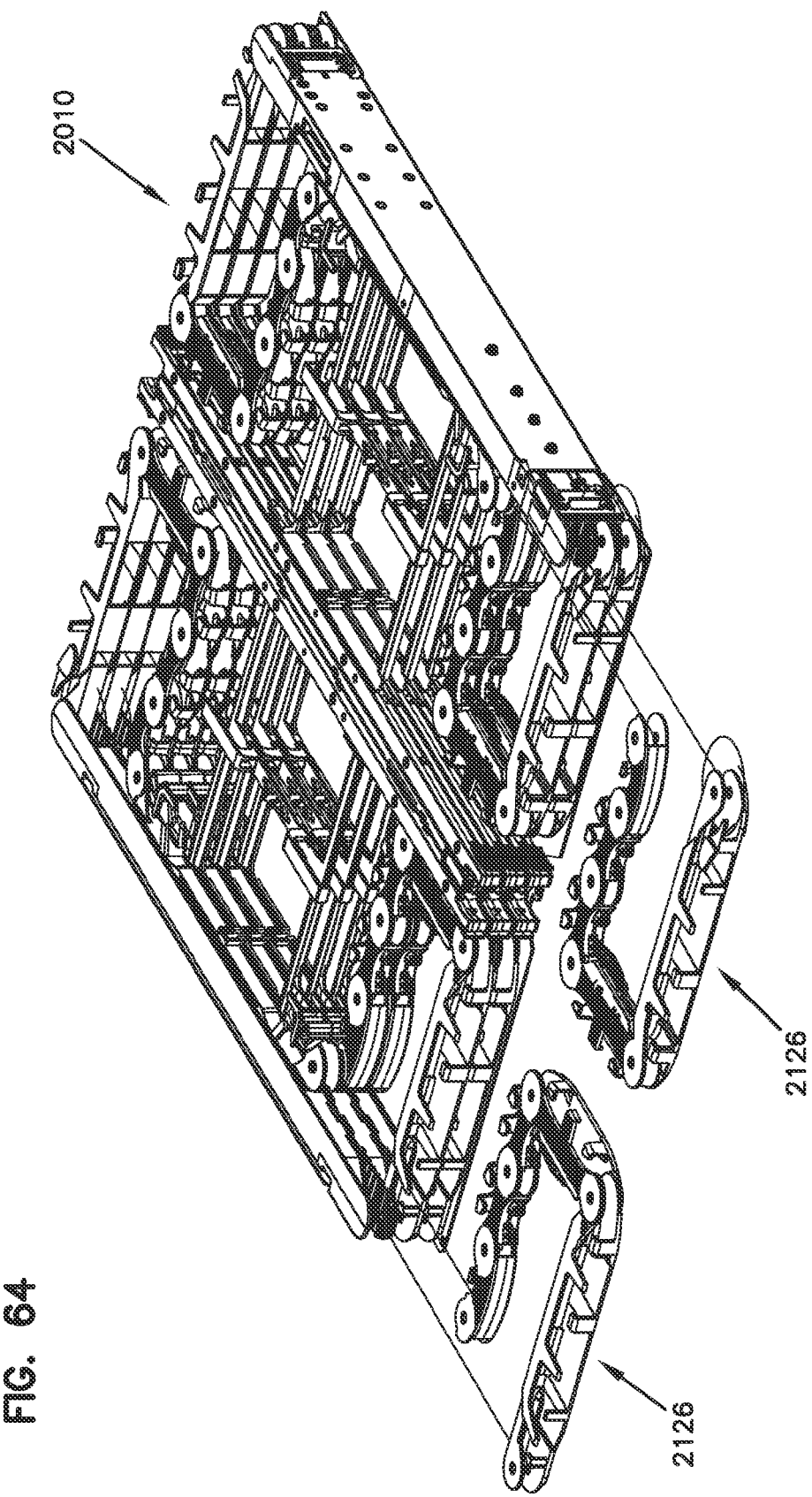
FIG. 64 is a partially exploded view of the chassis of FIG. 63, shown with the top chassis cover removed completely to illustrate the tray assemblies mounted therein, the cable management portions for two of the trays shown exploded off the chassis.

The chassis 2010 defines a bottom plate 2014 with upwardly extending sidewalls 2016, a top chassis cover 2018, and a pair of mounting brackets 2020 that are configured to be fastened to the sidewalls 2016 (see FIG. 63). The mounting brackets 2020 are used for mounting the chassis 2010 to other fixtures such as telecommunications racks or frames 40. The bottom plate 2014, including the upwardly extending sidewalls 2016, and the top cover 2018 define fastener openings 2022 for mounting tray assemblies 2024 within the chassis 2010. The mounting brackets 2020 of the chassis 2010 are also fastened to fastener openings 2022 on the sidewalls 2016 of the chassis 2010.

In the depicted embodiment, as discussed above, the chassis 2010 is configured as a standard 1RU (rack unit) piece. In other embodiments, the chassis 2010 may be configured to have different sizes. According to one example embodiment, the chassis may be configured as a 4RU device. Such an example of a chassis is shown in FIGS. 23-37 as mounted on a telecommunications rack 40.

Still referring to FIGS. 62-69, as noted above, each chassis 2010 is configured to house tray assemblies 2024. In the depicted embodiment, the tray assemblies 2024 may be defined by a first tray assembly 2024a that is located on the right side of the chassis 2010 and a second tray assembly 2024b that is located on the left side of the chassis 2010. Each of the tray assemblies 2024 may include a plurality of slidable trays 2012 mounted in a stacked arrangement. For example, the first tray assembly 2024a, as shown, may include three first trays 2012a to be mounted in a stacked arrangement and the second tray assembly 2024b may include three second trays 2012b to be mounted in a stacked arrangement, wherein the chassis 2010 can house six total slidable trays 2012 in the depicted version.

Figure 65:
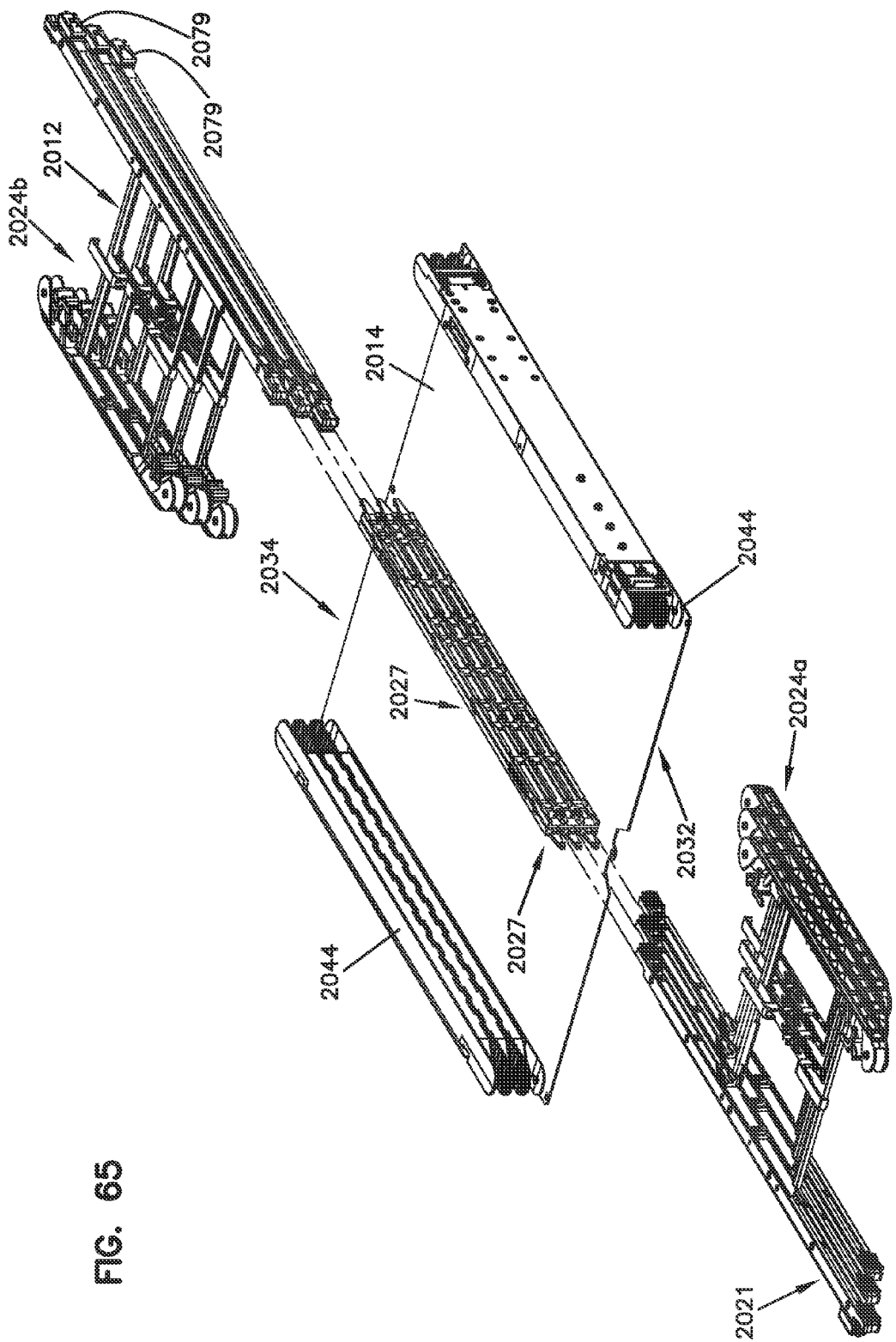
FIG. 65 illustrates the chassis of FIG. 64 with the trays shown exploded off the chassis.

As shown in FIG. 65, in the depicted embodiment of the chassis 2010, the first tray assemblies 2024a are removable from the front side of the chassis and the second tray assemblies 2024b are removable from the rear side of the chassis. Each tray is slidable both in the forward and the rearward direction with respect to the chassis 2010.

Figure 62:
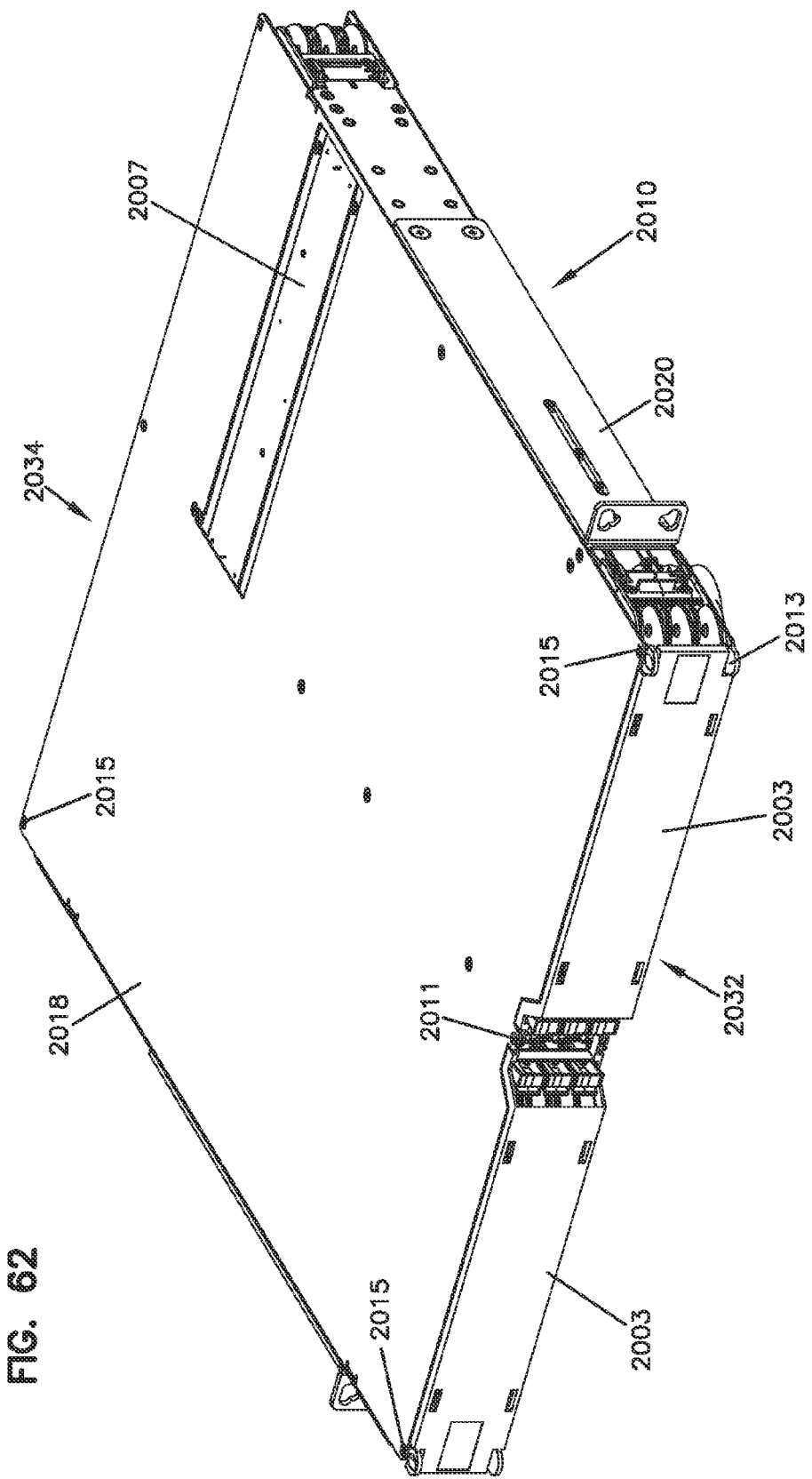
FIG. 62 is a front, right, top perspective view of another embodiment of a 1RU high-density fiber distribution chassis configured to support a plurality of slidable fiber optic connection trays or blades having features that are examples of inventive aspects in accordance with the principles of the present disclosure mounted in a stacked arrangement thereon, the chassis of FIG. 62 including features similar to the 1RU chassis of FIGS. 1-22.

As shown in FIG. 62, the chassis defines a pair of pivot doors 2003 at each of the front end 2032 and the rear end 2034 of the chassis 2010. The pivot doors 2003 protect the first and second tray assemblies 2024 within the chassis 2010. Both of the pivot doors 2003 at the front end 2032 and the at the rear end 2034 share a pivot hinge 2011 and pivot about the same pivot axis to provide access to the tray assemblies 2024 within the chassis 2010. The pivot doors 2003 define latches 2013 at the ends opposite from the pivot hinge 2011 for locking the pivot doors 2003 at a closed position. The latches 2013 may define flexible portions that are configured to snap into detents 2015 located at the top chassis cover 2018 and the bottom plate 2014 of the chassis 2010, adjacent the end supports 2044.

FIGS. 81-86 illustrate another example of a pivot door 3003 that can be used with the chassis 2010 of the present application. The pivot door 3003 includes a spring latch mechanism 3005 that allows a user to latch and unlatch the door 3003.

Referring to FIGS. 81-86, at a first end 3007, the pivot door 3003 defines a pivot pin 3009 for cooperating with the pivot hinge 2011 of the chassis 2010 for pivotally opening the door 3003 to provide access to the tray assemblies 2024 within the chassis 2010. At a second end 3011, the pivot door 3003 defines the spring latch mechanism 3005 that allows the user to latch the door 3003 at a closed position and unlatch the pivot door 3003 to an open position.

The spring latch mechanism 3005 includes a slide latch 3013 that is configured to be captured against the second end 3011 of the door 3003 with a cover 3015. The cover 3015 is fastened to the second end 3011 of the door 3003 with a fastener 3017. The slide latch 3013 is configured to have limited sliding movement between the cover 3015 and the door 3003 and is spring-biased to an extended position (i.e., a closed or a latched position) as will be discussed below.

The slide latch 3013 defines guide slots 3019 that cooperate with guide tabs 3021 on the door 3003 for allowing the slide latch 3013 to slide between the extended position and a depressed position (i.e., an open or an unlatched position). The abutment of the guide tabs 3021 with ends 3023 of the guide slots 3019 provide the positive stops in limiting the sliding movement of the slide latch 3013.

Still referring to FIGS. 81-86, the spring 3025 providing the biasing force on the slide latch 3013 is positioned within a spring pocket 3027 defined on the slide latch 3013. The spring 3025 abuts a first end 3029 of the spring pocket 3027 at a first end 3031 of the spring 3025 and a spring stop 3033 defined on the door 3003 at a second end 3035 of the spring 3025. In this manner, the spring 3025 is captured between the slide latch 3013 and a structure that is on the door 3003 and is able to bias the slide latch 3013 away from the door 3003.

The slide latch 3013 defines a pair of angled pin tracks 3037 that are configured to receive pins 3039 of two opposing locking tabs 3041. The locking tabs 3041 are configured to slidably move in a direction generally perpendicular to that of the movement of the slide latch 3013. The locking tabs 3041, similar to the slide latch 3013, also include guide tabs 3045 that slidably fit within guide slots 3047 defined on the cover 3015 for guiding and limiting the movement of the locking tabs 3041. The guide tabs 3045 are located on an opposite face of the locking tabs 3041 from the pins 3039.

The locking tabs 3041 include locking ends 3049 with a tapered face 3051 and an opposing flat face 3053. The locking ends 3049 are configured to snap into the detents 2015 located at the top chassis cover 2018 and the bottom plate 2014 of the chassis 2010, adjacent the end supports 2044. The flat faces 3053 of the locking ends 3049 need to be cleared off the detents 2015 in order to pivot the door 3003 to an open position.

Figure 86:
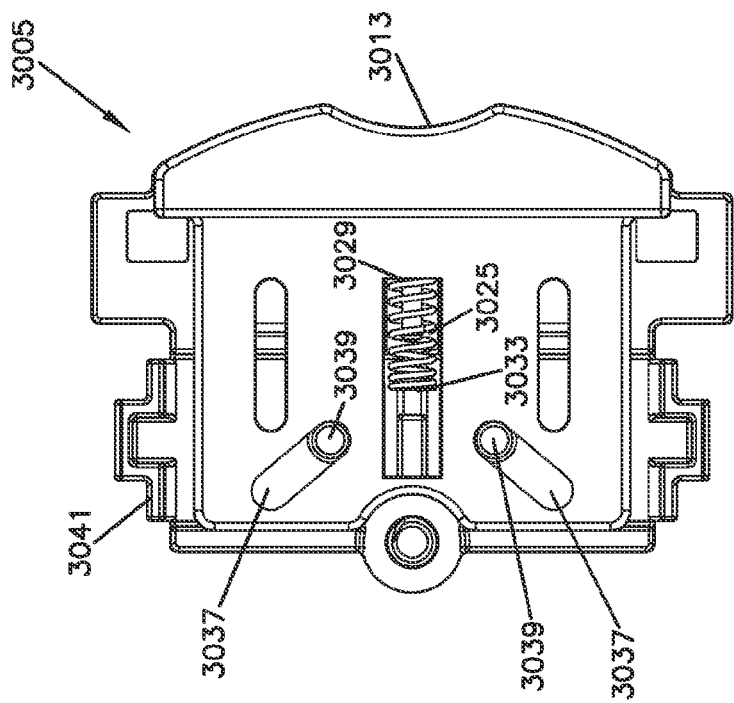
FIG. 86 illustrates the spring latch mechanism of FIG. 85 in an unlatched or open position.
Figure 85:
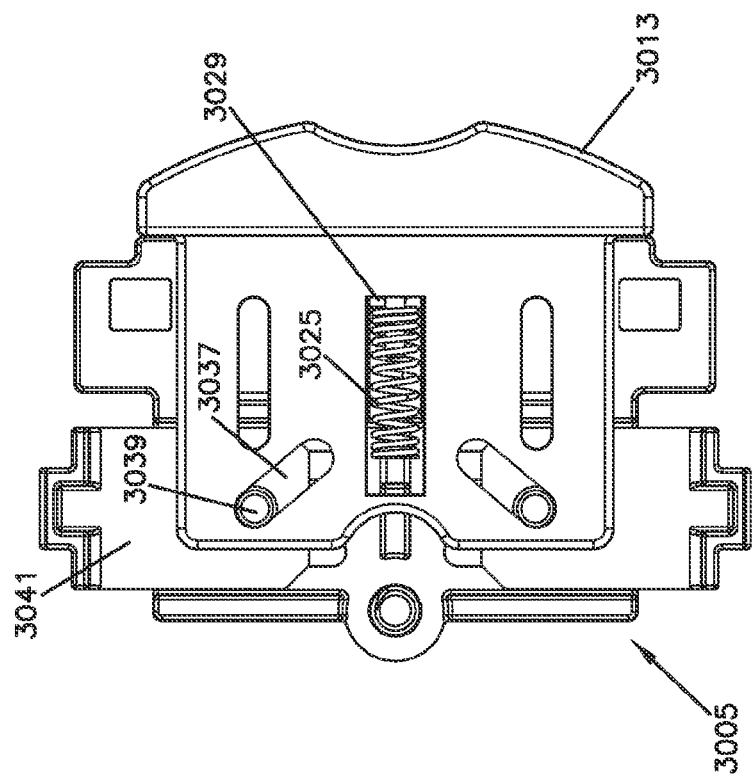
FIG. 85 is a close-up, front view of the spring latch mechanism removed from the door of FIG. 81, the spring latch mechanism shown in a latched position.
Figure 87:
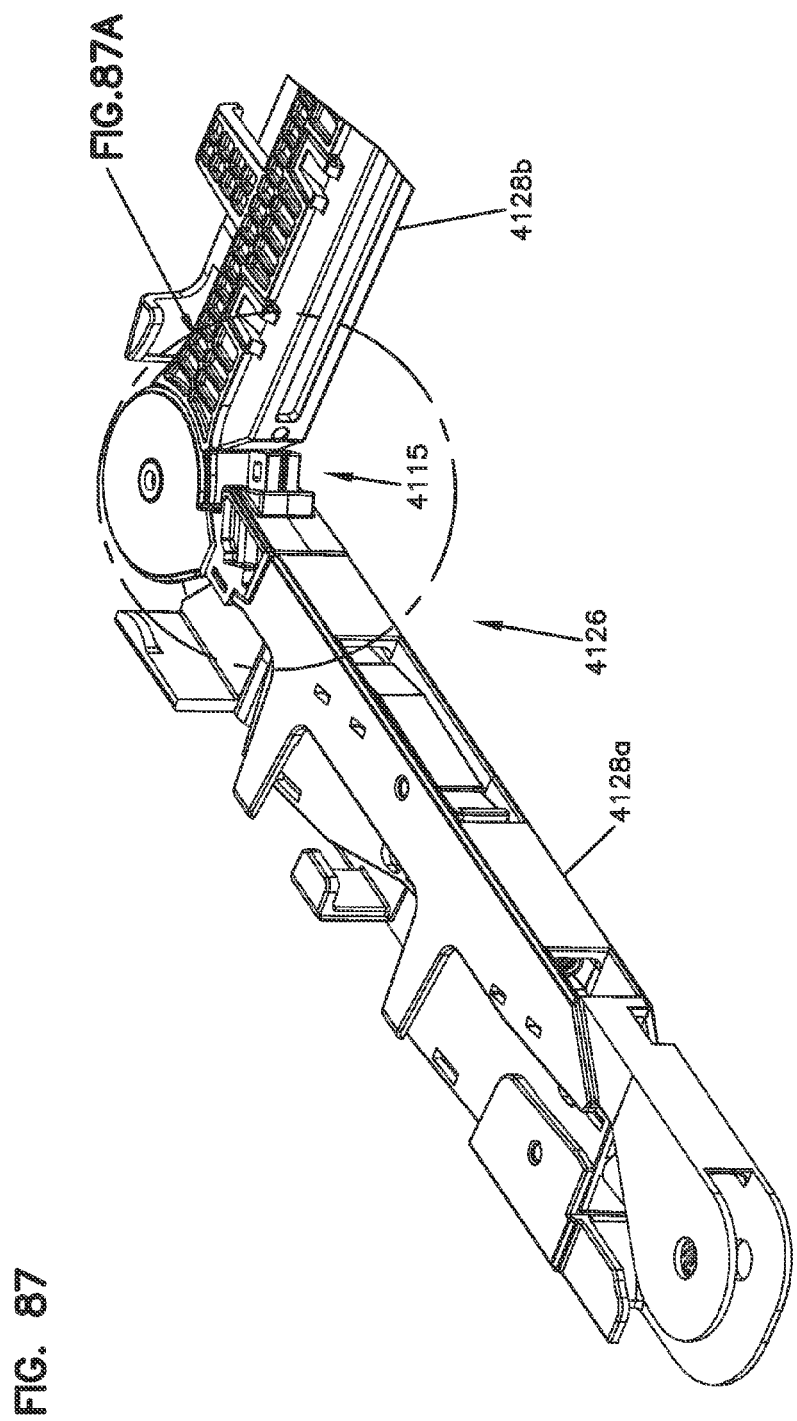
FIG. 87 illustrates another version of a link arm assembly including a compression spring assembly provided between a first link arm and a second link arm connected thereto.
Figure 87A:
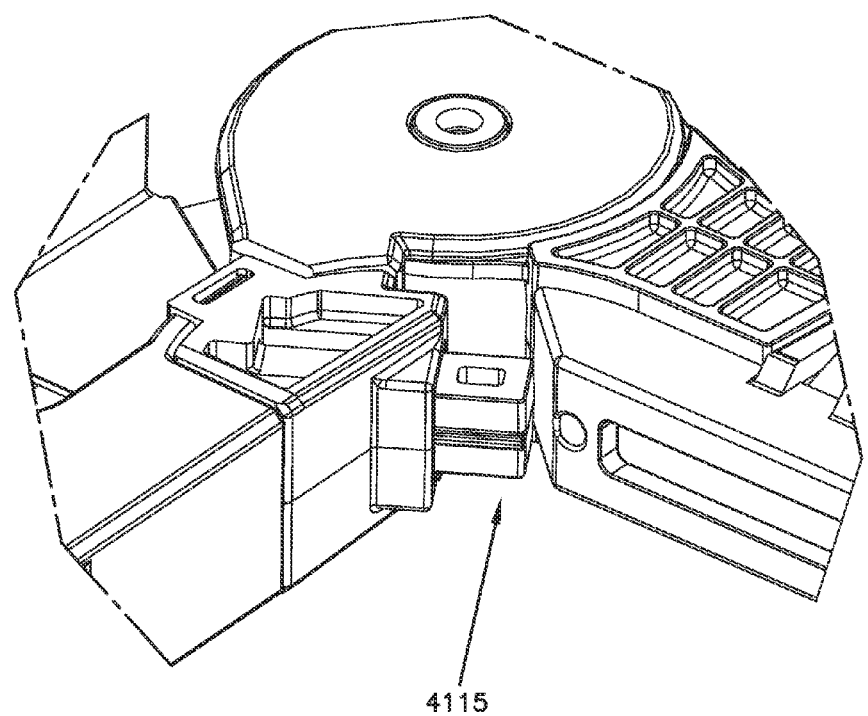
FIG. 87A is a close-up view of a portion of the link arm assembly of FIG. 87.
Figure 88:
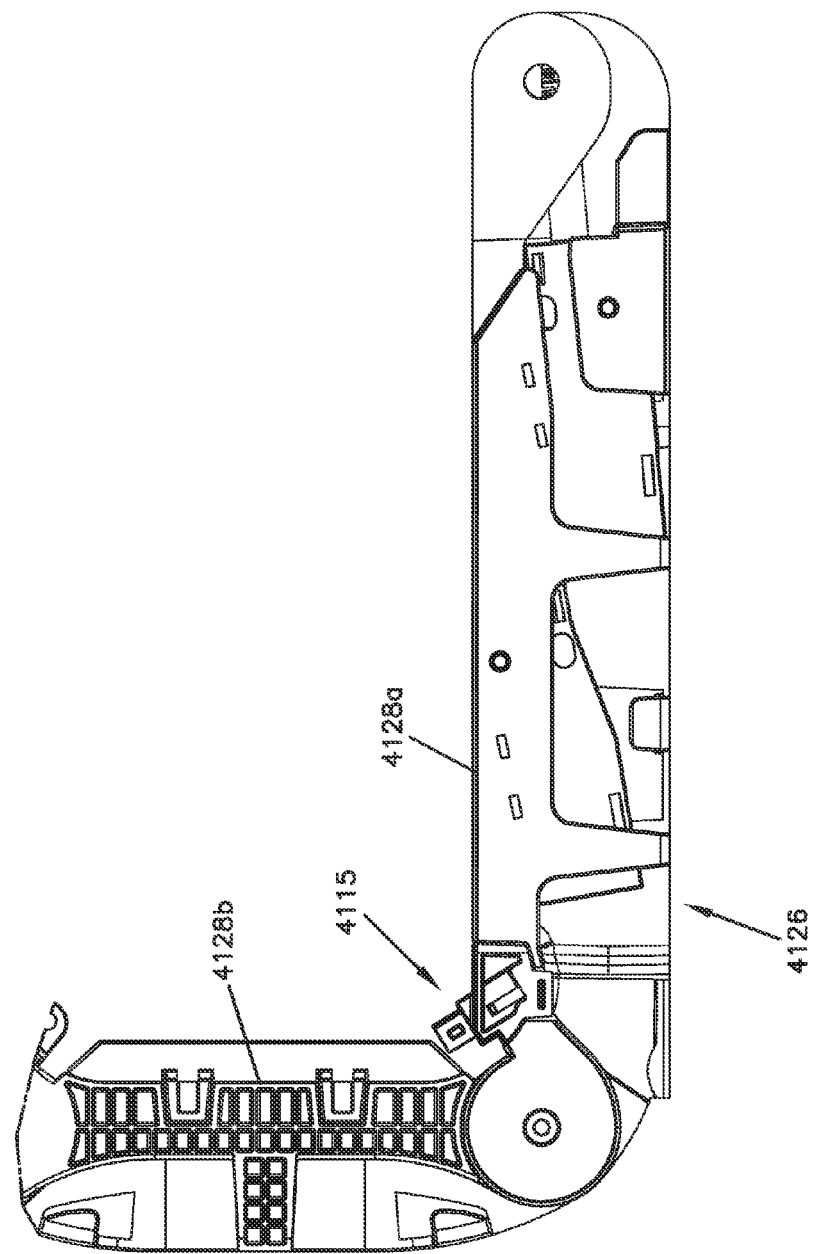
FIG. 88 illustrates the link arms of FIG. 87 from a top view.

As shown in FIGS. 85-86, when the slide latch 3013 is pushed inwardly toward the door 3003 and the spring 3025 is depressed, the locking tabs 3041 are pulled toward the slide latch 3013 due to the camming action between the angled pin tracks 3037 and the pins 3039 of the locking tabs 3041. When the locking tabs 3041 have cleared the detents 2015, the door 3003 can be pivoted open.

The spring 3025 biases the slide latch 3013 outwardly to an extended position. Due to the camming action between the angled pin tracks 3037 and the pins 3039 of the locking tabs 3041, the locking tabs 3041 are also pushed outwardly away from the slide latch 3013 due to the spring 3025. When a user needs to close the pivot door 3003, the user can simply push the pivot door 3003 to a closed position and the tapered faces 3051 of the locking ends 3049 of the locking tabs 3041 allow the locking tabs 3041 to snap-fit into the detents 2015 on the chassis 2010. The tapered faces 3051 of the locking ends 3049 abut the front edge of the top chassis cover 2018 and the front edge of the bottom plate 2014 of the chassis 2010 to provide the slight inward movement needed for the locking tabs 3041 to clear the top chassis cover 2018 and the bottom plate 2014 of the chassis 2010 and snap into the detents 2015.

The pivot door 3003, although illustrated and described for a 1RU chassis, may be modified for use with a 4RU chassis with a similar spring latch mechanism.

Now referring back to FIG. 64, a partially exploded view of the chassis 2010 is shown with the top chassis cover 2018 removed completely to illustrate the tray assemblies 2024 mounted therein, the cable management portions for two of the trays 2012 shown exploded off the chassis 2010.

The first and second tray assemblies 2024a, 2024b are generally similar in configuration and for ease of description, only the first tray assembly 2024a will be described in detail, with the understanding that the features of the first tray assembly 2024a are fully applicable to the second tray assembly 2024b except for the noted differences. In addition, in FIGS. 70-77, only one representative first tray 2012a has been shown for ease of illustration and description, with the understanding that the features of that first tray 2012a are fully applicable to other first trays 2012a that might be mounted in a stacked arrangement therewith or to other second trays 2012b that might be mounted on the left side of the chassis 2010.

Referring specifically now to FIGS. 65-69, the first and second tray assemblies 2024a, 2024b are shown outside of the chassis 2010. As discussed for the previous embodiments of chassis and as will be discussed in further detail below, the two tray assemblies 2024, when mounted together, capture a central PCB 2028 therebetween. The central PCB 2028 may electrically connect to indicators in the form of LEDs 2030 on both the front 2032 and the back 2034 of the chassis 2010 to communicate to a technician which tray 2012 should be accessed. As will be discussed in further detail, the LEDs 2030 may be carried by the removable trays 2012 and may be electrically connected to the central PCB 2028 when the trays 2012 are slidably mounted on the chassis 2010.

All of the trays 2012 of both the first tray assembly 2024a and the second tray assembly 2024b are configured to be electrically connected to the central PCB 2028. And, the central PCB 2028 is configured to be electrically connected to a main PCB or controller 2036 of the chassis 2010, wherein the main PCB 2036 of the chassis 2010 is configured to communicate to a higher-level managed connectivity rack or frame 40.

Referring still to FIGS. 65-69, the different parts of the first tray assembly 2024a are illustrated in an exploded configuration. The first tray assembly 2024a is formed from a center divider assembly 2027 that includes the central PCB 2028 and a pair of mounting blocks 2042 that capture the central PCB 2028 thereinbetween. The first tray assembly 2024a also includes the first tray 2012a, an end support 2044, the main PCB 2036, and a backplane PCB 2066 that are mounted to the end support 2044. As noted above and as will be described in further detail below, a flexible circuit in the form of a ribbon cable 2046 provides an electrical connection between the central PCB 2028 of the chassis 2010 and a tray PCB 2048 located on the tray 2012. Another PCB (i.e., the top PCB) 2050 provides the connection between the central PCB 2028 and a backplane PCB 2066. The main PCB or controller 2036 of the chassis 2010 is connected to the backplane PCB 2066 via card-edge-style connections. The top PCB 2050 is mounted to a mounting panel 2007, the mounting panel 2007 configured to mount the top PCB 2050 to the top chassis cover 2018 of the chassis 2010. The top PCB 2050, via the central PCB 2028, can connect both the first and second tray assemblies 2024a, 2024b to the main PCB 2036.

Figure 66:
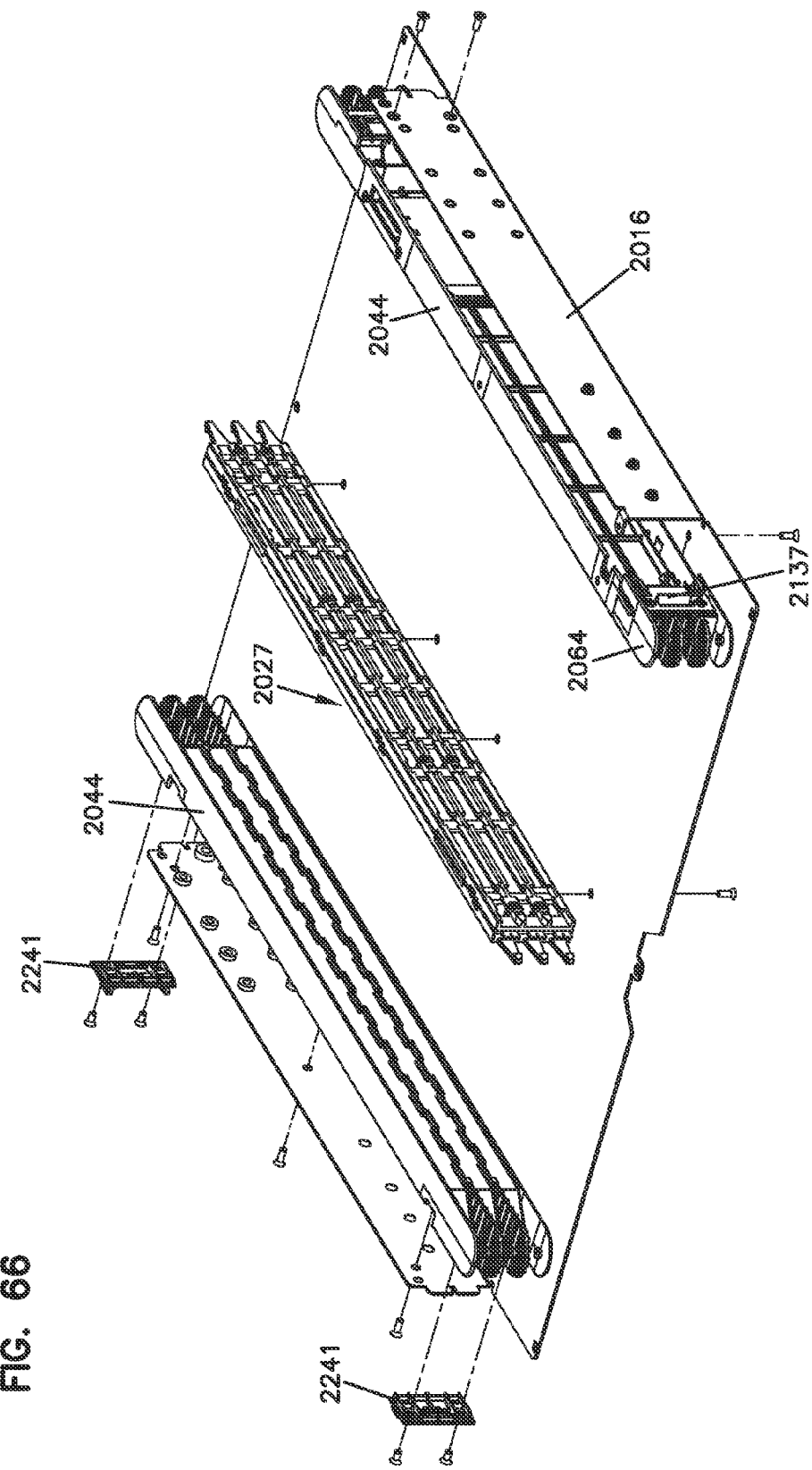
FIG. 66 illustrates the chassis of FIG. 65 with the ends supports and the center divider assembly of the chassis shown exploded off the chassis.
Figure 67:
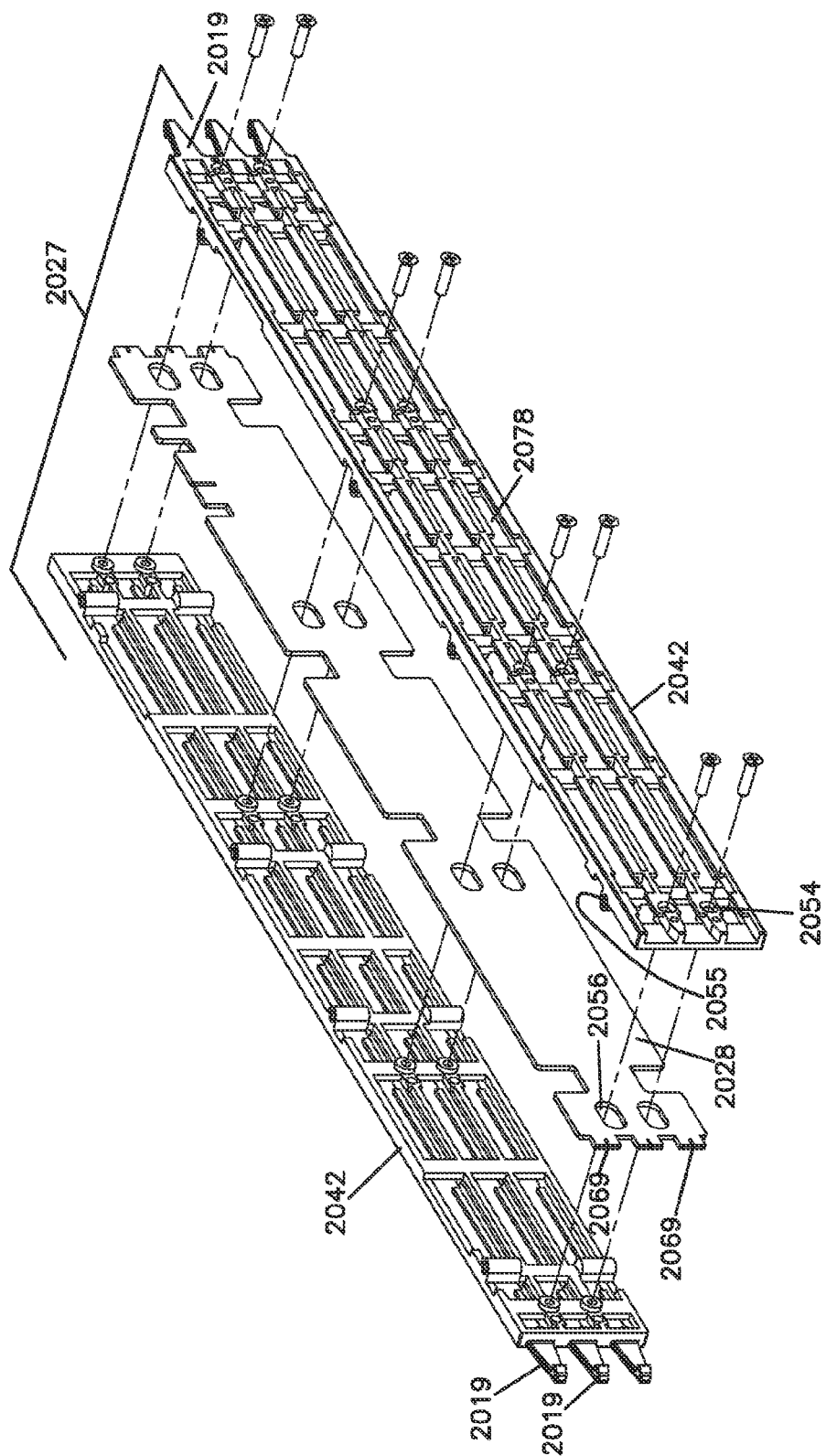
FIG. 67 illustrates the center divider assembly of the chassis in an exploded configuration.
Figure 68:
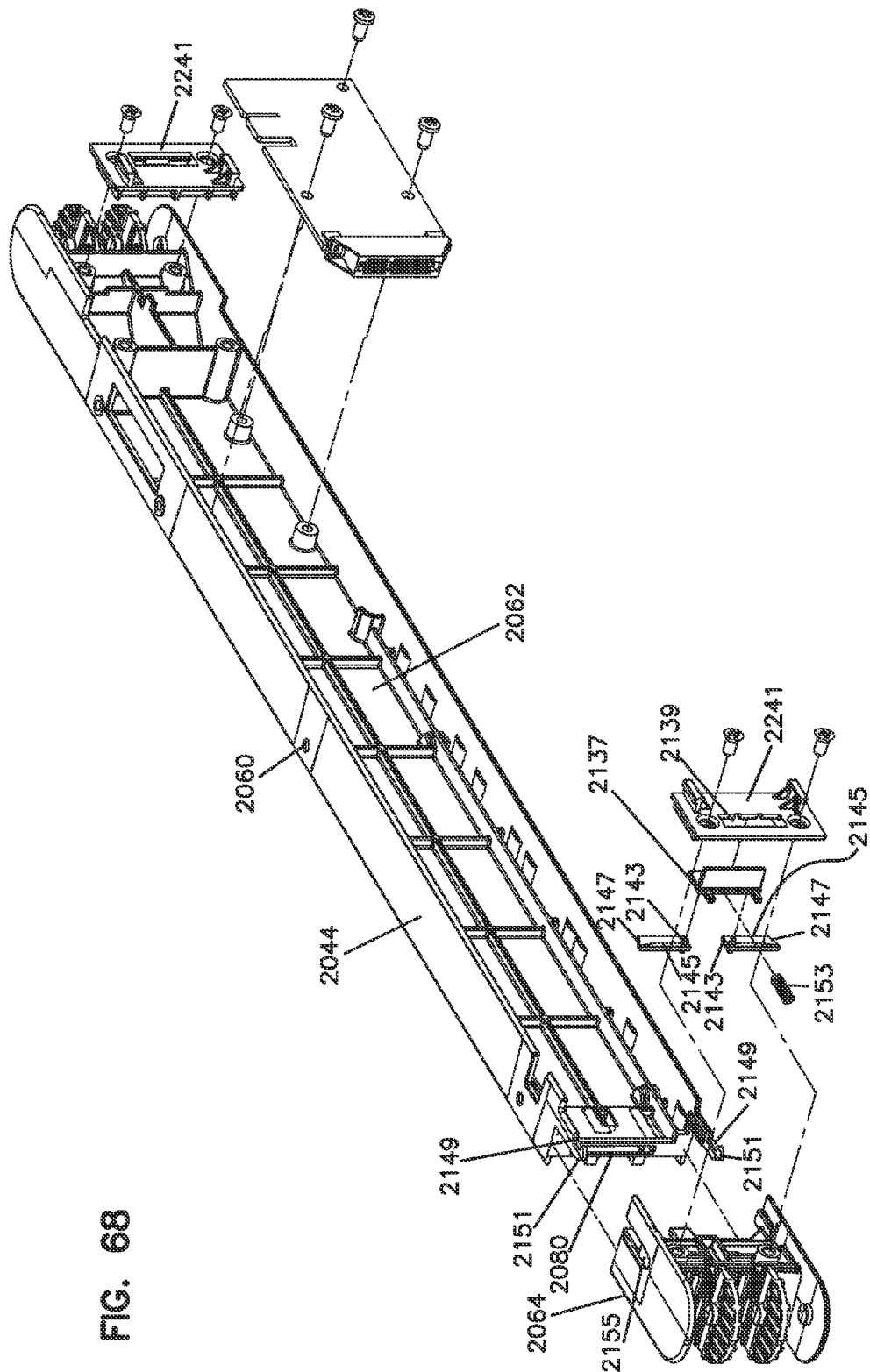
FIG. 68 illustrates the right end support of the chassis in an exploded configuration, the right end support configured to house the main controller or PCB of the chassis.
Figure 69:
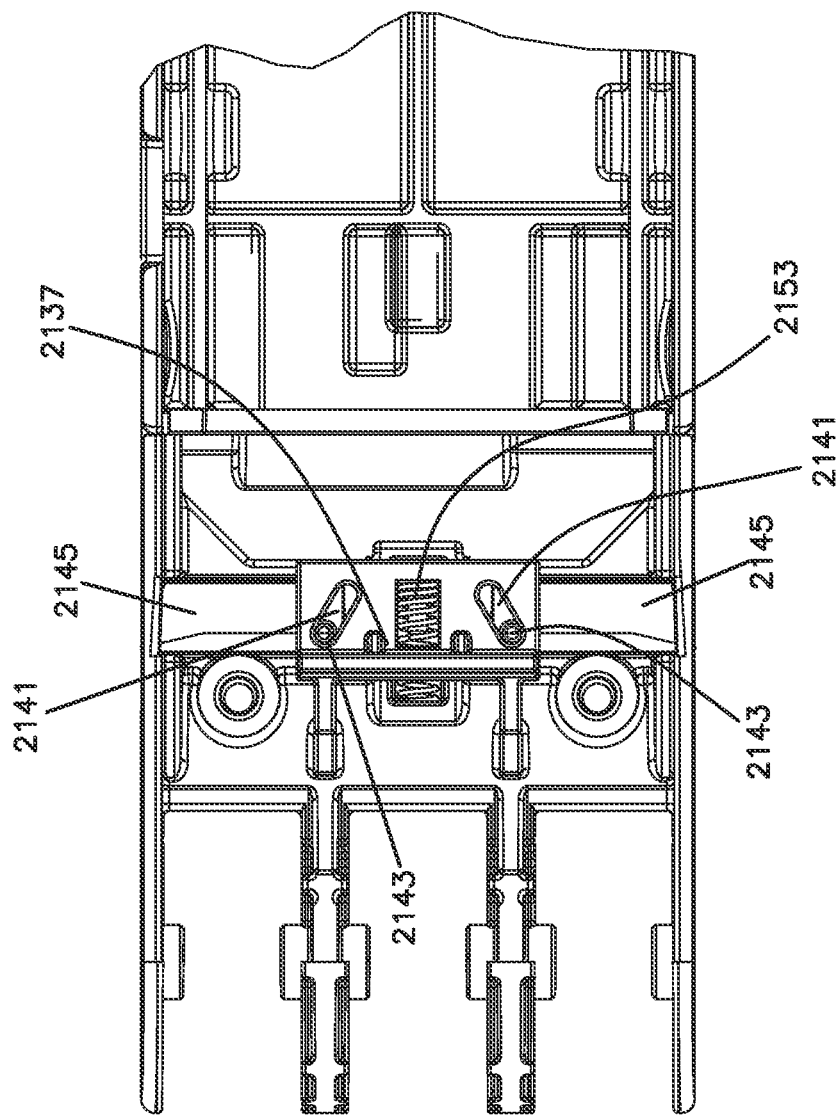
FIG. 69 is a side view of the removable end cap of the right end support of the chassis, the end cap shown with the end cap cover removed to illustrate the end cap lever features.

FIG. 65 illustrates the chassis 2010 with the trays 2012 shown exploded off the chassis 2010. FIG. 66 illustrates the chassis 2010 with the ends supports 2044 and the center divider assembly 2027 of the chassis 2010 shown exploded off the chassis 2010. FIG. 67 illustrates the center divider assembly 2027 of the chassis 2010 in an exploded configuration. FIG. 68 illustrates the right end support 2044 of the chassis 2010 in an exploded configuration, the right end support 2044 configured to house the main controller or PCB 2036 of the chassis 2010. FIG. 69 is a side view of the removable end cap 2064 of the right end support 2044 of the chassis 2010.

Still referring to FIGS. 65-69, the right and left mounting blocks 2042 are configured for capturing the central PCB 2028 and mounting the central PCB 2028 and the center divider assembly 2027 to the chassis 2010. The mounting blocks 2042 define fastener openings 2054 that are aligned with fastener openings 2056 of the central PCB 2028 for mounting the central PCB 2028 to the blocks 2042. The mounting blocks 2042 also define fastener openings 2055 that are configured to align with fastener openings of the top chassis cover 2018 for mounting the center divider assembly 2027 to the chassis 2010.

As will be discussed in further detail, each tray 2012 is configured to be slidably captured between the mounting block 2042 and the end support 2044 of the tray assembly 2024. For the first tray assembly 2024a, for example, the end support 2044 defines fastener openings 2060 for mounting to the top chassis cover 2018 and the bottom plate 2014. The right end support 2044 is also configured to capture the main PCB 2036 and the backplane PCB 2066 against the right sidewall 2016 of the chassis 2010, wherein the right sidewall 2016 is also fastened to the top chassis cover 2018. The right end support 2044 defines a channel 2062 for housing the main PCB 2036 and the backplane PCB 2066. As shown in FIG. 68 and as will be discussed in further detail, the main PCB 2036 may be slidably loaded into the channel 2062 of the right end support 2044. The main PCB 2036 is accessible to a technician by removing a front end cap 2064 of the end support 2044. The main controller 2036 may use a card-edge-style connection 2017 at its opposite rear end to connect to the backplane PCB 2066 and eventually to the top PCB 2050 that is mounted to the chassis top cover 2018 via the mounting panel 2007. As in the previous embodiments discussed, it should be noted that in the depicted embodiment of the chassis 2010, since both tray assemblies 2024 are being connected through the central PCB 2028, only one end support 2044 (i.e., the right end support) of the first tray assembly 2024a defines a channel 2062 for supporting the main controller 2036 and the backplane PCB 2066, wherein the end support 2044 of the second tray assembly 2024b is not shown as housing a main PCB 2036 or backplane PCB 2066. This configuration may be modified depending upon the orientation of the chassis 2010 within a given rack 40.

Still referring to FIG. 67, the right mounting block 2042 defines channels 2078 for slidably receiving portions of the first tray assembly 2024a and the left mounting block 2042, similarly defines channels 2078 for receiving portions of the second tray assembly 2024b.

The left mounting block 2042 defines three lock levers 2019 at the front end thereof, one for each tray 2012. The right mounting block 2042 defines three lock levers 2019 at the rear end thereof, one for each tray 2012. As will be discussed in further detail below, the lock levers 2019 are configured to cooperate with portions of the trays 2012 in locking the trays 2012 with respect to the center divider assembly 2027. When the center divider assembly 2027 has been formed with the central PCB 2028 captured between the mounting blocks 2042, the lock levers 2019 of the left mounting block 2042 cooperate with the right trays 2012a in locking the trays 2012a against slidable movement with respect to the chassis 2010. The lock levers 2019 of the right mounting block 2042 cooperate with the left trays 2012b in locking the trays 2012b against slidable movement with respect to the chassis 2010. As discussed before, the chassis 2010 is configured such that the right trays 2012a are only removable from the front end 2032 of the chassis 2010 and the left trays 2012b are only removable from the rear end 2034 of the chassis 2010. As will be discussed in further detail below, the lock levers 2019 have to be pivoted away from the center divider assembly 2027 before the trays 2012 can be slidably removed from the chassis 2010.

Referring now to FIGS. 70-78, each tray 2012 of each tray assembly 2024 defines a main connection portion 2070, a center mounting portion 2072, a side mounting portion 2074, and a cable management portion 2076. Each tray 2012 also defines a slide assembly 2021 that is formed from a center rail 2023 that is configured to slide with respect to a mounting rail 2025. As shown specifically in the exploded view in FIG. 72, the mounting rail 2025 defines a dovetail portion 2029 that is slidably captured against the center rail 2023 by a top cover 2031 of the center rail 2023. The mounting rail 2025 also defines a gear rack 2033, the purpose of which will be discussed in further detail below.

The center mounting portion 2072 of the tray 2012 is also configured for slidable coupling to the center rail 2023 of the slide assembly 2021. The center mounting portion 2072 of the tray 2012 also defines a dovetail profile 2035 that is slidably captured against the center rail 2023 by the top cover 2031 of the center rail 2023. The center mounting portion 2072 of the tray 2012 also defines a gear rack 2037, the purpose of which will be discussed in further detail below.

The side mounting portion 2074 of the tray 2012 is configured for slidable coupling to an end support 2044 of the tray assembly 2024 that is located generally close to one of the sides of the chassis 2010.

As noted previously, both the mounting block 2042 and the end support 2044 include longitudinally extending channels provided in a stacked arrangement. The channels 2078 of the mounting block 2042 are configured to slidably receive the mounting rail 2025 of the slide assembly 2021 of each tray 2012. The lock levers 2019 of the mounting blocks 2042 are configured to fix the mounting rails 2025 to the mounting blocks 2042 with a snap fit interlock. In this manner, the mounting rail 2025 of the slide assembly 2021 is stationarily fixed with respect to the mounting block 2042, thus, to the chassis 2010. The center rail 2023 slides with respect to the mounting rail 2025. And, the tray 2012 slides with respect to the center rail 2023, at twice the speed of the center rail 2023 relative to the stationary mounting rail 2025 due to a gear arrangement, as will be discussed.

The channels 2080 of the end support 2044 are configured to receive the side mounting portion 2074 of each tray 2012 for supporting the slidable movement of the tray 2012.

Referring now to the interaction between the side mounting portions 2074 of the trays 2012 and the channels 2080 of the end support 2044, the side mounting portions 2074 and the channels 2080 of the end support 2044 might also define matching dovetail configurations for providing slidable movement and preventing lateral separation. Other types of support structures may also be used for slidable movement such as shelf type of alignment and support structures.

Regarding the interaction between the center mounting portions 2072 of the trays 2012 and the center rails 2023 of the slide assemblies 2021, as discussed above, the center mounting portion 2072 of the tray also defines a dovetail profile 2035 that is slidably captured against the center rail 2023 by the top cover 2031 of the center rail 2023.

Figure 74A:
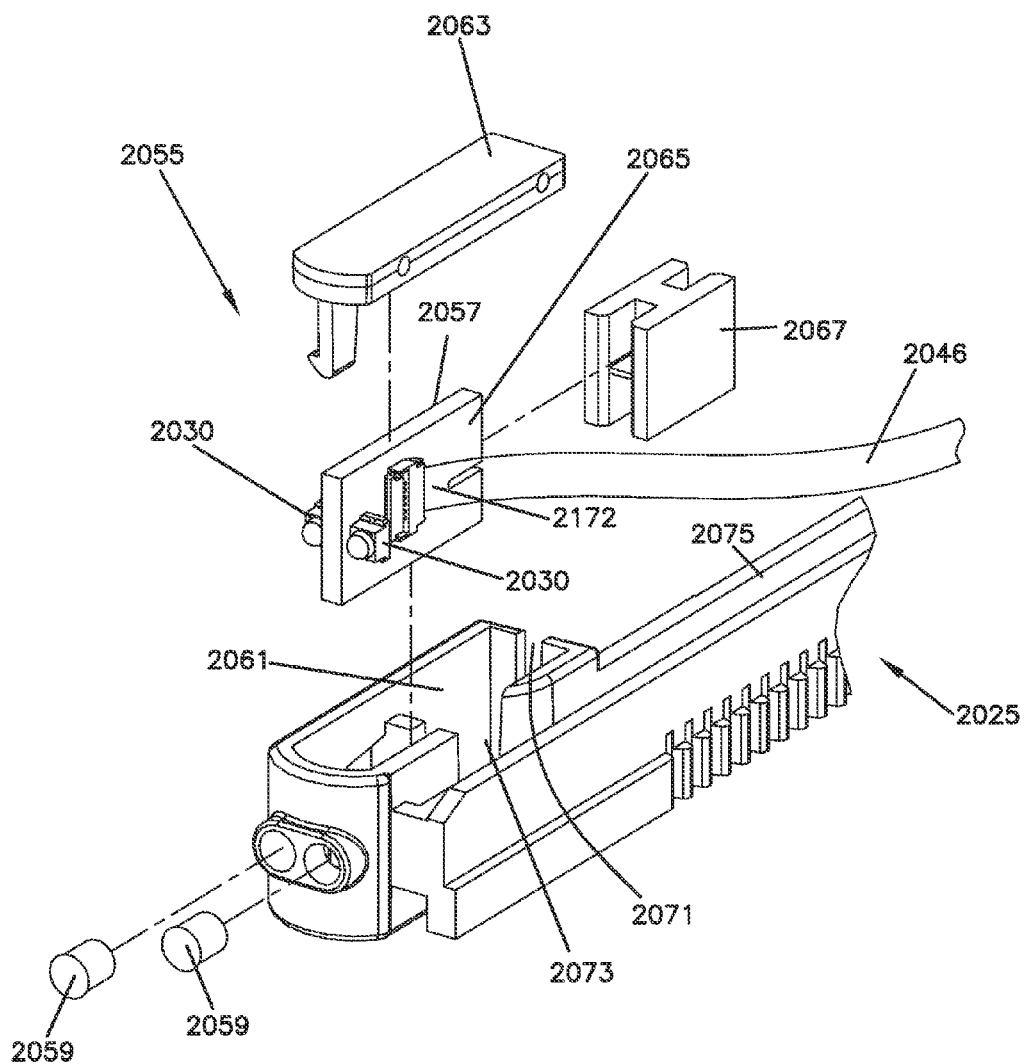
FIG. 74A is a close-up view of a portion of the tray of FIG. 74.

Referring now to FIGS. 74 and 74A, the mounting rail 2025 is illustrated in isolation. As discussed above, the mounting rail 2025 is the portion of the slide assembly 2021 that is configured to be fixedly mounted to the mounting block 2042. The mounting rail 2025 is the portion that needs to be removed from the channels 2078 of the mounting block 2042 in removing the entire tray 2012 and the slide assembly 2021 thereof from the chassis 2010. Otherwise, with the mounting rail 2025 fixed in place with respect to the mounting block 2042, each tray 2012 is still free to slide via the slide assembly 2021, without being removed from the chassis 2010.

Referring to the mounting rail 2025 of one of the first trays 2012a, the mounting rail 2025 defines a dovetail configuration 2041 on the leftmost wall 2043 of the mounting rail 2025 for slidable insertion into one of the channels 2078 of the mounting block 2042. As discussed above, the rightmost wall 2045 of the mounting rail 2025 also defines a dovetail configuration 2029 for allowing the center rail 2023 to slide with respect to the mounting rail 2025. The gear rack 2033 also defined on the rightmost wall 2045 of the mounting rail 2025 is configured to interact with first and second gear wheels 2051 that are positioned on the center rail 2023.

As the center rail 2023 slides with respect to the mounting rail 2025, the gear teeth 2053 of the gear wheels 2051 cause the gear wheels 2051 to spin as they interact with the gear rack 2033 of the mounting rail 2025. As the gear wheels 2051 spin, the wheels 2051 also interact with the gear rack 2037 that is found on the center mounting portion 2072 of the tray 2012. Thus, when the center rail 2023 slides with respect to the stationary mounting rail 2025, the tray 2012 slides with respect to the center rail 2023, at twice the speed of the center rail 2023 relative to the stationary mounting rail 2025 due to the gear arrangement.

Still referring to FIGS. 74 and 74A, the mounting rail 2025 defines an LED mount 2055 at a front end thereof. The LED mount 2055 is configured to house a micro slide PCB 2057 that is provided with two LEDs 2030, one on each side thereof. The LEDs 2030 can be seen through a pair of transparent lenses 2059 provided at the front of the LED mount 2055. The micro slide PCB 2057 is captured within a PCB pocket 2061 of the LED mount 2055 with a cover 2063. The rear end of the micro slide PCB 2057 defines an edge connection portion 2065 and receives a card-edge-style connector 2067. The card-edge-style connector 2067 at the back end of the micro slide PCB 2057 is configured to electrically connect to one of the front extensions 2069 defined on the central PCB 2028. The front extension 2069 of the central PCB 2028 extends through a slot 2071 located at the rear end of the LED mount 2055 to electrically connect to the micro slide PCB 2057 via the card edge connector 2067.

As shown in FIG. 74A, the micro slide PCB 2057 electrically ties the tray 2012 to the central PCB 2028 via a flexible circuit in the form of a ribbon cable 2046. The ribbon cable 2046 is configured to be connected to the micro slide PCB 2057 and enters into the PCB pocket 2061 via a side entrance 2073 of the LED mount 2055.

Referring now to FIGS. 72, 74, and 74A, the flexible circuit 2046 extends through the mounting rail 2025. The mounting rail 2025 defines a flex pocket 2075 that runs longitudinally along the mounting rail 2025 and houses the flexible circuit 2046. Toward the rear end of the mounting rail 2025, the mounting rail 2025 defines a slot 2077 for directing the flexible circuit 2046 out of the flex pocket 2075 into the center rail 2023 as will be discussed in further detail below.

As noted above, the mounting rail 2025 is the portion of the slide assembly 2021 that is configured to be stationarily fixed with respect to the mounting block 2042 of the center divider assembly 2027.

As discussed previously, the mounting block 2042 to the left of the central PCB 2028 defines three lock levers 2019. The lock levers 2019 of the mounting blocks 2042 are configured to fix the mounting rails 2025 to the mounting blocks 2042 with a snap fit interlock once the mounting rails 2025 have been slidably inserted into the channels 2078 of the mounting blocks 2042. As shown in FIG. 65, each LED mount 2055 defines an exterior lock detent 2079. The lock detents 2079 flexibly receive the lock levers 2019 with a snap fit. If an entire tray 2012 needs to be removed from the chassis 2010, the lock levers 2019 are pivoted away from the detents 2079 until they clear the detents 2079. Once the lock levers 2019 clear the detents 2079, the entire tray 2012 can be slidably removed from the chassis 2010.

Referring now back to FIGS. 72-73, as noted above, the center rail 2023 receives the mounting rail 2025 on the left side of the center rail 2023 and the center mounting portion 2072 of the tray 2012 at the right side of the center rail 2023. The center rail 2023 slides with respect to the mounting rail 2025 and also causes the tray 2012 to slide with respect to the center rail 2023 due to the gear wheels 2051 that are located within the center rail 2023. The gear wheels 2051, the rightmost wall 2045 of the mounting rail 2025 and the dovetail profile 2035 of the center mounting portion 2072 of the tray 2012 are captured with respect to the center rail 2023 via the top cover 2031. The top cover 2031 is fastened to the center rail 2023 via fasteners 2081 that are inserted into fastener mounts 2083. The fastener mounts 2083 are located on a divider wall 2085 that is located within the center rail 2023.

The first and second gear wheels 2051a, 2051b are positioned within wheel pockets 2087 formed within the divider wall 2085 of the center rail 2023. The gear wheels 2051 rotate freely once captured by the top cover 2031. Each gear wheel 2051 defines a lower portion having the gear teeth 2053 and an upper portion that acts as a ribbon cable guide or pulley 2089.

As shown in FIG. 73, once the flexible circuit in the form of the ribbon cable 2046 exits the center mounting portion 2072 of the tray 2012 and enters the center rail 2023, the flexible circuit 2046 runs toward the front of the center rail 2023 and is positioned between the center mounting portion 2072 of the tray 2012 and the right side of the divider wall 2085 of the center rail.

Once lead around the first gear wheel 2051a, the flex circuit 2046 is directed toward the rear of the center rail 2023 and is positioned at the left side of the divider wall 2085 (between the divider wall 2085 and the rightmost wall 2045 of the mounting rail 2025 (please see FIG. 73). As shown in FIG. 72, the pocket 2087 that receives the gear wheel 2051 defines a notch 2091 that allows the ribbon cable 2046 to pass from the right side of the divider wall 2085 to the left side of the divider wall 2085.

In this manner, as shown in the top view of FIG. 73, as the tray 2012 is moved back and forth with respect to the chassis 2010 via the slide assembly 2021, any slack within the ribbon cable 2046 is taken up by the first gear wheel 2051a, which acts as a pulley for the ribbon cable 2046.

The portion of the flexible circuit 2046 that resides within the flex pocket 2087 of the mounting rail 2025 remains generally stationary while the portions of the flexible circuit 2046 that are located at both sides of the divider wall 2085 of the center rail 2023 move back and forth as the tray 2012 moves back and forth.

As noted previously, the mounting rail 2025 of the slide assembly 2021 is stationarily fixed with respect to the mounting block 2042, thus, to the chassis 2010. The center rail 2023 slides with respect to the mounting rail 2025. And, the tray 2012 slides with respect to the center rail 2023, at twice the speed of the center rail 2023 relative to the stationary mounting rail 2025 due to the gear arrangement.

When the tray 2012 is in a fully pulled-out position, a pivotable slide lever 2093 is used to lock and release the tray 2012. As shown in FIGS. 72 and 73, the center rail 2025 defines a lever housing 2095 at a front end thereof. The lever housing 2095 houses the slide lever 2093. The slide lever 2093 defines a catch portion 2097 and a finger grip portion 2099. The slide lever 2093 is pivotally coupled to the lever housing 2095 via a pivot hinge 2101 defined by a pivot pin 2103. The slide lever 2093 is laterally biased by a spring 2105 that is within the lever housing 2095. As the lever 2093 is pushed laterally toward the left using the finger grip portion 2099, the spring 2105 is loaded and biases the lever 2093 back toward the right. The catch portion 2097 is configured to interact with an extension latch 2107 defined on the center mounting portion 2072 of the tray 2012.

When the tray 2012 is fully pulled out, the extension latch 2107 locks with the catch portion 2097 of the slide lever 2093. In order to free the tray 2012 and allow it to slide back, the finger grip portion 2099 of the slide lever 2093 is pushed, against the bias of the spring 2105, and the catch portion 2097 is released from the extension latch 2107 of the tray 2012.

Once the tray 2012 starts sliding into the chassis 2010, the tray also makes temporary stops at discrete positions along its travel path. For this purpose, the center rail 2023 defines stop detents 2109 positioned at discrete locations along the center rail 2023. The detents 2109 cooperate with a flexible position latch 2111 located on the center mounting portion 2072 of the tray 2012. The position latch 2111 is located underneath the extension latch 2107 and defines a round profile to facilitate entrance into and removal from the stop detents 2109.

It should be noted that the center rail 2023 is configured with similar features at both the front end and the rear end, such as the slide lever 2093, so that trays 2012 can be accessed and slid from both ends of the chassis 2010 in either the forward direction or the rearward direction.

Figure 119A:
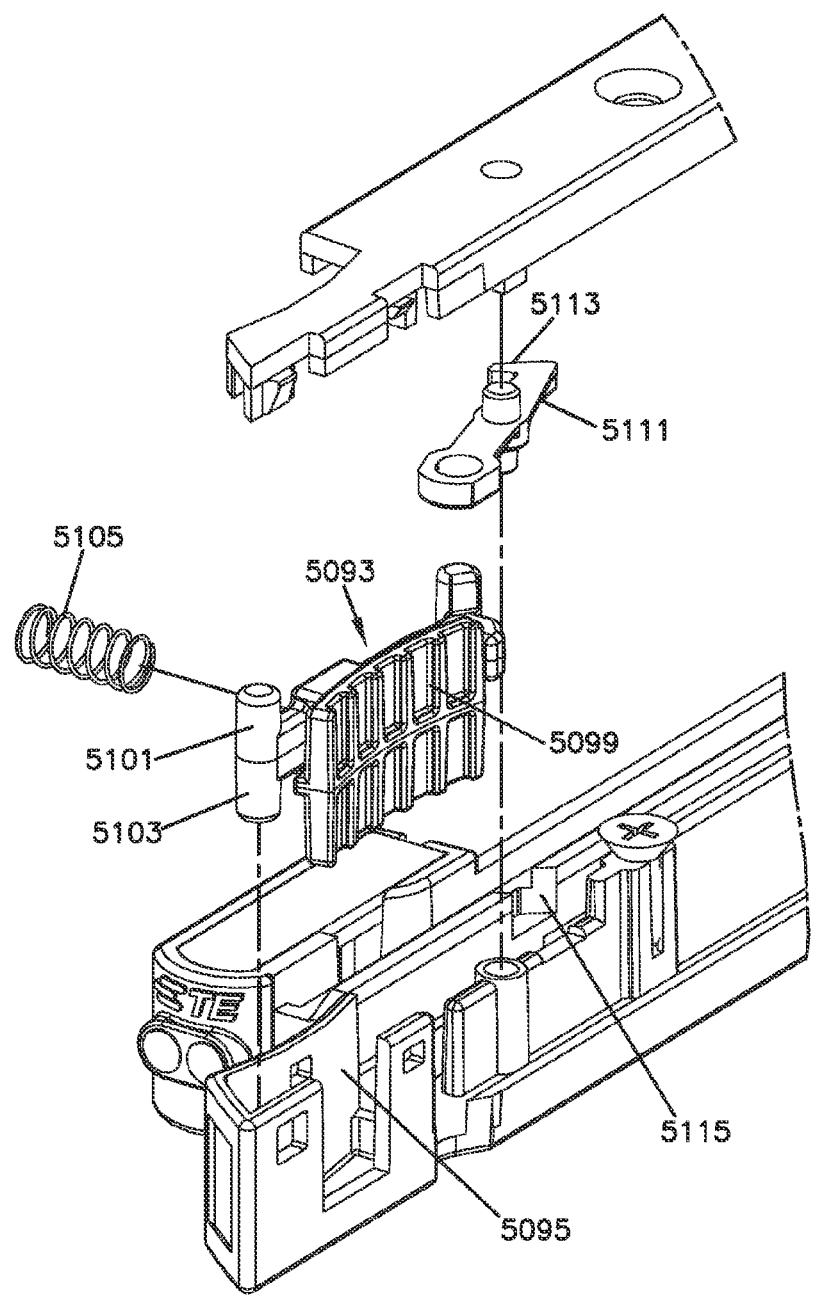
Figure 120B:
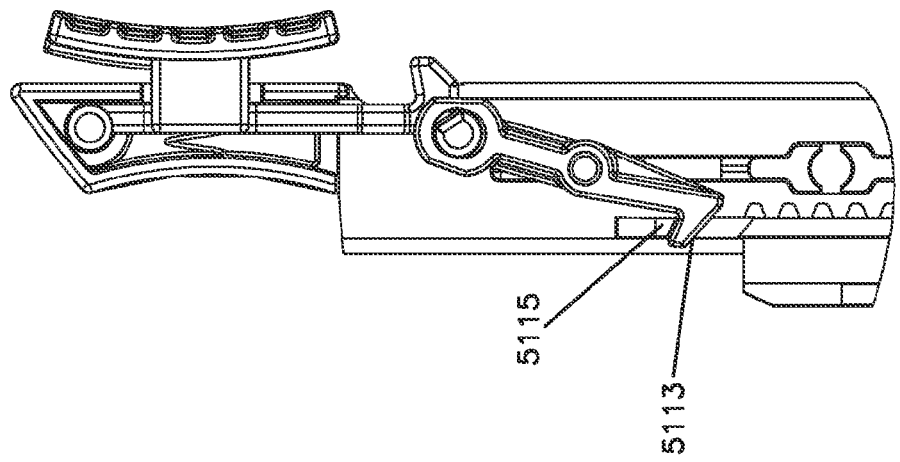
Figure 120A:
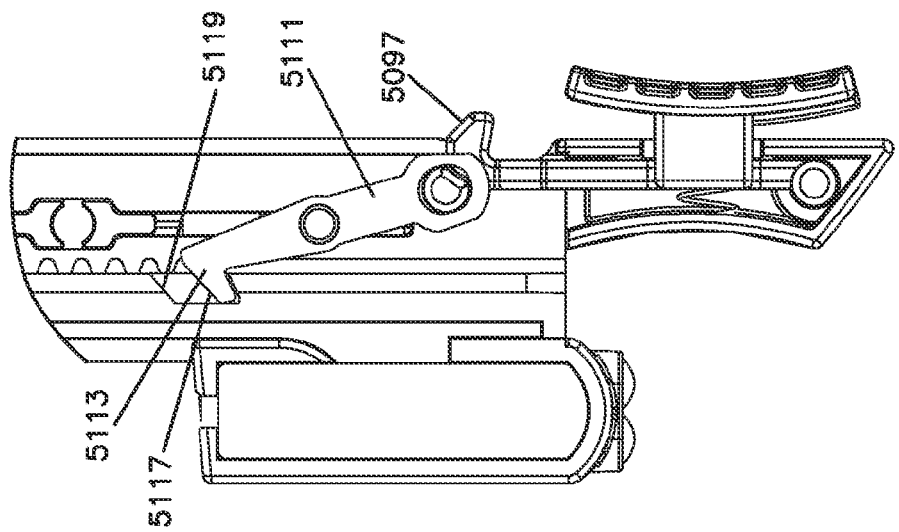
Figure 121:
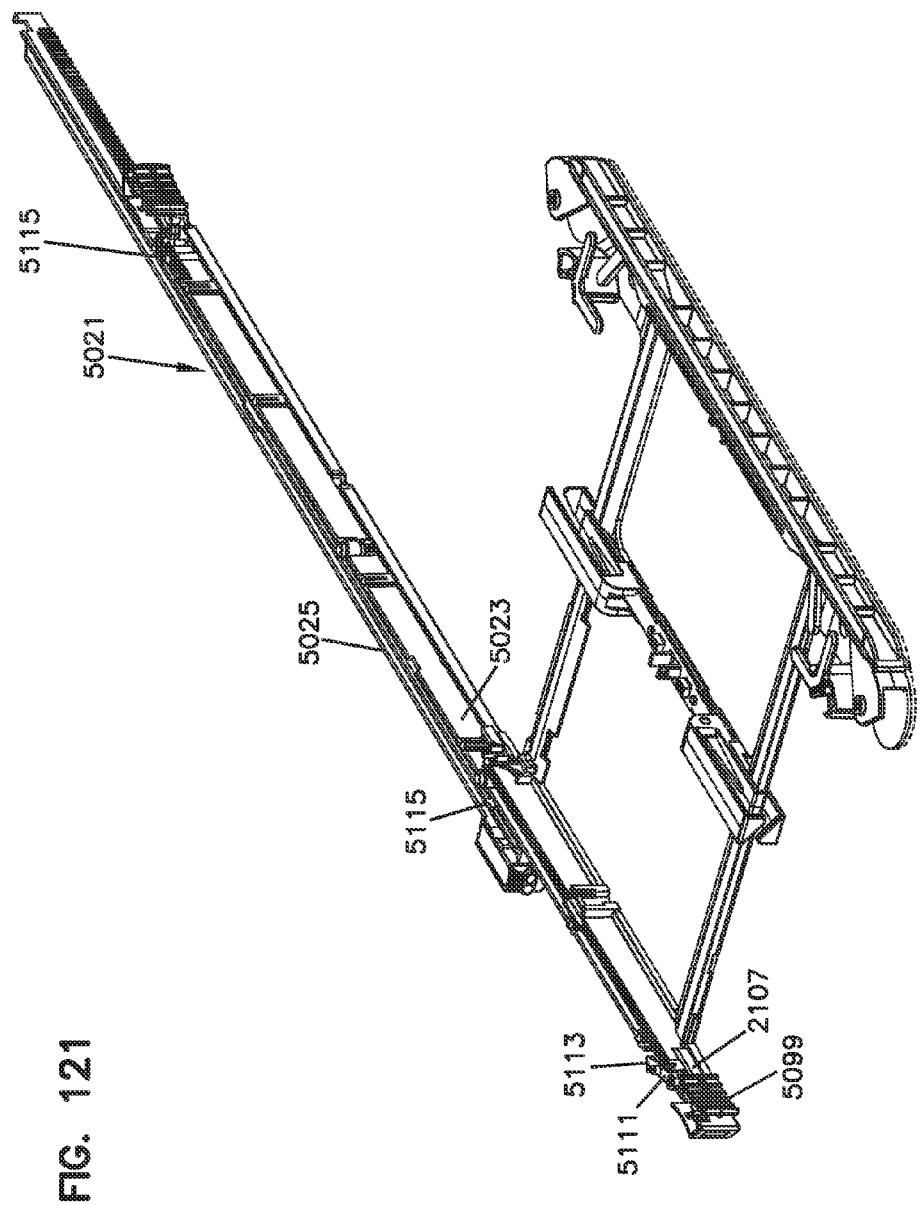

Referring now to FIGS. 119-121, another version of a slide assembly 5021 for mounting a tray such as the tray 2012 to a chassis such as chassis 2010 is illustrated. The slide assembly 5021 includes features similar to slide assembly 2021 of FIGS. 72-73 but also includes certain differences, which will be discussed in further detail.

Still referring to FIGS. 119-121, the slide assembly 5021 includes a further locking arrangement for locking a tray such as tray 2012 at the center position within a chassis.

Similar to slide assembly 2021, slide assembly 5021 defines a mounting rail 5025 that is stationarily fixed with respect to the mounting block 2042, thus, to the chassis 2010. A center rail 5023 of the slide assembly slides with respect to the mounting rail 5025. And, a tray such as the tray 2012 that is mounted using the slide assembly 5021 slides with respect to the center rail 5023, at twice the speed of the center rail 5023 relative to the stationary mounting rail 5025 due to the gear arrangement.

The slide assembly 5021 includes a pivotable slide lever 5093 similar to slide lever 2093 of slide assembly 2021. When a tray is in a fully pulled-out position, the pivotable slide lever 5093 is used to lock and release the tray. As shown in FIGS. 119, 119A, 120, 120A, and 120B, the center rail 5023 defines a lever housing 5095 at a front end thereof. The lever housing 5095 houses the slide lever 5093. The slide lever 5093 defines a catch portion 5097 and a finger grip portion 5099. The slide lever 5093 is pivotally coupled to the lever housing 5095 via a pivot hinge 5101 defined by a pivot pin 5103. The slide lever 5093 is laterally biased by a spring 5105 that is within the lever housing 5095. As the lever 5093 is pushed laterally toward the left using the finger grip portion 5099, the spring 5105 is loaded and biases the lever 5093 back toward the right. The catch portion 5097 is configured to interact with an extension latch such as the extension latch 2107 defined on the center mounting portion 2072 of the tray 2012.

When a tray such as tray 2012 is fully pulled out, the extension latch 2107 locks with the catch portion 5097 of the slide lever 5093. In order to free the tray 2012 and allow it to slide back, the finger grip portion 5099 of the slide lever 5093 is pushed, against the bias of the spring 5105, and the catch portion 5097 is released from the extension latch 2107 of the tray 2012.

Once the tray 2012 starts sliding into the chassis 2010, the tray also makes temporary stops at discrete positions along its travel path. For this purpose, the center rail 5023 defines stop detents 5109 positioned at discrete locations along the center rail 5023. The detents 5109 cooperate with a flexible position latch 2111 located on the center mounting portion 2072 of the tray 2012. The position latch 2111 is located underneath the extension latch 2107 and defines a round profile to facilitate entrance into and removal from the stop detents 5109.

The center rail 5023 is configured with similar features at both the front end and the rear end, such as the slide lever 5093, so that trays such as trays 2012 can be accessed and slid from both ends of the chassis 2010 in either the forward direction or the rearward direction.

As noted above, in addition to the stop detents 5109 positioned at discrete locations along the center rail 5023, the slide assembly 5021 includes a further locking feature for locking a tray such as tray 2012 at the center position within a chassis such as chassis 2010.

As shown in FIGS. 119-121, the slide assembly 5021 includes a pivot lever 5111 that is pivotally connected to the slide lever 5093. The pivot lever 5111 includes a second catch portion 5113 that is configured to fit within a detent 5115 located on the mounting rail 5025 of the slide assembly 5021. When the tray 2012 is positioned at the central position within the chassis 2010, the second catch portion 5113 is positioned within the detent 5115. Since the slide lever 5093 is laterally biased by the spring 5105 toward the right, the pivot lever 5111 is biased to pivot in a counter-clockwise direction and the second catch portion 5113 sits within the detent 5115 under the bias force of the spring 5105.

When the tray 2012 needs to be moved from the central position and pulled forwardly, the lever 5093 is pushed laterally toward the left using the finger grip portion 5099 and the spring 5105 is compressed. Pushing the lever 5093 laterally leftwardly pivots the lever 5111 in a clockwise direction and frees the second catch portion 5113 from the detent 5115, allowing the tray to now be slid forwardly.

It should be noted that the center rail 5023 is configured with similar features at both the front end and the rear end such as the pivot lever 5111, so that trays 2012 can be accessed and slid from both ends of the chassis 2010 in either the forward direction or the rearward direction as they are released from a central position within the chassis 2010.

As shown in the close-up view in FIG. 120A, the second catch portion 5113 and the detent 5115 both include complementary angled faces 5117, 5119 such that if the tray 2012 is pulled from the rear end of the chassis 2010, the angled face 5117 of the second catch portion 5113 at the front of the slide assembly can automatically clear the detent 5115 as the center rail 5023 is moved with respect to the mounting rail 5025.

When a tray 2012 is not at the central position, the second catch portions 5113 of the pivot levers 5111 are either not in contact with or simply ride along the surface of the mounting rail 5025 and are not used in locking the tray. Please see FIGS. 121, 121A, and 121B. When the tray 2012 is at a forward or backward position as shown in FIGS. 121, 121A, and 121B, only the slide lever 5093 is used in locking the tray 2012.

FIGS. 120, 120A, and 120B illustrate a tray such as the tray 2012 locked in a central position within the chassis 2010, wherein both the front and rear pivot levers 5111 are being used to lock the tray. When moving the tray from the central position either forwardly or rearwardly, the finger grip portion 5099 of the corresponding slide lever 5093 (either front or back) has to be pressed to move the pivot lever 5111 attached to that slide lever 5093 in freeing the tray.

Thus, the slide assembly 5021 includes features that allow locking of the trays, not only in the forward and rearward positions, but also at the central position, wherein the trays will not be accidentally moved from their neutral position without engaging, once again, the finger grip portions 5099 of the slide levers 5093.

Figure 75:
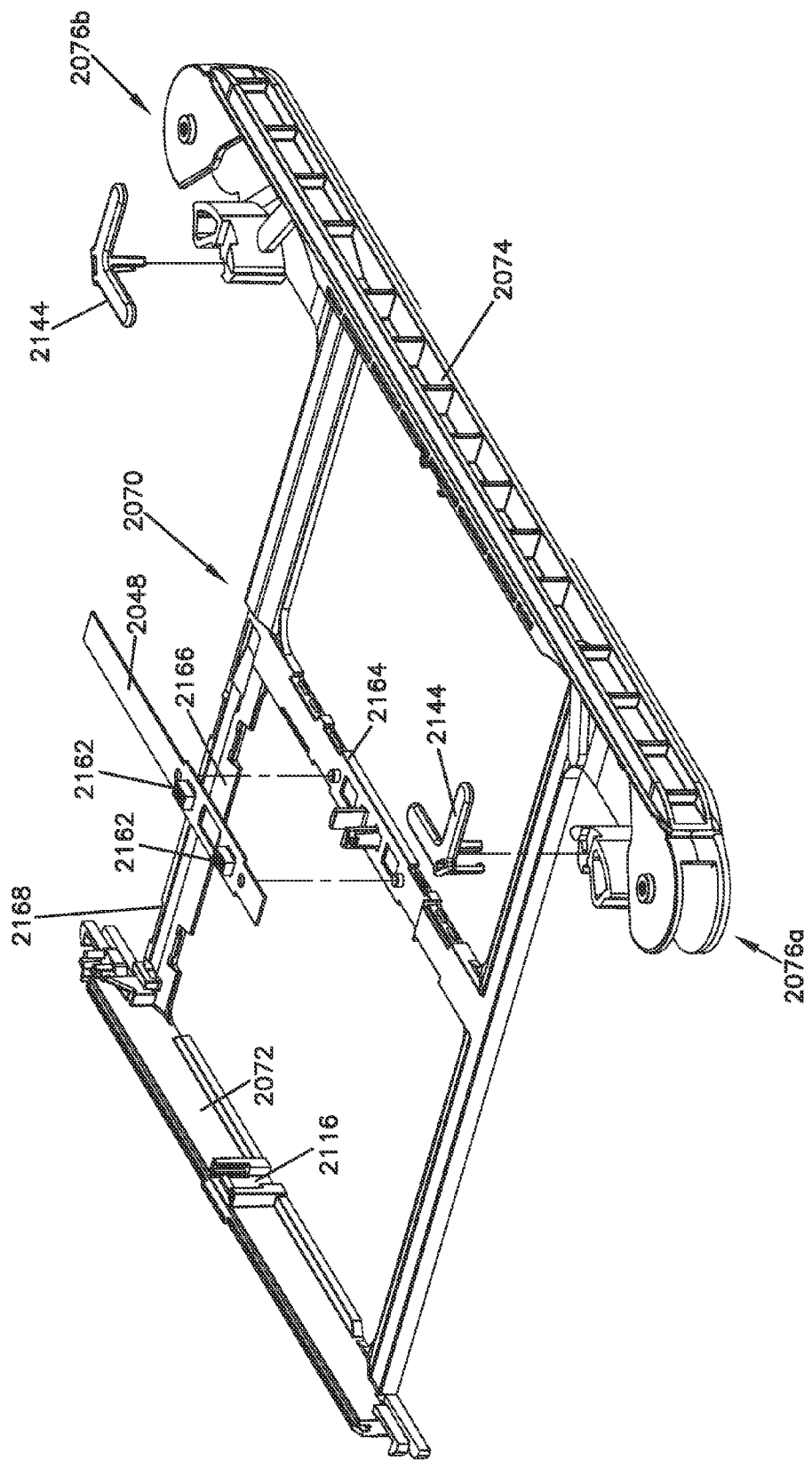
FIG. 75 illustrates the tray of FIG. 70 removed from the slide assembly of FIG. 72, the tray defining a main connection portion, a center mounting portion, and a side mounting portion.

Referring now back to FIG. 75, the main connection portion 2070 of the tray 2012 is located between the center mounting portion 2072 and the side mounting portion 2074 and is configured to define connection locations for the tray 2012. By stacking a plurality of the trays 2012 on a distribution chassis 2010, density of connections for fiber optic transmission can be increased and the slidability of the trays 2012 in either the front direction or the rear direction provides for easy access at both the front or the rear of the distribution chassis 2010.

As shown in FIG. 75, the depicted version of the main connection portion 2070 of the tray 2012 includes a mount 2116 for mounting fiber optic adapters which define the fiber optic connection locations in the present embodiment of the tray 2012. Specifically, in the tray 2012 shown and described in the present application, the fiber optic connection locations may be defined by adapters having an LC type footprint. In the depicted embodiments, twenty-four LC adapters may be mounted to the mount 2116 via a snap-fit connection defined on the mount 2116. In the high density distribution chassis 2010 shown in the present disclosure, six slidable trays 2012 may be mounted on a 1RU of rack space, providing 144 LC connections as noted above.

As noted earlier, other standards of fiber optic adapters (such as SC or MPO adapters) can be mounted to the mount 2116. Fiber optic adapters are only one type of fiber optic equipment that provides connection locations for the tray 2012 and the tray 2012 can be used with other types of fiber optic equipment. For example, equipment such as fiber optic splitters, couplers, multiplexers/demultiplexers, or other types of equipment wherein cables may be routed away from the connection locations may be housed on the main connection portion 2070.

If fiber optic adapters are used, the connection locations may be defined by adapters individually mounted in the mount 2116 or may be defined by adapter block assemblies that include integrally formed adapters in block form, as shown in the previously depicted embodiments. In other embodiments, the connection locations may be in the form of a cassette that may include fiber optic adapters on one side wherein the opposite side may have a multi-fiber connector or a cable extending outwardly therefrom, with optical fibers normally housed within such a cassette.

Examples of devices that may define the connection locations such as the adapter block assemblies or cassettes are illustrated and described in further detail in U.S. Patent Applications having Ser. Nos. 61/761,048, 61/761,034, and 61/761,042, all entitled "Optical Assemblies with Managed Connectivity," which applications have been filed on Feb. 5, 2013; U.S. Patent Applications having Ser. Nos. 61/843,733, 61/843,718, and 61/843,752, all entitled "Optical Assemblies with Managed Connectivity," which applications were filed on Jul. 8, 2013; and U.S. Patent Applications having Ser. Nos. 14/170,157, 14/169,912, and 14/169,882, all entitled "Optical Assemblies with Managed Connectivity," which applications are being filed concurrently herewith, which are all incorporated by reference in their entireties.

As noted previously, the chassis or panels 2010 may be available in 1-rack-unit (1RU) and 4-rack-unit (4RU) sizes. The 1RU panels may house 144 mated LC connector pairs, 72 SC connector pairs or 48 MPO connector pairs. The 4RU panels may house four times the number of connections as the 1RU units with the same functionality.

Within each panel 2010 and within each tray 2012, the connection locations may be accessible from both the front 2032 and the back 2034 of the panel 2010. An adapter block assembly may be installed on a sliding tray 2012 such that it resides toward the center portion of the panel 2010. The trays 2012 can be slid forwardly or rearwardly to access the front connections or the rear connections of an adapter block assembly.

Cable management is an important aspect of a high density distribution panel or frame when managing a high density of cables extending from the front and rear ends of the adapter block assemblies that may be mounted on the trays 2012.

As discussed above, each tray 2012 is configured to include a cable management portion 2076 for managing cables from the connection locations to and away from the chassis 2010 both for the cables extending from the front ports of the adapters and from the rear ports of the adapters. The cable management portions 2076 of the trays 2012 are configured such that they accommodate any cable slack during the forward and rearward slidable movements of the trays 2012, while maintaining minimum bend radius requirements of the cables. Also, the cable management portions 2076 of the trays 2012 are designed to keep the same length of cabling from the connection locations to the exterior of the chassis 2010 so as to prevent any pulling or pinching of the cables and to limit the need for excess slack cabling.

The cable management portion 2076 of each tray 2012 may be defined by a front cable management portion 2076*a* and a rear cable management portion 2076*b*. It should be noted that the front and rear cable management portions 2076*a*, 2076*b* are similar in configuration and only the front cable management portion 2076*a* will be discussed herein for ease of description, with the understanding that all of the inventive features of the front cable management portion 2076*a* of a given tray 2012 are fully applicable to the rear cable management portion 2076*b*.

Referring now to FIGS. 71 and 76-78, the front cable management portion 2076*a* is defined by a radius limiter 2124 that is located adjacent the side mounting portion 2074 of the tray 2012 and a link arm assembly 2126 made up of five cable management link arms 2128, which are attached between the radius limiter 2124 and the front of the end support 2044 of the tray assembly 2024. The side mounting portion 2074 of the tray 2012 also includes removable cable management fingers 2144 that are snap fit over the radius limiters 2124 to manage the cables therearound.

In the depicted embodiment, the cable management portion 2076 of the trays 2012 are configured for top and side loading of the cables thereinto. As shown in FIGS. 71 and 76-78, the radius limiter 2124 defines a generally curved cable channel 2142 with the removably-mounted inwardly extending cable management fingers 2144 for retaining cables once therein. In such an example, the cables can be top loaded into the radius limiter 2124 as they extend from the connection locations.

The link arms 2128 are configured to swing forwardly and out of the way for access to the front of the adapter block assembly 2120 when the tray 2012 is pulled forwardly. When a technician is done accessing and/or loading the front connectors, the tray 2012 is pushed back to its original closed location.

The link arms 2128 are defined by five link arms that are pivotally coupled with respect to each other so as to define a limited pivotal movement therebetween. All of the link arms 128 include snap-fit coupling features defined, for example, by cylindrical tabs 2148 on a first male end 2150 and cylindrical receptacles 2152 on an opposite second female end 2154 for providing the pivotal movement.

The five link arms include a first link arm 2128a that is directly pivotally coupled to the front of the end support 2044 of the tray assembly 2024. The first link arm 2128a is pivotally connected to the end support 2044 such that it can move between a transverse position when the tray 2012 is closed to a longitudinal orientation when the tray 2012 is fully open, similar to the view shown in FIG. 22. A contact surface 2146 defined on the first link arm 2128a prevents further movement of the first link arm 2128a with respect to the end support 2044. The next link arm 2128b of the link arm assembly 2126 is configured to house an extension spring 2113 that is configured to bias the link arm assembly 2126 and thus the tray 2012 to a closed position, as will be discussed in further detail below.

The next two link arms 2128c are configured to have the same shape as each other. Each of the similar link arms 2128c are coupled back to back from the second link arm 2128b toward a fifth link arm 2128d that is connected to the radius limiter 2124 of each tray 2012. Each of the link arms 2128, as in the first link arm 2128a, defines contact surfaces 2156 such that they are limited in their pivotal movement with respect to each other. For example, the link arm 2128b that is directly coupled to the first link arm 2128a might define a contact surface 2156 to prevent further pivotal movement with respect thereto when the tray 2012 is fully open. Each of the link arms 2128, including the first link arm 2128a, is designed such that regardless of position of the moving tray 2012, the cables contained therewithin will not violate the minimum bend radius requirements.

Figure 76:
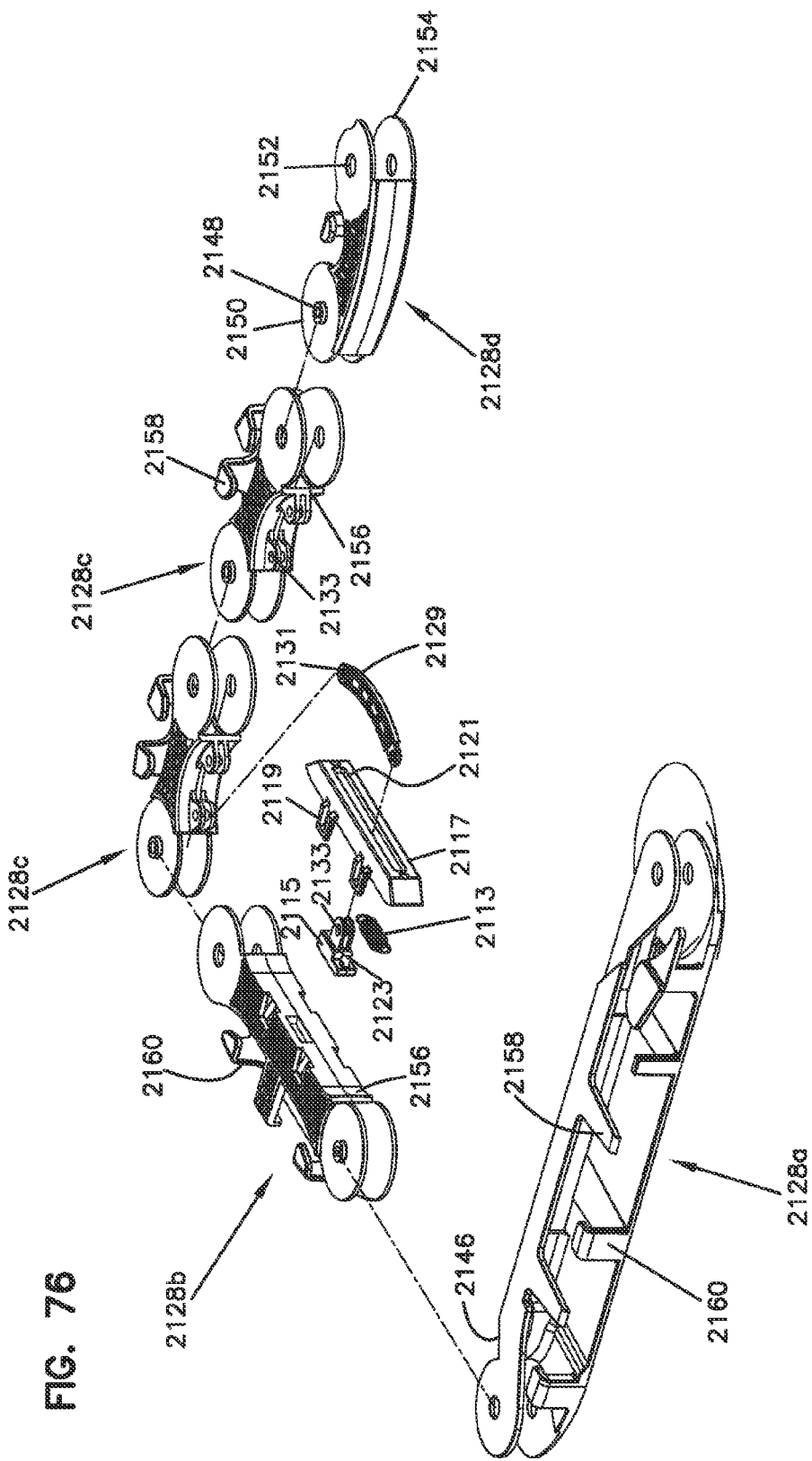
FIG. 76 illustrates an exploded view of a cable management portion of one of the first trays of the first tray assembly of the chassis of FIGS. 62-65.
Figure 77:
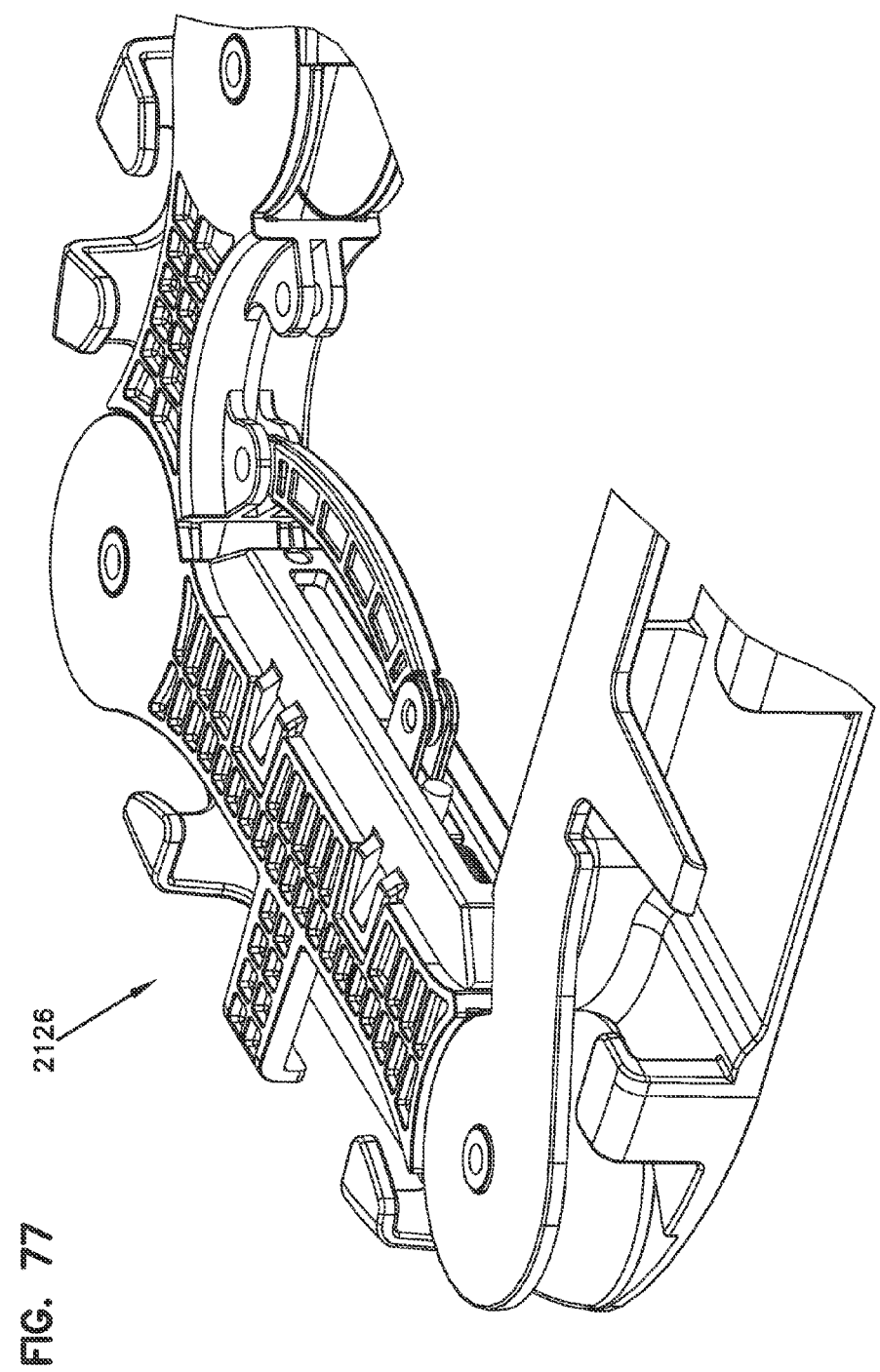
FIG. 77 illustrates a portion of a fully assembled configuration of the cable management portion of the first tray of FIG. 76.
Figure 78:
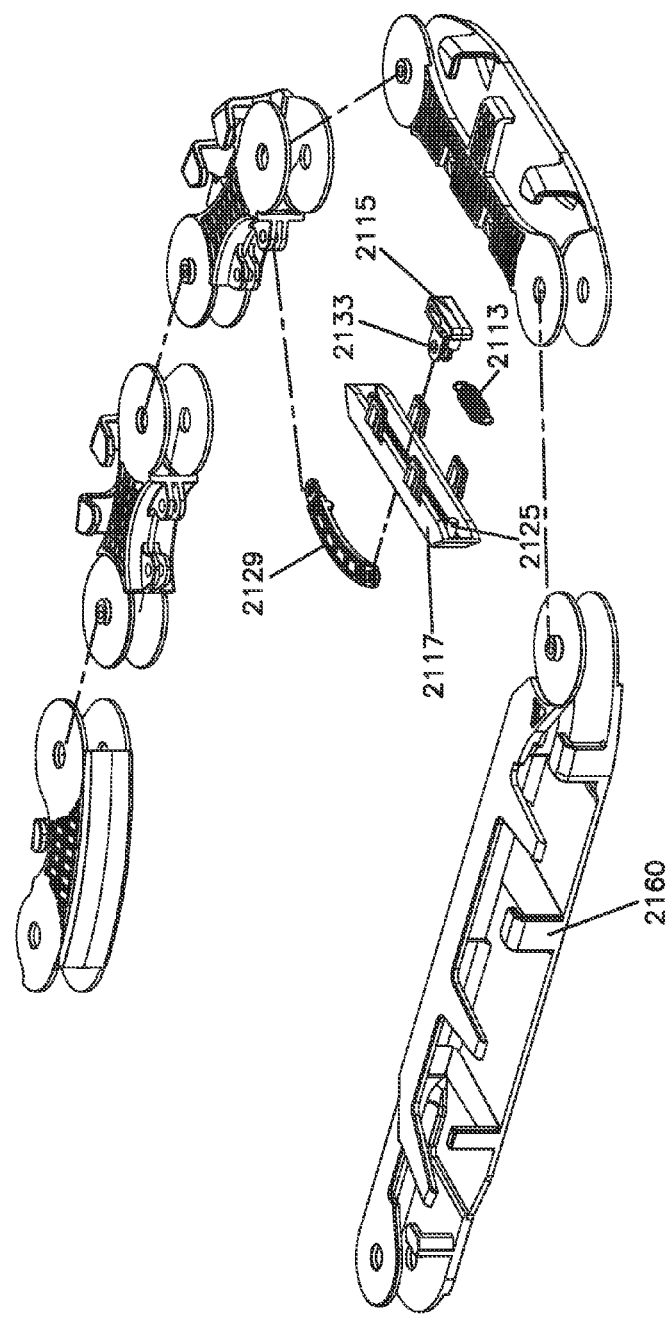
FIG. 78 illustrates an exploded view of a cable management portion of one of the second trays of the second tray assembly of the chassis of FIGS. 62-65.

Referring now specifically to FIGS. 76-78, exploded views of a right link arm assembly 2126 and a left link assembly 2126 are shown, illustrating the extension springs 2113 that are configured to bias the link arm assemblies 2126 and thus the trays 2012 to a closed position. In the link arm assembly 2126, the link arm 2128b is configured to support a slidable spring mount 2115. A spring mount cover 2117 captures the slidable spring mount 2115 against the link arm 2128b and snaps onto the link arm 2128b with snap-fit structures 2119. The spring mount cover 2117 defines a track 2121 along which the slidable spring mount 2115 can slide. The extension spring 2113 is mounted between a mount pin 2123 defined on the slidable spring mount 2115 and a mount pin 2125 defined on the spring mount cover 2117 (please refer to FIG. 78). As the slidable spring mount 2115 slides away from the pin 2125 of the spring mount cover 2117, the extension spring 2113 is extended under a load. When at an extended position, the spring 2113 biases the slidable spring mount 2115 toward its initial position. The slidable spring mount 2115 is linked to one of the link arms 2128c with a spring mount link 2129. The spring mount link 2129 defines male snap-fit structures in the form of pins 2131 that are received into female snap-fit structures in the form of receptacles 2133 that are provided both on the slidable spring mount 2115 and the link arm 2128c.

In this manner, when the link arm 2128b and the link arm 2128c pivot relative to each other, the slidable spring mount 2115 is slidably moved via the spring mount link 2129. As the slidable spring mount 2115 is moved with respect to the spring mount cover 2117 along its track 2121, the spring 2113 extends and is loaded with a biasing force. Thus, when the link arms 2128b and 2128c are pivoted to an angle that is larger than 90 degrees, the spring 2113 biases the link arms 2128b and 2128c to a generally 90-degree, right angle position and starts to pull the entire link arm assembly 2126 back into the tray 2012. The initial pull provided by the extension spring 2113 facilitates moving the link arm assembly 2126 and the tray 2012 back into the chassis 2010. Although only one of the link arms 2128b is used with the extension spring 2113, the two link arms 2128b are manufactured with the same features, including receptacles 2133 for receiving an end of the spring mount link 2129, for manufacturing efficiency purposes. Also, although only one of the link arm assemblies 2126 has been described herein with respect to having an extension spring 2113, it should be noted that an extension spring 2113 is used on all four corners of the chassis 2010 to facilitate closing of the trays.

Referring now to FIGS. 87-95, another feature that facilitates the closing and opening of the link arm assemblies is illustrated. This feature, as illustrated in FIGS. 87-95, includes a compression spring assembly 4115 that is configured to bias a first link arm away from the adjacent link arm attached thereto. It should be noted that the compression spring assembly 4115 is shown with an alternative embodiment of a link assembly 4126 that has features similar to the link assemblies 2126 discussed above. The link assembly 4126, which will be discussed in further detail below, includes certain additional features to that of the link assembly 2126.

Still referring to FIGS. 87-95, the compression spring assembly 4115 is configured bias the first link arm 4128a away from the link arm 4128b so as to provide a generally 90-degree angle between the two arms 4128a, 4128b. The biasing provided by the compression spring assembly 4115 facilitates closing and opening of the link arm assembly 4126. During opening, the link arm 4128b applies a contact force on the spring assembly 4115, which in turn applies a force on the first link arm 4128a to spread the two link arms apart to generally a 90-degree position to help establish a smooth opening motion for the arms 4128a, 4128b. Similarly, during closing, the link arm 4128a applies a contact force on link arm 4128b through the compression spring assembly 4115 and forces the link arm 4128b away from link arm 4128a to start moving it in the closing direction.

Figure 89:
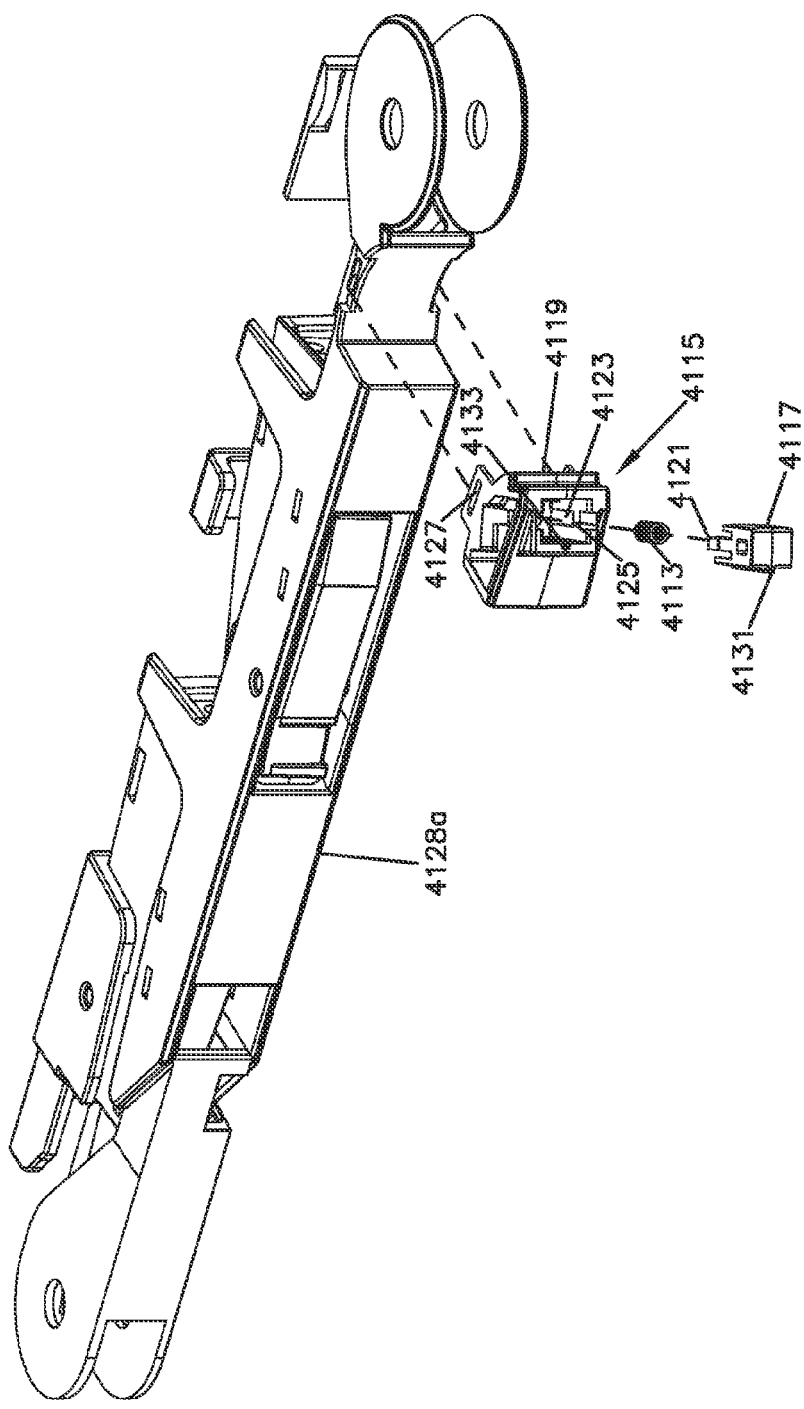
FIG. 89 illustrates the compression spring assembly exploded off the first link arm of FIG. 87.
Figure 90:
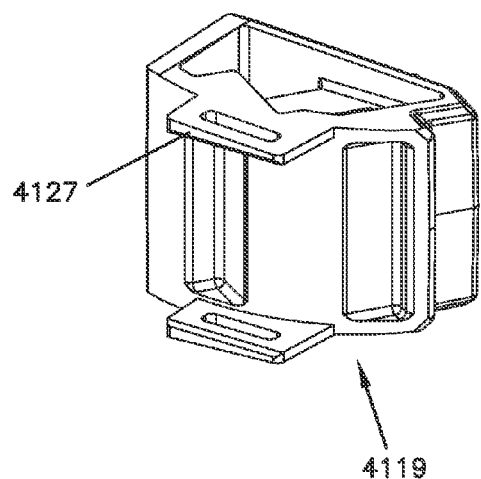
FIG. 90 is a perspective view of a spring housing of the compression spring assembly of FIG. 87.
Figure 91:
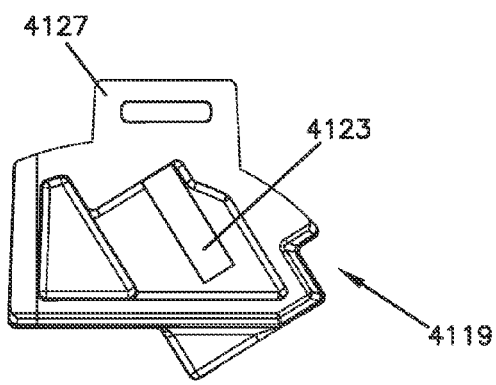
FIG. 91 is a top view of the spring housing of FIG. 90.
Figure 92:
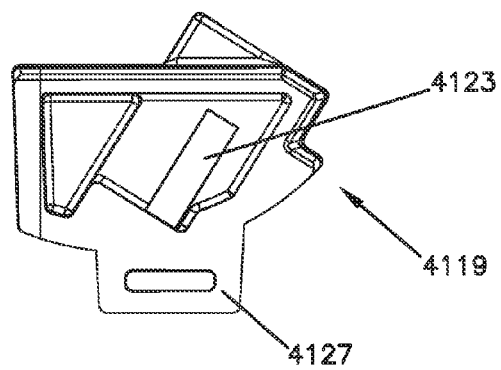
FIG. 92 is a bottom view of the spring housing of FIG. 90.
Figure 93:
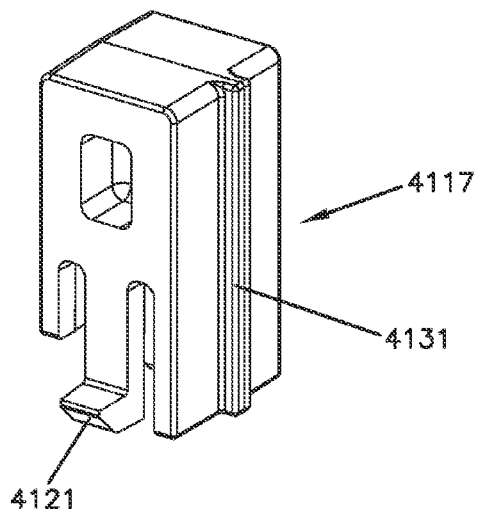
FIG. 93 is a perspective view of a slider of the compression spring assembly of FIG. 87.
Figure 94:
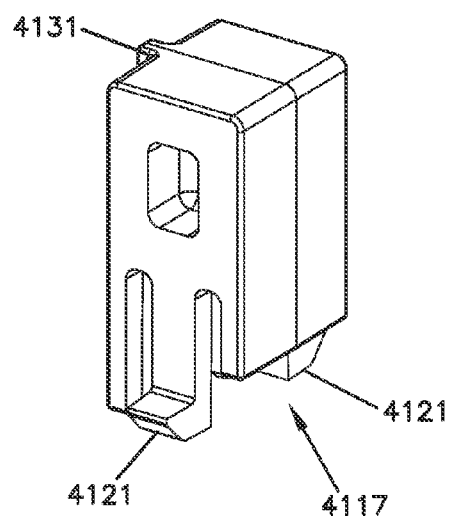
FIG. 94 is another perspective view of the slider of FIG. 93.
Figure 95:
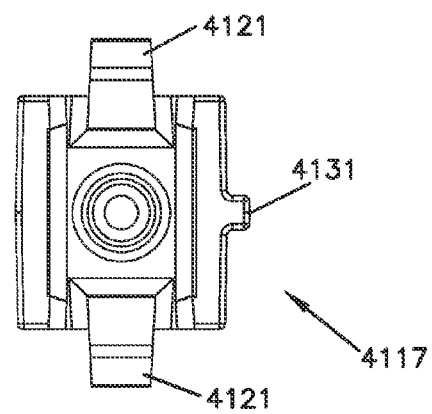
FIG. 95 is a front view of the slider of FIG. 93.

As shown in the exploded view provided by FIG. 89, the compression spring assembly 4115 includes a slider 4117 that is mounted within a spring housing 4119. The slider 4117 is biased away from the spring housing 4119 via a compression spring 4113 that is captured between the slider 4117 and the spring housing 4119. The slider 4117 defines a pair of tabs 4121 that slide within opposing tracks 4123 provided in the spring housing 4119. The slider 4117 is limited in its movement away from the spring housing 4119 due to stops 4125 formed at the ends of the tracks 4123, which are contacted by the tabs 4121 of the slider 4117. The slider 4117 and the spring housing 4119 include further guiding or keying features 4131, 4133 for slidably guiding the slider 4117 within the spring housing 4119. The spring housing is shown in isolation in FIGS. 90-92 and the slider is shown in isolation in FIGS. 93-95.

The spring housing 4119 includes snap-fit features 4127 for latching the spring housing 4119 to the first link arm 4128a as shown in FIGS. 87-92. The features provided on the first link arm 4128a, such as snap-fit tabs 4129, are some of the differences provided on the alternative version of the link assembly 4126 as compared to the link assembly 2126 discussed earlier. Certain other differences for the version of the link assembly 4126 will be discussed in further detail below.

Referring now back to FIGS. 76-78, according to one example embodiment, as shown in FIGS. 76-78, all of the link arms 2128 (and link arms 4128) may be designed for top and side loading of the cable, wherein cable management tabs 2158 might be located on the peripheral edges 2160.

The first link arm 2128a that is directly attached to one of the end supports 2044 of the tray assembly 2024 may be designed to hold structures such as fanouts, which are devices that transition fiber from one high-fiber-count cable to multiple single-fiber-count cables.

The version of the link arm assembly 4126 that has features similar to link arm assembly 2126, as shown in FIGS. 96-118, is illustrated with such features designed to hold equipment such as fanouts. The features for holding equipment such as fanouts are some of the other differences provided on the alternative version of the link assembly 4126 as compared to the link assembly 2126 discussed above.

Still referring to FIGS. 96-118, in the version of the link assembly 4126, the first link arm 4128a includes features for holding different sized fanouts. In the depicted embodiment, the first link arm 4128a includes features for holding two different sized fanouts.

Figure 96:
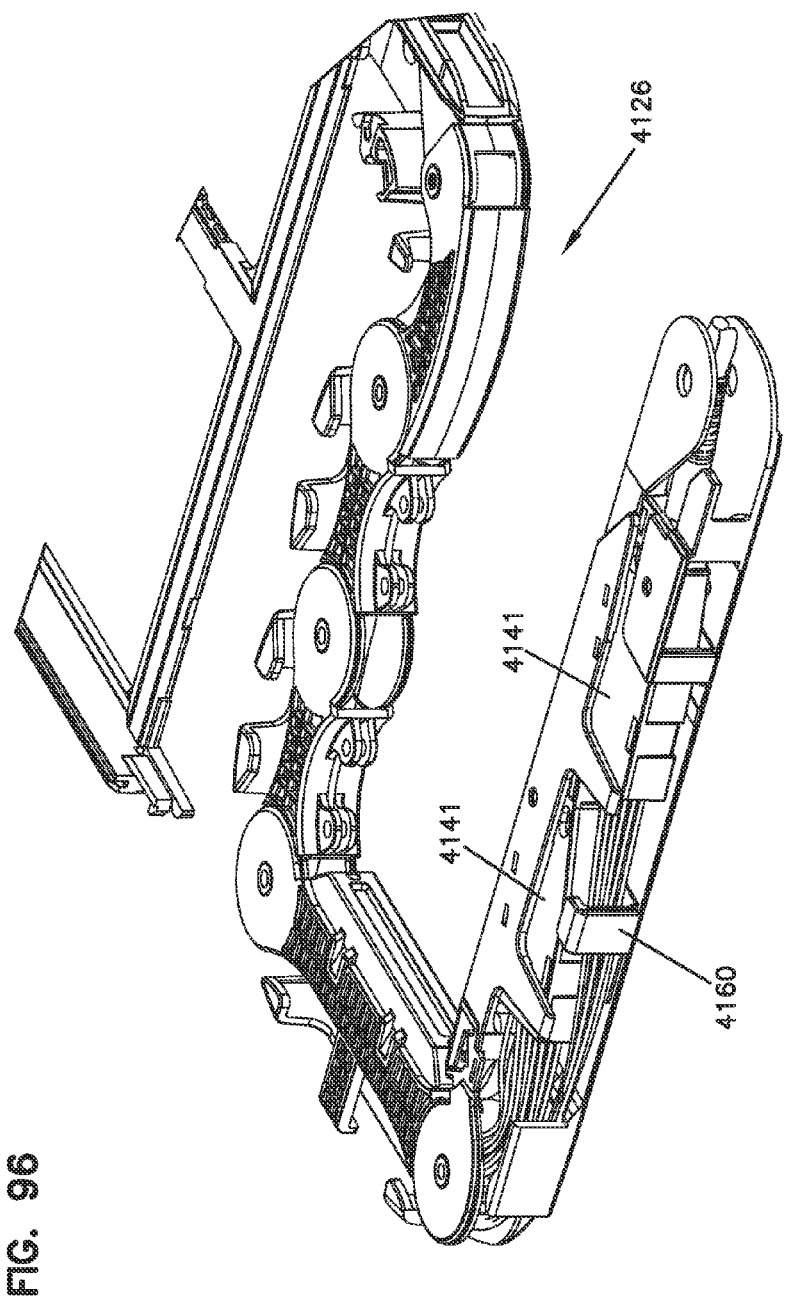
FIG. 96 illustrates a perspective view of the link arm assembly of FIG. 87 with a pair of first fanouts mounted on the first link arm.
Figure 97:
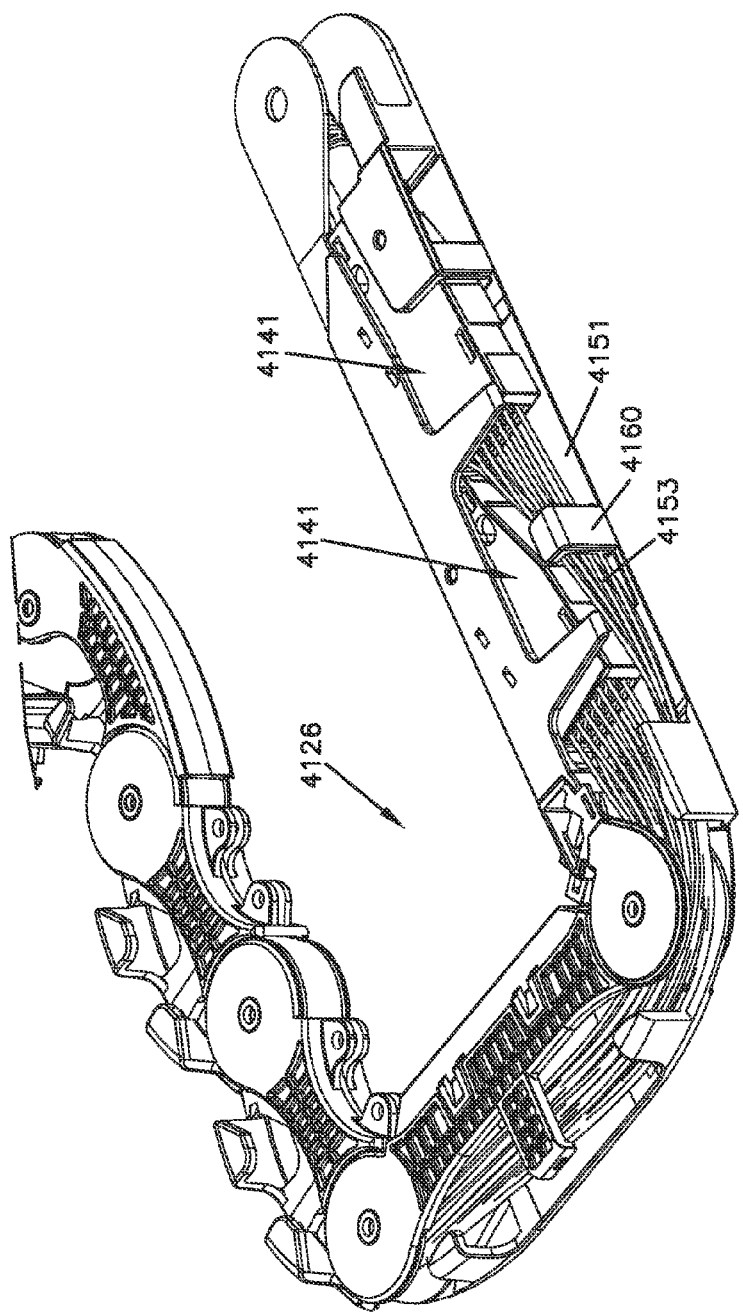
FIG. 97 illustrates another perspective view of the link arm assembly of FIG. 96.
Figure 98:
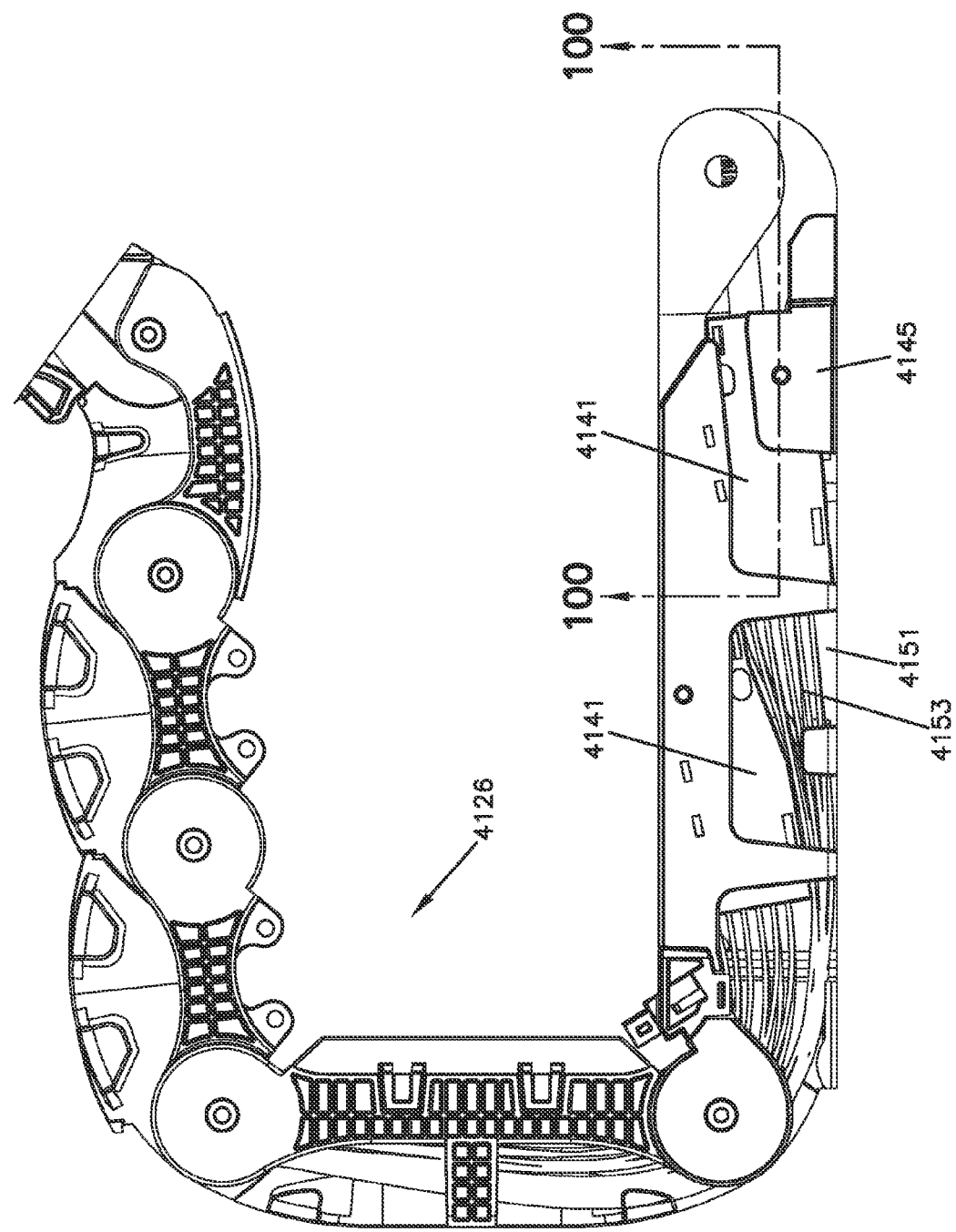
FIG. 98 illustrates a top view of the link arm assembly of FIG. 96.
Figure 99:
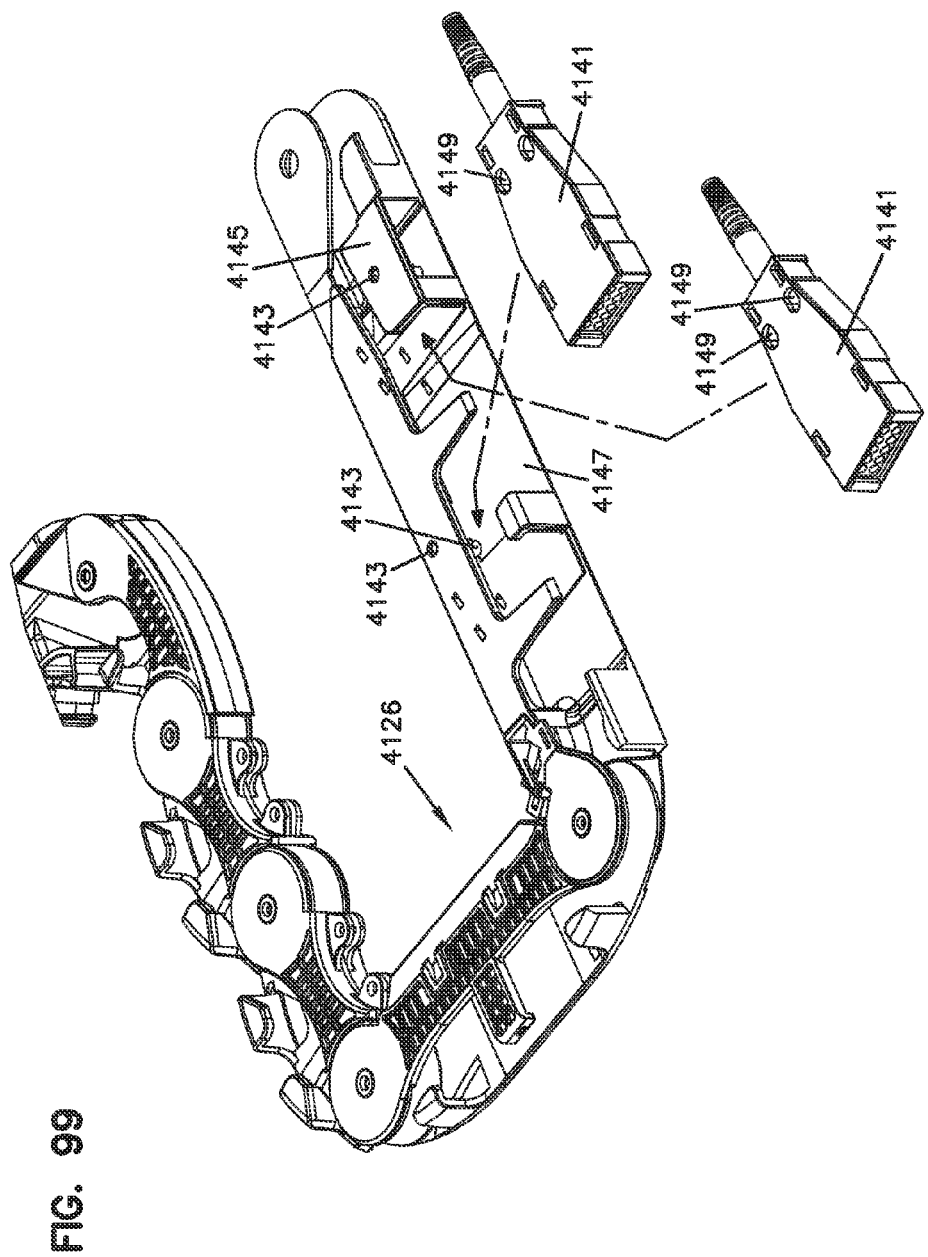
FIG. 99 illustrates the first fanouts exploded from the first link arm of the link arm assembly of FIG. 96.
Figure 100:
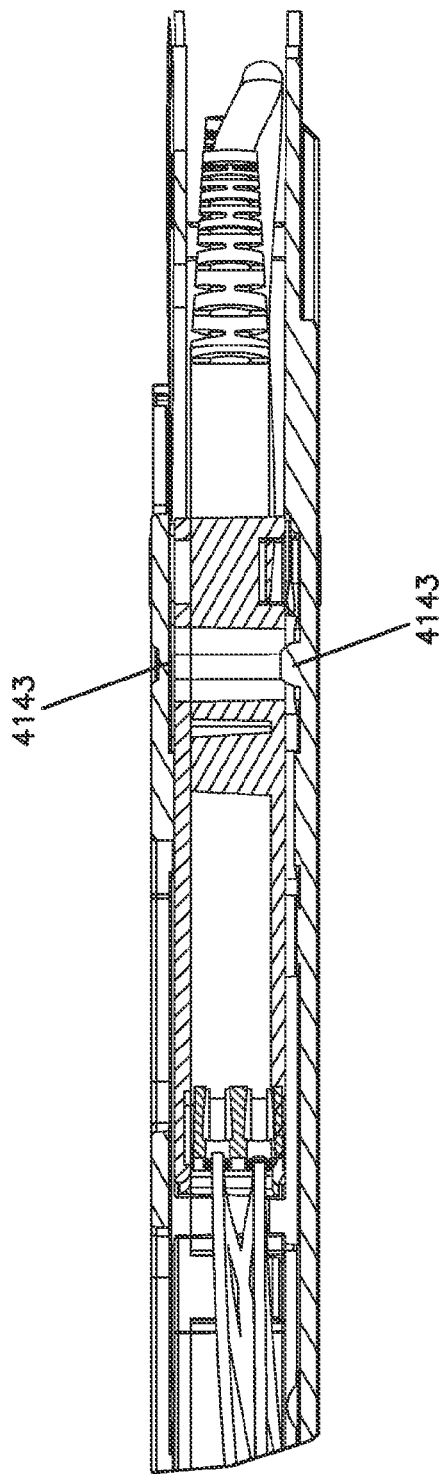
FIG. 100 is a cross-sectional view taken along a line 100-100 of FIG. 98.
Figure 101:
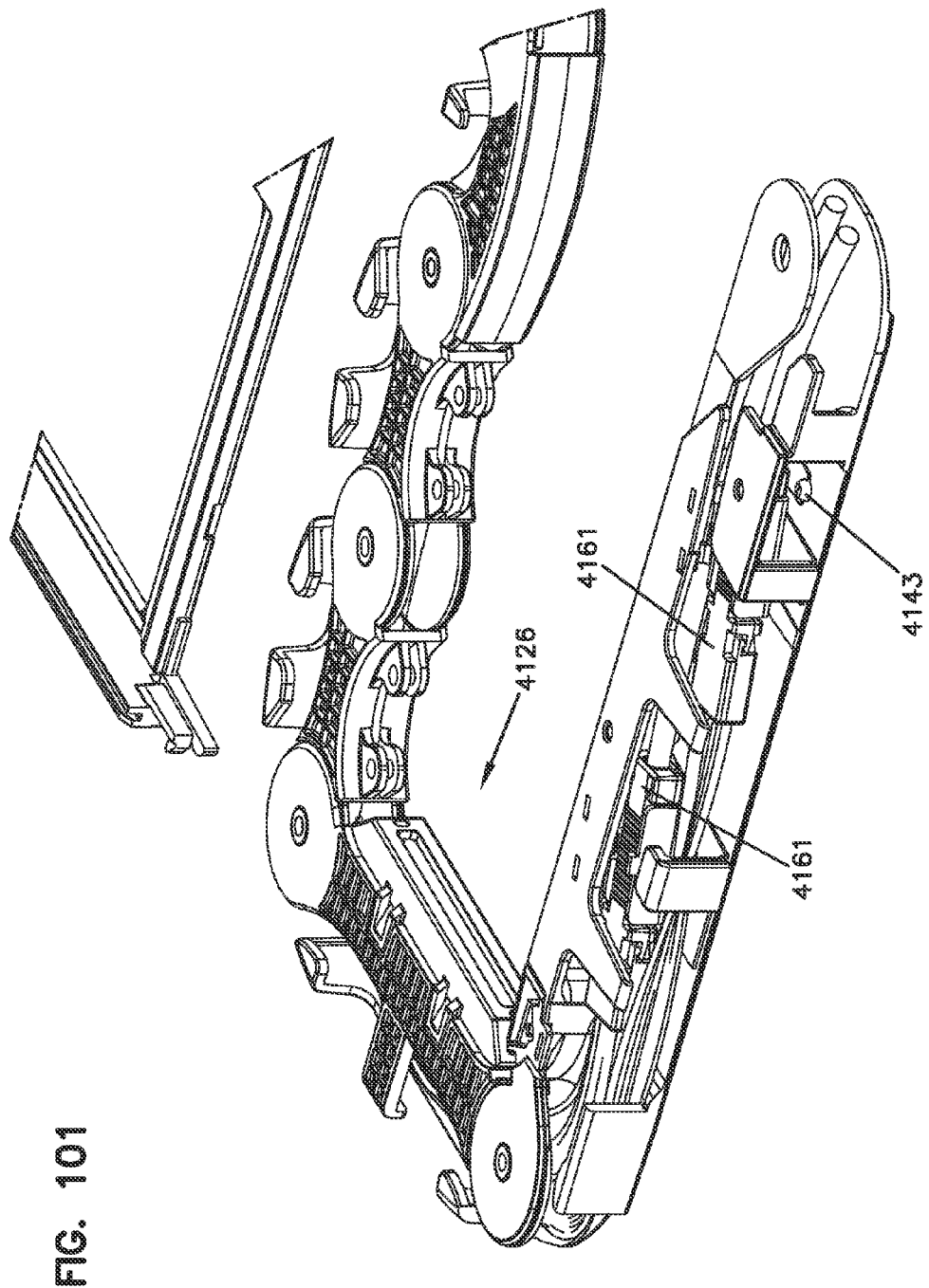
FIG. 101 illustrates a perspective view of the link arm assembly of FIG. 87 with a pair of second fanouts mounted on the first link arm.
Figure 102:
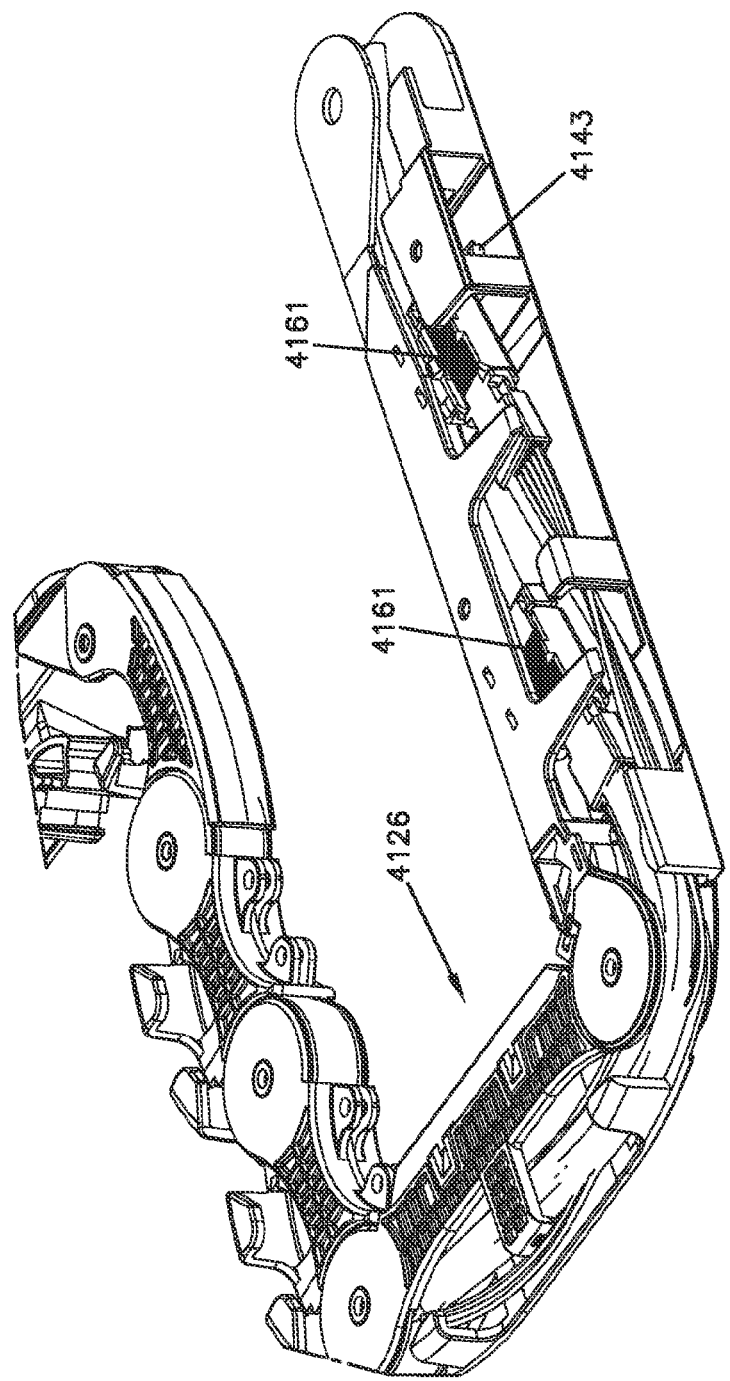
FIG. 102 illustrates another perspective view of the link arm assembly of FIG. 101.
Figure 103:
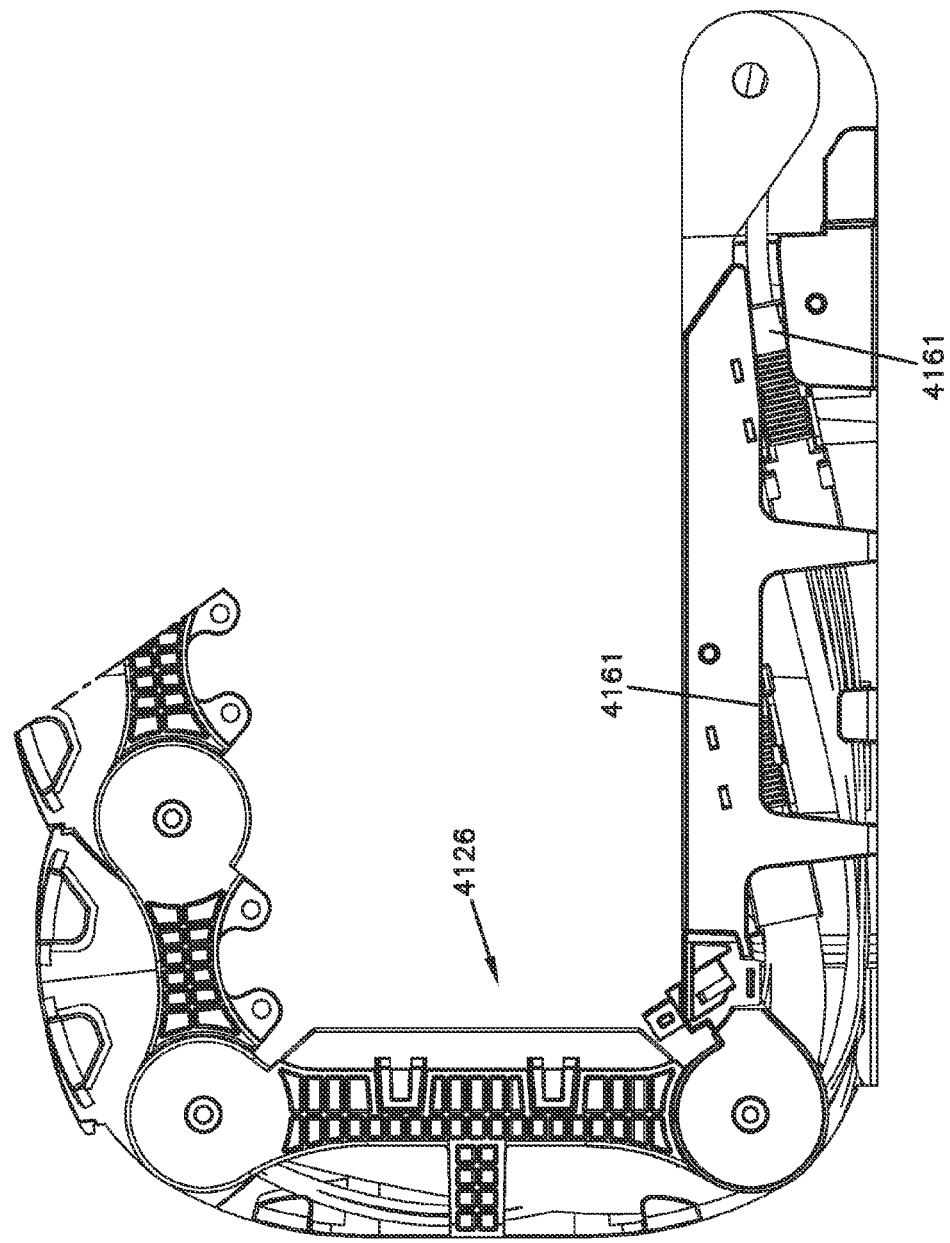
FIG. 103 illustrates a top view of the link arm assembly of FIG. 96.
Figure 104:
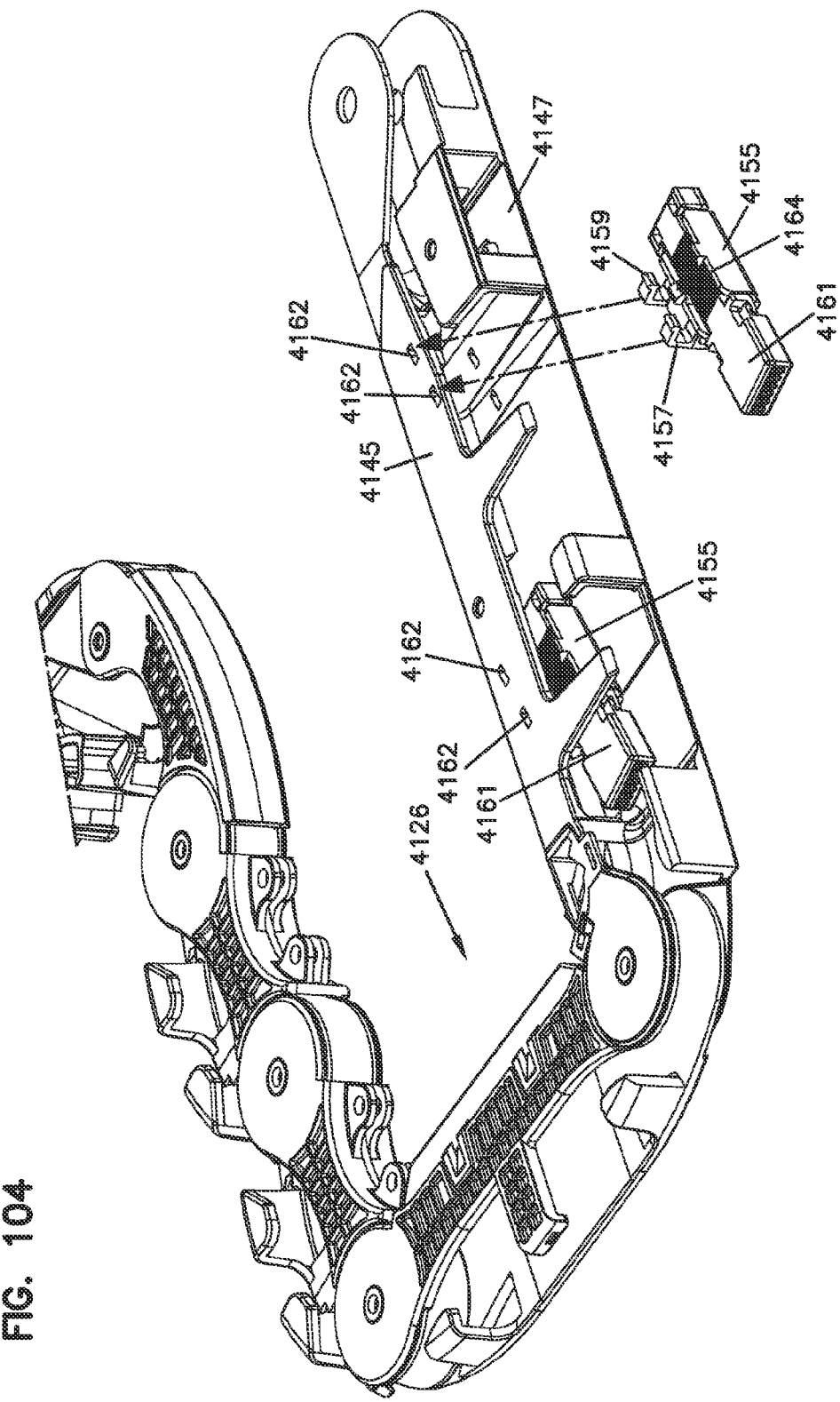
FIG. 104 illustrates the second fanouts exploded from the first link arm of the link arm assembly of FIG. 101.

In FIGS. 96-100, the first link arm 4128a is shown with a pair of first fanouts 4141 (e.g., 2 mm fanouts). The link arm 4128a may be provided with bumps 4143 on the top and bottom walls 4145, 4147 of the link arm 4128a for accepting the first fanouts 4141 with a snap-fit interlock. The first fanouts 4141 define cavities or slots 4149 for receiving the bumps 4143 located on the top and bottom walls 4145, 4147 of the first link arm 4128a. As shown in FIGS. 96 and 97, when the two fanouts 4141 are mounted, one is mounted at an angle to provide a space 4151 for cables 4153 that are fanned out from the rear fanout 4141. The cables 4153 fanned out from the rear fanout 4141 are able to pass by the front fanout 4141 and are retained by cable management features 4160 defined by the periphery of the link arm 4128a.

Referring now to FIGS. 101-104, the first link arm 4128a is shown with a pair of second fanouts 4161. The second fanouts 4161 depicted are 900 micron fanouts and are sized smaller than the 2 mm first fanouts 4141 discussed above. In mounting the second fanouts 4161, the first link arm 4128a utilizes a fanout holder 4155 that is configured to receive the second fanout 4161 with a snap-fit interlock and also latch to the first link arm 4128a.

Figure 105:
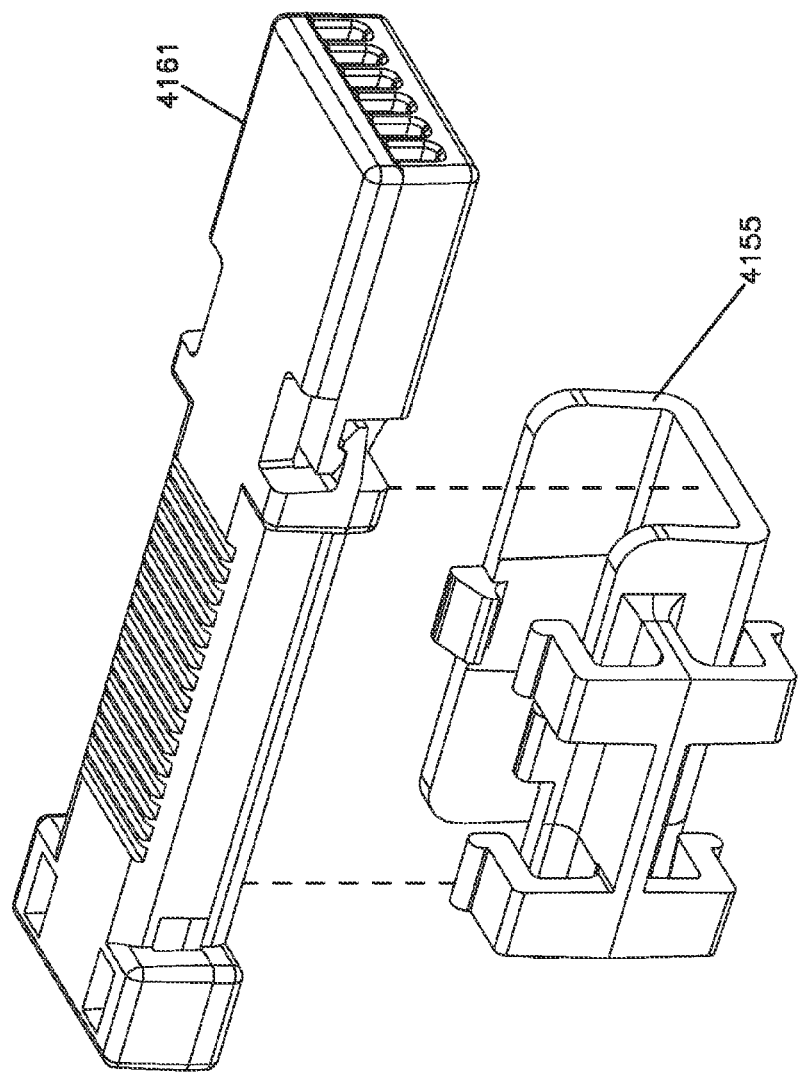
FIG. 105 illustrates in an exploded configuration one of the second fanouts and a fanout holder used for mounting one of the second fanouts to the first link arm of the link arm assembly of FIG. 101.
Figure 106:
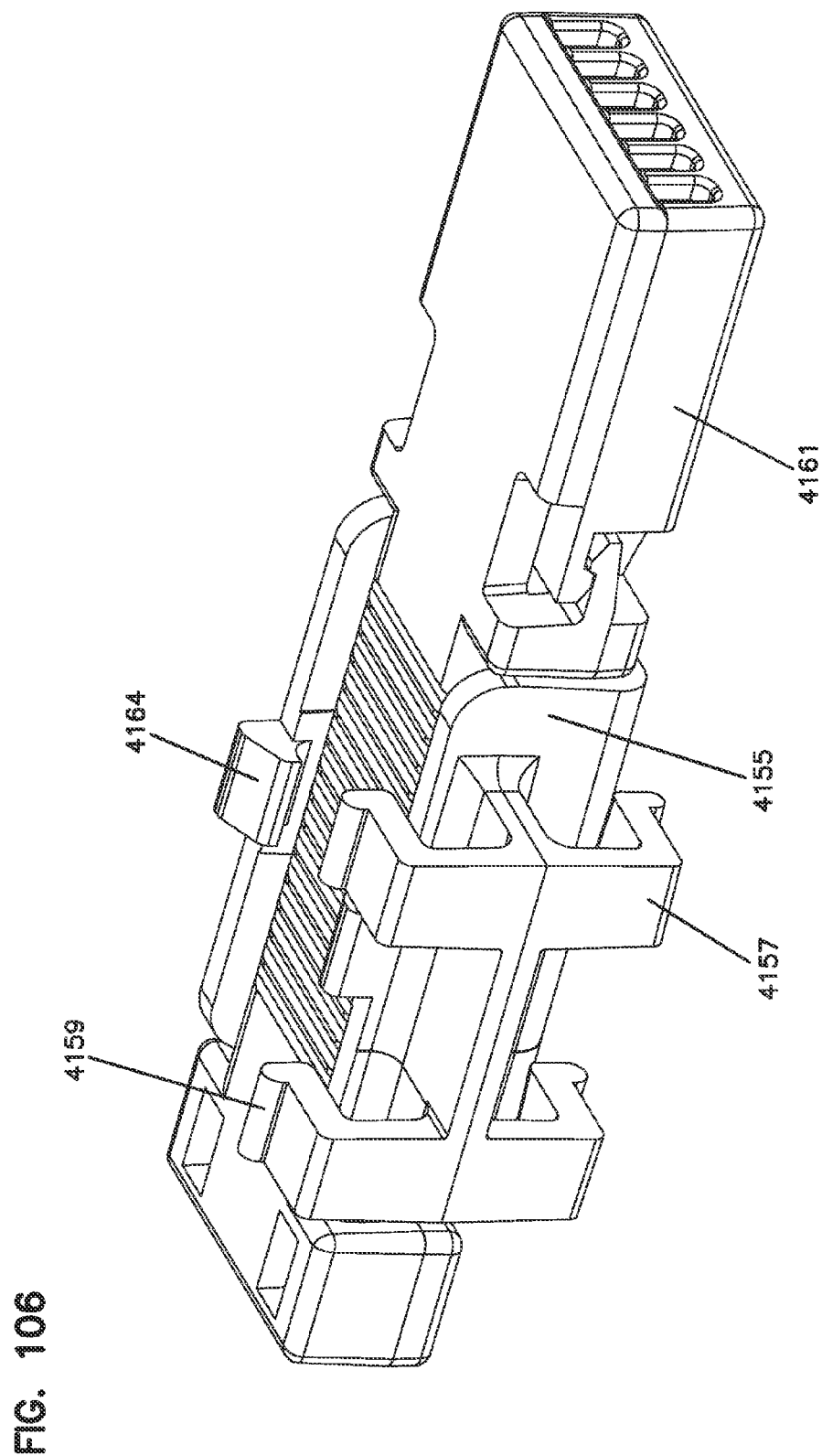
FIG. 106 is a front perspective view of the second fanout and the fanout holder of FIG. 105 in an assembled configuration.
Figure 107:
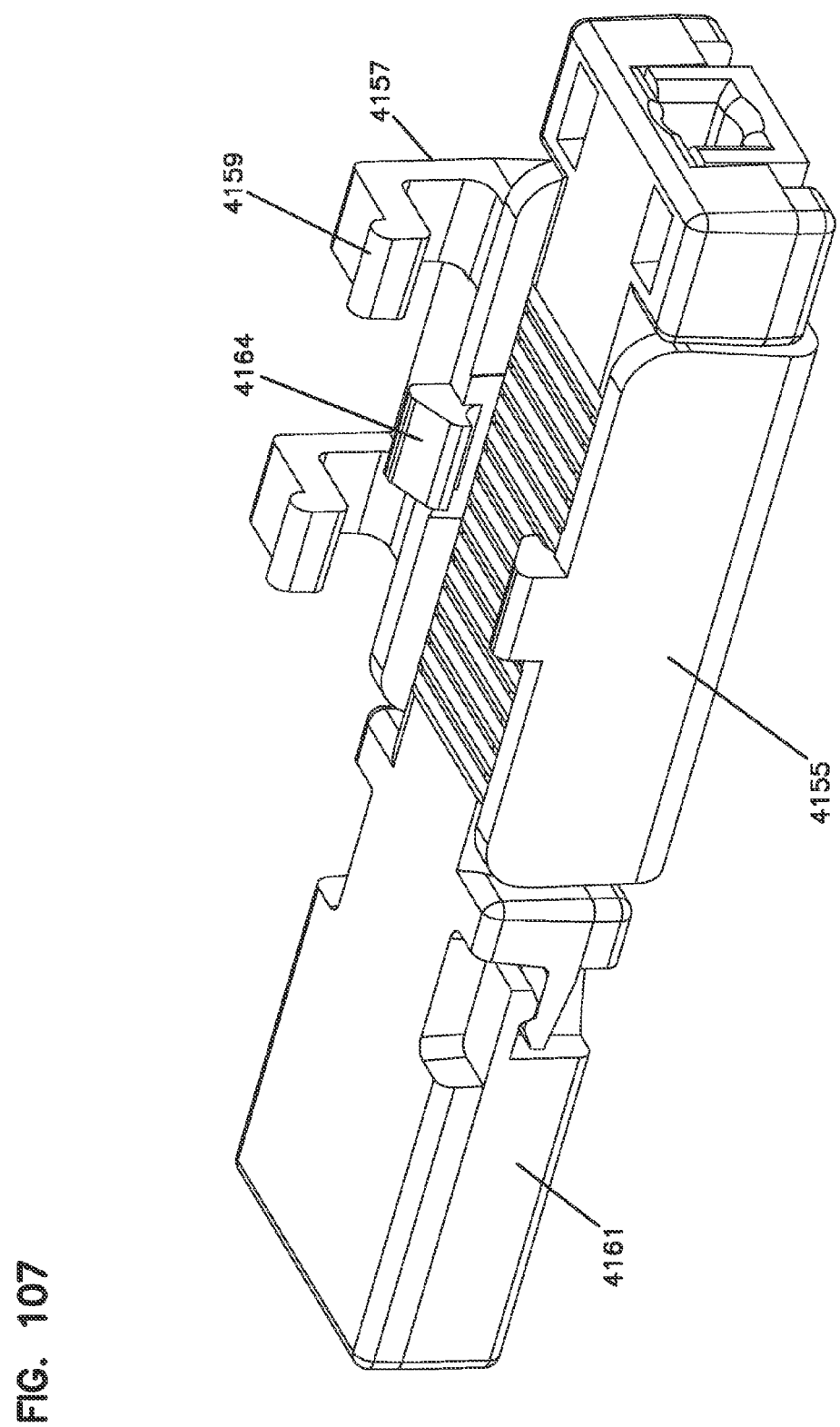
FIG. 107 is a rear perspective view of the second fanout and the fanout holder of FIG. 106.
Figure 108:
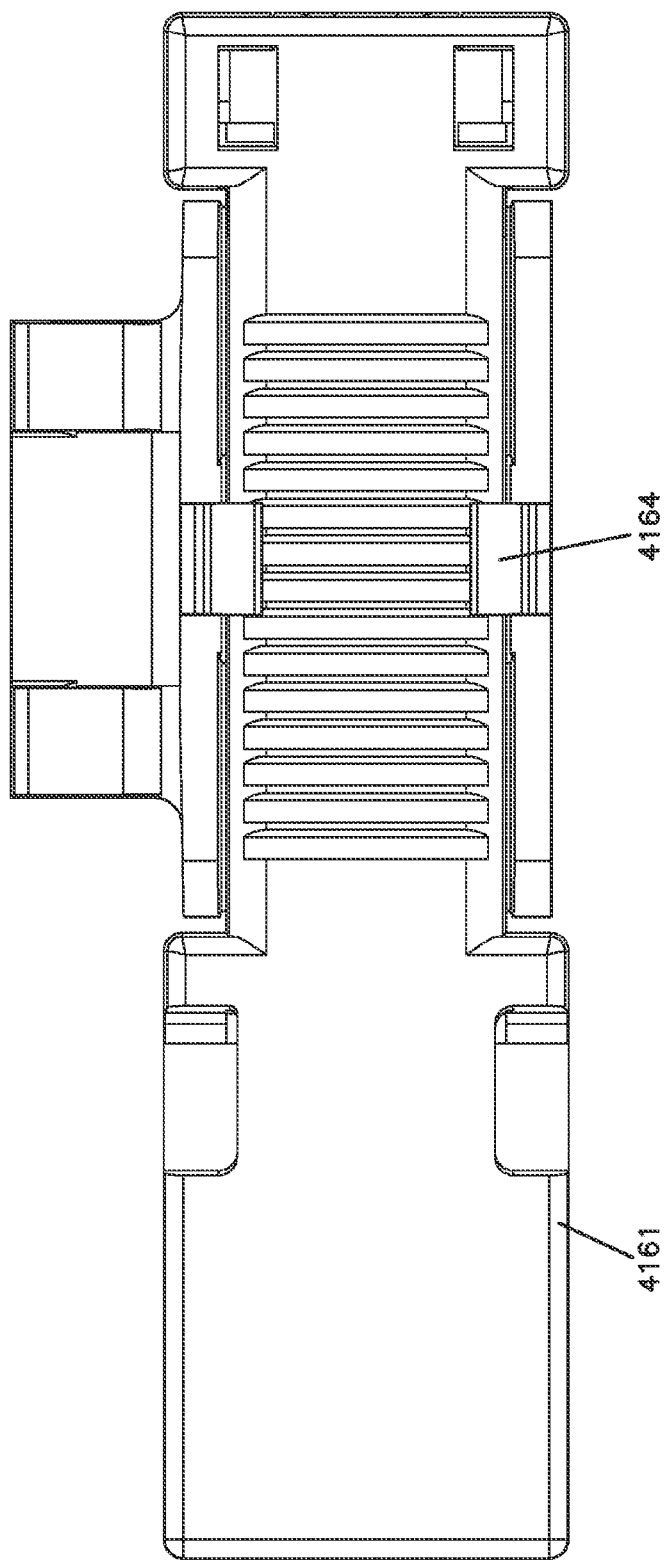
FIG. 108 is a top view of the second fanout and the fanout holder of FIG. 106.
Figure 109:
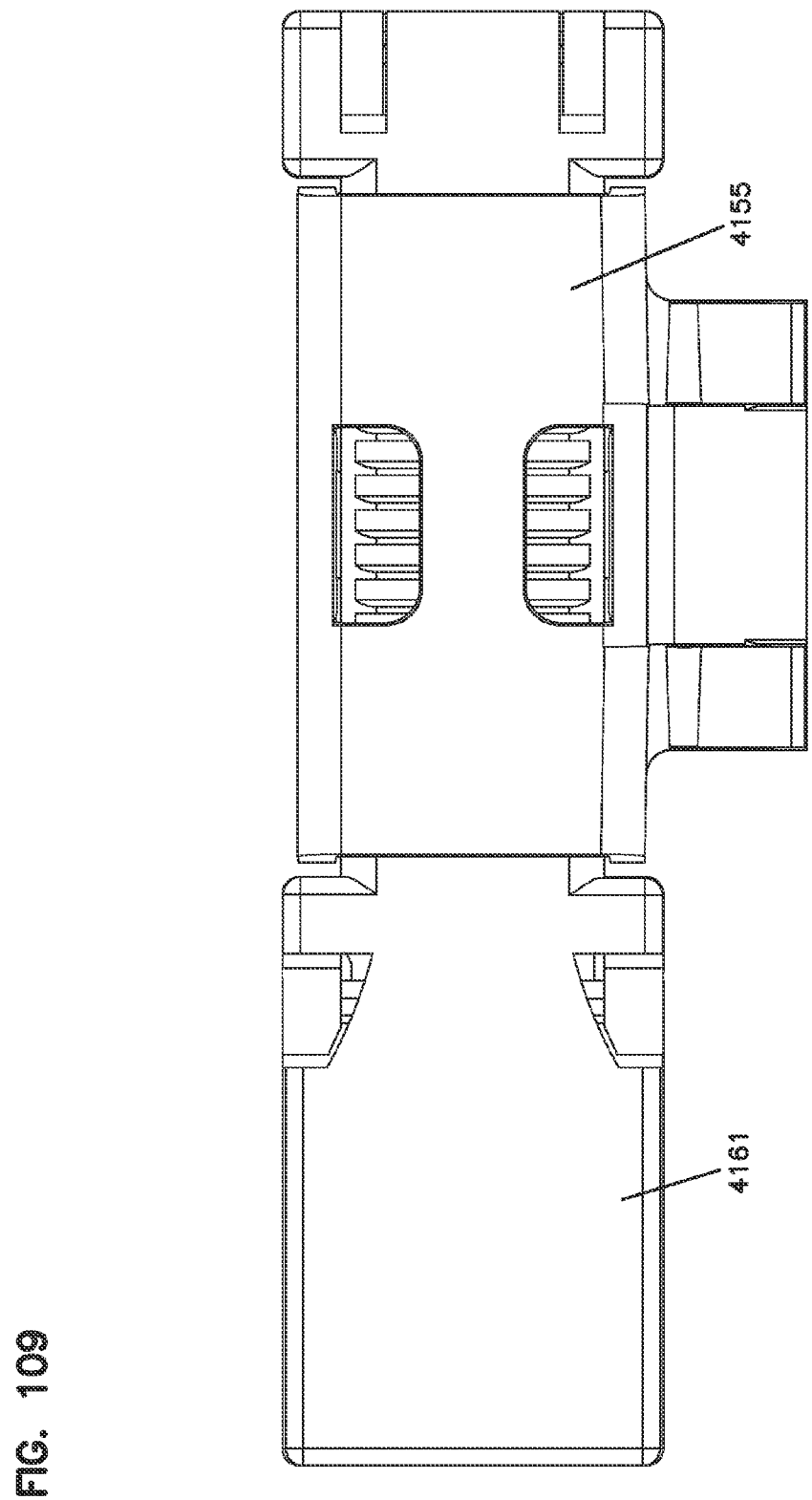
FIG. 109 is a bottom view of the second fanout and the fanout holder of FIG. 106.
Figure 110:
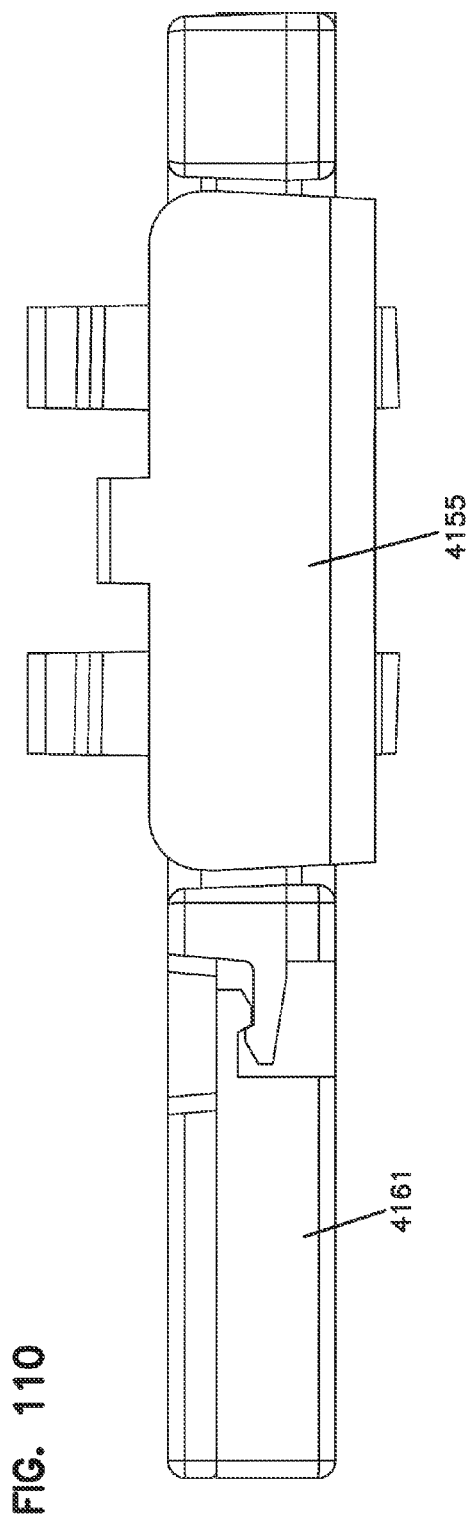
FIG. 110 is a side view of the second fanout and the fanout holder of FIG. 106.
Figure 111:
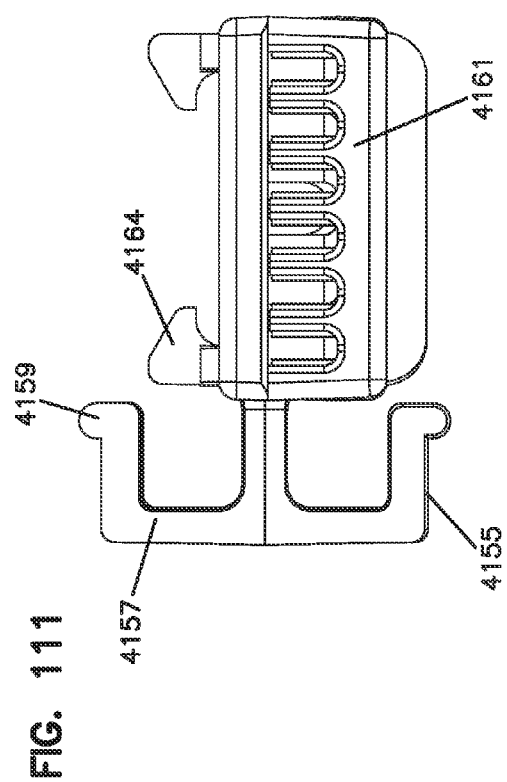
FIG. 111 is a front view of the second fanout and the fanout holder of FIG. 106.
Figure 112:
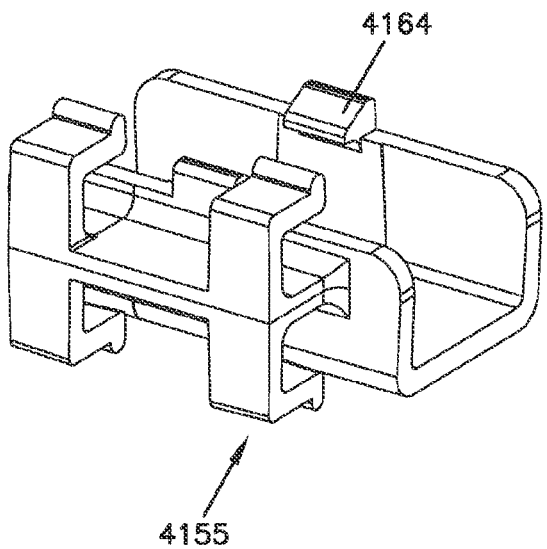
FIG. 112 is a front perspective view of the fanout holder of FIG. 105 shown in isolation.
Figure 113:
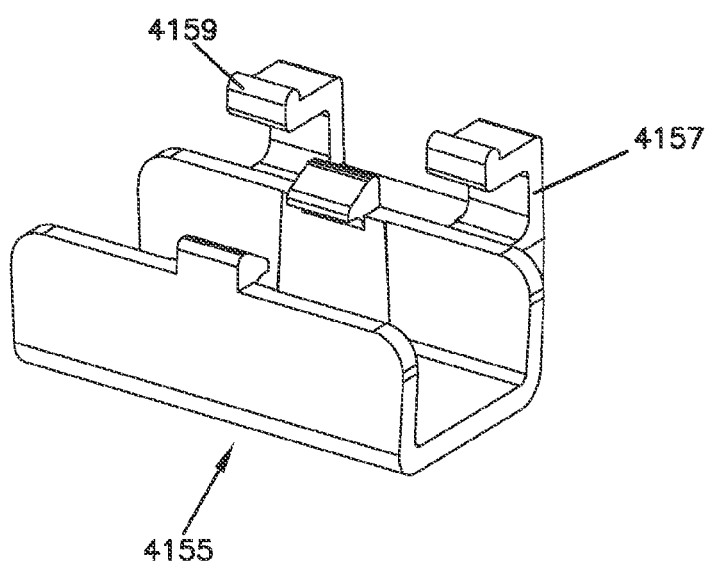
FIG. 113 is a rear perspective view of the fanout holder of FIG. 112.
Figure 114:
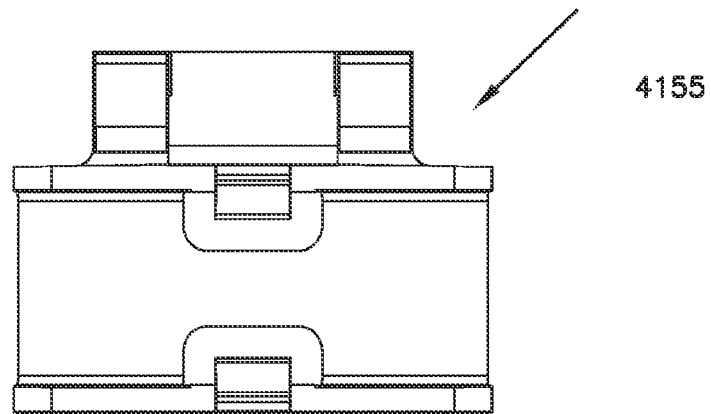
FIG. 114 is a top view of the fanout holder of FIG. 112.
Figure 115:
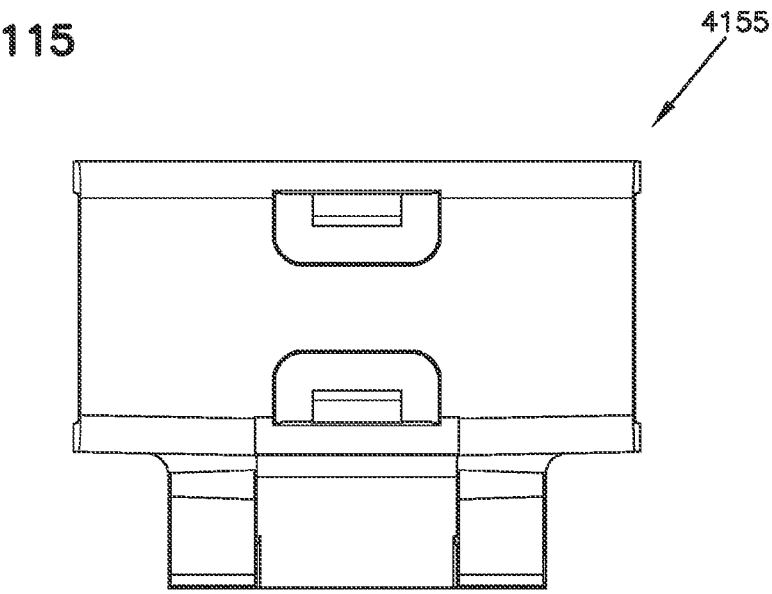
FIG. 115 is a bottom view of the fanout holder of FIG. 112.
Figure 116:
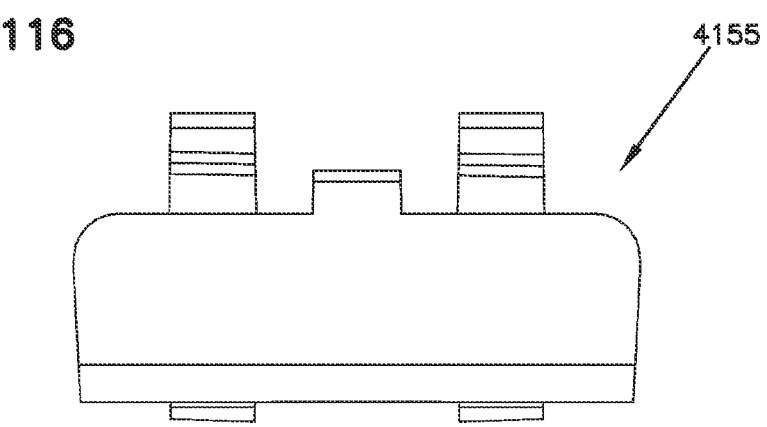
Figure 117:
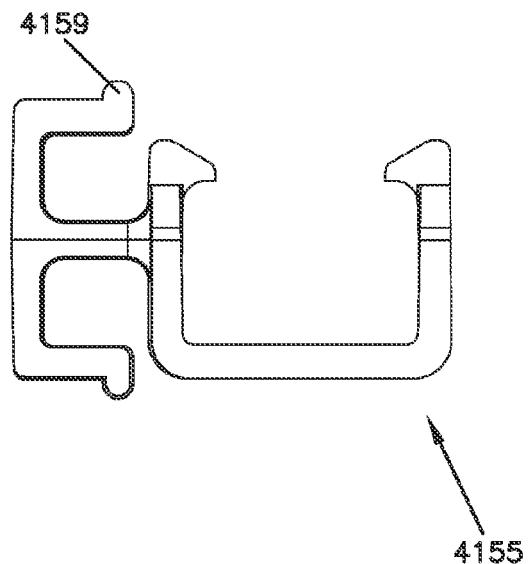
Figure 118:
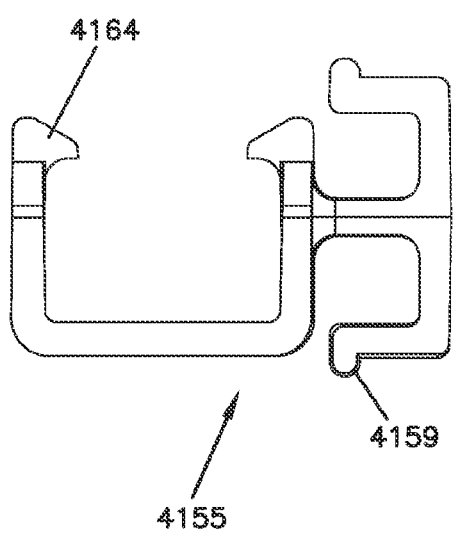

The holder 4155 and the second fanout 4161 are shown in an exploded configuration in FIG. 105. In FIGS. 106-111, the holder 4155 and the second fanout 4161 are shown in a coupled arrangement. The holder 4155 is shown in isolation in FIGS. 112-118.

As noted, the holder 4155 includes flexible cantilever arms 4157 both at the top and bottom sides of the holder 4155. The cantilever arms 4157 include latching tabs 4159 that are configured to snap into detents 4162 provided on the top and bottom walls 4145, 4147 of the first link arm 4128a. The holder 4155 also includes flexible holding tabs 4164 for mounting the second fanout 4161 to the holder 4155.

Thus, with the use of a holder 4155, the link arm 4128a is provided with features for accommodating two different types and sizes of fanouts.

Referring now back to FIGS. 76-78, in an example cable routing configuration, cables may lead from both the front and rear connection locations of a tray 2012 through the radius limiters 2124 and through each of the link arms 2128d, 2128c, 2128b in that order and finally through the first link arm 2128a before being directed out of the chassis 2010. As noted above, the front link arm assembly 2126a and the rear link arm assembly 2126b are configured to move simultaneously together to manage the cable slack as the trays 2012 are pulled out from either direction.

Referring now to FIGS. 70, 71, and 71A, the cable management portion 2076 of the trays 2012 may also include snap-on cable retainers 2005 located at the main connection portion of each tray 2012 that extend toward the front and the back of the trays. The cable retainers 2005 may include snap-fit features for coupling to a central divider portion 2164 of the trays 2012. The cable retainers 2005 are configured to hold or retain cables extending from the connection locations toward the link arm assemblies 2126.

Figure 79:
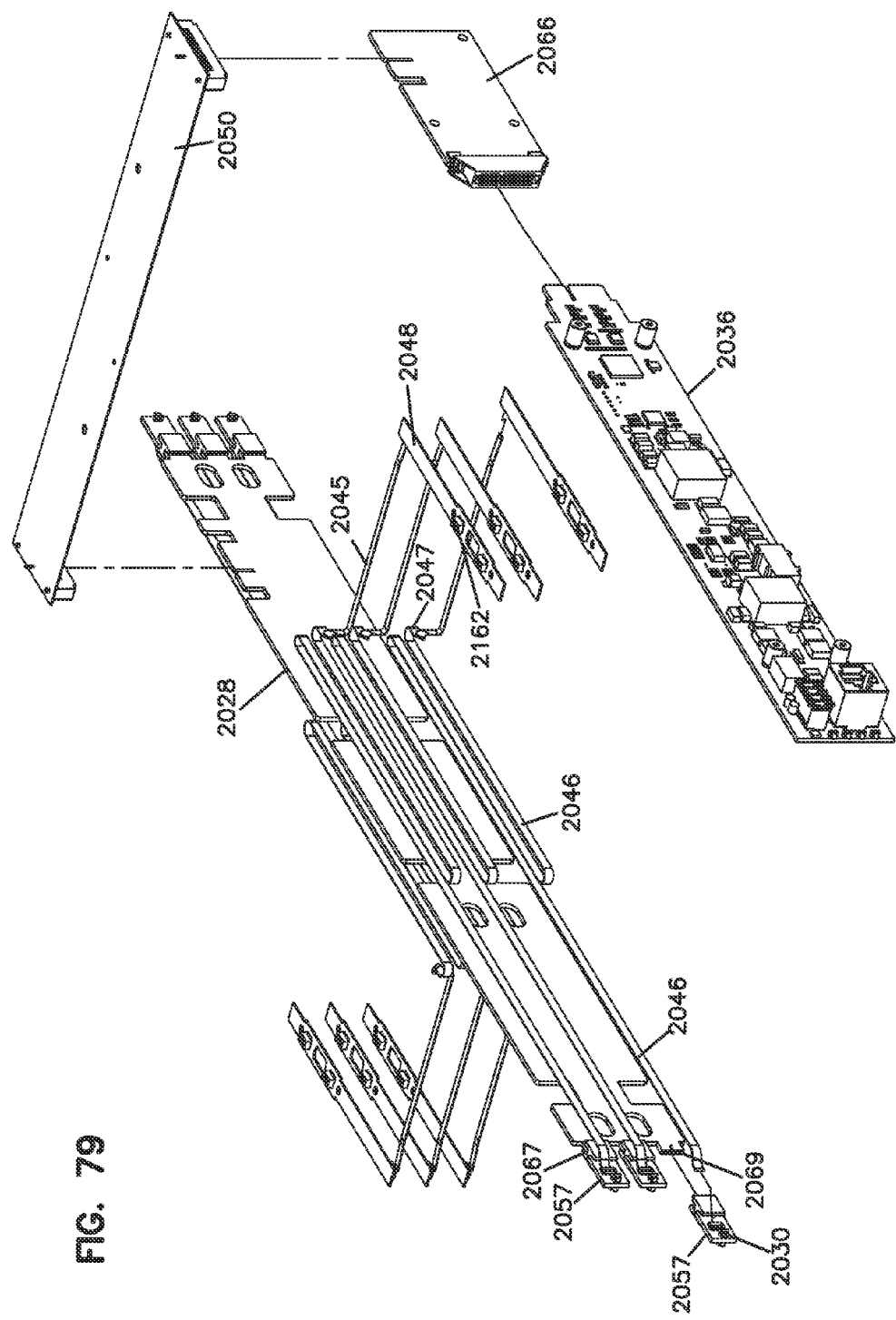
FIG. 79 illustrates the electrical communication pathways via circuit boards for the entire chassis of FIG. 62.
Figure 80:
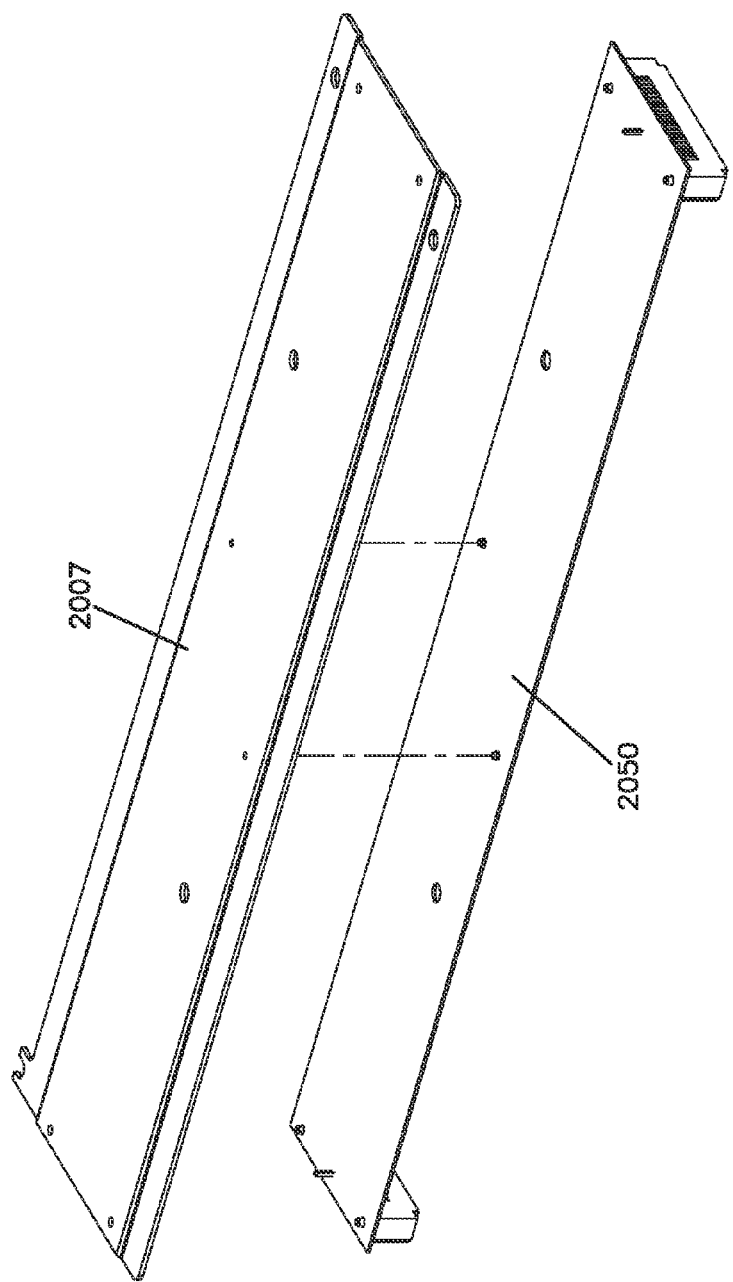
FIG. 80 illustrates a mounting panel for the top PCB of the chassis, the mounting panel configured to mount the top PCB to the top chassis cover of the chassis of FIG. 62.
Figure 82A:
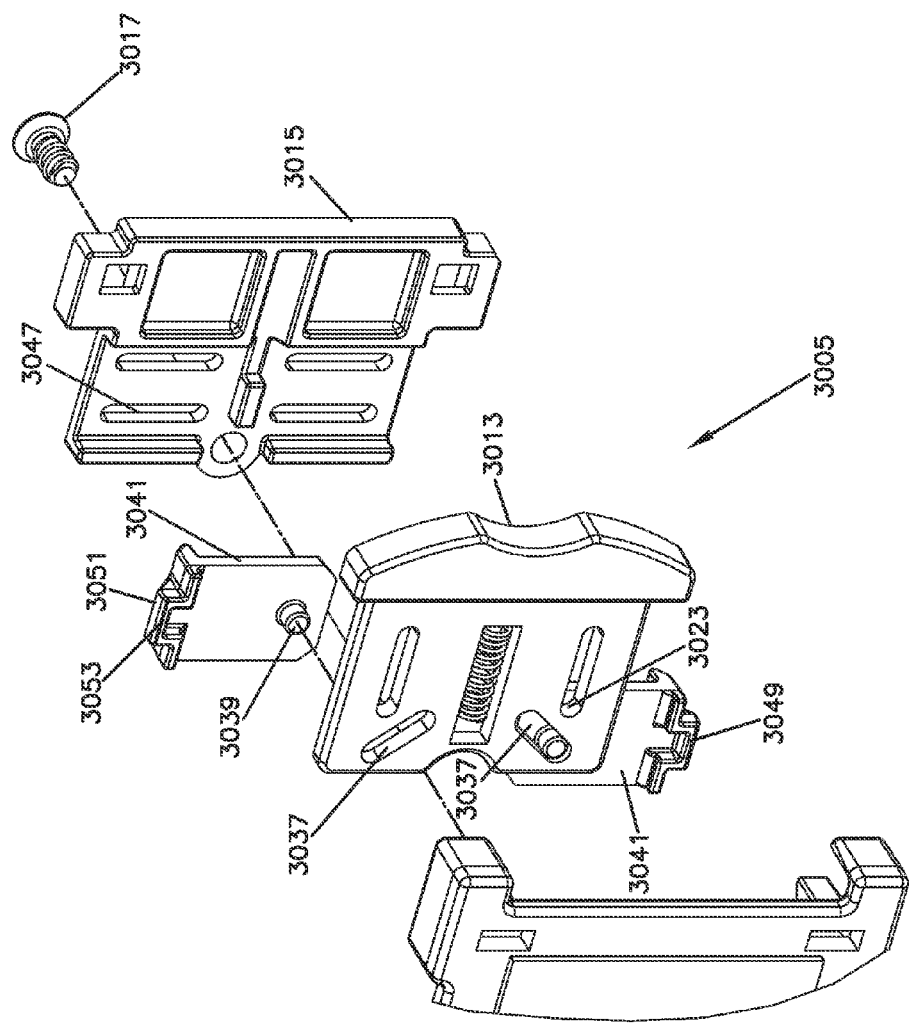
FIG. 82A is a close-up view of a portion of the pivot door of FIG. 82.
Figure 83:
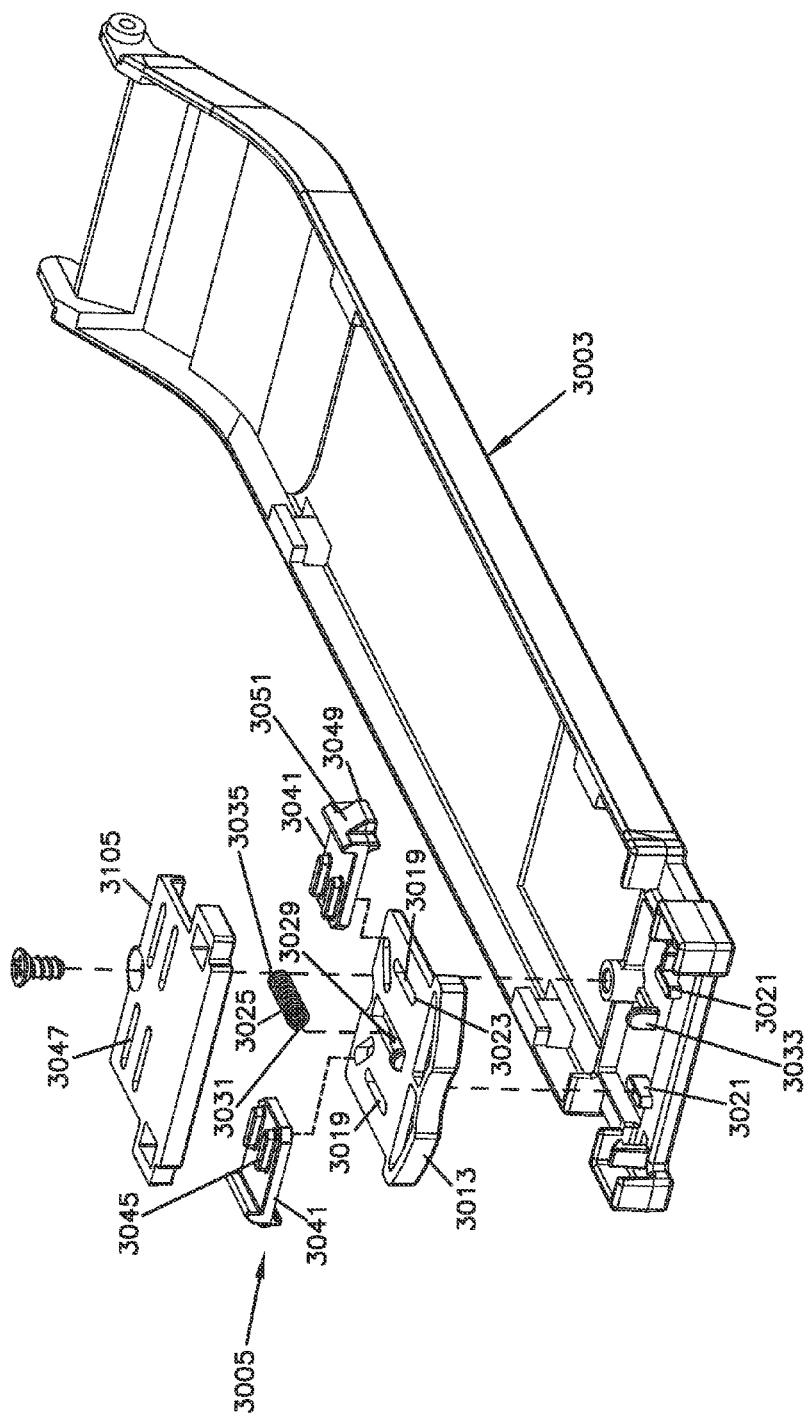
FIG. 83 is another exploded view of the pivot door of FIG. 81.
Figure 84:
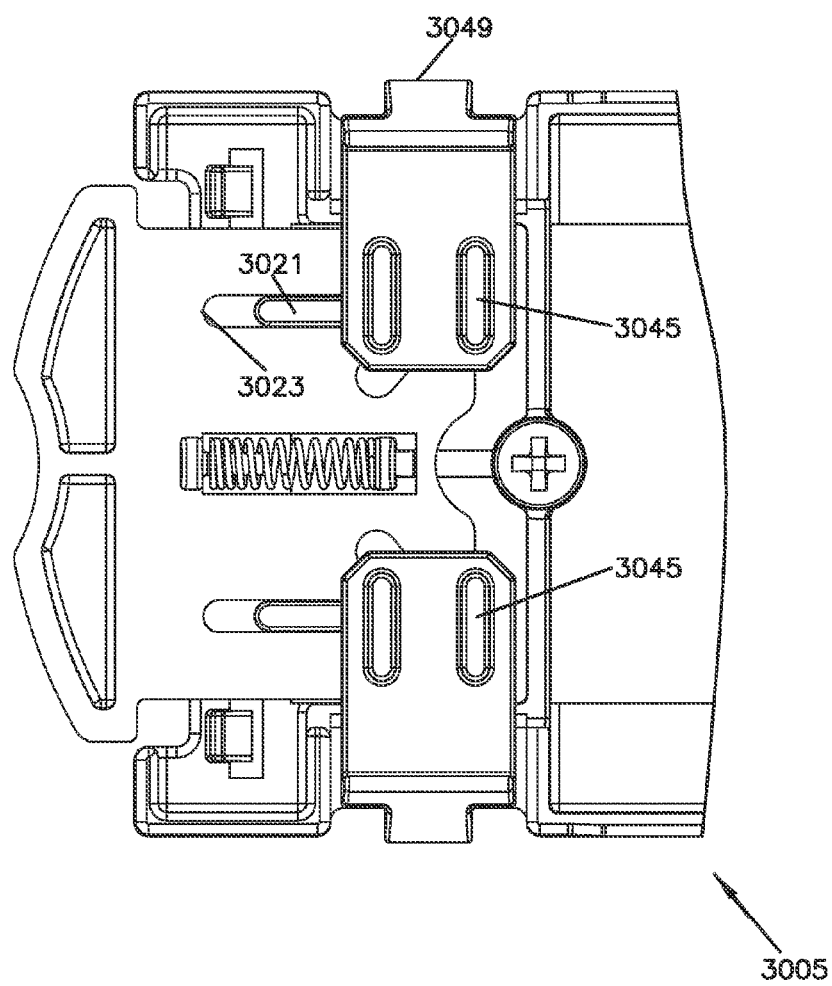
FIG. 84 is a close-up, rear view of the spring latch mechanism of the door of FIG. 81 with the cover removed.

Referring for example to FIGS. 75, 79, and 80, as discussed for previous embodiments, in accordance with some aspects, certain types of adapters that are mounted to the trays 2012 in the form of adapter block assemblies may be configured to collect physical layer information from one or more fiber optic connectors received thereat. For example, certain types of adapters of the adapter block assemblies may include a body configured to hold one or more media reading interfaces that are configured to engage memory contacts on the fiber optic connectors. One or more media reading interfaces may be positioned in the adapter body. In certain implementations, the adapter body may define slots extending between an exterior of the adapter body and an internal passage in which the ferrules of the connectors are received.

Certain types of media reading interfaces may include one or more contact members that are positioned in the slots. A portion of each contact member may extend into a respective one of the passages to engage memory contacts on a fiber optic connector. Another portion of each contact member may also extend out of the slot to contact a circuit board that may be positioned on the adapter block assembly. As noted, portions of the tray 2012 and the chassis 2010 may define conductive paths that are configured to connect the media reading interfaces of the adapters with a main controller or PCB 2036 of the chassis 2010, which can further communicate with a controller of the rack 40 that is housing the chassis 2010.

The main controller 2036 of the chassis 2010 or the controller of the rack 40 may include or connect (e.g., over a network) to a processing unit that is configured to manage physical layer information obtained by the media reading interfaces.

According to the depicted example embodiment, on each tray 2012, once a technician attaches an adapter block assembly using snap features on the tray 2012, the adapter block assemblies may plug into the network as discussed above. For such managed panels 2010, for example, the printed circuit boards of the adapter block assemblies may connect to the tray 2012 using multi-pin connectors 2162 on the tray 2012 as shown in FIGS. 75 and 79. The multi-pin connectors 2162 on the tray 12 may be attached to the flexible circuit formed by the ribbon cable 2046 that routes to the central PCB 2028 within the panel 2010. As shown, the conductive pathway from the multi-pin connectors 2162 to the ribbon cable 2046 is provided by a printed circuit board 2048 that is located at the central divider portion 2164 of the tray 2012 and also by a portion 2045 of the flexible ribbon cable 2046 that is positioned horizontally along the rear side 2166 of the main connection portion 2070 of the tray 2012. The printed circuit board 2048 and the horizontal portion 2045 of the ribbon cable 2046 are preferably mounted flush within recesses 2168 provided on the central divider 2164 and the rear side 2166 of the main connection portion 2070 of the tray 2012.

A tray PCB cover 2001 may be snapped on to the tray to protect the printed circuit board 2048 and the horizontal portion 2045 of the ribbon cable 2046, as shown in FIGS. 71 and 71A.

The portion 2045 of the flexible circuit or ribbon cable that is positioned horizontally along the rear side 2166 is provided with a twist to position it vertically as it passes from the center mounting portion 2072 of the tray 2012 to the slide assembly 2021. The vertical portion 2047 of the ribbon cable passes through a slot 2135 located adjacent the rear end of the center mounting portion 2072 of the tray 2012 to the opposite side of the center mounting portion 2072 of the tray 2012. As discussed previously, the portion 2047 of the ribbon cable 2046, which is provided in a vertical orientation, may then be looped within the slide assembly 2021 of the tray 2012 as shown in FIGS. 72, 73, and 79. The vertical portion 2047 of the ribbon cable 2046 is configured to move within the slide assembly 2021 to allow the tray 2012 to travel back and forth without disrupting the communication through the ribbon cable 2046 between the central PCB 2028 and tray PCB 2048.

As shown in FIG. 73, once the ribbon cable 2046 exits the center mounting portion 2072 of the tray 2012 and enters the center rail 2023, the ribbon cable 2046 runs toward the front of the center rail 2023 and is positioned between the center mounting portion 2072 of the tray 2012 and the right side of the divider wall 2085 of the center rail 2023. Once lead around the first gear wheel 2051a, the ribbon cable 2046 is directed toward the rear of the center rail 2023 and is positioned at the left side of the divider wall 2085 (between the divider wall 2085 and the rightmost wall 2045 of the mounting rail 2025 (please see FIG. 73). As the tray 2012 is moved back and forth with respect to the chassis 2010 via the slide assembly 2021, any slack within the ribbon cable 2046 is taken up by the first gear wheel 2051a, which acts as a pulley for the ribbon cable 2046.

The portion of the ribbon cable 2046 that resides within the flex pocket 2075 of the mounting rail 2025 remains generally stationary while the portions of the ribbon cable 2046 that are located at both sides of the divider wall 2085 of the center rail 2023 move back and forth as the tray 2012 moves back and forth. As discussed previously, an end 2172 of the ribbon cable 2046 that is within the flex pocket 2075 connects to the micro slide PCB 2057 housed within the LED mount 2055 of the mounting rail 2025 of the slide assembly 2021. When a tray 2012 is slidably mounted to the mounting block 2042 and is locked in via the lock lever 2019, the tray 2012 establishes electrical communication with the central PCB 2028 via card-edge-style connections between the micro slide PCB 2057 and the front extensions 2069 of the central PCB 2028.

As noted above, the micro slide PCB's 2057 of the slide assemblies 2021 may use indicators such as LEDs 2030 on both the front 2032 and back 2034 of the panel 2010 to communicate to a technician which tray 2012 should be accessed. The central PCB 2028 then may connect to the main PCB or controller 2036 of the chassis 2010, which is housed within the end support 2044 of the tray assembly 2024. The connection is made via the top PCB 2050 that runs along the top cover 2018 of the panel 2010 into the end support 2044. The top PCB 2050 is configured to extend to the backplane PCB 2066 located toward the rear of the channel 2062 via a card-edge-style connection. The main controller 2036 is accessible to the technician by removing a removable front end cap 2064 of the applicable end support 2044. The main controller 2036 may also use a card-edge-style connection at its opposite rear end to connect to the backplane PCB 2066, allowing the main controller 2036 to be a field-replaceable device. The main controller 2036 is configured to communicate to a higher-level managed connectivity rack or frame 40 via a connection on the side of the panel 2010. The main controller 2036 of the panel 2010 may be powered via another connection on the side of the panel 2010.

The right end support 2044 is shown in an exploded configuration in FIG. 68 to illustrate the removability feature of the end cap 2064. The end cap 2064 includes an end cap lever 2137 that needs to be pulled toward the front of the chassis 2010 when removing the end cap 2064. The lever 2137 slides within an aperture 2139 defined by an end cap cover 2241 that is used to capture the lever 2137 against the end cap 2064. The lever 2137 defines a pair of angled pin tracks 2141 that are configured to receive the pins 2143 of two opposing locking tabs 2145. The locking tabs 2145 include tapered locking ends 2147 that are configured to snap into upper and lower notches 2149 defined on extensions 2151 provided on the end support 2044. The tapered ends 2147 need to be cleared off the notches 2149 to pull the end cap 2064 forwardly and remove it from the end support 2044. As shown in FIG. 69, when the lever 2137 is pulled toward the front 2032 of the chassis 2010, the locking tabs 2145 are pulled toward the lever 2137. The tapered ends 2147 that are snapped into the notches 2149 are pulled out of the notches 2149 due to the interaction of the pins 2143 and the tracks 2141 and the end cap 2064 can be removed from the end support 2044. A spring 2153 biases the lever 2137 rearwardly, to keep the locking tabs 2145 in a locking position. When the lever 2137 is pulled forwardly, the lever 2137 is pulled against the bias of the spring 2153.

Once the main controller 2036 has been inserted into the end support 2044, the end cap 2064 can be slidably re-inserted onto the end support 2044, with the extensions 2151 of the end support 2044 slidably fitting into guides 2155 defined on the end cap 2064. The tapered ends 2147 of the locking tabs 2145 contact the extensions 2151 and eventually clear the extensions 2151 under the bias of the spring 2153 until they snap into the notches 2149 defined on the extensions 2151.

It should be noted that in the depicted embodiment, only the front end cap 2064 of the right end support 2044 has been provided with features to make it removable. A similar end cap cover 2141 may be used on all four corners of the chassis 2010 for efficiency in manufacturing.

Although in the foregoing description, terms such as "top," "bottom," "front," "back," "right," "left," "upper," and "lower" were used for ease of description and illustration, no restriction is intended by such use of the terms. The telecommunications devices described herein can be used in any orientation, depending upon the desired application.

Having described the preferred aspects and embodiments of the present invention, modifications and equivalents of the disclosed concepts may readily occur to one skilled in the art. However, it is intended that such modifications and equivalents be included within the scope of the claims which are appended hereto.

The invention claimed is:

1. A fiber optic telecommunications device comprising:
a telecommunications chassis for mounting on a telecommunications frame;
the chassis including:
a plurality of fiber optic trays slidably mounted on the chassis, the fiber optic trays arranged in a vertically stacked arrangement, each fiber optic tray slidable between a closed storage position and an open access position, each fiber optic tray including:
fiber optic connection locations defined by fiber optic adapters for connecting cables to be routed through the telecommunications frame; and
a cable manager coupled at a first end to the fiber optic tray and coupled at a second end to the telecommunications chassis, the cable manager configured for routing cables to and from the fiber optic connection locations, the cable manager defining a plurality of link arms that are pivotally connected to each other such that the cable manager retracts and extends with a corresponding movement of the tray as the link arms pivot with respect to each other, wherein the link arms are configured to pivot relative to each other to prevent fiber optic cables managed therein from being bent in an arc having a radius of curvature that is less than a predetermined value during the movement of the tray, each link arm defining a top wall, a bottom wall, and two oppositely positioned sidewalls, wherein each link arm defines an open portion along at least one of the sidewalls and an open portion along the top wall for receiving fiber optic cables therein, the open portions along the top wall and the at least one of the sidewalls communicating with each other, wherein each fiber optic adapter includes electrical contacts that are configured to make an electrical connection with a fiber optic connector inserted into the adapter, the electrical contacts communicating with a controller mounted on the chassis, wherein the controller mounted on the chassis is configured to electrically communicate with a connector mounted on the telecommunications frame.

2. A fiber optic telecommunications device according to claim 1, wherein at least two of the pivotally connected link arms include a compression spring therebetween to bias the link arms away from each other.

3. A fiber optic telecommunications device according to claim 1, wherein the chassis includes three slidable fiber optic trays arranged in a vertically stacked arrangement, each chassis occupying a 1RU of standard telecommunications rack space.

4. A fiber optic telecommunications device according to claim 3, wherein the chassis includes three slidable fiber optic trays arranged in a vertically stacked arrangement on a right side of the chassis and three slidable fiber optic trays arranged in a vertically stacked arrangement on a left side of the chassis, each chassis occupying a 1RU of standard telecommunications rack space.

5. A fiber optic telecommunications device according to claim 1, wherein the chassis includes twelve slidable fiber optic trays arranged in a vertically stacked arrangement, each chassis occupying a 4RU of standard telecommunications rack space.

6. A fiber optic telecommunications device according to claim 5, wherein the chassis includes twelve slidable fiber optic trays arranged in a vertically stacked arrangement on a right side of the chassis and twelve slidable fiber optic trays arranged in a vertically stacked arrangement on a left side of the chassis, each chassis occupying a 4RU of standard telecommunications rack space.

7. A fiber optic telecommunications device according to claim 1, wherein the fiber optic adapters are mounted to the trays with a snap-fit interlock.

8. A fiber optic telecommunications device according to claim 1, wherein the fiber optic adapters are LC-format adapters.

9. A fiber optic telecommunications device according to claim 1, wherein the cable manager includes five link arms that are pivotally connected to each other.

10. A fiber optic telecommunications device according to claim 1, wherein the plurality of fiber optic trays are removable from the telecommunications chassis via a flexible lever.

11. A fiber optic telecommunications device according to claim 1, wherein each tray is mounted on the chassis via a slide assembly that includes a gear mechanism.

12. A fiber optic telecommunications device according to claim 11, wherein the slide assembly houses a flexible printed circuit board that flexes as the tray moves back and forth, the flexible printed circuit board configured to relay information from the fiber optic connection locations on the tray to other parts of the chassis.

13. A fiber optic telecommunications device according to claim 12, wherein the flexible printed circuit board relays information from the fiber optic connection locations on the tray to a central printed circuit board of the chassis, wherein the connection from the flexible printed circuit board to the central printed circuit board is made through a removable micro printed circuit board that is removably mounted within the slide assembly.

14. A fiber optic telecommunications device according to claim 13, wherein the micro printed circuit board includes at least one light-emitting diode to identify a particular tray.

15. A fiber optic telecommunications device according to claim 1, wherein the link arms are pivotally coupled with respect to each other so as to define a limited pivotal movement therebetween, wherein at least some of the link arms include snap-fit coupling features defined by cylindrical tabs on a first male end and cylindrical receptacles on an opposite second female end for providing the pivotal movement therebetween.

16. A fiber optic telecommunications device according to claim 1, wherein the chassis includes at least one pivot door with a spring-loaded latching mechanism for allowing and limiting access to the plurality of fiber optic trays slidably mounted on the chassis.

17. A fiber optic telecommunications device comprising:
a telecommunications rack for mounting a plurality of telecommunications chassis, each chassis including:
a plurality of fiber optic trays slidably mounted on the chassis, the fiber optic trays arranged in a vertically stacked arrangement, each fiber optic tray slidable between a closed storage position and an open access position, each fiber optic tray including:
fiber optic connection locations defined by fiber optic adapters for connecting cables to be routed through the telecommunications frame; and
a cable manager coupled at a first end to the fiber optic tray and coupled at a second end to the telecommunications chassis, the cable manager configured for routing cables to and from the fiber optic connection locations, the cable manager defining a plurality of link arms that are pivotally connected to each other such that the cable manager retracts and extends with a corresponding movement of the tray as the link arms pivot with respect to each other, wherein the link arms are configured to pivot relative to each other to prevent fiber optic cables managed therein from being bent in an arc having a radius of curvature that is less than a predetermined value during the movement of the tray, each link arm defining a top wall, a bottom wall, and two oppositely positioned sidewalls, wherein each link arm defines an open portion along at least one of the sidewalls and an open portion along the top wall for receiving fiber optic cables therein, the open portions along the top wall and the at least one of the sidewalls communicating with each other, wherein each fiber optic adapter includes electrical contacts that are configured to make an electrical connection with a fiber optic connector inserted into the adapter, the electrical contacts communicating with a controller mounted on the chassis, wherein the controller mounted on the chassis is configured to electrically communicate with a connector mounted on the telecommunications frame.

18. A fiber optic telecommunications device according to claim 17, wherein at least two of the pivotally connected link arms include a compression spring therebetween to bias the link arms away from each other.

19. A fiber optic telecommunications device according to claim 17, wherein the chassis includes three slidable fiber optic trays arranged in a vertically stacked arrangement, each chassis occupying a 1RU of standard telecommunications rack space.

20. A fiber optic telecommunications device according to claim 19, wherein the chassis includes three slidable fiber optic trays arranged in a vertically stacked arrangement on a right side of the chassis and three slidable fiber optic trays arranged in a vertically stacked arrangement on a left side of the chassis, each chassis occupying a 1 RU of standard telecommunications rack space.

21. A fiber optic telecommunications device according to claim 17, wherein the chassis includes twelve slidable fiber optic trays arranged in a vertically stacked arrangement, each chassis occupying a 4RU of standard telecommunications rack space.

22. A fiber optic telecommunications device according to claim 21, wherein the chassis includes twelve slidable fiber optic trays arranged in a vertically stacked arrangement on a right side of the chassis and twelve slidable fiber optic trays arranged in a vertically stacked arrangement on a left side of the chassis, each chassis occupying a 4RU of standard telecommunications rack space.

23. A fiber optic telecommunications device according to claim 17, wherein the fiber optic adapters are mounted to the trays with a snap-fit interlock.

24. A fiber optic telecommunications device according to claim 17, wherein the fiber optic adapters are LC-format adapters.

25. A fiber optic telecommunications device according to claim 17, wherein the cable manager includes five link arms that are pivotally connected to each other.

26. A fiber optic telecommunications device according to claim 17, wherein the plurality of fiber optic trays are removable from the telecommunications chassis via a flexible lever.

27. A fiber optic telecommunications device according to claim 17, wherein each tray is mounted on the chassis via a slide assembly that includes a gear mechanism.

28. A fiber optic telecommunications device according to claim 17, wherein the slide assembly houses a flexible printed circuit board that flexes as the tray moves back and forth, the flexible printed circuit board configured to relay information from the fiber optic connection locations on the tray to other parts of the chassis.

29. A fiber optic telecommunications device according to claim 28, wherein the flexible printed circuit board relays information from the fiber optic connection locations on the tray to a central printed circuit board of the chassis, wherein the connection from the flexible printed circuit board to the central printed circuit board is made through a removable micro printed circuit board that is removably mounted within the slide assembly.

30. A fiber optic telecommunications device according to claim 29, wherein the micro printed circuit board includes at least one light-emitting diode to identify a particular tray.

31. A fiber optic telecommunications device according to claim 17, wherein the link arms are pivotally coupled with respect to each other so as to define a limited pivotal movement therebetween, wherein at least some of the link arms include snap-fit coupling features defined by cylindrical tabs on a first male end and cylindrical receptacles on an opposite second female end for providing the pivotal movement therebetween.

32. A fiber optic telecommunications device according to claim 17, wherein the chassis includes at least one pivot door with a spring-loaded latching mechanism for allowing and limiting access to the plurality of fiber optic trays slidably mounted on the chassis.

33. A fiber optic telecommunications tray comprising:
first and second slide portions for slidably mounting the tray to a telecommunications fixture and a connection portion located between the first and second slide portions;
fiber optic connection locations defined by the connection portion of the tray for connecting cables; and
a cable manager coupled at a first end to the fiber optic tray and defining a second end for coupling to the telecommunications fixture receiving the tray, the cable manager configured for routing cables to and from the fiber optic connection locations, the cable manager defining a plurality of link arms that are pivotally connected to each other such that the cable manager retracts and extends with a corresponding movement of the tray with respect to the fixture as the link arms pivot with respect to each other, wherein the link arms are configured to pivot relative to each other to prevent fiber optic cables managed therein from being bent in an arc having a radius of curvature that is less than a predetermined value during the movement of the tray, each link arm defining a top wall, a bottom wall, and two oppositely positioned sidewalls, wherein each link arm defines an open portion along at least one of the sidewalls and an open portion along the top wall for receiving fiber optic cables therein, the open portions along the top wall and the at least one of the sidewalls communicating with each other, wherein at least two of the pivotally connected link arms include a compression spring therebetween to bias the link arms away from each other.

34. A fiber optic telecommunications tray according to claim 32, wherein the connection locations are defined by fiber optic adapters.

35. A fiber optic telecommunications tray according to claim 34, wherein the fiber optic adapters are mounted to the tray with a snap-fit interlock.

36. A fiber optic telecommunications tray according to claim 34, wherein the fiber optic adapters are LC-format adapters.

37. A fiber optic telecommunications tray according to claim 34, wherein the cable manager includes five link arms that are pivotally connected to each other.

38. A fiber optic telecommunications device comprising:
a telecommunications chassis for mounting on a telecommunications frame;
the chassis including:
a plurality of fiber optic trays slidably mounted on the chassis, the fiber optic trays arranged in a vertically stacked arrangement, each fiber optic tray slidable between a closed storage position and an open access position, each fiber optic tray including:
fiber optic connection locations for connecting cables to be routed through the telecommunications frame; and
a cable manager coupled at a first end to the fiber optic tray and coupled at a second end to the telecommunications chassis, the cable manager configured for routing cables to and from the fiber optic connection locations, the cable manager defining a plurality of link arms that are pivotally connected to each other such that the cable manager retracts and extends with a corresponding movement of the tray as the link arms pivot with respect to each other, wherein the link arms are configured to pivot relative to each other to prevent fiber optic cables managed therein from being bent in an arc having a radius of curvature that is less than a predetermined value during the movement of the tray, each link arm defining a top wall, a bottom wall, and two oppositely positioned sidewalls, wherein each link arm defines an open portion along at least one of the sidewalls and an open portion along the top wall for receiving fiber optic cables therein, the open portions along the top wall and the at least one of the sidewalls communicating with each other, wherein each tray is mounted on the chassis via a slide assembly that includes a gear mechanism, and wherein the slide assembly houses a flexible printed circuit board that flexes as the tray moves back and forth, the flexible printed circuit board configured to relay information from the fiber optic connection locations on the tray to other parts of the chassis.

39. A fiber optic telecommunications device according to claim 38, wherein the flexible printed circuit board relays information from the fiber optic connection locations on the tray to a central printed circuit board of the chassis, wherein the connection from the flexible printed circuit board to the central printed circuit board is made through a removable micro printed circuit board that is removably mounted within the slide assembly.

40. A fiber optic telecommunications device according to claim 39, wherein the micro printed circuit board includes at least one light-emitting diode to identify a particular tray.

41. A fiber optic telecommunications device comprising:
a telecommunications rack for mounting a plurality of telecommunications chassis, each chassis including:
a plurality of fiber optic trays slidably mounted on the chassis, the fiber optic trays arranged in a vertically stacked arrangement, each fiber optic tray slidable between a closed storage position and an open access position, each fiber optic tray including:
fiber optic connection locations for connecting cables to be routed through the telecommunications frame; and
a cable manager coupled at a first end to the fiber optic tray and coupled at a second end to the telecommunications chassis, the cable manager configured for routing cables to and from the fiber optic connection locations, the cable manager defining a plurality of link arms that are pivotally connected to each other such that the cable manager retracts and extends with a corresponding movement of the tray as the link arms pivot with respect to each other, wherein the link arms are configured to pivot relative to each other to prevent fiber optic cables managed therein from being bent in an arc having a radius of curvature that is less than a predetermined value during the movement of the tray, each link arm defining a top wall, a bottom wall, and two oppositely positioned sidewalls, wherein each link arm defines an open portion along at least one of the sidewalls and an open portion along the top wall for receiving fiber optic cables therein, the open portions along the top wall and the at least one of the sidewalls communicating with each other, wherein each tray is mounted on the chassis via a slide assembly that includes a gear mechanism, and wherein the slide assembly houses a flexible printed circuit board that flexes as the tray moves back and forth, the flexible printed circuit board configured to relay information from the fiber optic connection locations on the tray to other parts of the chassis.

42. A fiber optic telecommunications device according to claim 41, wherein the flexible printed circuit board relays information from the fiber optic connection locations on the tray to a central printed circuit board of the chassis, wherein the connection from the flexible printed circuit board to the central printed circuit board is made through a removable micro printed circuit board that is removably mounted within the slide assembly.

43. A fiber optic telecommunications device according to claim 42, wherein the micro printed circuit board includes at least one light-emitting diode to identify a particular tray.

\* \* \* \* \*